US012265655B2

(12) United States Patent
Elhadad et al.

(10) Patent No.: US 12,265,655 B2
(45) Date of Patent: *Apr. 1, 2025

(54) MOVING WINDOWS BETWEEN A VIRTUAL DISPLAY AND AN EXTENDED REALITY ENVIRONMENT

(71) Applicant: Sightful Computers Ltd., Tel Aviv (IL)

(72) Inventors: Eli Elhadad, Kidron (IL); Amit Knaani, Tel Aviv (IL); Tomer Kahan, Ramat Hasharon (IL); Tamir Berliner, Tel Aviv (IL); Orit Dolev, Tel Aviv (IL)

(73) Assignee: Sightful Computers Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,179

(22) Filed: Oct. 20, 2023

(65) Prior Publication Data

US 2024/0045495 A1 Feb. 8, 2024

Related U.S. Application Data

(63) Continuation of application No. PCT/US2022/038450, filed on Jul. 27, 2022.
(Continued)

(51) Int. Cl.
*G06F 3/01* (2006.01)
*G02B 27/01* (2006.01)
(Continued)

(52) U.S. Cl.
CPC ......... *G06F 3/012* (2013.01); *G02B 27/0172* (2013.01); *G06F 1/163* (2013.01);
(Continued)

(58) Field of Classification Search
CPC .............................. G06T 19/006; G06T 19/20
See application file for complete search history.

(56) References Cited

U.S. PATENT DOCUMENTS 5,168,531 A 12/1992 Sigel
5,977,935 A 11/1999 Yasukawa et al.
(Continued)

FOREIGN PATENT DOCUMENTS

CN 110442245 11/2019
CN 111782332 10/2020
(Continued)

OTHER PUBLICATIONS

Abdul Waheed Khan et al. "VGDRA: A Virtual Grid-Based Dynamic Routes Adjustment Scheme for Mobile Sink-Based Wireless Sensor Networks." IEEE Sensors Journal 15.1, pp. 526-534. (Year: 2014).
(Continued)

*Primary Examiner* — Charles Tseng
(74) *Attorney, Agent, or Firm* — Finnegan, Henderson, Farabow, Garrett & Dunner LLP

(57) ABSTRACT

Systems, methods, and non-transitory computer readable media including instructions for extracting content from a virtual display are disclosed. Extracting content from a virtual display includes generating a virtual display via a wearable extended reality appliance, wherein the virtual display presents a group of virtual objects and is located at a first virtual distance from the wearable extended reality appliance; generating an extended reality environment via the wearable extended reality appliance including at least one additional virtual object at a second virtual distance from the wearable extended reality appliance; receiving input for causing a specific virtual object to move from the virtual display to the extended reality environment; and in response, generating a presentation of a version of the specific virtual object in the extended reality environment at a third virtual distance different from the first virtual distance and the second virtual distance.

19 Claims, 52 Drawing Sheets

Related U.S. Application Data

(60) Provisional application No. 63/344,727, filed on May 23, 2022, provisional application No. 63/319,423, filed on Mar. 14, 2022, provisional application No. 63/307,203, filed on Feb. 7, 2022, provisional application No. 63/307,217, filed on Feb. 7, 2022, provisional application No. 63/307,207, filed on Feb. 7, 2022, provisional application No. 63/299,188, filed on Jan. 13, 2022, provisional application No. 63/226,180, filed on Jul. 28, 2021.

(51) Int. Cl.

| | |
|---|---|
| *G06F 1/16* | (2006.01) |
| *G06F 3/023* | (2006.01) |
| *G06F 3/14* | (2006.01) |
| *G06F 3/16* | (2006.01) |
| *G06F 40/169* | (2020.01) |
| *G06T 7/70* | (2017.01) |
| *G06T 7/73* | (2017.01) |
| *G06T 11/60* | (2006.01) |
| *G06T 19/00* | (2011.01) |
| *G06T 19/20* | (2011.01) |
| *G06V 10/74* | (2022.01) |
| *G06V 20/20* | (2022.01) |
| *G06V 40/20* | (2022.01) |
| *G09G 3/00* | (2006.01) |
| *G10L 15/22* | (2006.01) |
| *G06V 40/10* | (2022.01) |
| *G08B 7/00* | (2006.01) |

(52) U.S. Cl.
CPC .............. *G06F 3/011* (2013.01); *G06F 3/017* (2013.01); *G06F 3/0231* (2013.01); *G06F 3/1423* (2013.01); *G06F 3/1454* (2013.01); *G06F 3/165* (2013.01); *G06F 3/167* (2013.01); *G06F 40/169* (2020.01); *G06T 7/70* (2017.01); *G06T 7/73* (2017.01); *G06T 11/60* (2013.01); *G06T 19/00* (2013.01); *G06T 19/006* (2013.01); *G06T 19/20* (2013.01); *G06V 10/761* (2022.01); *G06V 20/20* (2022.01); *G06V 40/28* (2022.01); *G09G 3/001* (2013.01); *G10L 15/22* (2013.01); *G02B 2027/014* (2013.01); *G02B 2027/0143* (2013.01); *G02B 2027/0178* (2013.01); *G06T 2219/2004* (2013.01); *G06V 40/10* (2022.01); *G06V 40/20* (2022.01); *G08B 7/00* (2013.01); *G09G 2320/0613* (2013.01); *G09G 2320/064* (2013.01); *G09G 2320/0686* (2013.01); *G09G 2330/021* (2013.01); *G09G 2354/00* (2013.01); *G10L 2015/223* (2013.01)

(56) References Cited

U.S. PATENT DOCUMENTS

| | | | |
|---|---|---|---|
| 6,023,275 | A | 2/2000 | Horvitz et al. |
| 6,215,498 | B1 | 4/2001 | Filo et al. |
| 6,388,657 | B1 | 5/2002 | Natoli |
| 6,445,364 | B2 | 9/2002 | Zwern |
| 7,119,819 | B1 | 10/2006 | Robertson et al. |
| 7,225,414 | B1 | 5/2007 | Sharma et al. |
| 7,542,040 | B2 | 6/2009 | Templeman |
| 8,751,969 | B2 | 6/2014 | Matsuda et al. |
| 8,947,322 | B1 | 2/2015 | Chi et al. |
| 8,947,323 | B1 | 2/2015 | Raffle et al. |
| 8,957,916 | B1 | 2/2015 | Hedman et al. |
| 9,007,301 | B1 | 4/2015 | Raffle et al. |
| 9,081,177 | B2 | 7/2015 | Wong et al. |
| 9,113,032 | B1 | 8/2015 | Mey et al. |
| 9,244,533 | B2 | 1/2016 | Friend et al. |
| 9,613,448 | B1 | 4/2017 | Margolin |
| 9,696,795 | B2 | 7/2017 | Marcolina et al. |
| 9,726,896 | B2 | 8/2017 | von und zu Liechtenstein |
| 9,779,517 | B2 | 10/2017 | Ballard et al. |
| 9,939,900 | B2 | 4/2018 | Cruz-Hernandez et al. |
| 9,996,797 | B1 | 6/2018 | Holz et al. |
| 10,007,359 | B2 | 6/2018 | Chung et al. |
| 10,127,731 | B1 | 11/2018 | Ozery |
| 10,317,505 | B1 | 6/2019 | Spiko et al. |
| 10,353,532 | B1 | 7/2019 | Holz et al. |
| 10,430,018 | B2 | 10/2019 | Black et al. |
| 10,438,262 | B1 | 10/2019 | Helmer et al. |
| 10,469,804 | B1 | 11/2019 | Lyren |
| 10,516,853 | B1 | 12/2019 | Gibson et al. |
| 10,553,031 | B2 | 2/2020 | Alt et al. |
| 10,706,111 | B1 | 7/2020 | Nasserbakht et al. |
| 10,916,057 | B2 | 2/2021 | Leppanen et al. |
| 10,917,613 | B1 | 2/2021 | Chiarella et al. |
| 10,948,997 | B1 | 3/2021 | Victor-Faichney et al. |
| 11,003,307 | B1 | 5/2021 | Ravasz et al. |
| 11,014,000 | B2 | 5/2021 | Koyama et al. |
| 11,042,028 | B1 | 6/2021 | Welch et al. |
| 11,060,858 | B2 | 7/2021 | Abovitz et al. |
| 11,061,239 | B2 | 7/2021 | Lanman et al. |
| 11,106,328 | B1 | 8/2021 | Holland et al. |
| 11,120,640 | B1 | 9/2021 | Yang et al. |
| 11,144,759 | B1 | 10/2021 | Hatfield et al. |
| 11,170,221 | B2 | 11/2021 | Sato et al. |
| 11,178,376 | B1 | 11/2021 | Tichenor et al. |
| 11,210,851 | B1 | 12/2021 | Nussbaum et al. |
| 11,210,863 | B1 | 12/2021 | Yan et al. |
| 11,227,445 | B1 | 1/2022 | Tichenor et al. |
| 11,245,871 | B1 | 2/2022 | Gandhi et al. |
| 11,294,475 | B1 | 4/2022 | Pinchon et al. |
| 11,307,968 | B2 | 4/2022 | Yerli |
| 11,308,686 | B1 | 4/2022 | Boissière et al. |
| 11,317,060 | B1 | 4/2022 | Libin |
| 11,334,212 | B2 | 5/2022 | Ravasz et al. |
| 11,340,857 | B1 | 5/2022 | Smith et al. |
| 11,355,043 | B1 | 6/2022 | Choi et al. |
| 11,402,871 | B1 | 8/2022 | Berliner et al. |
| 11,475,650 | B2 | 10/2022 | Berliner et al. |
| 11,480,791 | B2 | 10/2022 | Berliner et al. |
| 11,481,963 | B2 | 10/2022 | Berliner et al. |
| 11,496,571 | B2 | 11/2022 | Berliner et al. |
| 11,514,656 | B2 | 11/2022 | Berliner et al. |
| 11,516,297 | B2 | 11/2022 | Berliner et al. |
| 11,638,147 | B2 | 4/2023 | Irvin et al. |
| 2003/0058215 | A1 | 3/2003 | Yamaji et al. |
| 2003/0063132 | A1 | 4/2003 | Sauer et al. |
| 2004/0100556 | A1 | 5/2004 | Stromme |
| 2004/0113888 | A1 | 6/2004 | De Waal |
| 2005/0019079 | A1 | 1/2005 | Griffin et al. |
| 2007/0133788 | A1 | 6/2007 | Ladouceur et al. |
| 2007/0223792 | A1 | 9/2007 | Morimoto et al. |
| 2008/0184124 | A1 | 7/2008 | Agarwal et al. |
| 2008/0270947 | A1 | 10/2008 | Elber et al. |
| 2009/0015559 | A1 | 1/2009 | Day et al. |
| 2009/0183125 | A1 | 7/2009 | Magal et al. |
| 2009/0303984 | A1 | 12/2009 | Clark et al. |
| 2010/0034457 | A1 | 2/2010 | Berliner et al. |
| 2010/0182340 | A1 | 7/2010 | Bachelder et al. |
| 2011/0004481 | A1 | 1/2011 | Jones |
| 2011/0216060 | A1 | 9/2011 | Weising et al. |
| 2011/0302535 | A1 | 12/2011 | Clerc et al. |
| 2012/0068921 | A1 | 3/2012 | Jacobsen et al. |
| 2012/0113092 | A1 | 5/2012 | Bar-Zeev et al. |
| 2012/0162384 | A1 | 6/2012 | Vesely et al. |
| 2012/0192088 | A1 | 7/2012 | Sauriol et al. |
| 2012/0194418 | A1 | 8/2012 | Osterhout et al. |
| 2012/0202569 | A1 | 8/2012 | Maizels et al. |
| 2012/0204133 | A1 | 8/2012 | Guendelman et al. |
| 2012/0229425 | A1 | 9/2012 | Barrus et al. |
| 2012/0242603 | A1 | 9/2012 | Engelhardt et al. |
| 2012/0249587 | A1 | 10/2012 | Anderson et al. |
| 2012/0249741 | A1 | 10/2012 | Maciocci et al. |
| 2012/0272179 | A1 | 10/2012 | Stafford |
| 2012/0326961 | A1 | 12/2012 | Bromer |

(56) References Cited

U.S. PATENT DOCUMENTS

| | | |
|---|---|---|
| 2013/0033483 A1 | 2/2013 | Im et al. |
| 2013/0069985 A1 | 3/2013 | Wong et al. |
| 2013/0106692 A1 | 5/2013 | Maizels et al. |
| 2013/0107021 A1 | 5/2013 | Maizels et al. |
| 2013/0117377 A1 | 5/2013 | Miller |
| 2013/0174213 A1 | 7/2013 | Liu et al. |
| 2013/0194304 A1 | 8/2013 | Latta et al. |
| 2013/0208232 A1 | 8/2013 | Boukli-Hacene |
| 2013/0246955 A1 | 9/2013 | Schwesig et al. |
| 2013/0260822 A1 | 10/2013 | Wu |
| 2013/0278631 A1 | 10/2013 | Border et al. |
| 2013/0283208 A1 | 10/2013 | Bychkov et al. |
| 2013/0293468 A1 | 11/2013 | Perez et al. |
| 2013/0321265 A1 | 12/2013 | Bychkov et al. |
| 2013/0321271 A1 | 12/2013 | Bychkov et al. |
| 2013/0328914 A1 | 12/2013 | Smith et al. |
| 2013/0328925 A1 | 12/2013 | Latta et al. |
| 2013/0342564 A1 | 12/2013 | Kinnebrew et al. |
| 2013/0342570 A1 | 12/2013 | Kinnebrew et al. |
| 2014/0002496 A1 | 1/2014 | Lamb et al. |
| 2014/0028548 A1 | 1/2014 | Bychkov et al. |
| 2014/0035819 A1 | 2/2014 | Griffin |
| 2014/0062875 A1 | 3/2014 | Rafey et al. |
| 2014/0063055 A1 | 3/2014 | Osterhout et al. |
| 2014/0082526 A1 | 3/2014 | Park et al. |
| 2014/0091857 A1 | 4/2014 | Bernstein |
| 2014/0123077 A1 | 5/2014 | Kutliroff et al. |
| 2014/0132629 A1 | 5/2014 | Pandey et al. |
| 2014/0152552 A1 | 6/2014 | Berliner et al. |
| 2014/0191927 A1 | 7/2014 | Cho |
| 2014/0193047 A1 | 7/2014 | Grosz et al. |
| 2014/0208274 A1 | 7/2014 | Smyth et al. |
| 2014/0258942 A1 | 9/2014 | Kutliroff et al. |
| 2014/0272845 A1 | 9/2014 | Hendriks et al. |
| 2014/0282105 A1 | 9/2014 | Nordstrom |
| 2014/0327611 A1 | 11/2014 | Ono et al. |
| 2014/0380230 A1 | 12/2014 | Venable et al. |
| 2015/0067580 A1 | 3/2015 | Um et al. |
| 2015/0091780 A1 | 4/2015 | Lyren |
| 2015/0121287 A1 | 4/2015 | Fermon |
| 2015/0133193 A1 | 5/2015 | Stotler |
| 2015/0160825 A1 | 6/2015 | Dolbier et al. |
| 2015/0205106 A1 | 7/2015 | Norden |
| 2015/0206349 A1 | 7/2015 | Rosenthal et al. |
| 2015/0215581 A1 | 7/2015 | Barzuza et al. |
| 2015/0235267 A1 | 8/2015 | Steube et al. |
| 2015/0268721 A1 | 9/2015 | Joo |
| 2015/0277560 A1 | 10/2015 | Beaty |
| 2015/0294480 A1 | 10/2015 | Marks et al. |
| 2015/0302665 A1 | 10/2015 | Miller |
| 2015/0302867 A1 | 10/2015 | Tomlin et al. |
| 2015/0324001 A1 | 11/2015 | Yanai et al. |
| 2015/0338886 A1 | 11/2015 | Seo |
| 2015/0379770 A1 | 12/2015 | Haley, Jr. et al. |
| 2016/0005229 A1 | 1/2016 | Lee et al. |
| 2016/0018985 A1 | 1/2016 | Bennet et al. |
| 2016/0026242 A1 | 1/2016 | Burns et al. |
| 2016/0026253 A1 | 1/2016 | Bradski et al. |
| 2016/0027214 A1 | 1/2016 | Memmott et al. |
| 2016/0027216 A1 | 1/2016 | da Veiga et al. |
| 2016/0041625 A1 | 2/2016 | Maizels et al. |
| 2016/0071325 A1 | 3/2016 | Callaghan |
| 2016/0093108 A1 | 3/2016 | Mao et al. |
| 2016/0147399 A1 | 5/2016 | Berajawala |
| 2016/0191910 A1 | 6/2016 | von und zu Liechtenstein |
| 2016/0209928 A1 | 7/2016 | Kandur Raja et al. |
| 2016/0239080 A1 | 8/2016 | Marcolina et al. |
| 2016/0255748 A1 | 9/2016 | Kim et al. |
| 2016/0259548 A1 | 9/2016 | Ma |
| 2016/0262235 A1 | 9/2016 | Clymer et al. |
| 2016/0282824 A1 | 9/2016 | Smallwood et al. |
| 2016/0306431 A1 | 10/2016 | Stafford et al. |
| 2016/0313868 A1 | 10/2016 | Weng et al. |
| 2016/0313890 A1 | 10/2016 | Walline et al. |
| 2016/0328590 A1 | 11/2016 | Fefferman |
| 2016/0370860 A1 | 12/2016 | Bychkov et al. |
| 2016/0370970 A1 | 12/2016 | Chu et al. |
| 2016/0379409 A1 | 12/2016 | Gavriliuc et al. |
| 2017/0039770 A1 | 2/2017 | Lanier et al. |
| 2017/0083104 A1 | 3/2017 | Namba et al. |
| 2017/0109516 A1 | 4/2017 | Engelhardt et al. |
| 2017/0131964 A1 | 5/2017 | Baek et al. |
| 2017/0132199 A1 | 5/2017 | Vescovi et al. |
| 2017/0132842 A1 | 5/2017 | Morrison |
| 2017/0153866 A1 | 6/2017 | Grinberg et al. |
| 2017/0169616 A1 | 6/2017 | Wiley et al. |
| 2017/0185261 A1 | 6/2017 | Perez et al. |
| 2017/0193706 A1 | 7/2017 | Lo et al. |
| 2017/0195629 A1 | 7/2017 | Wexler et al. |
| 2017/0220134 A1 | 8/2017 | Burns |
| 2017/0221264 A1 | 8/2017 | Perry |
| 2017/0242480 A1 | 8/2017 | Dees et al. |
| 2017/0243403 A1 | 8/2017 | Daniels et al. |
| 2017/0248785 A1 | 8/2017 | Thomas et al. |
| 2017/0262045 A1 | 9/2017 | Rouvinez et al. |
| 2017/0266554 A1 | 9/2017 | Marks et al. |
| 2017/0280090 A1 | 9/2017 | Raskin |
| 2017/0285758 A1 | 10/2017 | Hastings et al. |
| 2017/0287217 A1 | 10/2017 | Kim et al. |
| 2017/0315627 A1 | 11/2017 | Yao |
| 2017/0315722 A1 | 11/2017 | Yao |
| 2017/0322622 A1 | 11/2017 | Hong et al. |
| 2017/0343811 A1 | 11/2017 | Mese et al. |
| 2017/0345457 A1 | 11/2017 | Li |
| 2017/0351097 A1 | 12/2017 | Memmott et al. |
| 2017/0352083 A1 | 12/2017 | Ruck et al. |
| 2018/0045963 A1 | 2/2018 | Hoover et al. |
| 2018/0075658 A1 | 3/2018 | Lanier et al. |
| 2018/0088663 A1 | 3/2018 | Zhang et al. |
| 2018/0088682 A1 | 3/2018 | Tsang |
| 2018/0089899 A1 | 3/2018 | Piemonte et al. |
| 2018/0090018 A1 | 3/2018 | Gavrilets et al. |
| 2018/0101994 A1 | 4/2018 | Da Veiga et al. |
| 2018/0131847 A1 | 5/2018 | Kokonaski et al. |
| 2018/0131907 A1 | 5/2018 | Schmirler et al. |
| 2018/0150997 A1 | 5/2018 | Austin |
| 2018/0167501 A1 | 6/2018 | Peterson et al. |
| 2018/0173323 A1 | 6/2018 | Harvey et al. |
| 2018/0173404 A1 | 6/2018 | Smith |
| 2018/0181626 A1 | 6/2018 | Lyons et al. |
| 2018/0189568 A1 | 7/2018 | Powderly et al. |
| 2018/0197341 A1 | 7/2018 | Loberg et al. |
| 2018/0197624 A1 | 7/2018 | Robaina et al. |
| 2018/0246324 A1 | 8/2018 | Hada et al. |
| 2018/0246328 A1 | 8/2018 | Song et al. |
| 2018/0247431 A1 | 8/2018 | Clark et al. |
| 2018/0267762 A1 | 9/2018 | Aurongzeb et al. |
| 2018/0276891 A1 | 9/2018 | Craner et al. |
| 2018/0276896 A1 | 9/2018 | Launonen |
| 2018/0300952 A1 | 10/2018 | Evans et al. |
| 2018/0307303 A1 | 10/2018 | Powderly et al. |
| 2018/0314329 A1 | 11/2018 | Bychkov et al. |
| 2018/0314406 A1 | 11/2018 | Powderly et al. |
| 2018/0315248 A1 | 11/2018 | Bastov et al. |
| 2018/0350119 A1 | 12/2018 | Kocharlakota et al. |
| 2018/0350150 A1 | 12/2018 | Powderly et al. |
| 2018/0357472 A1 | 12/2018 | Dreessen |
| 2019/0035234 A1 | 1/2019 | Howard et al. |
| 2019/0073109 A1 | 3/2019 | Zhang et al. |
| 2019/0087015 A1 | 3/2019 | Lam et al. |
| 2019/0102946 A1 | 4/2019 | Spivack et al. |
| 2019/0107944 A1 | 4/2019 | Glass et al. |
| 2019/0107991 A1 | 4/2019 | Spivack et al. |
| 2019/0114802 A1 | 4/2019 | Lazarow |
| 2019/0114991 A1 | 4/2019 | Selan et al. |
| 2019/0114997 A1 | 4/2019 | Okamoto |
| 2019/0174088 A1 | 6/2019 | Kim et al. |
| 2019/0229495 A1 | 7/2019 | Pierer et al. |
| 2019/0236842 A1 | 8/2019 | Bennett et al. |
| 2019/0237044 A1 | 8/2019 | Day et al. |
| 2019/0265781 A1 | 8/2019 | Kehoe et al. |
| 2019/0270015 A1 | 9/2019 | Li et al. |
| 2019/0295323 A1 | 9/2019 | Gutierrez et al. |
| 2019/0311460 A1 | 10/2019 | Mandy |

(56) References Cited

U.S. PATENT DOCUMENTS

| | | |
|---|---|---|
| 2019/0318065 A1 | 10/2019 | Brent et al. |
| 2019/0324277 A1 | 10/2019 | Kohler et al. |
| 2019/0333275 A1 | 10/2019 | Wang et al. |
| 2019/0335083 A1 | 10/2019 | DiGiantomasso et al. |
| 2019/0340816 A1 | 11/2019 | Rogers |
| 2019/0362557 A1 | 11/2019 | Lacey et al. |
| 2019/0362562 A1 | 11/2019 | Benson |
| 2019/0380792 A1 | 12/2019 | Poltaretskyi et al. |
| 2019/0384406 A1 | 12/2019 | Smith et al. |
| 2020/0004401 A1 | 1/2020 | Hwang et al. |
| 2020/0005026 A1 | 1/2020 | Andersen et al. |
| 2020/0019156 A1 | 1/2020 | Drew et al. |
| 2020/0035203 A1 | 1/2020 | Kosik et al. |
| 2020/0043243 A1 | 2/2020 | Bhushan et al. |
| 2020/0051337 A1 | 2/2020 | Reynolds et al. |
| 2020/0051527 A1 | 2/2020 | Ngo |
| 2020/0074738 A1 | 3/2020 | Hare et al. |
| 2020/0109847 A1 | 4/2020 | Poggio et al. |
| 2020/0110928 A1 | 4/2020 | Al Jazaery et al. |
| 2020/0111232 A1 | 4/2020 | Bleyer et al. |
| 2020/0111255 A1 | 4/2020 | Brodsky et al. |
| 2020/0111256 A1 | 4/2020 | Bleyer et al. |
| 2020/0111257 A1 | 4/2020 | Kim |
| 2020/0111259 A1 | 4/2020 | Sears et al. |
| 2020/0117267 A1 | 4/2020 | Gibson et al. |
| 2020/0117270 A1 | 4/2020 | Gibson et al. |
| 2020/0125322 A1 | 4/2020 | Wilde |
| 2020/0126309 A1 | 4/2020 | Moroze et al. |
| 2020/0135419 A1 | 4/2020 | Nakano et al. |
| 2020/0174660 A1 | 6/2020 | Klein et al. |
| 2020/0175759 A1 | 6/2020 | Russell et al. |
| 2020/0193938 A1 | 6/2020 | Estruch Tena et al. |
| 2020/0209628 A1 | 7/2020 | Sztuk et al. |
| 2020/0211207 A1 | 7/2020 | Chen et al. |
| 2020/0213632 A1 | 7/2020 | Goldberg |
| 2020/0258481 A1 | 8/2020 | Woo et al. |
| 2020/0342671 A1 | 10/2020 | Ishihara |
| 2020/0363636 A1 | 11/2020 | Karafin et al. |
| 2020/0364915 A1 | 11/2020 | Ruth et al. |
| 2020/0387215 A1 | 12/2020 | Smathers et al. |
| 2020/0401805 A1 | 12/2020 | Kotoyori |
| 2020/0404217 A1 | 12/2020 | Yerli |
| 2021/0008413 A1 | 1/2021 | Asikainen et al. |
| 2021/0041951 A1 | 2/2021 | Gibson et al. |
| 2021/0096726 A1 | 4/2021 | Faulkner et al. |
| 2021/0097766 A1 | 4/2021 | Palangie et al. |
| 2021/0121136 A1 | 4/2021 | Dobson et al. |
| 2021/0132683 A1 | 5/2021 | Herling et al. |
| 2021/0135895 A1 | 5/2021 | Cheung |
| 2021/0173480 A1 | 6/2021 | Osterhout et al. |
| 2021/0174570 A1 | 6/2021 | Bleyer et al. |
| 2021/0185471 A1 | 6/2021 | Jot et al. |
| 2021/0191600 A1 | 6/2021 | Lemay et al. |
| 2021/0201581 A1 | 7/2021 | Xie et al. |
| 2021/0227178 A1 | 7/2021 | Lyon et al. |
| 2021/0232211 A1 | 7/2021 | McCall |
| 2021/0255458 A1 | 8/2021 | Yoon |
| 2021/0256261 A1 | 8/2021 | Wang et al. |
| 2021/0272373 A1 | 9/2021 | Fradet et al. |
| 2021/0295602 A1 | 9/2021 | Scapel et al. |
| 2021/0311320 A1 | 10/2021 | Pike et al. |
| 2021/0349676 A1 | 11/2021 | Sommer et al. |
| 2021/0366440 A1 | 11/2021 | Burns et al. |
| 2021/0373672 A1 | 12/2021 | Schwarz et al. |
| 2021/0407205 A1 | 12/2021 | Canberk et al. |
| 2022/0012920 A1 | 1/2022 | Beith et al. |
| 2022/0035439 A1 | 2/2022 | Holland et al. |
| 2022/0084279 A1 | 3/2022 | Lindmeirer et al. |
| 2022/0084288 A1 | 3/2022 | LeBeau et al. |
| 2022/0086203 A1 | 3/2022 | Morris et al. |
| 2022/0101612 A1 | 3/2022 | Palangie et al. |
| 2022/0107632 A1 | 4/2022 | Sinha et al. |
| 2022/0121344 A1 | 4/2022 | Pastrana Vicente et al. |
| 2022/0130077 A1 | 4/2022 | Rajarathnam et al. |
| 2022/0155853 A1 | 5/2022 | Fan et al. |
| 2022/0156998 A1 | 5/2022 | Lee et al. |
| 2022/0172397 A1 | 6/2022 | Herling et al. |
| 2022/0229534 A1 | 7/2022 | Terre et al. |
| 2022/0253093 A1 | 8/2022 | Berliner et al. |
| 2022/0253098 A1 | 8/2022 | Berliner et al. |
| 2022/0253128 A1 | 8/2022 | Berliner et al. |
| 2022/0253130 A1 | 8/2022 | Berliner et al. |
| 2022/0253136 A1 | 8/2022 | Holder et al. |
| 2022/0253139 A1 | 8/2022 | Berliner et al. |
| 2022/0253149 A1 | 8/2022 | Berliner et al. |
| 2022/0253188 A1 | 8/2022 | Berliner et al. |
| 2022/0253194 A1 | 8/2022 | Berliner et al. |
| 2022/0253200 A1 | 8/2022 | Berliner et al. |
| 2022/0253201 A1 | 8/2022 | Berliner et al. |
| 2022/0253263 A1 | 8/2022 | Noam et al. |
| 2022/0253264 A1 | 8/2022 | Berliner et al. |
| 2022/0253266 A1 | 8/2022 | Berliner et al. |
| 2022/0253759 A1 | 8/2022 | Berliner et al. |
| 2022/0254112 A1 | 8/2022 | Berliner et al. |
| 2022/0254118 A1 | 8/2022 | Berliner et al. |
| 2022/0254120 A1 | 8/2022 | Berliner et al. |
| 2022/0255974 A1 | 8/2022 | Berliner et al. |
| 2022/0255995 A1 | 8/2022 | Berliner et al. |
| 2022/0256062 A1 | 8/2022 | Berliner et al. |
| 2022/0261091 A1 | 8/2022 | Berliner et al. |
| 2022/0261149 A1 | 8/2022 | Berliner et al. |
| 2022/0335673 A1 | 10/2022 | Jang et al. |
| 2023/0080905 A1 | 3/2023 | Tomczek et al. |
| 2023/0081717 A1 | 3/2023 | Hoang et al. |
| 2023/0135787 A1 | 5/2023 | Peleg et al. |
| 2023/0139337 A1 | 5/2023 | Noam et al. |

FOREIGN PATENT DOCUMENTS

| | | |
|---|---|---|
| EP | 3188075 | 7/2017 |
| EP | 3584692 | 12/2019 |
| WO | WO 2019/126175 | 6/2019 |
| WO | WO 2021/239223 | 12/2021 |

OTHER PUBLICATIONS

International Search Report and Written Opinion for International Application No. PCT/US2022/015546, dated Jun. 29, 2022, 16 pages.

International Search Report and Written Opinion for International Application No. PCT/US2022/015547, dated Jul. 1, 2022, 16 pages.

International Search Report and Written Opinion for International Application No. PCT/US2022/015548, dated Jun. 30, 2020, 13 pages.

International Search Report and Written Opinion for International Application No. PCT/US2022/038450, dated Feb. 6, 2023, 13 pages.

International Search Report and Written Opinion for International Application No. PCT/US2023/011401, dated Jul. 7, 2023, 14 pages.

Kimberly Ruth, Tadayoshi Kohno, Franziska Roesner, "Secure Multi-User Content Sharing for Augmented Reality Applications", Aug. 2019, USENIX Association, Proceedings of 28th USENIX Security Symposium (USENIX Security 19), pp. 141-158.

Meta Quest, "Oculus Quest Basics Tutorial Part 02: Play area setup", https://www.youtube.com/watch?v=zh5ldprM5Mg, May 20, 2019. (Year: 2019).

Yehia ElRakaiby, Frederic Cuppens, Nora Cuppens-Boulahia, "Interactivity for Reactive Access Control", 2008, International Conference on Security and Cryptography (SECRYPT), pp. 57-64.

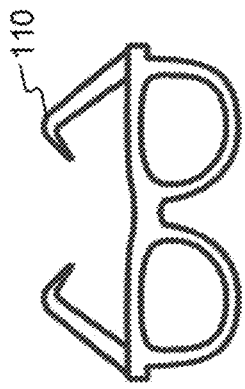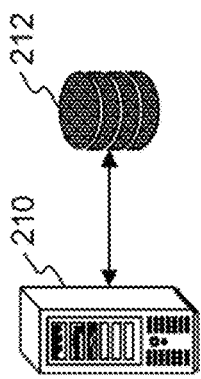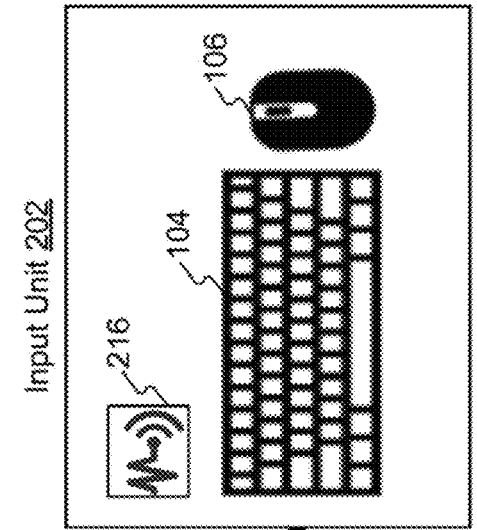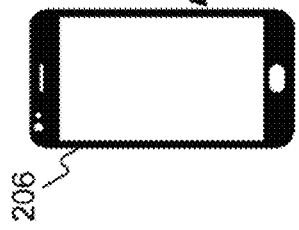
FIG. 2

1800

```
┌─────────────────────────────────────────────────────────┐
│ Generating a virtual display via a wearable extended    │
│ reality appliance, wherein the virtual display presents │──── 1802
│ a group of virtual objects and is located at a first    │
│ virtual distance from the wearable extended reality     │
│ appliance                                               │
└─────────────────────────────────────────────────────────┘
                            │
                            ▼
┌─────────────────────────────────────────────────────────┐
│ Generating an extended reality environment via the      │
│ wearable extended reality appliance, wherein the        │
│ extended reality environment includes at least one      │──── 1804
│ additional virtual object presented at a second virtual │
│ distance from the wearable extended reality appliance   │
└─────────────────────────────────────────────────────────┘
                            │
                            ▼
┌─────────────────────────────────────────────────────────┐
│ Receiving input for causing a specific virtual object   │
│ from the group of virtual objects to move from the      │──── 1806
│ virtual display to the extended reality environment     │
└─────────────────────────────────────────────────────────┘
                            │
                            ▼
┌─────────────────────────────────────────────────────────┐
│ In response to receiving the input, generating a        │
│ presentation of a version of the specific virtual       │
│ object in the extended reality environment at a third   │──── 1808
│ virtual distance from the wearable extended reality     │
│ appliance, wherein the third virtual distance differs   │
│ from the first virtual distance and the second virtual  │
│ distance                                                │
└─────────────────────────────────────────────────────────┘
```

*FIG. 18*

2910
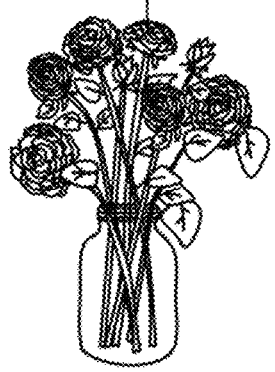
2916
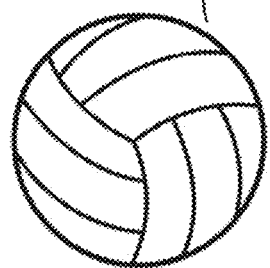
2914
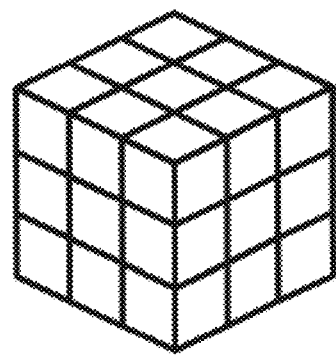
2912
FIG. 29

MOVING WINDOWS BETWEEN A VIRTUAL DISPLAY AND AN EXTENDED REALITY ENVIRONMENT

CROSS REFERENCES TO RELATED APPLICATIONS

This application is a continuation of U.S. patent application Ser. No. 18/089,933, filed on Dec. 28, 2022, which is based on and claims the benefit of priority of PCT International Application No. PCT/US2022/038450, filed on Jul. 27, 2022, which is based on and claims the benefit of priority of U.S. Provisional Patent Application No. 63/226,180, filed on Jul. 28, 2021, U.S. Provisional Patent Application No. 63/299,188, filed on Jan. 13, 2022, U.S. Provisional Patent Application No. 63/307,207, filed on Feb. 7, 2022, U.S. Provisional Patent Application No. 63/307,203, filed on Feb. 7, 2022, U.S. Provisional Patent Application No. 63/307,217, filed on Feb. 7, 2022, U.S. Provisional Patent Application No. 63/319,423, filed on Mar. 14, 2022, and U.S. Provisional Patent Application No. 63/344,727, filed on May 23, 2022, all of which are incorporated herein by reference in their entirety.

BACKGROUND

I. Technical Field

The present disclosure generally relates to the field of extended reality. More specifically, the present disclosure relates to systems, methods, and devices for providing productivity applications using an extended reality environment.

II. Background Information

For many years, PC users were faced with a productivity dilemma: either to limit their mobility (when selecting a desktop computer) or to limit their screen size (when selecting a laptop computer). One partial solution to this dilemma is using a docking station. A docking station is an interface device for connecting a laptop computer with other devices. By plugging the laptop computer into the docking station, laptop users can enjoy the increased visibility provided by a larger monitor. But because the large monitor is stationary, the mobility of the user—while improved—is still limited. For example, even laptop users with docking stations do not have the freedom of using two 32" screens anywhere they want.

Some of the disclosed embodiments are directed to providing a new approach for solving the productivity dilemma, one that uses extended reality (XR) to provide a mobile environment that enables users to experience the comfort of a stationary workspace anywhere they want by providing virtual desktop-like screens.

SUMMARY

Embodiments consistent with the present disclosure provide systems, methods, and devices for providing and supporting productivity applications using an extended reality environment.

Some disclosed embodiments may include systems, methods, and non-transitory computer readable media for performing duty cycle control operations for wearable extended reality appliances. These embodiments may involve receiving data representing virtual content in an extended reality environment associated with a wearable extended reality appliance; identifying in the extended reality environment a first display region and a second display region separated from the first display region; determining a first duty cycle configuration for the first display region; determining a second duty cycle configuration for the second display region, wherein the second duty cycle configuration differs from the first duty cycle configuration; and causing the wearable extended reality appliance to display the virtual content in accordance with the determined first duty cycle configuration for the first display region and the determined second duty cycle configuration for the second display region.

Some disclosed embodiments may include systems, methods, and non-transitory computer readable media for extracting content from a virtual display. These embodiments may involve generating a virtual display via a wearable extended reality appliance, wherein the virtual display presents a group of virtual objects and is located at a first virtual distance from the wearable extended reality appliance; generating an extended reality environment via the wearable extended reality appliance, wherein the extended reality environment includes at least one additional virtual object presented at a second virtual distance from the wearable extended reality appliance; receiving input for causing a specific virtual object from the group of virtual objects to move from the virtual display to the extended reality environment; and in response to receiving the input, generating a presentation of a version of the specific virtual object in the extended reality environment at a third virtual distance from the wearable extended reality appliance, wherein the third virtual distance differs from the first virtual distance and the second virtual distance.

Some disclosed embodiments may include systems, methods, and non-transitory computer readable media for selectively operating a wearable extended reality appliance. These embodiments may involve establishing a link between a wearable extended reality appliance and a keyboard device; receiving sensor data from at least one sensor associated with the wearable extended reality appliance, the sensor data being reflective of a relative orientation of the wearable extended reality appliance with respect to the keyboard device; based on the relative orientation, selecting from a plurality of operation modes a specific operation mode for the wearable extended reality appliance; identifying a user command based on at least one signal detected by the wearable extended reality appliance; and executing an action responding to the identified user command in a manner consistent with the selected operation mode.

Some disclosed embodiments may include systems, methods, and non-transitory computer readable media for generating videos of individuals interacting with virtual objects. These embodiments may involve causing a wearable extended reality appliance to generate a presentation of an extended reality environment including at least one virtual object; receiving first image data from at least a first image sensor, the first image data reflecting a first perspective of an individual wearing the wearable extended reality appliance; receiving second image data from at least a second image sensor, the second image data reflecting a second perspective facing the individual; identifying in the first image data first physical hand movements interacting with the at least one virtual object from the first perspective; identifying in the second image data second physical hand movements interacting with the at least one virtual object from the second perspective; analyzing at least one of the first image data or the second image data to determine an interaction with the at least one virtual object; rendering for display a representation of the at least one virtual object from the second perspective; and melding the rendered representation of the at least one virtual object from the second perspective with the second image data to generate a video of the individual interacting with the at least one virtual object from the second perspective.

Some disclosed embodiments may include systems, methods, and non-transitory computer readable media for enabling collaboration between physical writers and virtual writers. These embodiments may involve receiving image data representing a hand of a first physical writer holding a physical marking implement and engaging with a physical surface to create tangible markings, wherein the image data is received from an image sensor associated with a wearable extended reality appliance worn by the first physical writer; transmitting information based on the image data to at least one computing device associated with at least one second virtual writer, to thereby enable the at least one second virtual writer to view the tangible markings created by the first physical writer; receiving from the at least one computing device annotation data representing additional markings in relative locations with respect to the tangible markings created by the first physical writer; and in response to receiving the annotation data, causing the wearable extended reality appliance to overlay the physical surface with virtual markings in the relative locations.

Some disclosed embodiments may include systems, methods, and non-transitory computer readable media to tie at least one virtual speaker to a physical space. These embodiments may involve receiving, via a wireless network, a first indication that a first wearable extended reality appliance is located in an area associated with a virtual speaker; transmitting to the first wearable extended reality appliance first data corresponding to first sounds associated with the virtual speaker, to thereby enable a first user of the first wearable extended reality appliance to hear the first sounds during a first time period, wherein the first sounds correspond to first settings of the virtual speaker; receiving input associated with the first wearable extended reality appliance during the first time period, wherein the received input is indicative of second settings for the virtual speaker; transmitting to the first wearable extended reality appliance second data corresponding to second sounds associated with the virtual speaker, to thereby enable the first user of the first wearable extended reality appliance to hear the second sounds during a second time period, wherein the second sounds correspond to the second settings of the virtual speaker; after determining that the first user and the first wearable extended reality appliance left the area associated with the virtual speaker, receiving, via the wireless network, a second indication that a second wearable extended reality appliance is located in the area associated with the virtual speaker; and transmitting to the second wearable extended reality appliance third data corresponding to third sounds associated with the virtual speaker, to thereby enable a second user of the second wearable extended reality appliance to hear the third sounds during a third time period, wherein the third sounds correspond to the second settings of the virtual speaker.

Some disclosed embodiments may include systems, methods, and non-transitory computer readable media to initiate location-driven sensory prompts reflecting changes to virtual. These embodiments may involve enabling interaction with a virtual object located in an extended reality environment associated with a wearable extended reality appliance; receiving data reflecting a change associated with the virtual object; determining whether the virtual object is within a field of view of the wearable extended reality appliance or is outside the field of view of the wearable extended reality appliance; causing the wearable extended reality appliance to initiate a first sensory prompt indicative of the change associated with the virtual object when the virtual object is determined to be within the field of view; and causing the wearable extended reality appliance to initiate a second sensory prompt indicative of the change associated with the virtual object when the virtual object is determined to be outside the field of view, wherein the second sensory prompt differs from the first sensory prompt.

Some disclosed embodiments may include systems, methods, and non-transitory computer readable media for selectively controlling display of digital objects. These embodiments may involve generating a plurality of digital objects for display in connection with use of a computing device operable in a first display mode and in a second display mode, wherein in the first display mode, the plurality of digital objects are displayed via a physical display connected to the computing device, and in the second display mode, some of the plurality of digital objects are displayed via the physical display, and at least one other of the plurality of digital objects is displayed via a wearable extended reality appliance; determining a usage status of the wearable extended reality appliance; selecting a display mode based on the usage status of the wearable extended reality appliance; and in response to the display mode selection, outputting for presentation the plurality of digital objects in a manner consistent with the selected display mode.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2 is a schematic illustration of the main components of the example extended reality system of FIG. 1, consistent with some embodiments of the present disclosure.

FIG. 18 is a block diagram illustrating an example process for moving content between a virtual display and an extended reality environment, consistent with some embodiments of the present disclosure.

FIG. 29 illustrates exemplary virtual objects, consistent with some embodiments of the present disclosure.

DETAILED DESCRIPTION

Figure 1:
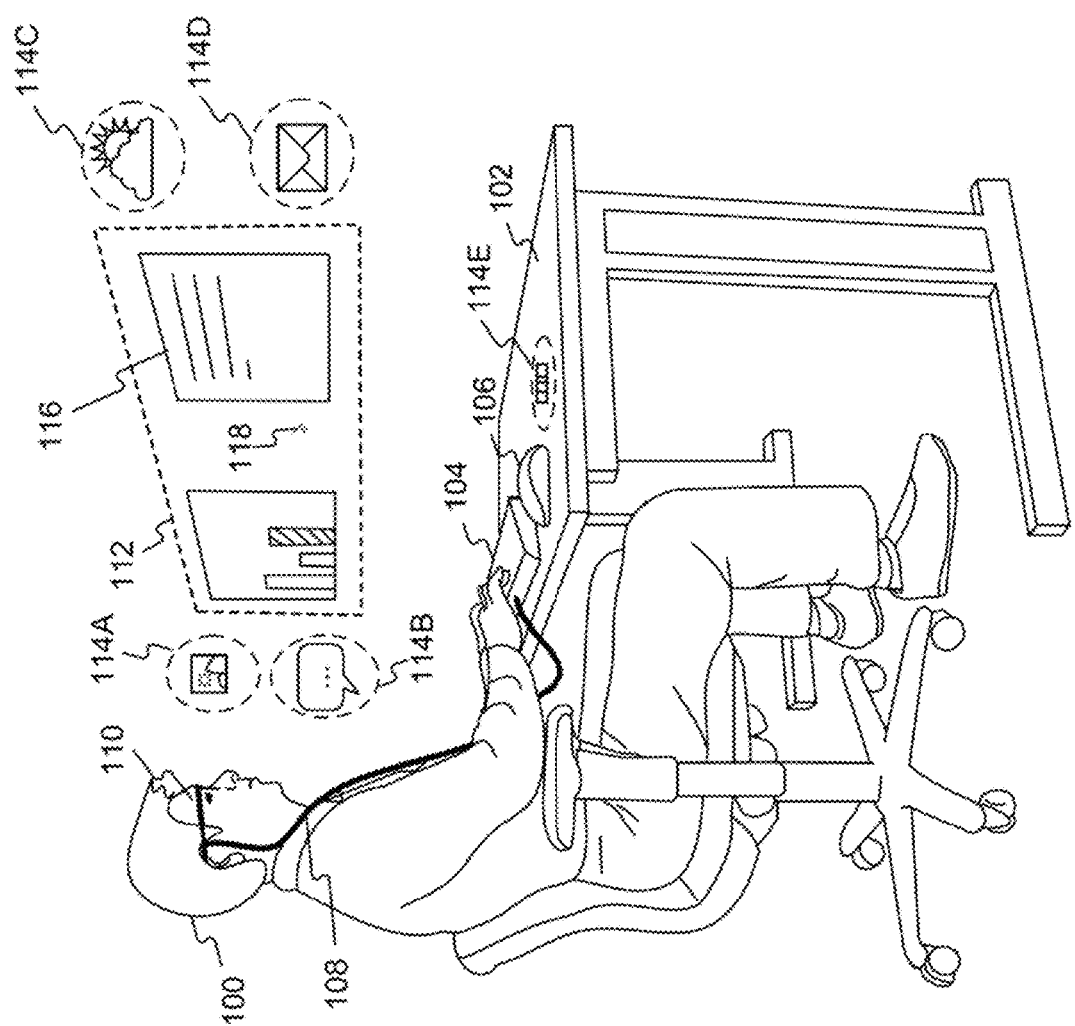
FIG. 1 is a schematic illustration of a user, using an example extended reality system, consistent with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims. The present disclosure is directed to systems and methods for providing users an extended reality environment. The term "extended reality environment," which may also be referred to as "extended reality," "extended reality space," or "extended environment," refers to all types of real-and-virtual combined environments and human-machine interactions at least partially generated by computer technology. The extended reality environment may be a completely simulated virtual environment or a combined real- and virtual environment that a user may perceive from different perspectives. In some examples, the user may interact with elements of the extended reality environment. One non-limiting example of an extended reality environment may be a virtual reality environment, also known as "virtual reality" or a "virtual environment." An immersive virtual reality environment may be a simulated non-physical environment which provides to the user the perception of being present in the virtual environment. Another non-limiting example of an extended reality environment may be an augmented reality environment, also known as "augmented reality" or "augmented environment." An augmented reality environment may involve live direct or indirect view of a physical real-world environment that is enhanced with virtual computer-generated perceptual information, such as virtual objects that the user may interact with. Another non-limiting example of an extended reality environment is a mixed reality environment, also known as "mixed reality" or a "mixed environment." A mixed reality environment may be a hybrid of physical real-world and virtual environments, in which physical and virtual objects may coexist and interact in real time. In some examples, both augmented reality environments and mixed reality environments may include a combination of real and virtual worlds, real-time interactions, and accurate 3D registrations of virtual and real objects. In some examples, both the augmented reality environment and the mixed reality environment may include constructive overlaid sensory information that may be added to the physical environment. In other examples, both the augmented reality environment and the mixed reality environment may include destructive virtual content that may mask at least part of the physical environment.

In some embodiments, the systems and methods may provide the extended reality environment using an extended reality appliance. The term extended reality appliance may include any type of device or system that enables a user to perceive and/or interact with an extended reality environment. The extended reality appliance may enable the user to perceive and/or interact with an extended reality environment through one or more sensory modalities. Some non-limiting examples of such sensory modalities may include visual, auditory, haptic, somatosensory, and olfactory signals or feedback. One example of the extended reality appliance is a virtual reality appliance that enables the user to perceive and/or interact with a virtual reality environment. Another example of the extended reality appliance is an augmented reality appliance that enables the user to perceive and/or interact with an augmented reality environment. Yet another example of the extended reality appliance is a mixed reality appliance that enables the user to perceive and/or interact with a mixed reality environment.

Consistent with one aspect of the disclosure, the extended reality appliance may be a wearable device, such as a head-mounted device, for example, smart glasses, smart contact lens, headsets or any other device worn by a human for purposes of presenting an extended reality to the human. Other extended reality appliances may include a holographic projector or any other device or system capable of providing an augmented reality (AR), virtual reality (VR), mixed reality (MR), or any immersive experience. Typical components of wearable extended reality appliances may include at least one of: a stereoscopic head-mounted display, a stereoscopic head-mounted sound system, head-motion tracking sensors (such as gyroscopes, accelerometers, magnetometers, image sensors, structured light sensors, etc.), head mounted projectors, eye-tracking sensors, and/or additional components described below. Consistent with another aspect of the disclosure, the extended reality appliance may be a non-wearable extended reality appliance. Specifically, the non-wearable extended reality appliance may include multi-projected environment appliances. In some embodiments, an extended reality appliance may be configured to change the viewing perspective of the extended reality environment in response to movements of the user and in response to head movements of the user in particular. In one example, a wearable extended reality appliance may change the field-of-view of the extended reality environment in response to detecting head movements and determining a change of the head pose of the user. The change the field-of-view of the extended reality environment may be achieved by changing the spatial orientation without changing the spatial position of the user in the extended reality environment. In another example, a non-wearable extended reality appliance may change the spatial position of the user in the extended reality environment in response to a change in the position of the user in the real world, for example, by changing the spatial position of the user in the extended reality environment without changing the direction of the field-of-view with respect to the spatial position.

According to some embodiments, an extended reality appliance may include a digital communication device configured to at least one of: receive virtual content data configured to enable a presentation of the virtual content, transmit virtual content for sharing with at least one external device, receive contextual data from at least one external device, transmit contextual data to at least one external device, transmit usage data indicative of usage of the extended reality appliance, and transmit data based on information captured using at least one sensor included in the extended reality appliance. In additional embodiments, the extended reality appliance may include memory for storing at least one of virtual data configured to enable a presentation of virtual content, contextual data, usage data indicative of usage of the extended reality appliance, sensor data based on information captured using at least one sensor included in the extended reality appliance, software instructions configured to cause a processing device to present the virtual content, software instructions configured to cause a processing device to collect and analyze the contextual data, software instructions configured to cause a processing device to collect and analyze the usage data, and software instructions configured to cause a processing device to collect and analyze the sensor data. In additional embodiments, the extended reality appliance may include a processing device configured to perform at least one of rendering of virtual content, collecting and analyzing contextual data, collecting and analyzing usage data, and collecting and analyzing sensor data. In additional embodiments, the extended reality appliance may include one or more sensors. The one or more sensors may include one or more image sensors (e.g., configured to capture images and/or videos of a user of the appliance or of an environment of the user), one or more motion sensors (such as an accelerometer, a gyroscope, a magnetometer, etc.), one or more positioning sensors (such as GPS, outdoor positioning sensor, indoor positioning sensor, etc.), one or more temperature sensors (e.g., configured to measure the temperature of at least part of the appliance and/or of the environment), one or more contact sensors, one or more proximity sensors (e.g., configured to detect whether the appliance is currently worn), one or more electrical impedance sensors (e.g., configured to measure electrical impedance of the user), one or more eye tracking sensors, such as gaze detectors, optical trackers, electric potential trackers (e.g., electrooculogram (EOG) sensors), video—based eye-trackers, infra-red/near infra-red sensors, passive light sensors, or any other technology capable of determining where a human is looking or gazing.

In some embodiments, the systems and methods may use an input device to interact with the extended reality appliance. The term input device may include any physical device configured to receive input from a user or an environment of the user, and to provide the data to a computational device. The data provided to the computational device may be in a digital format and/or in an analog format. In one embodiment, the input device may store the input received from the user in a memory device accessible by a processing device, and the processing device may access the stored data for analysis. In another embodiment, the input device may provide the data directly to a processing device, for example, over a bus or over another communication system configured to transfer data from the input device to the processing device. In some examples, the input received by the input device may include key presses, tactile input data, motion data, position data, gestures based input data, direction data, or any other data. Some examples of the input device may include a button, a key, a keyboard, a computer mouse, a touchpad, a touchscreen, a joystick, or another mechanism from which input may be received. Another example of an input device may include an integrated computational interface device that includes at least one physical component for receiving input from a user. The integrated computational interface device may include at least a memory, a processing device, and the at least one physical component for receiving input from a user. In one example, the integrated computational interface device may further include a digital network interface that enables digital communication with other computing devices. In one example, the integrated computational interface device may further include a physical component for outputting information to the user. In some examples, all components of the integrated computational interface device may be included in a single housing, while in other examples the components may be distributed among two or more housings. Some non-limiting examples of physical components for receiving input from users that may be included in the integrated computational interface device may include at least one of a button, a key, a keyboard, a touchpad, a touchscreen, a joystick, or any other mechanism or sensor from which computational information may be received. Some non-limiting examples of physical components for outputting information to users may include at least one of a light indicator (such as a LED indicator), a screen, a touchscreen, a beeper, an audio speaker, or any other audio, video, or haptic device that provides human-perceptible outputs.

In some embodiments, image data may be captured using one or more image sensors. In some examples, the image sensors may be included in the extended reality appliance, in a wearable device, in the wearable extended reality device, in the input device, in an environment of a user, and so forth. In some examples, the image data may be read from memory, may be received from an external device, may be generated (for example, using a generative model), and so forth. Some non-limiting examples of image data may include images, grayscale images, color images, 2D images, 3D images, videos, 2D videos, 3D videos, frames, footages, data derived from other image data, and so forth. In some examples, the image data may be encoded in any analog or digital format. Some non-limiting examples of such formats may include raw formats, compressed formats, uncompressed formats, lossy formats, lossless formats, JPEG, GIF, PNG, TIFF, BMP, NTSC, PAL, SECAM, MPEG, MPEG-4 Part 14, MOV, WMV, FLV, AVI, AVCHD, WebM, MKV, and so forth.

In some embodiments, the extended reality appliance may receive digital signals, for example, from the input device. The term digital signals refers to a series of digital values that are discrete in time. The digital signals may represent, for example, sensor data, textual data, voice data, video data, virtual data, or any other form of data that provides perceptible information. Consistent with the present disclosure, the digital signals may be configured to cause the extended reality appliance to present virtual content. In one embodiment, the virtual content may be presented in a selected orientation. In this embodiment, the digital signals may indicate a position and an angle of a viewpoint in an environment, such as an extended reality environment. Specifically, the digital signals may include an encoding of the position and angle in six degree-of-freedom coordinates (e.g., forward/back, up/down, left/right, yaw, pitch, and roll). In another embodiment, the digital signals may include an encoding of the position as three-dimensional coordinates (e.g., x, y, and z), and an encoding of the angle as a vector originating from the encoded position. Specifically, the digital signals may indicate the orientation and an angle of the presented virtual content in absolute coordinates of the environment, for example, by encoding yaw, pitch and roll of the virtual content with respect to a standard default angle. In another embodiment, the digital signals may indicate the orientation and the angle of the presented virtual content with respect to a viewpoint of another object (e.g., a virtual object, a physical object, etc.), for example, by encoding yaw, pitch, and roll of the virtual content with respect to a direction corresponding to the viewpoint or to a direction corresponding to the other object. In another embodiment, such digital signals may include one or more projections of the virtual content, for example, in a format ready for presentation (e.g., image, video, etc.). For example, each such projection may correspond to a particular orientation or a particular angle. In another embodiment, the digital signals may include a representation of virtual content, for example, by encoding objects in a three-dimensional array of voxels, in a polygon mesh, or in any other format in which virtual content may be presented.

In some embodiments, the digital signals may be configured to cause the extended reality appliance to present virtual content. The term virtual content may include any type of data representation that may be displayed by the extended reality appliance to the user. The virtual content may include a virtual object, inanimate virtual content, animate virtual content configured to change over time or in response to triggers, virtual two-dimensional content, virtual three dimensional content, a virtual overlay over a portion of a physical environment or over a physical object, a virtual addition to a physical environment or to a physical object, a virtual promotion content, a virtual representation of a physical object, a virtual representation of a physical environment, a virtual document, a virtual character or persona, a virtual computer screen, a virtual widget, or any other format for displaying information virtually. Consistent with the present disclosure, the virtual content may include any visual presentation rendered by a computer or a processing device. In one embodiment, the virtual content may include a virtual object that is a visual presentation rendered by a computer in a confined region and configured to represent an object of a particular type (such as an inanimate virtual object, an animate virtual object, virtual furniture, a virtual decorative object, virtual widget, or other virtual representation). The rendered visual presentation may change to reflect changes to a status of an object or changes in the viewing angle of the object, for example, in a way that mimics changes in the appearance of physical objects. In another embodiment, the virtual content may include a virtual display (also referred to as a "virtual display screen" or a "virtual screen" herein), such as a virtual computer screen, a virtual tablet screen or a virtual smartphone screen, configured to display information generated by an operating system, in which the operating system may be configured to receive textual data from a physical keyboard and/or a virtual keyboard and to cause a display of the textual content in the virtual display screen. In one example, illustrated in FIG. 1, the virtual content may include a virtual environment that includes a virtual computer screen and a plurality of virtual objects. In some examples, a virtual display may be a virtual object mimicking and/or extending the functionality of a physical display screen. For example, the virtual display may be presented in an extended reality environment (such as a mixed reality environment, an augmented reality environment, a virtual reality environment, etc.), using an extended reality appliance. In one example, a virtual display may present content produced by a regular operating system that may be equally presented on a physical display screen. In one example, a textual content entered using a keyboard (for example, using a physical keyboard, using a virtual keyboard, etc.) may be presented on a virtual display in real time as the textual content is typed. In one example, a virtual cursor may be presented on a virtual display, and the virtual cursor may be controlled by a pointing device (such as a physical pointing device, a virtual pointing device, a computer mouse, a joystick, a touchpad, a physical touch controller, and/or any other device for identifying a location on the display). In one example, one or more windows of a graphical user interface operating system may be presented on a virtual display. In another example, content presented on a virtual display may be interactive, that is, it may change in reaction to actions of users. In yet another example, a presentation of a virtual display may include a presentation of a screen frame, or may include no presentation of a screen frame.

Some disclosed embodiments may include and/or access a data structure or a database. The terms data structure and a database, consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, Entity-Relationship model, a graph, a hypergraph, a matrix, a tensor, and/or other ways of organizing data. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and/or Neo4J. A data structure may be a component of the disclosed system or a remote computing component (e.g., a cloud-based data structure). Data in the data structure may be stored in contiguous or non-contiguous memory. Moreover, a data structure may not require information to be co-located. It may be distributed across multiple servers, for example, the multiple servers may be owned or operated by the same or different entities. Thus, the term data structure in the singular is inclusive of plural data structures.

In some embodiments, the system may determine the confidence level in received input or in any determined value. The term confidence level refers to any indication, numeric or otherwise, of a level (e.g., within a predetermined range) indicative of an amount of confidence the system has in the determined data. For example, the confidence level may have a value between 1 and 10. Alternatively, the confidence level may be expressed as a percentage or any other numerical or non-numerical indication. In some cases, the system may compare the confidence level to a threshold. The term threshold may denote a reference value, a level, a point, or a range of values. In operation, when the confidence level of determined data exceeds the threshold (or is below it, depending on a particular use case), the system may follow a first course of action and, when the confidence level is below it (or above it, depending on a particular use case), the system may follow a second course of action. The value of the threshold may be predetermined for each type of examined object or may be dynamically selected based on different considerations.

System Overview

Reference is now made to FIG. 1, which illustrates a user that uses an example extended reality system consistent with various embodiments of the present disclosure. FIG. 1 is an exemplary representation of just one embodiment, and it is to be understood that some illustrated elements might be omitted and others added within the scope of this disclosure. As shown, a user 100 is sitting behind table 102, supporting a keyboard 104 and mouse 106. Keyboard 104 is connected by wire 108 to a wearable extended reality appliance 110 that displays virtual content to user 100. Alternatively or additionally, keyboard 104 may connect to wearable extended reality appliance 110 wirelessly. For illustration purposes, the wearable extended reality appliance is depicted as a pair of smart glasses, but, as described above, wearable extended reality appliance 110 may be any type of head-mounted device used for presenting an extended reality to user 100. The virtual content displayed by wearable extended reality appliance 110 includes a virtual screen 112 (also referred to as a "virtual display screen" or a "virtual display" herein) and a plurality of virtual widgets 114. Virtual widgets 114A-114D are displayed next to virtual screen 112 and virtual widget 114E is displayed on table 102. User 100 may input text to a document 116 displayed in virtual screen 112 using keyboard 104, and may control virtual cursor 118 using mouse 106. In one example, virtual cursor 118 may move anywhere within virtual screen 112. In another example, virtual cursor 118 may move anywhere within virtual screen 112 and may also move to any one of virtual widgets 114A-114D but not to virtual widget 114E. In yet another example, virtual cursor 118 may move anywhere within virtual screen 112 and may also move to any one of virtual widgets 114A-114E. In an additional example, virtual cursor 118 may move anywhere in the extended reality environment including virtual screen 112 and virtual widgets 114A-114E. In yet another example, virtual cursor may move on all available surfaces (i.e., virtual surfaces or physical surfaces) or only on selected surfaces in the extended reality environment. Alternatively or additionally, user 100 may interact with any one of virtual widgets 114A-114E, or with selected virtual widgets, using hand gestures recognized by wearable extended reality appliance 110. For example, virtual widget 114E may be an interactive widget (e.g., a virtual slider controller) that may be operated with hand gestures.

FIG. 2 illustrates an example of a system 200 that provides extended reality (XR) experience to users, such as user 100. FIG. 2 is an exemplary representation of just one embodiment, and it is to be understood that some illustrated elements might be omitted and others added within the scope of this disclosure. System 200 may be computer-based and may include computer system components, wearable appliances, workstations, tablets, handheld computing devices, memory devices, and/or internal network(s) connecting the components. System 200 may include or be connected to various network computing resources (e.g., servers, routers, switches, network connections, storage devices) for supporting services provided by system 200. Consistent with the present disclosure, system 200 may include an input unit 202, an XR unit 204, a mobile communications device 206, and/or a remote processing unit 208. Remote processing unit 208 may include a server 210 coupled to one or more physical or virtual storage devices, such as a data structure 212. System 200 may also include or be connected to a communications network 214 that facilitates communications and data exchange between different system components and the different entities associated with system 200.

Consistent with the present disclosure, input unit 202 may include one or more devices that may receive input from user 100. In one embodiment, input unit 202 may include a textual input device, such as keyboard 104. The textual input device may include all possible types of devices and mechanisms for inputting textual information to system 200. Examples of textual input devices may include mechanical keyboards, membrane keyboards, flexible keyboards, QWERTY keyboards, Dvorak keyboards, Colemak keyboards, chorded keyboards, wireless keyboards, keypads, key-based control panels, or other arrays of control keys, vision input devices, or any other mechanism for inputting text, whether the mechanism is provided in physical form or is presented virtually. In one embodiment, input unit 202 may also include a pointing input device, such as mouse 106. The pointing input device may include all possible types of devices and mechanisms for inputting two-dimensional or three-dimensional information to system 200. In one example, two-dimensional input from the pointing input device may be used for interacting with virtual content presented via the XR unit 204. Examples of pointing input devices may include a computer mouse, trackball, touchpad, trackpad, touchscreen, joystick, pointing stick, stylus, light pen, or any other physical or virtual input mechanism. In one embodiment, input unit 202 may also include a graphical input device, such as a touchscreen configured to detect contact, movement, or break of movement. The graphical input device may use any of a plurality of touch sensitivity technologies, including, but not limited to, capacitive, resistive, infrared, and surface acoustic wave technologies as well as other proximity sensor arrays or other elements for determining one or more points of contact. In one embodiment, input unit 202 may also include one or more voice input devices, such as a microphone. The voice input device may include all possible types of devices and mechanisms for inputting voice data to facilitate voice-enabled functions, such as voice recognition, voice replication, digital recording, and telephony functions. In one embodiment, input unit 202 may also include one or more image input devices, such as an image sensor, configured to capture image data. In one embodiment, input unit 202 may also include one or more haptic gloves configured to capture hands motion and pose data. In one embodiment, input unit 202 may also include one or more proximity sensors configured to detect presence and/or movement of objects in a selected region near the sensors.

In accordance with some embodiments, the system may include at least one sensor configured to detect and/or measure a property associated with the user, the user's action, or user's environment. One example of the at least one sensor, is sensor 216 included in input unit 202. Sensor 216 may be a motion sensor, a touch sensor, a light sensor, an infrared sensor, an audio sensor, an image sensor, a proximity sensor, a positioning sensor, a gyroscope, a temperature sensor, a biometric sensor, or any other sensing devices to facilitate related functionalities. Sensor 216 may be integrated with, or connected to, the input devices or it may be separated from the input devices. In one example, a thermometer may be included in mouse 106 to determine the body temperature of user 100. In another example, a positioning sensor may be integrated with keyboard 104 to determine movement of user 100 relative to keyboard 104. Such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, image based positioning technology, indoor positioning technology, outdoor positioning technology, or any other positioning technology.

In accordance with some embodiments, the system may include one or more sensors for identifying a position and/or a movement of a physical device (such as a physical input device, a physical computing device, keyboard 104, mouse 106, wearable extended reality appliance 110, and so forth). The one or more sensors may be included in the physical device or may be external to the physical device. In some examples, an image sensor external to the physical device (for example, an image sensor included in another physical device) may be used to capture image data of the physical device, and the image data may be analyzed to identify the position and/or the movement of the physical device. For example, the image data may be analyzed using a visual object tracking algorithm to identify the movement of the physical device, may be analyzed using a visual object detection algorithm to identify the position of the physical device (for example, relative to the image sensor, in a global coordinates system, etc.), and so forth. In some examples, an image sensor included in the physical device may be used to capture image data, and the image data may be analyzed to identify the position and/or the movement of the physical device. For example, the image data may be analyzed using visual odometry algorithms to identify the position of the physical device, may be analyzed using an ego-motion algorithm to identify movement of the physical device, and so forth. In some examples, a positioning sensor, such as an indoor positioning sensor or an outdoor positioning sensor, may be included in the physical device and may be used to determine the position of the physical device. In some examples, a motion sensor, such as an accelerometer or a gyroscope, may be included in the physical device and may be used to determine the motion of the physical device. In some examples, a physical device, such as a keyboard or a mouse, may be configured to be positioned on a physical surface. Such physical device may include an optical mouse sensor (also known as non-mechanical tracking engine) aimed towards the physical surface, and the output of the optical mouse sensor may be analyzed to determine movement of the physical device with respect to the physical surface.

Consistent with the present disclosure, XR unit 204 may include a wearable extended reality appliance configured to present virtual content to user 100. One example of the wearable extended reality appliance is wearable extended reality appliance 110. Additional examples of wearable extended reality appliance may include a Virtual Reality (VR) device, an Augmented Reality (AR) device, a Mixed Reality (MR) device, or any other device capable of generating extended reality content. Some non-limiting examples of such devices may include Nreal Light, Magic Leap One, Varjo, Quest 1/2, Vive, and others. In some embodiments, XR unit 204 may present virtual content to user 100. Generally, an extended reality appliance may include all real- and virtual combined environments and human-machine interactions generated by computer technology and wearables. As mentioned above, the term "extended reality" (XR) refers to a superset which includes the entire spectrum from "the complete real" to "the complete virtual." It includes representative forms such as augmented reality (AR), mixed reality (MR), virtual reality (VR), and the areas interpolated among them. Accordingly, it is noted that the terms "XR appliance," "AR appliance," "VR appliance," and "MR appliance" may be used interchangeably herein and may refer to any device of the variety of appliances listed above.

Consistent with the present disclosure, the system may exchange data with a variety of communication devices associated with users, for example, mobile communications device 206. The term "communication device" is intended to include all possible types of devices capable of exchanging data using digital communications network, analog communication network or any other communications network configured to convey data. In some examples, the communication device may include a smartphone, a tablet, a smartwatch, a personal digital assistant, a desktop computer, a laptop computer, an IoT device, a dedicated terminal, a wearable communication device, and any other device that enables data communications. In some cases, mobile communications device 206 may supplement or replace input unit 202. Specifically, mobile communications device 206 may be associated with a physical touch controller that may function as a pointing input device. Moreover, mobile communications device 206 may also, for example, be used to implement a virtual keyboard and replace the textual input device. For example, when user 100 steps away from table 102 and walks to the break room with his smart glasses, he may receive an email that requires a quick answer. In this case, the user may select to use his or her own smartwatch as the input device and to type the answer to the email while it is virtually presented by the smart glasses.

Consistent with the present disclosure, embodiments of the system may involve the usage of a cloud server. The term "cloud server" refers to a computer platform that provides services via a network, such as the Internet. In the example embodiment illustrated in FIG. 2, server 210 may use virtual machines that may not correspond to individual hardware. For example, computational and/or storage capabilities may be implemented by allocating appropriate portions of desirable computation/storage power from a scalable repository, such as a data center or a distributed computing environment. Specifically, in one embodiment, remote processing unit 208 may be used together with XR unit 204 to provide the virtual content to user 100. In one example configuration, server 210 may be a cloud server that functions as the operating system (OS) of the wearable extended reality appliance. In one example, server 210 may implement the methods described herein using customized hard-wired logic, one or more Application Specific Integrated Circuits (ASICs), Field Programmable Gate Arrays (FPGAs), firmware, and/or program logic which, in combination with the computer system, cause server 210 to be a special-purpose machine.

In some embodiments, server 210 may access data structure 212 to determine, for example, virtual content to display to user 100. Data structure 212 may utilize a volatile or non-volatile, magnetic, semiconductor, tape, optical, removable, non-removable, other type of storage device or tangible or non-transitory computer-readable medium, or any medium or mechanism for storing information. Data structure 212 may be part of server 210 or separate from server 210, as shown. When data structure 212 is not part of server 210, server 210 may exchange data with data structure 212 via a communication link. Data structure 212 may include one or more memory devices that store data and instructions used to perform one or more features of the disclosed methods. In one embodiment, data structure 212 may include any of a plurality of suitable data structures, ranging from small data structures hosted on a workstation to large data structures distributed among data centers. Data structure 212 may also include any combination of one or more data structures controlled by memory controller devices (e.g., servers) or software.

Consistent with the present disclosure, communications network may be any type of network (including infrastructure) that supports communications, exchanges information, and/or facilitates the exchange of information between the components of a system. For example, communications network 214 in system 200 may include, for example, a telephone network, an extranet, an intranet, the Internet, satellite communications, off-line communications, wireless communications, transponder communications, a Local Area Network (LAN), wireless network (e.g., a Wi-Fi/ 302.11 network), a Wide Area Network (WAN), a Virtual Private Network (VPN), digital communication network, analog communication network, or any other mechanism or combination of mechanisms that enables data transmission. The components and arrangements of system 200 shown in FIG. 2 are intended to be exemplary only and are not intended to limit any embodiment, as the system components used to implement the disclosed processes and features may vary.

Figure 3:
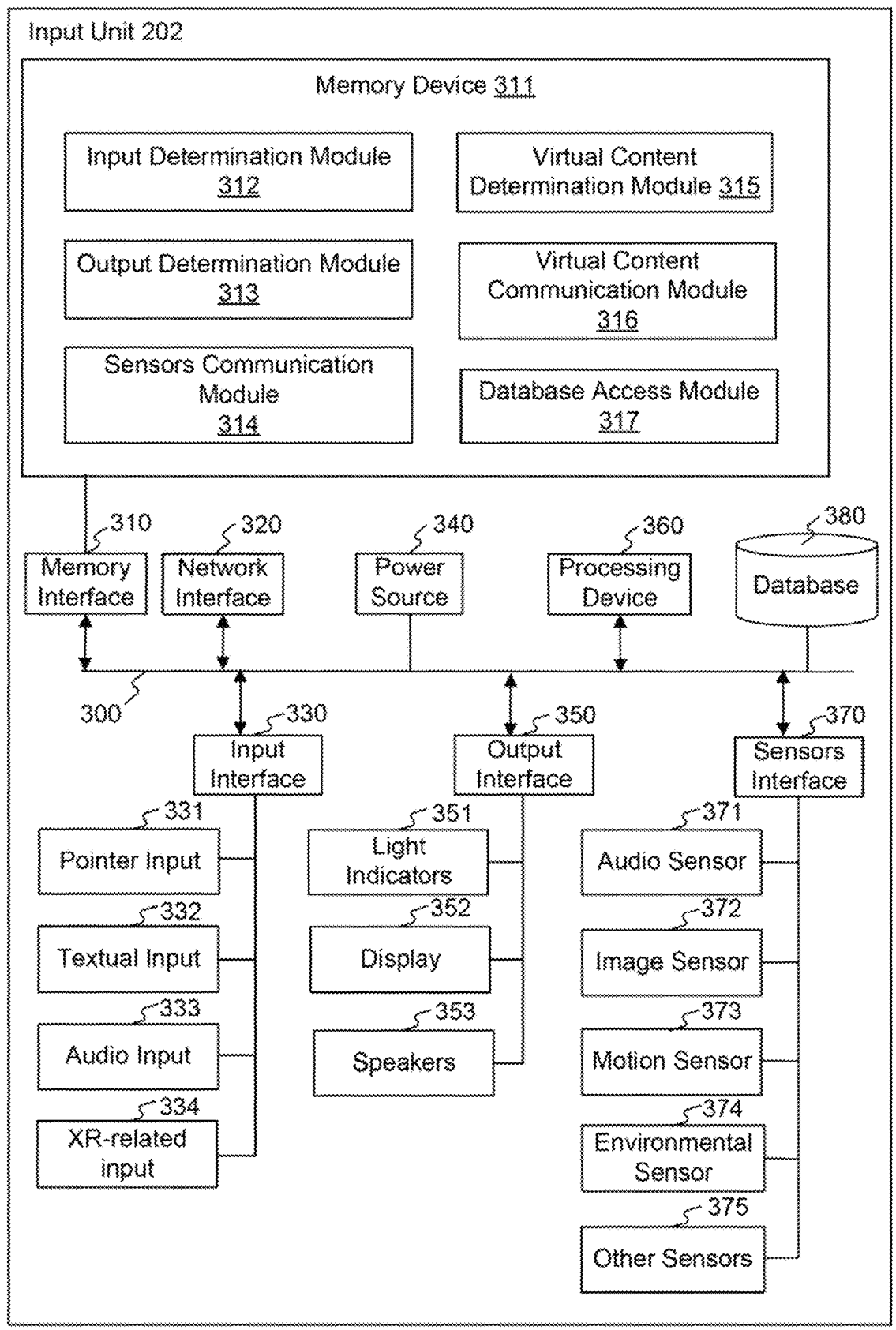
FIG. 3 is a block diagram illustrating some of the components of an input unit, consistent with some embodiments of the present disclosure.

FIG. 3 is a block diagram of an exemplary configuration of input unit 202. FIG. 3 is an exemplary representation of just one embodiment, and it is to be understood that some illustrated elements might be omitted and others added within the scope of this disclosure. In the embodiment of FIG. 3, input unit 202 may directly or indirectly access a bus 300 (or other communication mechanism) that interconnects subsystems and components for transferring information within input unit 202. For example, bus 300 may interconnect a memory interface 310, a network interface 320, an input interface 330, a power source 340, an output interface 350, a processing device 360, a sensors interface 370, and a database 380.

Memory interface 310, shown in FIG. 3, may be used to access a software product and/or data stored on a non-transitory computer-readable medium. Generally, a non-transitory computer-readable storage medium refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. Accordingly, the term computer-readable storage medium should be understood to include tangible items and exclude carrier waves and transient signals. In the specific embodiment illustrated in FIG. 3, memory interface 310 may be used to access a software product and/or data stored on a memory device, such as memory device 311. Memory device 311 may include high-speed random-access memory and/or non-volatile memory, such as one or more magnetic disk storage devices, one or more optical storage devices, and/or flash memory (e.g., NAND, NOR). Consistent with the present disclosure, the components of memory device 311 may be distributed in more than units of system 200 and/or in more than one memory device.

Memory device 311, shown in FIG. 3, may contain software modules to execute processes consistent with the present disclosure. In particular, memory device 311 may include an input determination module 312, an output determination module 313, a sensors communication module 314, a virtual content determination module 315, a virtual content communication module 316, and a database access module 317. Modules 312-317 may contain software instructions for execution by at least one processor (e.g., processing device 360) associated with input unit 202. Input determination module 312, output determination module 313, sensors communication module 314, virtual content determination module 315, virtual content communication module 316, and database access module 317 may cooperate to perform various operations. For example, input determination module 312 may determine text using data received from, for example, keyboard 104. Thereafter, output determination module 313 may cause presentation of the recent inputted text, for example on a dedicated display 352 physically or wirelessly coupled to keyboard 104. This way, when user 100 types, the user can see a preview of the typed text without constantly moving his head up and down to look at virtual screen 112. Sensors communication module 314 may receive data from different sensors to determine a status of user 100. Thereafter, virtual content determination module 315 may determine the virtual content to display, based on received input and the determined status of user 100. For example, the determined virtual content may be a virtual presentation of the recent inputted text on a virtual screen virtually located adjacent to keyboard 104. Virtual content communication module 316 may obtain virtual content that is not determined by virtual content determination module 315 (e.g., an avatar of another user). The retrieval of the virtual content may be from database 380, from remote processing unit 208, or any other source.

In some embodiments, input determination module 312 may regulate the operation of input interface 330 in order to receive pointer input 331, textual input 332, audio input 333, and XR-related input 334. Details on the pointer input, the textual input, and the audio input are described above. The term "XR-related input" may include any type of data that may cause a change in the virtual content displayed to user 100. In one embodiment, XR-related input 334 may include image data of user 100 from the wearable extended reality appliance (e.g., detected hand gestures of user 100). In another embodiment, XR-related input 334 may include wireless communication indicating a presence of another user in proximity to user 100. Consistent with the present disclosure, input determination module 312 may concurrently receive different types of input data. Thereafter, input determination module 312 may further apply different rules based on the detected type of input. For example, a pointer input may have precedence over voice input.

In some embodiments, output determination module 313 may regulate the operation of output interface 350 in order to generate output using light indicators 351, display 352, and/or speakers 353. In general, the output generated by output determination module 313 does not include virtual content to be presented by a wearable extended reality appliance. Instead, the output generated by output determination module 313 includes various outputs that relates to the operation of input unit 202 and/or the operation of XR unit 204. In one embodiment, light indicators 351 may include a light indicator that shows the status of a wearable extended reality appliance. For example, the light indicator may display green light when wearable extended reality appliance 110 are connected to keyboard 104, and blinks when wearable extended reality appliance 110 has low battery. In another embodiment, display 352 may be used to display operational information. For example, the display may present error messages when the wearable extended reality appliance is inoperable. In another embodiment, speakers 353 may be used to output audio, for example, when user 100 wishes to play some music for other users.

In some embodiments, sensors communication module 314 may regulate the operation of sensors interface 370 in order to receive sensor data from one or more sensors, integrated with, or connected to, an input device. The one or more sensors may include: audio sensor 371, image sensor 372, motion sensor 373, environmental sensor 374 (e.g., a temperature sensor, ambient light detectors, etc.), and other sensors 375. In one embodiment, the data received from sensors communication module 314 may be used to determine the physical orientation of the input device. The physical orientation of the input device may be indicative of a state of the user and may be determined based on combination of a tilt movement, a roll movement, and a lateral movement. Thereafter, the physical orientation of the input device may be used by virtual content determination module 315 to modify display parameters of the virtual content to match the state of the user (e.g., attention, sleepy, active, sitting, standing, leaning backwards, leaning forward, walking, moving, riding).

In some embodiments, virtual content determination module 315 may determine the virtual content to be displayed by the wearable extended reality appliance. The virtual content may be determined based on data from input determination module 312, sensors communication module 314, and other sources (e.g., database 380). In some embodiments, determining the virtual content may include determining the distance, the size, and the orientation of the virtual objects. The determination of the position of the virtual objects may be determined based on the type of the virtual objects. Specifically, with regards to the example illustrated in FIG. 1, the virtual content determination module 315 may determine to place four virtual widgets 114A-114D on the sides of virtual screen 112 and to place virtual widget 114E on table 102 because virtual widget 114E is a virtual controller (e.g., volume bar). The determination of the position of the virtual objects may further be determined based on user's preferences. For example, for left-handed users, virtual content determination module 315 may determine placing a virtual volume bar left of keyboard 104; and for right-handed users, virtual content determination module 315 may determine placing the virtual volume bar right of keyboard 104.

In some embodiments, virtual content communication module 316 may regulate the operation of network interface 320 in order to obtain data from one or more sources to be presented as virtual content to user 100. The one or more sources may include other XR units 204, the user's mobile communications device 206, remote processing unit 208, publicly available information, etc. In one embodiment, virtual content communication module 316 may communicate with mobile communications device 206 in order to provide a virtual representation of mobile communications device 206. For example, the virtual representation may enable user 100 to read messages and interact with applications installed on the mobile communications device 206. Virtual content communication module 316 may also regulate the operation of network interface 320 in order to share virtual content with other users. In one example, virtual content communication module 316 may use data from input determination module to identify a trigger (e.g., the trigger may include a gesture of the user) and to transfer content from the virtual display to a physical display (e.g., TV) or to a virtual display of a different user.

In some embodiments, database access module 317 may cooperate with database 380 to retrieve stored data. The retrieved data may include, for example, privacy levels associated with different virtual objects, the relationship between virtual objects and physical objects, the user's preferences, the user's past behavior, and more. As described above, virtual content determination module 315 may use the data stored in database 380 to determine the virtual content. Database 380 may include separate databases, including, for example, a vector database, raster database, tile database, viewport database, and/or a user input database. The data stored in database 380 may be received from modules 314-317 or other components of system 200. Moreover, the data stored in database 380 may be provided as input using data entry, data transfer, or data uploading.

Modules 312-317 may be implemented in software, hardware, firmware, a mix of any of those, or the like. In some embodiments, any one or more of modules 312-317 and data associated with database 380 may be stored in XR unit 204, mobile communications device 206, or remote processing unit 208. Processing devices of system 200 may be configured to execute the instructions of modules 312-317. In some embodiments, aspects of modules 312-317 may be implemented in hardware, in software (including in one or more signal processing and/or application specific integrated circuits), in firmware, or in any combination thereof, executable by one or more processors, alone, or in various combinations with each other. Specifically, modules 312-317 may be configured to interact with each other and/or other modules of system 200 to perform functions consistent with some disclosed embodiments. For example, input unit 202 may execute instructions that include an image processing algorithm on data from XR unit 204 to determine head movement of user 100. Furthermore, each functionality described throughout the specification, with regards to input unit 202 or with regards to a component of input unit 202, may correspond to a set of instructions for performing said functionality. These instructions need not be implemented as separate software programs, procedures, or modules. Memory device 311 may include additional modules and instructions or fewer modules and instructions. For example, memory device 311 may store an operating system, such as ANDROID, iOS, UNIX, OSX, WINDOWS, DARWIN, RTXC, LINUX or an embedded operating system such as VXWorkS. The operating system can include instructions for handling basic system services and for performing hardware-dependent tasks.

Network interface 320, shown in FIG. 3, may provide two-way data communications to a network, such as communications network 214. In one embodiment, network interface 320 may include an Integrated Services Digital Network (ISDN) card, cellular modem, satellite modem, or a modem to provide a data communication connection over the Internet. As another example, network interface 320 may include a Wireless Local Area Network (WLAN) card. In another embodiment, network interface 320 may include an Ethernet port connected to radio frequency receivers and transmitters and/or optical (e.g., infrared) receivers and transmitters. The specific design and implementation of network interface 320 may depend on the communications network or networks over which input unit 202 is intended to operate. For example, in some embodiments, input unit 202 may include network interface 320 designed to operate over a GSM network, a GPRS network, an EDGE network, a Wi-Fi or WiMax network, and a Bluetooth network. In any such implementation, network interface 320 may be configured to send and receive electrical, electromagnetic, or optical signals that carry digital data streams or digital signals representing various types of information.

Input interface 330, shown in FIG. 3, may receive input from a variety of input devices, for example, a keyboard, a mouse, a touch pad, a touch screen, one or more buttons, a joystick, a microphone, an image sensor, and any other device configured to detect physical or virtual input. The received input may be in the form of at least one of: text, sounds, speech, hand gestures, body gestures, tactile information, and any other type of physically or virtually input generated by the user. In the depicted embodiment, input interface 330 may receive pointer input 331, textual input 332, audio input 333, and XR-related input 334. In additional embodiments, input interface 330 may be an integrated circuit that may act as a bridge between processing device 360 and any of the input devices listed above.

Power source 340, shown in FIG. 3, may provide electrical energy to power input unit 202 and optionally also power XR unit 204. Generally, a power source included in the any device or system in the present disclosure may be any device that can repeatedly store, dispense, or convey electric power, including, but not limited to, one or more batteries (e.g., a lead-acid battery, a lithium-ion battery, a nickel-metal hydride battery, a nickel-cadmium battery), one or more capacitors, one or more connections to external power sources, one or more power convertors, or any combination of them. With reference to the example illustrated in FIG. 3, the power source may be mobile, which means that input unit 202 can be easily carried by hand (e.g., the total weight of power source 340 may be less than a pound). The mobility of the power source enables user 100 to use input unit 202 in a variety of situations. In other embodiments, power source 340 may be associated with a connection to an external power source (such as an electrical power grid) that may be used to charge power source 340. In addition, power source 340 may be configured to charge one or more batteries included in XR unit 204; for example, a pair of extended reality glasses (e.g., wearable extended reality appliance 110) may be charged (e.g., wirelessly or not wirelessly) when they are placed on or in proximity to the input unit 202.

Output interface 350, shown in FIG. 3, may cause output from a variety of output devices, for example, using light indicators 351, display 352, and/or speakers 353. In one embodiment, output interface 350 may be an integrated circuit that may act as bridge between processing device 360 and at least one of the output devices listed above. Light indicators 351 may include one or more light sources, for example, a LED array associated with different colors. Display 352 may include a screen (e.g., LCD or dot-matrix screen) or a touch screen. Speakers 353 may include audio headphones, a hearing aid type device, a speaker, a bone conduction headphone, interfaces that provide tactile cues, and/or vibrotactile stimulators.

Processing device 360, shown in FIG. 3, may include at least one processor configured to execute computer programs, applications, methods, processes, or other software to perform embodiments described in the present disclosure. Generally, a processing device included in any device or system in the present disclosure may include one or more integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. The processing device may include at least one processor configured to perform functions of the disclosed methods such as a microprocessor manufactured by Intel™. The processing device may include a single core or multiple core processors executing parallel processes simultaneously. In one example, the processing device may be a single core processor configured with virtual processing technologies. The processing device may implement virtual machine technologies or other technologies to provide the ability to execute, control, run, manipulate, store, etc., multiple software processes, applications, programs, etc. In another example, the processing device may include a multiple-core processor arrangement (e.g., dual, quad core, etc.) configured to provide parallel processing functionalities to allow a device associated with the processing device to execute multiple processes simultaneously. Other types of processor arrangements may be implemented to provide the capabilities disclosed herein.

Sensors interface 370, shown in FIG. 3, may obtain sensor data from a variety of sensors, for example, audio sensor 371, image sensor 372, motion sensor 373, environmental sensor 374, and other sensors 375. In one embodiment, sensors interface 370 may be an integrated circuit that may act as bridge between processing device 360 and at least one of the sensors listed above.

Audio sensor 371 may include one or more audio sensors configured to capture audio by converting sounds to digital information. Some examples of audio sensors may include: microphones, unidirectional microphones, bidirectional microphones, cardioid microphones, omnidirectional microphones, onboard microphones, wired microphones, wireless microphones, or any combination of the above. Consistent with the present disclosure, processing device 360 may modify a presentation of virtual content based on data received from audio sensor 371 (e.g., voice commands).

Image sensor 372 may include one or more image sensors configured to capture visual information by converting light to image data. Consistent with the present disclosure, an image sensor may be included in the any device or system in the present disclosure and may be any device capable of detecting and converting optical signals in the near-infrared, infrared, visible, and ultraviolet spectrums into electrical signals. Examples of image sensors may include digital cameras, phone cameras, semiconductor Charge-Coupled Devices (CCDs), active pixel sensors in Complementary Metal-Oxide-Semiconductor (CMOS), or N-type metal-oxide-semiconductor (NMOS, Live MOS). The electrical signals may be used to generate image data. Consistent with the present disclosure, the image data may include pixel data streams, digital images, digital video streams, data derived from captured images, and data that may be used to construct one or more 3D images, a sequence of 3D images, 3D videos, or a virtual 3D representation. The image data acquired by image sensor 372 may be transmitted by wired or wireless transmission to any processing device of system 200. For example, the image data may be processed in order to: detect objects, detect events, detect actions, detect faces, detect people, recognize a known person, or determine any other information that may be used by system 200. Consistent with the present disclosure, processing device 360 may modify a presentation of virtual content based on image data received from image sensor 372.

Motion sensor 373 may include one or more motion sensors configured to measure motion of input unit 202 or motion of objects in the environment of input unit 202. Specifically, the motion sensors may perform at least one of the following: detect motion of objects in the environment of input unit 202, measure the velocity of objects in the environment of input unit 202, measure the acceleration of objects in the environment of input unit 202, detect the motion of input unit 202, measure the velocity of input unit 202, and/or measure the acceleration of input unit 202. In some embodiments, motion sensor 373 may include one or more accelerometers configured to detect changes in proper acceleration and/or to measure proper acceleration of input unit 202. In other embodiments, motion sensor 373 may include one or more gyroscopes configured to detect changes in the orientation of input unit 202 and/or to measure information related to the orientation of input unit 202. In other embodiments, motion sensor 373 may include one or more image sensors, LIDAR sensors, radar sensors, or proximity sensors. For example, by analyzing captured images the processing device may determine the motion of input unit 202, for example, using ego-motion algorithms. In addition, the processing device may determine the motion of objects in the environment of input unit 202, for example, using object tracking algorithms. Consistent with the present disclosure, processing device 360 may modify a presentation of virtual content based on the determined motion of input unit 202 or the determined motion of objects in the environment of input unit 202. For example, causing a virtual display to follow the movement of input unit 202.

Environmental sensor 374 may include one or more sensors from different types configured to capture data reflective of the environment of input unit 202. In some embodiments, environmental sensor 374 may include one or more chemical sensors configured to perform at least one of the following: measure chemical properties in the environment of input unit 202, measure changes in the chemical properties in the environment of input unit 202, detect the present of chemicals in the environment of input unit 202, measure the concentration of chemicals in the environment of input unit 202. Examples of such chemical properties may include: pH level, toxicity, and temperature. Examples of such chemicals may include: electrolytes, particular enzymes, particular hormones, particular proteins, smoke, carbon dioxide, carbon monoxide, oxygen, ozone, hydrogen, and hydrogen sulfide. In other embodiments, environmental sensor 374 may include one or more temperature sensors configured to detect changes in the temperature of the environment of input unit 202 and/or to measure the temperature of the environment of input unit 202. In other embodiments, environmental sensor 374 may include one or more barometers configured to detect changes in the atmospheric pressure in the environment of input unit 202 and/or to measure the atmospheric pressure in the environment of input unit 202. In other embodiments, environmental sensor 374 may include one or more light sensors configured to detect changes in the ambient light in the environment of input unit 202. Consistent with the present disclosure, processing device 360 may modify a presentation of virtual content based on input from environmental sensor 374. For example, automatically reducing the brightness of the virtual content when the environment of user 100 becomes darker.

Other sensors 375 may include a weight sensor, a light sensor, a resistive sensor, an ultrasonic sensor, a proximity sensor, a biometric sensor, or other sensing devices to facilitate related functionalities. In some embodiments, other sensors 375 may include one or more positioning sensors configured to obtain positioning information of input unit 202, to detect changes in the position of input unit 202, and/or to measure the position of input unit 202. Alternatively, GPS software may permit input unit 202 to access an external GPS receiver (e.g., connecting via a serial port or Bluetooth). Consistent with the present disclosure, processing device 360 may modify a presentation of virtual content based on input from other sensors 375. For example, presenting private information only after identifying user 100 using data from a biometric sensor.

The components and arrangements shown in FIG. 3 are not intended to limit any embodiment. As will be appreciated by a person skilled in the art having the benefit of this disclosure, numerous variations and/or modifications may be made to the depicted configuration of input unit 202. For example, not all components may be essential for the operation of an input unit in all cases. Any component may be located in any appropriate part of an input unit, and the components may be rearranged into a variety of configurations while providing the functionality of various embodiments. For example, some input units may not include all of the elements as shown in input unit 202.

Figure 4:
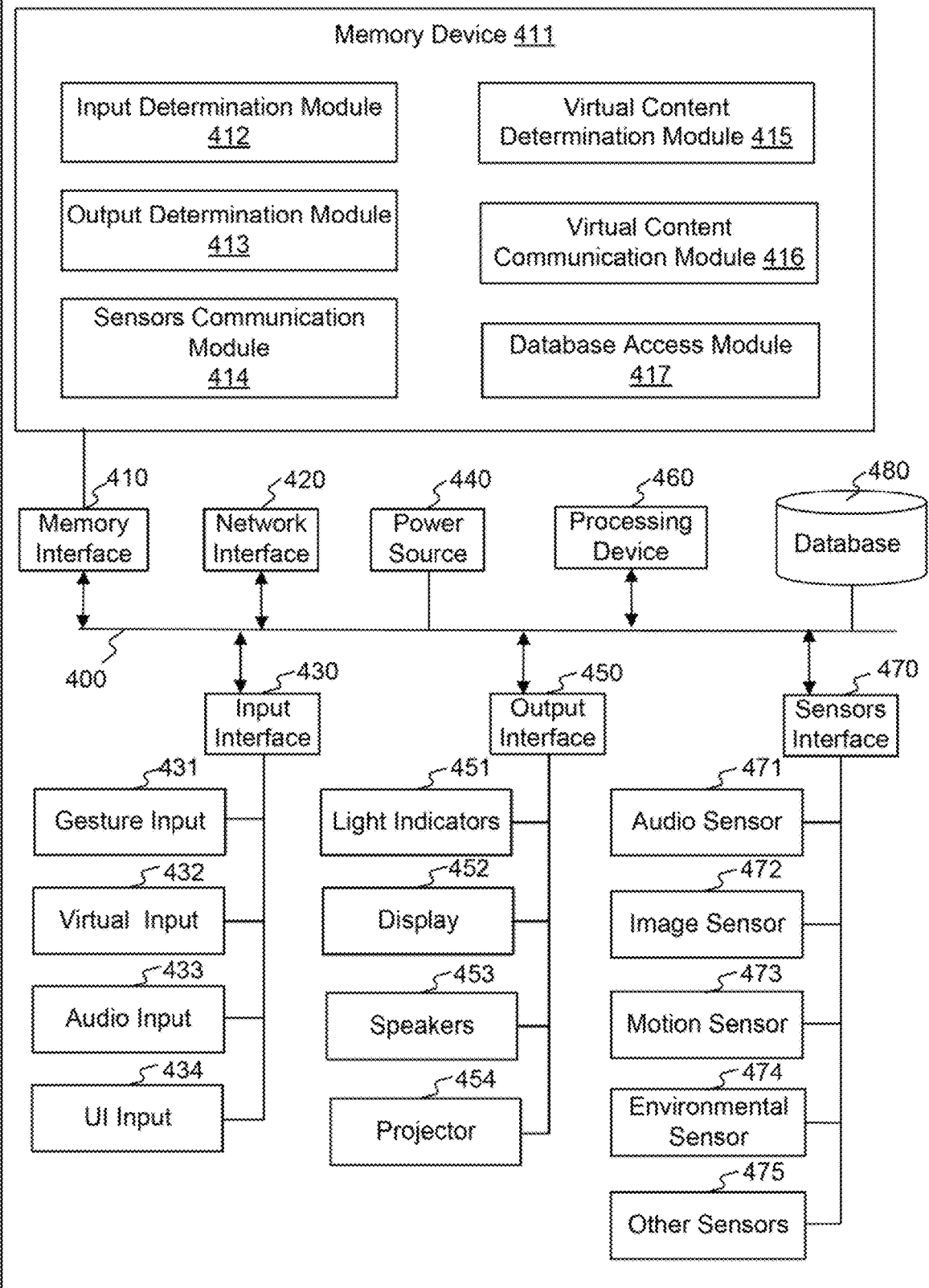
FIG. 4 is a block diagram illustrating some of the components of an extended reality unit, consistent with some embodiments of the present disclosure.

FIG. 4 is a block diagram of an exemplary configuration of XR unit 204. FIG. 4 is an exemplary representation of just one embodiment, and it is to be understood that some illustrated elements might be omitted and others added within the scope of this disclosure. In the embodiment of FIG. 4, XR unit 204 may directly or indirectly access a bus 400 (or other communication mechanism) that interconnects subsystems and components for transferring information within XR unit 204. For example, bus 400 may interconnect a memory interface 410, a network interface 420, an input interface 430, a power source 440, an output interface 450, a processing device 460, a sensors interface 470, and a database 480.

Memory interface 410, shown in FIG. 4, is assumed to have similar functionality as the functionality of memory interface 310 described above in detail. Memory interface 410 may be used to access a software product and/or data stored on a non-transitory computer-readable medium or on memory devices, such as memory device 411. Memory device 411 may contain software modules to execute processes consistent with the present disclosure. In particular, memory device 411 may include an input determination module 412, an output determination module 413, a sensors communication module 414, a virtual content determination module 415, a virtual content communication module 416, and a database access module 417. Modules 412-417 may contain software instructions for execution by at least one processor (e.g., processing device 460) associated with XR unit 204. Input determination module 412, output determination module 413, sensors communication module 414, virtual content determination module 415, virtual content communication module 416, and database access module 417 may cooperate to perform various operations. For example, input determination module 412 may determine User Interface (UI) input received from input unit 202. At the same time, sensors communication module 414 may receive data from different sensors to determine a status of user 100. Virtual content determination module 415 may determine the virtual content to display based on received input and the determined status of user 100. Virtual content communication module 416 may retrieve virtual content not determined by virtual content determination module 415. The retrieval of the virtual content may be from database 380, database 480, mobile communications device 206, or from remote processing unit 208. Based on the output of virtual content determination module 415, output determination module 413 may cause a change in a virtual content displayed to user 100 by projector 454.

In some embodiments, input determination module 412 may regulate the operation of input interface 430 in order to receive gesture input 431, virtual input 432, audio input 433, and UI input 434. Consistent with the present disclosure, input determination module 412 may concurrently receive different types of input data. In one embodiment, input determination module 412 may apply different rules based on the detected type of input. For example, gesture input may have precedence over virtual input. In some embodiments, output determination module 413 may regulate the operation of output interface 450 in order to generate output using light indicators 451, display 452, speakers 453, and projector 454. In one embodiment, light indicators 451 may include a light indicator that shows the status of the wearable extended reality appliance. For example, the light indicator may display green light when the wearable extended reality appliance 110 are connected to input unit 202, and blinks when wearable extended reality appliance 110 has low battery. In another embodiment, display 452 may be used to display operational information. In another embodiment, speakers 453 may include a bone conduction headphone used to output audio to user 100. In another embodiment, projector 454 may present virtual content to user 100.

The operations of a sensors communication module, a virtual content determination module, a virtual content communication module, and a database access module are described above with reference to FIG. 3, details of which are not repeated herein. Modules 412-417 may be implemented in software, hardware, firmware, a mix of any of those, or the like.

Network interface 420, shown in FIG. 4, is assumed to have similar functionality as the functionality of network interface 320, described above in detail. The specific design and implementation of network interface 420 may depend on the communications network(s) over which XR unit 204 is intended to operate. For example, in some embodiments, XR unit 204 is configured to be selectively connectable by wire to input unit 202. When connected by wire, network interface 420 may enable communications with input unit 202; and when not connected by wire, network interface 420 may enable communications with mobile communications device 206.

Input interface 430, shown in FIG. 4, is assumed to have similar functionality as the functionality of input interface 330 described above in detail. In this case, input interface 430 may communicate with an image sensor to obtain gesture input 431 (e.g., a finger of user 100 pointing to a virtual object), communicate with other XR units 204 to obtain virtual input 432 (e.g., a virtual object shared with XR unit 204 or a gesture of avatar detected in the virtual environment), communicate with a microphone to obtain audio input 433 (e.g., voice commands), and communicate with input unit 202 to obtain UI input 434 (e.g., virtual content determined by virtual content determination module 315).

Power source 440, shown in FIG. 4, is assumed to have similar functionality as the functionality of power source 340 described above, only it provides electrical energy to power XR unit 204. In some embodiments, power source 440 may be charged by power source 340. For example, power source 440 may be wirelessly changed when XR unit 204 is placed on or in proximity to input unit 202.

Output interface 450, shown in FIG. 4, is assumed to have similar functionality as the functionality of output interface 350 described above in detail. In this case, output interface 450 may cause output from light indicators 451, display 452, speakers 453, and projector 454. Projector 454 may be any device, apparatus, instrument, or the like capable of projecting (or directing) light in order to display virtual content onto a surface. The surface may be part of XR unit 204, part of an eye of user 100, or part of an object in proximity to user 100. In one embodiment, projector 454 may include a lighting unit that concentrates light within a limited solid angle by means of one or more mirrors and lenses, and may provide a high value of luminous intensity in a defined direction.

Processing device 460, shown in FIG. 4, is assumed to have similar functionality as the functionality of processing device 360 described above in detail. When XR unit 204 is connected to input unit 202, processing device 460 may work together with processing device 360. Specifically, processing device 460 may implement virtual machine technologies or other technologies to provide the ability to execute, control, run, manipulate, store, etc., multiple software processes, applications, programs, etc. It is appreciated that other types of processor arrangements could be implemented to provide the capabilities disclosed herein.

Sensors interface 470, shown in FIG. 4, is assumed to have similar functionality as the functionality of sensors interface 370 described above in detail. Specifically, sensors interface 470 may communicate with audio sensor 471, image sensor 472, motion sensor 473, environmental sensor 474, and other sensors 475. The operations of an audio sensor, an image sensor, a motion sensor, an environmental sensor, and other sensors are described above with reference to FIG. 3, details of which are not repeated herein. It will be appreciated that other types and combination of sensors may be used to provide the capabilities disclosed herein.

The components and arrangements shown in FIG. 4 are not intended to limit any embodiment. As will be appreciated by a person skilled in the art having the benefit of this disclosure, numerous variations and/or modifications may be made to the depicted configuration of XR unit 204. For example, not all components may be essential for the operation of XR unit 204 in all cases. Any component may be located in any appropriate part of system 200, and the components may be rearranged into a variety of configurations while providing the functionality of various embodiments. For example, some XR units may not include all of the elements in XR unit 204 (e.g., wearable extended reality appliance 110 may not have light indicators 451).

Figure 5:
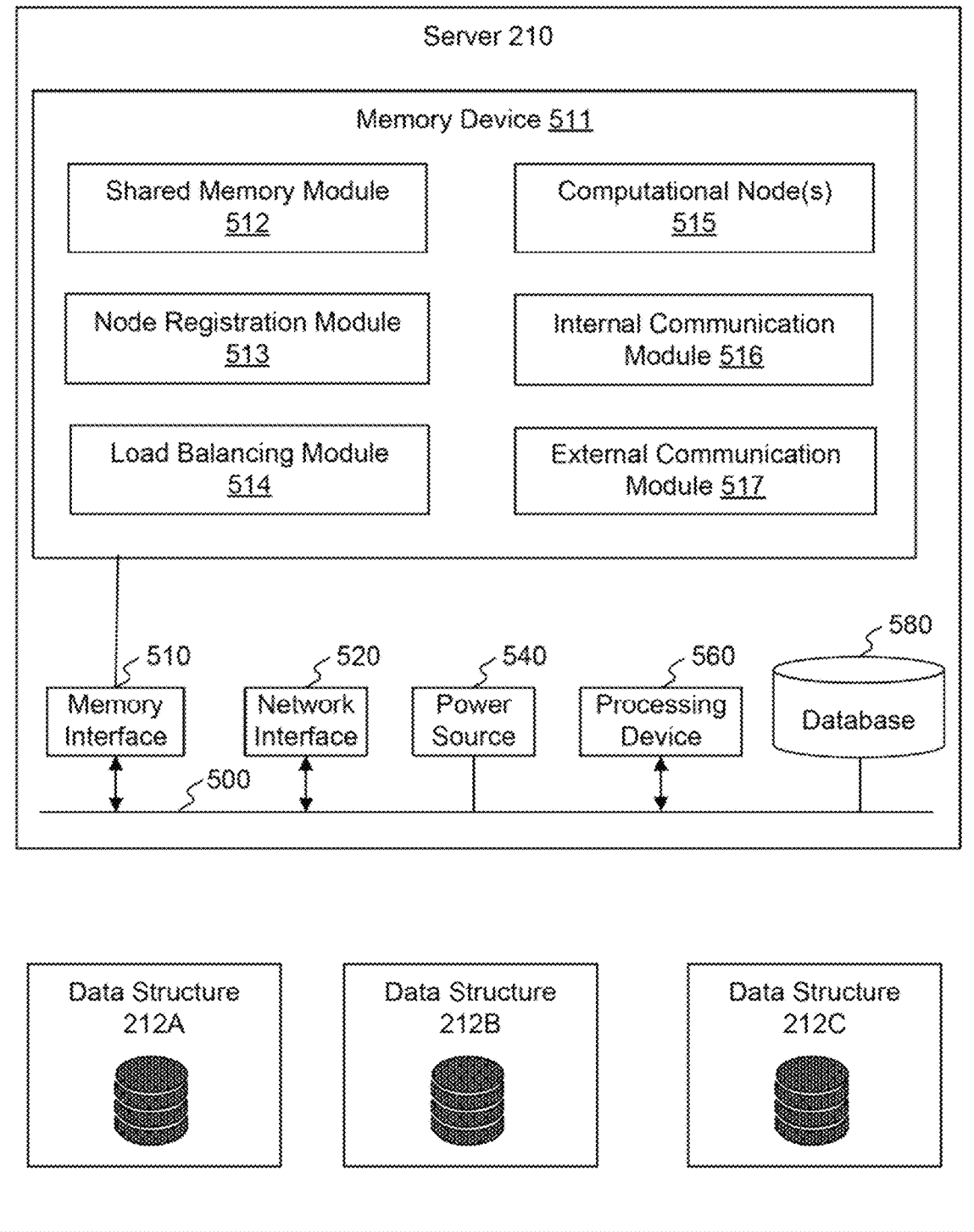
FIG. 5 is a block diagram illustrating some of the components of a remote processing unit, consistent with some embodiments of the present disclosure.

FIG. 5 is a block diagram of an exemplary configuration of remote processing unit 208. FIG. 5 is an exemplary representation of just one embodiment, and it is to be understood that some illustrated elements might be omitted and others added within the scope of this disclosure. In the embodiment of FIG. 5, remote processing unit 208 may include a server 210 that directly or indirectly accesses a bus 500 (or other communication mechanism) interconnecting subsystems and components for transferring information within server 210. For example, bus 500 may interconnect a memory interface 510, a network interface 520, a power source 540, a processing device 560, and a database 580. Remote processing unit 208 may also include a one or more data structures. For example, data structures 212A, 212B, and 212C.

Memory interface 510, shown in FIG. 5, is assumed to have similar functionality as the functionality of memory interface 310 described above in detail. Memory interface 510 may be used to access a software product and/or data stored on a non-transitory computer-readable medium or on other memory devices, such as memory devices 311, 411, 511, or data structures 212A, 212B, and 212C. Memory device 511 may contain software modules to execute processes consistent with the present disclosure. In particular, memory device 511 may include a shared memory module 512, a node registration module 513, a load balancing module 514, one or more computational nodes 515, an internal communication module 516, an external communication module 517, and a database access module (not shown). Modules 512-517 may contain software instructions for execution by at least one processor (e.g., processing device 560) associated with remote processing unit 208.

Shared memory module 512, node registration module 513, load balancing module 514, computational module 515, and external communication module 517 may cooperate to perform various operations.

Shared memory module 512 may allow information sharing between remote processing unit 208 and other components of system 200. In some embodiments, shared memory module 512 may be configured to enable processing device 560 (and other processing devices in system 200) to access, retrieve, and store data. For example, using shared memory module 512, processing device 560 may perform at least one of: executing software programs stored on memory device 511, database 580, or data structures 212A-C; storing information in memory device 511, database 580, or data structures 212A-C; or retrieving information from memory device 511, database 580, or data structures 212A-C.

Node registration module 513 may be configured to track the availability of one or more computational nodes 515. In some examples, node registration module 513 may be implemented as: a software program, such as a software program executed by one or more computational nodes 515, a hardware solution, or a combined software and hardware solution. In some implementations, node registration module 513 may communicate with one or more computational nodes 515, for example, using internal communication module 516. In some examples, one or more computational nodes 515 may notify node registration module 513 of their status, for example, by sending messages: at startup, at shutdown, at constant intervals, at selected times, in response to queries received from node registration module 513, or at any other determined times. In some examples, node registration module 513 may query about the status of one or more computational nodes 515, for example, by sending messages: at startup, at constant intervals, at selected times, or at any other determined times.

Load balancing module 514 may be configured to divide the workload among one or more computational nodes 515. In some examples, load balancing module 514 may be implemented as: a software program, such as a software program executed by one or more of the computational nodes 515, a hardware solution, or a combined software and hardware solution. In some implementations, load balancing module 514 may interact with node registration module 513 in order to obtain information regarding the availability of one or more computational nodes 515. In some implementations, load balancing module 514 may communicate with one or more computational nodes 515, for example, using internal communication module 516. In some examples, one or more computational nodes 515 may notify load balancing module 514 of their status, for example, by sending messages: at startup, at shutdown, at constant intervals, at selected times, in response to queries received from load balancing module 514, or at any other determined times. In some examples, load balancing module 514 may query about the status of one or more computational nodes 515, for example, by sending messages: at startup, at constant intervals, at pre-selected times, or at any other determined times.

Internal communication module 516 may be configured to receive and/or to transmit information from one or more components of remote processing unit 208. For example, control signals and/or synchronization signals may be sent and/or received through internal communication module 516. In one embodiment, input information for computer programs, output information of computer programs, and/or intermediate information of computer programs may be sent and/or received through internal communication module 516. In another embodiment, information received though internal communication module 516 may be stored in memory device 511, in database 580, in data structures 212A-C, or other memory device in system 200. For example, information retrieved from data structure 212A may be transmitted using internal communication module 516. In another example, input data may be received using internal communication module 516 and stored in data structure 212B.

External communication module 517 may be configured to receive and/or to transmit information from one or more components of system 200. For example, control signals may be sent and/or received through external communication module 517. In one embodiment, information received though external communication module 517 may be stored in memory device 511, in database 580, in data structures 212A-C, and or any memory device in the system 200. In another embodiment, information retrieved from any of data structures 212A-C may be transmitted using external communication module 517 to XR unit 204. In another embodiment, input data may be transmitted and/or received using external communication module 517. Examples of such input data may include data received from input unit 202, information captured from the environment of user 100 using one or more sensors (e.g., audio sensor 471, image sensor 472, motion sensor 473, environmental sensor 474, other sensors 475), and more.

In some embodiments, aspects of modules 512-517 may be implemented in hardware, in software (including in one or more signal processing and/or application specific integrated circuits), in firmware, or in any combination thereof, executable by one or more processors, alone, or in various combinations with each other. Specifically, modules 512-517 may be configured to interact with each other and/or other modules of system 200 to perform functions consistent with disclosed embodiments. Memory device 511 may include additional modules and instructions or fewer modules and instructions.

Network interface 520, power source 540, processing device 560, and database 580, shown in FIG. 5, are assumed to have similar functionality as the functionality of similar elements described above with reference to FIGS. 4 and 5. The specific design and implementation of the above-mentioned components may vary based on the implementation of system 200. In addition, remote processing unit 208 may include more or fewer components. For example, remote processing unit 208 may include an input interface configured to receive direct input from one or more input devices.

Consistent with the present disclosure, a processing device of system 200 (e.g., processor within mobile communications device 206, a processor within a server 210, a processor within a wearable extended reality appliance, such as, wearable extended reality appliance 110, and/or a processor within an input device associated with wearable extended reality appliance 110, such as keyboard 104) may use machine learning algorithms in order to implement any of the methods disclosed herein. In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and more. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by a process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, distance from an item depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

Consistent with the present disclosure, a processing device of system 200 may analyze image data captured by an image sensor (e.g., image sensor 372, image sensor 472, or any other image sensor) in order to implement any of the methods disclosed herein. In some embodiments, analyzing the image data may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

Consistent with other aspects of the disclosure, a processing device of system 200 may analyze image data in order to implement any of the methods disclosed herein. In some embodiments, analyzing the image may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result, and more. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two dimensional array of pixel values. In one example, calculating a convolution of an image may include calculating a two dimensional convolution on one or more components of the image. In another example, calculating a convolution of an image may include stacking arrays from different components to create a three dimensional array, and calculating a three dimensional convolution on the resulting three dimensional array. In some examples, a video may comprise one or more components (such as color components, depth component, etc.), and each component may include a three dimensional array of pixel values (with two spatial axes and one temporal axis). In one example, calculating a convolution of a video may include calculating a three dimensional convolution on one or more components of the video. In another example, calculating a convolution of a video may include stacking arrays from different components to create a four dimensional array, and calculating a four dimensional convolution on the resulting four dimensional array.

Wearable extended reality appliances may include different display regions. The display regions may be permanently set, or may dynamically configurable, for example by software or hardware components. Dynamically controlling the display luminance or intensity in the different display regions may be beneficial, for example to conserve resources, and/or accommodate user visibility needs. For example, the display luminance may be dimmed in a less relevant region of a display and intensified in a more relevant region to hold the focus of the user on the more relevant region, and/or to efficiently allocate resources (e.g., electrical energy). As another example, the display luminance may be dimmed or intensified to prevent eye strain, motion sickness, to accommodate ambient lighting conditions, and/or energy consumption requirements. One technique for dynamically controlling the display luminance may be to dynamically control the duty cycle of the display signal in each region of a wearable extended reality appliance. In other examples, dynamically controlling the duty cycle of the display signal in each region of a wearable extended reality appliance may be beneficial regardless of the display luminance or intensity, for example to prevent eye strain, motion sickness, to accommodate ambient lighting conditions, and/or energy consumption requirements. In some examples, dynamically controlling the duty cycle of the display signal in the entire display of a wearable extended reality appliance may be beneficial, for example to prevent eye strain, motion sickness, to accommodate ambient lighting conditions, and/or energy consumption requirements.

In some embodiments, duty cycle control operations may be performed for wearable extended reality appliances. Data representing virtual content in an extended reality environment and associated with a wearable extended reality appliance may be received. Two separate display regions (e.g., a first display region and a second display region), of the wearable extended reality appliance may be identified. A duty cycle configuration may be determined for each display region. Thus, a first duty cycle configuration may be determined for the first display region, and a second duty cycle configuration may be determined for the second display region, where the second duty cycle configuration differs from the first duty cycle configuration. The wearable extended reality appliance may be caused to display virtual content in the first display region according to the first determined duty cycle configuration and in the second display region according to the second determined duty cycle configuration. In this manner, virtual content may be displayed in each display region of the wearable extended reality appliance in accordance with a different duty cycle configuration.

In some instances, the description that follows may refer to FIGS. 6-9 which illustrate exemplary implementations for performing duty cycle control operations for representing virtual content in an extended reality environment associated with a wearable extended reality appliance, consistent with some disclosed embodiments. FIGS. 6-9 are intended merely to facilitate the conceptualizing of one exemplary implementation for performing duty cycle control operations to represent virtual content via a wearable extended reality appliance and do not limit the disclosure to any particular implementation. Additionally, while the description that follows generally relates to a first duty cycle configuration corresponding to a higher duty cycle and a second duty cycle configuration corresponding to a lower duty cycle, this is for illustrative purposes only and does not limit the invention. It thus may be noted that some implementations and/or applications may include the first duty cycle configuration corresponding to a lower duty cycle than the second duty cycle configuration. Additionally, the use of the descriptors "first' and "second" is intended merely to distinguish between two different entities and does not necessarily assign a higher ordinality or importance to one entity versus the other. The description that follows includes references to smart glasses as an exemplary implementation of a wearable extended reality appliance. It is to be understood that these examples are merely intended to assist in gaining a conceptual understanding of disclosed embodiments, and do not limit the disclosure to any particular implementation for a wearable extended reality appliance. The disclosure is thus understood to relate to any implementation for a wearable extended reality appliance, including implementations different than smart glasses.

Some embodiments involve a non-transitory computer readable medium containing instructions that when executed by at least one processor cause the at least one processor to perform duty cycle control operations for wearable extended reality appliances. The term "non-transitory computer-readable medium" may be understood as described earlier. The term "instructions" may refer to program code instructions that may be executed by a computer processor. The instructions may be written in any type of computer programming language, such as an interpretive language (e.g., scripting languages such as HTML and JavaScript), a procedural or functional language (e.g., C or Pascal that may be compiled for converting to executable code), object-oriented programming language (e.g., Java or Python), logical programming language (e.g., Prolog or Answer Set Programming), or any other programming language. In some embodiments, the instructions may implement methods associated with machine learning, deep learning, artificial intelligence, digital image processing, optimization algorithms, and any other computer processing technique. The term "processor" may refer to any physical device having an electric circuit that performs a logic operation. A processor may include one or more integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations, as described earlier.

The term "cycle" may refer to a portion of an oscillating signal that repeats periodically (e.g., regularly) over time. For each cycle of an oscillating signal, a fraction of the cycle may be associated with a "high" (e.g., on or active) state, another fraction of the cycle may be associated with a "low" (e.g., off or inactive) state such that aggregating the cycles of the signal over time causes the oscillating signal to regularly alternate between the "high" and "low" (e.g., on/off, or active/inactive) states. The term "duty cycle" may relate to the fraction of a cycle of an oscillating signal associated with the "high" (e.g., on or active) state versus "low" (e.g., off or inactive) state. For example, a signal having a 50% duty cycle may be set to the "high" state for half of each cycle and substantially to the "low" state for the complementary half of each cycle, accounting for latency and response times to transition between the high and low states. Aggregating multiple cycles over a time duration may result in an oscillating signal having a substantially uniform 50/50 distribution between the high/low states for the time duration. As another example, a signal having a 75% duty cycle may be set to the "high" state for three quarters of each cycle and to the "low" state substantially for the complementary one quarter of the cycle, accounting for latency and response times, such that aggregating multiple cycles over a time duration results in an oscillating signal having a substantially uniform 75/25 distribution between the high/low states for the time duration. For a visual display application, the high state may be associated with a high level of light output (e.g., illumination set to on or active and relatively high-power consumption) and the low state may be associated with a low level of light output (e.g., illumination set to off or inactive and relatively low power consumption). Thus, controlling the duty cycle of a display signal may allow modifying the total light output of the display signal. In some examples, reducing the duty cycle may reduce the total light output, thereby reducing luminosity or intensity and power consumption, whereas and increasing the duty cycle may increase the total light output, thereby increasing luminosity or intensity and power consumption. In some examples, reducing the duty cycle may reduce the opacity, whereas and increasing the duty cycle may increase the opacity. In some examples, for example when the frequency of the cycles in the display signal is sufficiently high (e.g., above a fusion threshold) and other steps are taken to maintain luminosity or intensity (for example by changing the maximum voltage), transitioning between the high and low states of each cycle may not be perceivable by the human eye, allowing for a "smooth" visual user experience preventing eye strain. Thus, controlling the duty cycle for a visual display may allow to smoothly transition between varying display configurations. The term "duty cycle control operations" may refer to one or more arithmetic and/or logical computations or procedures that may be performed by at least one processor for controlling the duty cycle of a display signal. For example, the duty cycle control operations may include instructions to implement pulse-width modulation (PWM), pulse-duration modulation (PDM), filters, signal compression or expansion, inversions, solutions to differential equations, statistical and/or polynomial signal processing, stochastic signal processing, estimation and detection techniques and any additional signal processing techniques affecting the duty cycle of a display signal.

The term "wearable extended reality appliances" may refer to a head-mounted device, for example, smart glasses, smart contact lens, headsets or any other device worn by a human for purposes of presenting an extended reality to the human, as described earlier. Thus, the at least one processor may control the luminosity (e.g., brightness) and/or the energy consumption for displaying content via a wearable extended reality appliance by controlling the duty cycle of the display signal.

For example, during a first time duration, the at least one processor may perform a first PWM procedure to increase the duty cycle from 50% to 75% to increase the brightness of content displayed via a wearable extended reality appliance. During a second time duration, the at least one processor may perform a second PWM procedure to decrease the duty cycle from 75% to 50% to dim the display of content via the wearable extended reality appliance. As another example, the at least one processor controlling the display of content via a wearable extended reality appliance may perform a PWM procedure to display incoming messages of a messaging application according to a 75% duty cycle, e.g., to draw the attention of the user, and display a weather application according to a 50% duty cycle, e.g., as a background application.

Figure 6:
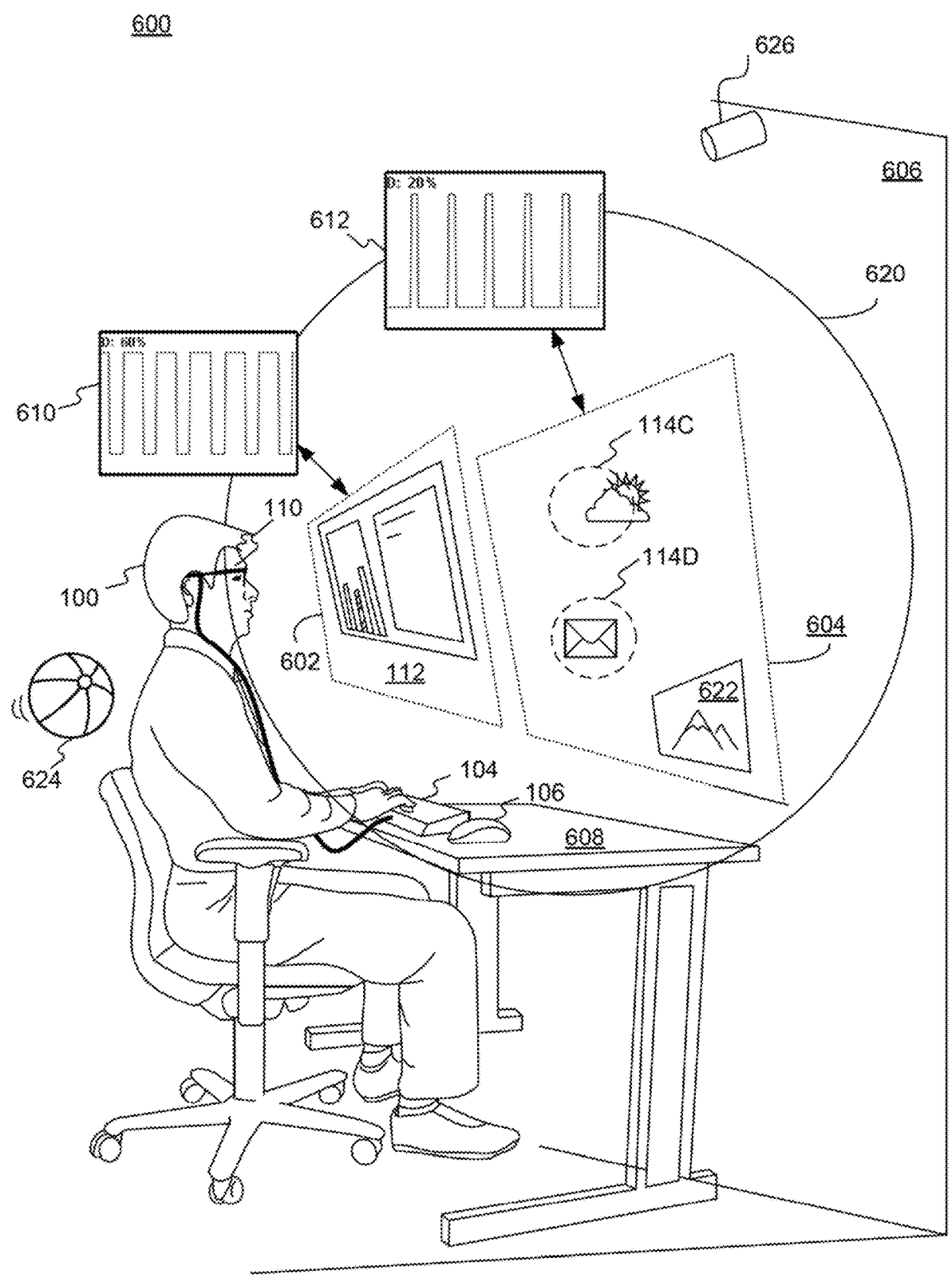
FIG. 6 illustrates an exemplary extended reality environment for displaying virtual content, consistent with some embodiments of the present disclosure.

By way of a non-limiting example, an exemplary implementation for performing duty cycle control operations for wearable extended reality appliances is shown. FIG. 6. Similar to FIG. 1, FIG. 6 illustrates a user 100 wearing wearable extended reality appliance 110, with the noted difference of an extended reality environment 620 including a first display region 602, a second display region 604, a physical wall 606, and a physical desktop 608. First display region 602 may be associated with the display of virtual screen 112 according to one duty cycle configuration (e.g., duty cycle configuration 610), and second display region 604 may be associated with the display of virtual widgets 114C and 114D according to a different duty cycle configuration (e.g., duty cycle configuration 612). Processing device 460 (FIG. 4) may perform a PWM procedure (e.g., a duty cycle control operation) to control the display of content via wearable extended reality appliance 110 such that content associated with virtual screen 112 is displayed according to duty cycle configuration 610 (e.g., a 60%), for example to focus the attention of user 100 on virtual screen 112, while virtual widget 114C may be displayed according to duty cycle configuration 610 (e.g., 20%), for example, as a background application.

Some embodiments involve receiving data representing virtual content in an extended reality environment associated with a wearable extended reality appliance. The term "receiving" may refer to accepting delivery of, acquiring, retrieving, generating, obtaining or otherwise gaining access to. For example, information or data may be received in a manner that is detectable by or understandable to a processor. The data may be received via a communications channel, such as a wired channel (e.g., cable, fiber) and/or wireless channel (e.g., radio, cellular, optical, IR). The data may be received as individual packets or as a continuous stream of data. The data may be received synchronously, e.g., by periodically polling a memory buffer, queue or stack, or asynchronously, e.g., via an interrupt event. For example, the data may be received from an input device or sensor configured with input unit 202 (FIG. 1), from mobile communications device 206, from remote processing unit 208, or from any other local and/or remote source, and the data may be received by wearable extended reality appliance 110, mobile communications device 206, remote processing unit 208, or any other local and/or remote computing device. In some examples, the data may be received from a memory unit, may be received from an external device, may be generated based on other information (for example, generated using a rendering algorithm based on at least one of geometrical information, texture information or textual information), and so forth. The term "content" may refer to data or media. Such data or media may be formatted according to a distinct specification for presenting information to a user via an interface of an electronic device. For example, content may include any combination of data formatted as text, image, audio, video, haptic, and any other data type for conveying information to a user. The term "virtual content" may refer to synthesized content that may exist wholly within the context of one or more processing devices, for example within an extended reality environment. Virtual content may thus be distinguished from physical or real-world content that may exist or be generated independent of a processing device. For example, voice data for a synthesized digital avatar may be virtual content, whereas a recorded voice message of a human user may be associated with physical, real-world (e.g., non-virtual) content. By way of another example, virtual content may be a synthesized image, in contrast to a real-world image. The term "data representing virtual content" may include signals carrying or encoding the virtual content. Such data (e.g., information encoded into binary bits or n-ary qubits) may be formatted according to one or more distinct specifications to allow rendering virtual content associated with the data via a user interface of an electronic device. The term "extended reality environment", e.g., also referred to as "extended reality", "extended reality space", or "extended environment", may refer to all types of real- and virtual combined environments and human-machine interactions at least partially generated by computer technology, as described earlier. The extended reality environment may be implemented via at least one processor and at least one extended reality appliance (e.g., a wearable and/or non-wearable extended reality appliance). The term "associated with" may refer to the existence of a relationship, affiliation, correspondence, link or any other type of connection or correlation. The term "wearable extended reality appliance" may be understood as described earlier.

The wearable extended reality appliance may produce or generate an extended reality environment including representations of physical (e.g., real) objects and virtual content for viewing by the wearer. For example, wearable extended reality appliance may be a pair of smart glasses. The extended reality environment associated with the pair of smart glasses may include the field-of-view of the wearer of the smart glasses, e.g., a portion of the physical environment surrounding the wearer, as well as any virtual content superimposed thereon. Encoded information (e.g., data) for rendering (e.g., representing) virtual content may be obtained (e.g., received), for example, by a processor associated with the pair of smart glasses. The encoded information may be processed for displaying the virtual content within the extended reality environment generated by (e.g., associated with) the pair of smart glasses (e.g., a wearable extended reality appliance). For example, the extended reality environment may include different display regions, where received video content may be displayed in a forward-center region of the field-of-view of the wearer, and text content may be displayed as a notification (e.g., in a bottom right corner of the field-of-view of the wearer).

By way of a non-limiting example, FIG. 6 illustrates an extended reality environment 620 generated for user 100 by (e.g., at least) processing device 460 (FIG. 4) and wearable extended reality appliance 110. Processing device 460 may receive first data encoded as text content and second data encoded as image content for displaying to user 100 via (e.g., associated with) wearable extended reality appliance 110. The text content may represent values for virtual axes of a virtual bar graph displayed on virtual screen 112, and the image data may represent virtual widgets 114C and 114D.

Some embodiments involve identifying in the extended reality environment a first display region and a second display region separated from the first display region. The term "identifying" may refer to recognizing, perceiving, or otherwise determining or establishing an association with a known entity, quantity, or value. The term "extended reality environment" may be understood as described earlier. The term "display region" may refer to a designated area or zone (e.g., physical and/or virtual) inside the field-of-view of a wearer of a wearable extended reality appliance. For example, the field of view of the wearer may be visible via an electronic display screen (e.g., semi-transparent screen) of the wearable extended reality appliance. For example, the electronic display may be an electroluminescent (EL), liquid crystal (LC), light emitting diode (LED) include OLED and AMOLED, plasma, quantum dot, or cathode ray tube display, or any other type of electronic display technology. The electronic display may include a region for presenting content (e.g., virtual content) together with (e.g., overlaid on, alongside, or otherwise co-presented with) the physical environment surrounding the wearer. For example, one part of the region may be non-transparent for presenting the virtual content, and another part of the region may be transparent for presenting the physical environment. The term "separate" may refer to detached, partitioned, or otherwise disassociated, e.g., disjointed.

Thus, the extended reality environment may include multiple different areas or zones for presenting content (e.g., display regions) that are disassociated (e.g., separate) from each other. Each zone (e.g., display region) may include one or more transparent parts for viewing the physical environment, and one or more non-transparent parts for presenting virtual content overlaid on the presentation of the physical environment. For example, a processing device may be configured to recognize or establish (e.g., identify) different display regions according to one or more characteristics, such as relating to the wearer, the virtual content being displayed, the physical environment, software and/or hardware requirements of the wearable extended reality appliance, and/or any other characteristic relevant to the extended reality environment.

For example, the different display regions may be recognized (e.g., identified) according to the viewing angle of the wearer (e.g., the front center may be the first display region, and the right side may be the second display region). As another example, the different display regions may be established (e.g., identified) according to different attributes of the content displayed therein, such as the context (e.g., high versus low priority, primary or peripheral content), type (e.g., text, image, video), resolution (e.g., high versus low), representation (e.g., 2D versus 3D, grey scale versus color), or temporal attributes (e.g., current versus historical). In some embodiments, different display regions may be identified according to hardware characteristics of one or more extended reality appliances used to implement the extended reality environment, such as the power consumption, resolution capability, channel capacity, memory requirements, or any other hardware characteristic affecting the capability to render content. In some embodiments, different display regions may be identified according to characteristics of the user consuming content via the extended reality environment, such as the type of user (e.g., adult or child, young or old, disabled or able bodied), the user application (e.g., professional or lay), the user activity (e.g., gaming, trading, viewing streamed content, editing a text document). In some embodiments, different display regions of the extended reality environment may be identified according to ambient conditions, such as lighting, temperature, the presence of physical objects and/or background noise.

For example, a top-center area (e.g., a first display region) of the extended reality environment may be designated for rendering high priority content (e.g., warnings or alerts), and a bottom-side region of the extended reality environment may be designated for rendering lower priority content (e.g., weather updates). As another example, a left-oriented area may be designated for displaying 3D color images, and a right-oriented area may be designated for displaying white text against a dark background.

By way of a non-limiting example, turning to FIG. 6, processing device 460 (FIG. 4) may identify in extended reality environment 620 (e.g., implemented via wearable extended reality appliance 110), a first display region 602 for displaying a first category of content, e.g., relating to a work application for user 100, such as a bar chart and accompanying text on virtual screen 112, and a second display region 604 for displaying a second category of content, e.g., relating to personal applications for user 100, such as virtual widget 114C associated with the local weather forecast and virtual widget 114D associated with personal emails.

According to some embodiments, identifying the first display region and the second display region is based on an analysis of the received data. For example, the received data may represent the virtual content. The terms "identifying", "display region", and "received data" may be understood as described earlier. The term "based on" may refer to established or founded upon, or otherwise derived from. The term "analysis of the received data" may include examining or investigating the received data, such as by parsing one or more elements of the received data, and using the parsed elements to perform one or more computations, queries, comparisons, reasoning, deduction, extrapolation, interpolation, or any other logical or arithmetic operation, e.g., to determine a fact, conclusion, or consequence associated with the received data. The analysis may be based on the data type, size, format, a time when the data was received and/or sent, communication and/or processing latency, a communications channel and/or network used to receive the data, a source of the received data, the context under which the data was received, or any other criterion relevant to determining a fact or consequence associated with the received data. For example, an analysis of first received data may identify the first received data as video content for a live streaming application that may be displayed in a central region of the extended reality display environment, whereas analysis of second received data may identify the second received data as text content for an electronic mail application that may be displayed in a peripheral region of the extended reality display environment. In some examples, a machine learning model may be trained using training examples to identify display regions based on data representing virtual content. An example of such training example may include a sample data representing sample virtual content, together with a label indicating one or more desired display regions. The trained machine learning model may be used to analyze the received data representing the virtual content to identify the first display region and/or the second display region.

By way of a non-limiting example, turning to FIG. 6, processing device 460 (FIG. 3) may analyze first received data to determine that the first received data is graphic content. Based on this analysis, processing device 460 may identify first display region 602 for rendering the first received data, e.g., on virtual display 112. In addition, processing device 460 may analyze second received data to determine a source of the second received data, e.g., a remote server providing weather updates. Based on this analysis, processing device 460 may identify second display region 604 for rendering the second received data, e.g., in association with virtual widget 114C.

According to some embodiments, identifying the first display region and the second display region is based on an area of focus of a wearer of the wearable extended reality appliance. The terms "identifying", "display region", "based on", and "wearable extended reality appliance" may be understood as described earlier. The term "wearer of the wearable extended reality appliance" may include a user donning, carrying, or otherwise being communicatively connected to the wearable extended reality appliance, e.g., as clothing, an accessory (e.g., glasses, watch, hearing aid, ankle bracelet), a tattoo imprinted on the skin, as a sticker adhering to the surface of the skin, as an implant embedded beneath the skin (e.g., a monitor or regulator), or any other type of wearable extended reality appliance. The term "area of focus" may include a region or zone surrounding a point associated with a line of sight (e.g., detected via an eye tracker), a head pose (e.g., angle, orientation, and/or inclination detected via an inertial measurement sensor), a gaze, or a region of an electronic display (e.g., a window, widget, document, image, application, or any other displayed element) selected for example via a keyboard, electronic pointing device controlling a cursor, voice command, tracked gesture (e.g., head, hand or any other type of gesture), eye tracking apparatus, or any other means for selecting a displayed element. The area of focus may include a shape (e.g., circle, square, ellipse, or any other geometric shape) surrounding or a document or application associated with a point corresponding to the line-of-sight of the wearer, or a position of the cursor.

Thus, the first and second display regions may be identified based on the behavior of the user, e.g., where the wearer of the extended reality appliance is looking, pointing to, or otherwise indicating. For example, a forward center region of the virtual reality environment may be identified as the first display region based on an eye tracker detecting the line-of-sight of the wearer of the extended reality appliance. As another example, a bottom left region of the virtual reality environment may be identified as a second display region based on a selection via an electronic pointing device.

By way of a non-limiting example, display region 602 in FIG. 6 may be identified by processing device 460 (FIG. 4) based on an eye tracker (not shown) configured with wearable extended reality appliance 110 detecting the line-of-sight of user 100 (e.g., a first area of focus of user 100). Concurrently, display region 604 may be identified by processing device 460 based on a selection of virtual widget 114C via electronic mouse 106 (e.g., a second area of focus of user 100).

According to some embodiments, identifying the first display region and the second display region is based on characteristics of the extended reality environment resulting from a physical environment of the wearable extended reality appliance. The terms "identifying", "display region", "based on", "extended reality environment", and "wearable extended reality appliance" may be understood as described earlier. The term "characteristics" may include attributes, properties, aspects, traits, or any other feature distinctly associated with the extended reality environment. The term "physical environment" may refer to the real-world surroundings of the wearable extended reality appliance, such as the presence of walls, surfaces (e.g., floor, table tops, ceiling), obstructing objects (house plants, people, furniture, walls, doors), windows, and any other physical object potentially affecting the display of content via the wearable extended reality appliance. The term "resulting from" may refer to following from, or consequent to. Thus, the extended reality environment may be affected by the physical environment surrounding the wearable extended reality appliance, by including one or more objects facilitating the display of virtual content, (e.g., smooth, opaque, blank, white or pale colored, flat, and/or large surfaces) and/or one or more objects hampering the display of virtual (e.g., obstructions, rough, small, dark, or transparent surfaces, bright lights or other distracting objects). Accordingly, the first and second display regions may be identified according to one or more characteristics of physical objects in the extended reality environment, such as the distance (e.g., far or close), color (e.g., dark, light, varied or textured), size, texture (e.g., roughness, smoothness), opacity, transparency, shape, position (e.g., relative to the head pose of the wearer), exposure to light or shadow, and any other physical characteristic affecting display capabilities. For example, a blank white wall facing the wearable extended reality appliance may be identified as a first display region (e.g., requiring an average duty cycle to display content), and a window positioned adjacent to the wall may be identified as a second display region (e.g., requiring a higher duty cycle to display content to overcome daylight). As another example, a desktop facing the wearable extended reality appliance may be identified as a first display region, and a ceiling may be identified as a second display region.

By way of a non-limiting example, processing device 460 (FIG. 4) may identify wall 606 as display region 602 (FIG. 6) based on the position relative to user 100 (e.g., front-forward), its large size, white color, smooth texture, and the lack of a bright light source (e.g., window) hindering user 100 from seeing virtual content displayed thereon. Similarly, processing device 460 may identify desktop 608 of a desk as another display region based on the position (e.g., front-down), based on its flat, smooth surface, uniform color, and lack of an obstructing object (e.g., a houseplant) hindering user 100 from seeing virtual content displayed thereon.

Some embodiments may involve receiving image data captured from the physical environment of the wearable extended reality appliance using an image sensor included in the wearable extended reality appliance; and analyzing the received image data to identify the first display region and the second display region. The term "receiving", "physical environment", "wearable extended reality appliance", "display region", and "identify" may be understood as described earlier. The term "image data" may refer to pixel data streams, digital images, digital video streams, data derived from captured images, and data that may be used to construct one or more 2D and/or 3D images, a sequence of 2D and/or 3D images, 2D and/or 3D videos, or a virtual 2D and/or 3D representation, as described earlier. The image data may include data configured to convey information associated with the visual characteristics of an image, for example as a graphic form or picture, as described earlier. For example, the image data may include at least one of pixels, voxels or meta-data. The term "captured" may refer to the detection, sensing or acquisition of information using an optical sensor, such as by sensing light waves reflecting off an object. The term "image sensor" may include one or more sensory components capable of detecting and converting optical signals in the near-infrared, infrared, visible, and ultraviolet spectrums into electrical signals, as described earlier. The electric signals may be stored in memory and subsequently used to activate the pixels of an electronic display to present the object visually. Examples of electronic image sensors may include digital cameras, phone cameras, semiconductor Charge-Coupled Devices (CCDs), active pixel sensors in Complementary Metal-Oxide-Semiconductor (CMOS), or N-type metal-oxide-semiconductor (NMOS, Live MOS. The term "included" may refer to integrated or configured with. For example, an image sensor may be mechanically, optically, and/or electrically coupled to (e.g., included with) the wearable extended reality appliance to sense physical objects, such as surfaces, light sources, obstacles, people, animals, and/or any other object present in or absent from the environment of the wearer of the wearable extended reality appliance. Thus, the wearable extended reality device may be provided with one or more image sensors for sensing the physical characteristics (e.g., objects, spaces, light sources, shadows, and any other physical attribute) of the physical environment surrounding the wearer of the wearable extended reality appliance. A processing device may convert the data sensed by the image sensor to an image representing the physical environment.

The term "analyzing" may refer to investigating, scrutinizing and/or studying a data set, for example, to determine a correlation, association, pattern or lack thereof within the data set or with respect to a different data set. The image data received by the image sensor may be analyzed, for example using one or more image processing techniques such as convolutions, fast Fourier transforms, edge detection, pattern recognition, object detection algorithms, clustering, artificial intelligence, machine and/or deep learning, and any other image processing technique, to identify the first and second regions. In some examples, a machine learning model may be trained using training examples to identify display regions based on images and/or videos. An example of such training example may include a sample image and/or a sample video, together with a label indicating one or more desired display regions. The trained machine learning model may be used to analyze the received image data to identify the first display region and/or the second display region. In some examples, at least part of the image data may be analyzed to calculate a convolution of the at least part of the image data and thereby obtain a result value of the calculated convolution. Further, in response to the result value of the calculated convolution being a first value, one pair of regions may be identified as the first display region and the second display region, and in response to the result value of the calculated convolution being a second value, a different pair of regions may be identified as the first display region and the second display region. For example, image data sensed by the image sensor may be analyzed as described above. Based on the analysis of the image data, a vertical wall facing the user may be identified as the first display region, and a horizontal table surface supporting an input device may be identified as the second display region.

By way of a non-limiting example with reference to FIG. 6, wearable extended reality appliance 110 may be provided with a camera, such as image sensor 472 (FIG. 4). Image sensor 472 may capture image data of wall 606 facing user and desktop 608. Processing device 460 may receive the image data from image sensor 472, e.g., via bus 400 and may analyze the image data to identify wall 606 as the first region and desktop 608 as the second region.

Some embodiments involve determining a first duty cycle configuration for the first display region. The term "determining" may refer to establishing or arriving at a conclusive outcome as a result of a reasoned, learned, calculated or logical process. The term "configuration" may refer to a set up or an arrangement complying with one or more definitions or specifications. For example, a configuration may include one or more settings assigning one or more values to one or more parameters or variables to define a specific arrangement. The terms "duty cycle" and "display region" may be understood as described earlier. Thus, a "duty cycle configuration" may include one or more set ups, specifications or settings for one or more parameters affecting the duty cycle of a signal (e.g., a display signal), such as the ratio or percent for each cycle during which the signal is set to "active" versus "inactive", the frequency, amplitude and/or phase of the signal, the response time between the active" versus "inactive" states (e.g., gradient), and/or any other attribute that may affect the duty cycle. Accordingly, a specific set of specifications or settings for the duty cycle (e.g., duty cycle configuration) may be established for the first display region. For example, if the first display region is associated with high priority content, and/or exposed to a strong light source (e.g., a window exposing daylight), the duty cycle configuration may be determined to cause a more intense display (e.g., by setting a higher luminosity). Conversely, if the first display region is associated with low priority content or positioned in a relatively dark region of the extended reality environment, the duty cycle configuration may be determined to cause a dimmer display (e.g., by setting a lower luminosity). As another example, the first display region may be associated with a default duty cycle defined in advance, such as a primary display region automatically associated with a high (e.g., 60%) duty cycle.

By way of a non-limiting example, turning to FIG. 6, processing device 460 (FIG. 4) may determine a duty cycle configuration 610 for display signals associated with display region 602. Duty cycle configuration 610 may include one or more settings causing content displayed via projector 454 in display region 602 to correspond to a 60% duty cycle, such that slightly more than half (e.g., approximately 60%) of every cycle of the display signal is set to "high" or "active", and slightly less than half (e.g., approximately 40%) of every cycle is set to "low" or "inactive".

Some embodiments involve determining a second duty cycle configuration for the second display region, wherein the second duty cycle configuration differs from the first duty cycle configuration. The terms "determining", "duty cycle", "configuration", and "display region" may be understood as described earlier. The term "differs" may refer to being distinguished or distinct from, or otherwise being dissimilar. Thus, a second duty cycle configuration determined for the second display region may be dissimilar to (e.g., distinct from) the first duty cycle configuration determined for the first display region such that they are not the same. For example, the first duty cycle configuration may cause content to be displayed according to a 30% duty cycle, e.g., relatively dim and drawing little power, and the second duty cycle configuration may cause content to be displayed according to an 80% duty cycle, e.g., relatively bright and drawing considerably more power.

By way of a non-limiting example, turning to FIG. 6, processing device 460 (FIG. 4) may determine a duty cycle configuration 612 for display signals associated with display region 604 that differs from duty cycle configuration 610 determined for display region 602. Duty cycle configuration 612 may include one or more settings causing content displayed via projector 454 in display region 604 to correspond to a 20% duty cycle, such that only a small fraction (e.g., approximately 20%) of every cycle of the display signal is set to "high" or "active", and a predominant portion of the signal (e.g., approximately 80%) of every cycle is set to "low" or "inactive". Consequently, content may be displayed in display region 602 differently than content displayed in display region 604.

Some embodiments involve causing the wearable extended reality appliance to display the virtual content in accordance with the determined first duty cycle configuration for the first display region and the determined second duty cycle configuration for the second display region. The term "causing" may include triggering, inducing or taking an action to bring about a particular consequence or deterministic outcome. The term "display" may refer to presenting visually, for example by controlling the activation of one or more pixels of an electronic display to visually exhibit content. For example, some regions of an extended reality display may include pixels activated by circuitry for displaying virtual content overlaid on non-activated (e.g., transparent) regions of the display presenting the real world. The terms "extended reality appliance", "virtual content", "duty cycle configuration" (e.g., determined duty cycle configuration), and "display region" may be understood as described earlier. Thus, after determining the first and second duty cycle configurations the wearable extended reality appliance may be caused to display content in each of the first and second display regions according to the first and second duty cycle configurations, respectively.

For example, a processing device executing software instructions may control hardware circuitry (e.g., switches, diodes, transistors, controllers, filters, samplers, converters, compressors) and/or software equivalents to display content via the wearable extended reality appliance. The processing device may thus direct different display signals to different display regions of the extended reality environment to cause specific content to be displayed in certain regions. For example, display signals may be directed to display content in different regions according to one or more criterion as described earlier, such as the content type, context, priority, the physical environment, ambient conditions (e.g., lighting, noise, distractions), and/or any other criterion relevant to the display of content. In addition, the processing device may modify the display signals targeted for each display region using one or more signal processing techniques (e.g., analog and/or digital, linear and/or non-linear, discrete and/or continuous time) to affect the duty cycle of the display signals. Signal processing techniques affecting the duty cycle may include, for example, filters, transforms, modulations (e.g., PWM or PDM), inversions, differential equations, statistical and/or polynomial signal processing, stochastic signal processing, estimation and detection techniques, and any other signal processing technique affecting the duty cycle. The processing device may control aspects or parameters affecting the duty cycle such as the frequency and/or amplitude of the display signal, the percent during which each cycle of the display signal is set to "active" versus "inactive", the latency and/or responsiveness of the switching between the "active" and "inactive states within each cycle (e.g., expressed as a time delay within each cycle or gradient to transition between the active and inactive states), and/or any other factor affecting the duty cycle of the display signals.

The first and second duty cycle configurations may be applied to the display signals based on time, space, context or association, frequency of use, head pose, background noise, physical and/or virtual distractions, and/or any other criterion. Applying the first/second duty cycles based on time may include, for example, applying the first duty cycle configuration during morning hours and the second duty cycle configuration in the evening. Applying the first/second duty cycles based on space may include, for example applying the first duty cycle configuration for displaying content against a wall and the second duty cycle configuration for displaying on the surface of a desk. Applying the first/second duty cycles based on context or association may include, for example applying the first duty cycle configuration for highly relevant or important content and the second duty cycle configuration for less relevant content. Applying the first/second duty cycles based on frequency of use may include, for example, applying the first duty cycle configuration for frequently used virtual widgets or accessories and the second duty cycle configuration for infrequently used widgets or accessories. Applying the first/second duty cycles based on head pose may include, for example, applying the first duty cycle configuration when the head of the user faces forward and the second duty cycle configuration when the user turns his head sideways. Applying the first/second duty cycles based on background noise may include, for example, increasing the duty cycle in response to detecting distracting sounds, and decreasing the duty cycle in the absence of background noise. Applying the first/second duty cycles based on physical and/or virtual distractions may include, for example, increasing the duty cycle in response to detecting a person, animal or virtual avatar entering the extended reality environment.

Additionally, or alternatively, the first and second duty cycle configurations may be applied to the same object at different times, to different objects displayed simultaneously, to different regions of the extended reality environment, according to context or association and any other criterion differentiating displays of content via the wearable extended reality appliance. Applying the first/second duty cycles to the same object at different times may be based on, for example, the time of day and/or the frequency that the object is being used, changes to ambient illumination, or a changing head pose or posture of the user. Applying the first/second duty cycles to different objects displayed simultaneously may include, for example, displaying video content using a first duty cycle configuration simultaneously with displaying a virtual widget using a second duty cycle configuration. Applying the first/second duty cycles to different regions may include, for example, displaying objects docked to a desktop using a first duty cycle configuration and objects docked to a wall using a second duty cycle configuration. Applying the first/second duty cycles according to context or association may include, for example, displaying more important content according to a first duty cycle configuration, and less relevant content according to the second duty cycle configuration.

By way of a non-limiting example, processing device 460 (FIG. 4) may cause projector 454 to display content within display region 602 (FIG. 6) according to duty cycle 610 (e.g., 60%) and content within display region 604 according to duty cycle 612 (e.g., 20%). For example, processing device 460 may determine that display region 604 is situated in a relatively dark region within the physical space surrounding user 100, and that a duty cycle of 20% is therefore sufficient. Additionally, or alternatively, processing device 460 may determine that display region 602 corresponds to high priority content, and that a duty cycle of 60% may better draw the attention of user 100.

Some embodiments may involve determining a spatial distribution of the virtual content in the extended reality environment, and wherein at least one of the first duty cycle configuration and the second duty cycle configuration is determined based on the spatial distribution of the virtual content. The terms "determining", "virtual content", "extended reality environment", "duty cycle configuration", and "based on", may be understood as described earlier. The term "spatial distribution" may refer to an arrangement, layout or allocation of the virtual content in the extended reality environment, such as where in the extended reality environment content is displayed at a given moment in time. For example, a spatial distribution may be determined based on a density threshold for displaying content (e.g., to avoid a cluttered display), the field of view of the user, ambient lighting conditions, the presence of physical and/or virtual objects, and any other criterion. Determining the first/second duty cycle configuration for a spatial distribution based on a density threshold may include, for example, reducing the duty cycle when the density of the displayed content exceeds the threshold, e.g., to prevent eye strain. Determining the first/second duty cycle configuration for a spatial distribution based on the field of view of the user may include, for example, displaying content in the periphery according to a lower duty cycle configuration, and content in the center according to a higher duty cycle configuration, e.g., to facilitate concentration. Determining the first/second duty cycle configuration for a spatial distribution based on ambient lighting conditions may include, for example, applying a higher duty cycle configuration for content displayed in brightly lit areas and a lower duty cycle configuration for content displayed in dimly lit, or shadowed areas. Determining the first/second duty cycle configuration for a spatial distribution based on the presence of physical and/or virtual objects may include, for example, increasing and/or lowering the duty cycle when content is displayed in proximity to certain objects (e.g., based on the object type, color, size, light reflectance, light absorbance, or any other visible criterion).

As another example, a spatial distribution may cause a virtual keyboard to be fixed (e.g., docked) to a physical desktop (e.g., regardless of the head pose of the user) while causing a virtual screen to follow the user's gaze, e.g., anywhere within the extended reality environment. A higher duty cycle configuration may be applied to display the fixed virtual keyboard, and a lower duty cycle may be applied to display the virtual screen following the user's gaze (e.g., to prevent motion sickness). Another spatial distribution may redistribute, resize, or collapse a plurality of virtual widgets into a list when the number of virtual widgets exceeds a threshold. In such a case, the duty cycle for displaying the virtual widgets may be lowered.

By way of a non-limiting example, processing device 460 (FIG. 4) may determine to spatially distribute virtual screen 112 in display region 602 of FIG. 6, e.g., in the direct line of sight of user 100 when user 100 is facing wall 606, and virtual widgets 114C and 114D in a peripheral region of the field of view of user 100. Based on this spatial distribution, processing device 460 may determine to display content in virtual screen 112 according to duty cycle configuration 610, and virtual widgets 114C and 114C according to duty cycle configuration 610.

Some embodiments may further involve detecting a head motion of a wearer of the wearable extended reality appliance, and wherein at least one of the first duty cycle configuration and the second duty cycle configuration is determined based on the detected head motion of the wearer. The term "detecting" may include discovering, noticing or ascertaining, for example in response to sensing or otherwise becoming aware of something. For example, a sensor (e.g., optical, electric and/or magnetic, acoustic, motion, vibration, heat, pressure, olfactory, gas, or any other type of sensor) may sense a signal that may be analyzed to discover or ascertain, and thereby detect a physical phenomenon, such as a head motion. The term "head motion" may refer to any movement, for example enabled by the neck and/or shoulder muscles, which changes the position of the head (e.g., the part of the body from the neck upwards, including the ears, brain, forehead, cheeks, chin, eyes, nose, and mouth). Examples of head motion may include tilting (e.g., up and down motion), rotating (e.g., left or right motion), leaning (e.g., sideways motion), shifting (e.g., 360 degrees parallel to the floor plane, as a result of moving at least the upper body), and any combination thereof. The terms "wearer of the wearable extended reality appliance", "duty cycle configuration", "determined", and "based on" may be understood as described earlier. For example, the head motion of the wearer of the wearable extended reality appliance may be detected with respect to the body of the wearer, a stationary physical object in the vicinity of the wearer, a virtual object displayed via the extended reality appliance, and/or any combination thereof. At least one motion sensor may be provided to track any of the position, orientation, pose, and/or angle of the head of the wearer to detect a head motion. Examples of motion sensors that may be used include an IMU sensor (e.g., including one or more of a gyroscope, compass, and accelerometer), a camera (e.g., optic, IR), an acoustic sensor (e.g., sonar, ultrasound), an RFID sensor, and any other sensor configured to sense motion. For example, a combination of an IMU sensor integrated with the wearable extended reality appliance and an optical detector (e.g., camera) positioned to detect the head of the wearer may operate together to track head motions of the wearer, such as up/down, left/right, tilt, rotation, translation (e.g., due to walking), and any other type of head motion. Data collected by the at least one motion sensor may be received and analyzed by a processor to track the head of the wearer over time.

Thus, at least one of the duty cycle configurations may be determined based on the head motion of the wearer of the wearable extended reality appliance. For example, when the wearer is facing a virtual screen, a virtual widget may be displayed according to a first (e.g., high) duty cycle configuration, e.g., to facilitate the interfacing of the wearer with the virtual widget. However, when the wearer turns his head away from the virtual screen, for example to take a rest break, the virtual widget may be displayed according to a second (e.g., lower) duty cycle configuration, to prevent motion sickness or distractions during the rest break, while still allowing the wearer to interface with the virtual widget if necessary. As another example, two virtual screens may be displayed to the wearer simultaneously, where the display of each virtual screen may toggle between the first and second duty cycle configurations depending on the head orientation of the wearer of the extended reality appliance. For example, the configuration with the higher duty cycle may be used to display whichever of the two virtual screens is currently in a direct line of sight of the wearer, and the configuration with the lower duty cycle may be used for the other virtual screen (e.g., not in the direct line of sight). As the wearer moves his direct line of sight to the other of the two virtual screens, the duty cycle configuration may be switched.

Figure 7:
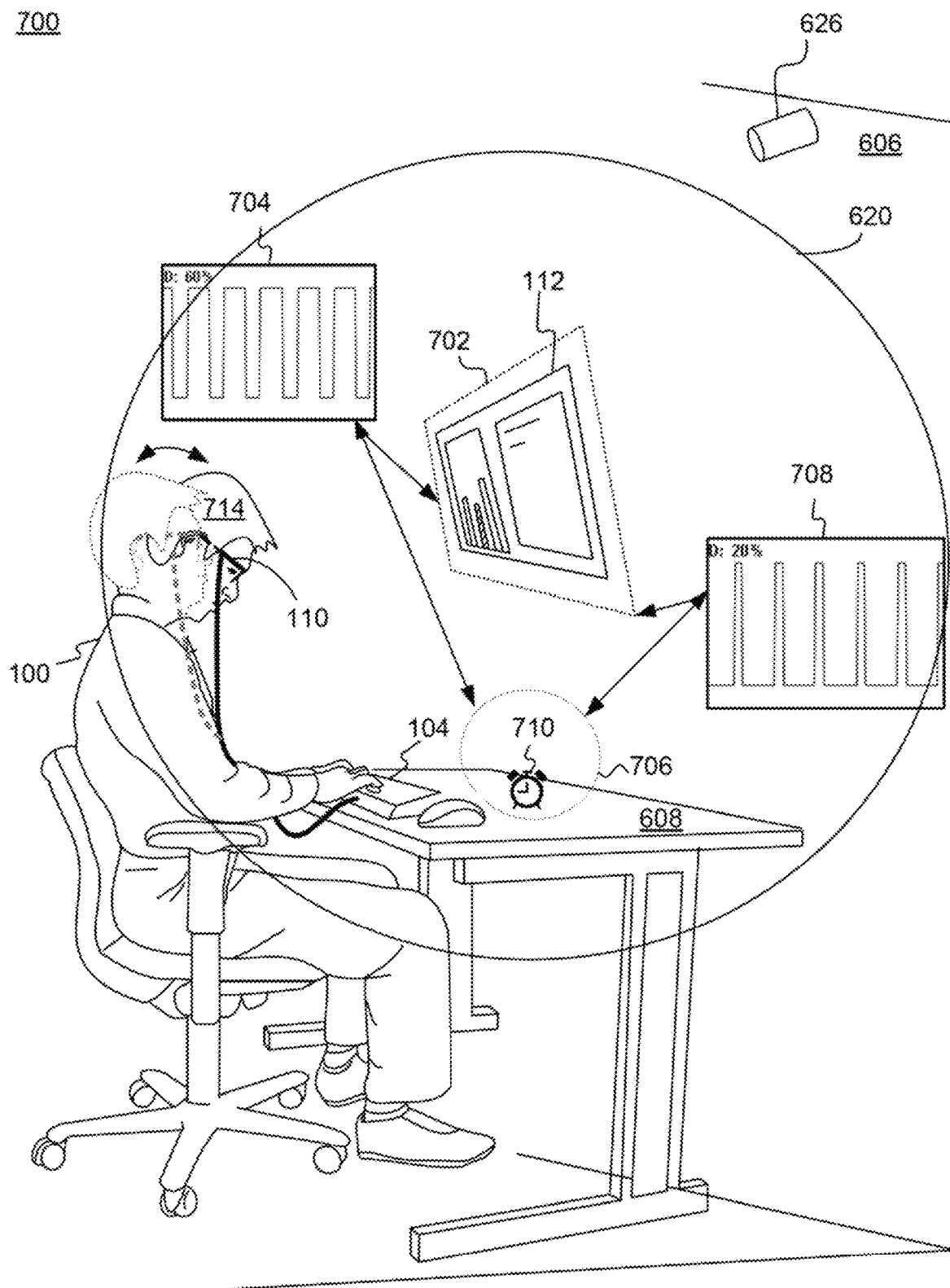
FIG. 7 illustrates another exemplary extended reality environment for displaying virtual content, consistent with some embodiments of the present disclosure.

By way of a non-limiting example, turning to FIG. 7, an exemplary implementation for basing the duty cycle on a determined head motion is shown. FIG. 7 is substantially similar to FIG. 6 with the notable difference of a display region 702 positioned against wall 606 at eye level with user 100, and display region 706 positioned on desktop 608. Virtual content on virtual screen 112 may be displayed in display region 702, and a virtual widget 710 may be displayed in display region 706. Two duty cycle configurations 704 (e.g., 60%) and 708 (e.g., 20%) may be provided to follow the gaze of user. When the gaze of user is directed towards display region 702, virtual screen 112 may displayed according to duty cycle 704, e.g., to provide a more intense display, whereas virtual widget 710 may be displayed according to duty cycle 708, e.g., to conserve energy. When the head of user 100 tilts downwards, away from display region 702 and towards display region 706, processing device 460 (FIG. 4) may detect the head motion (e.g., in conjunction with motion sensor 473) and switch the duty cycle configurations. Thus, for example, when the head of user 100 tilts downwards, virtual screen 112 may be displayed according to duty cycle configuration 708 (e.g., to conserve energy) and virtual widget 710 may be displayed according to duty cycle configuration 704, (e.g., to provide a more intense display). When user 100 tilts head 714 upwards once more to face virtual screen 112, processing device 460 may switch duty cycle configurations 704 and 708 again, accordingly.

Some embodiments may provide a non-transitory computer readable medium containing instructions that when executed by at least one processor cause the at least one processor to perform duty cycle control operations for wearable extended reality appliances, the operations comprising: receiving data representing virtual content in an extended reality environment associated with a wearable extended reality appliance; detecting in the extended reality environment a first head motion and a second head motion of a wearer of the wearable extended reality appliance; determining a first duty cycle configuration based on the first head motion; determining a second duty cycle configuration based on the second head motion, wherein the second duty cycle configuration differs from the first duty cycle configuration; and causing the wearable extended reality appliance to display the virtual content in accordance with the first duty cycle configuration upon detecting the first head motion and in accordance with the second duty cycle configuration upon detecting the second head motion. The terms "non-transitory computer-readable medium", "instructions", "processor", "duty cycle control operations", "wearable extended reality appliances", "receiving", "data representing virtual content", "extended reality environment", "associated with", "detecting", "head motion", "wearer of the wearable extended reality appliance", "determining", "duty cycle configuration", "based on", "differs", "causing", "display", and "virtual content" may be understood as described earlier. Thus, according to some embodiments, instead of using different display regions, different head motions of the wearer of the wearable extended reality appliance may be used to determine different (e.g., first and second) duty cycle configurations and to cause virtual content to be displayed according to different duty cycle configurations. In some examples, data captured using inertial sensors, accelerometers, gyroscopes and/or magnetometers included in the wearable extended reality appliance may be analyzed to determine head motion (such as the first head motion and/or the second head motion), head position and/or head direction. In some examples, image data captured using image sensors included in the wearable extended reality appliance may be analyzed (for example, using egomotion algorithms, using ego-positioning algorithms, etc.) to determine head motion (such as the first head motion and/or the second head motion), head position and/or head direction.

For example, while stationed at a physical work station (e.g., seated in a chair facing a physical wall) a wearer of a wearable extended reality appliance may turn his head level to face the wall. The motion (e.g., the first head motion) may be detected and used to determine a first duty cycle configuration for displaying virtual content (e.g., text on a virtual screen). For example, the first duty cycle configuration may be relatively high to allow the wearer to interface with the displayed virtual content. When the wearer turns his head away from the wall, for example, due to a distraction, the head turning motion may be detected as a second head motion. The second head motion may be used to determine a second (e.g., lower) duty cycle configuration for displaying the virtual content, previously displayed according to the first (e.g., higher) duty cycle configuration, for example to conserve energy since the focus of the user is no longer on the wall. As another example, a first head motion (e.g., gesture) by the wearer of the wearable extended reality appliance may be associated with invoking a messaging widget. Upon detecting the first head motion, the messaging widget may be displayed according to a first (e.g., relatively high) duty cycle configuration. When the wearer turns his head down to focus on the desktop, the downward motion (e.g., the second head motion) may be detected and used to determine a second (e.g., lower) duty cycle configuration. The messaging widget may be continually displayed by the extended reality appliance to follow the gaze of the wearer. However, the messaging widget may now be displayed according to the second (e.g., lower) duty cycle configuration instead of the first (e.g., higher) duty cycle configuration, for example to prevent nausea.

Figure 8:
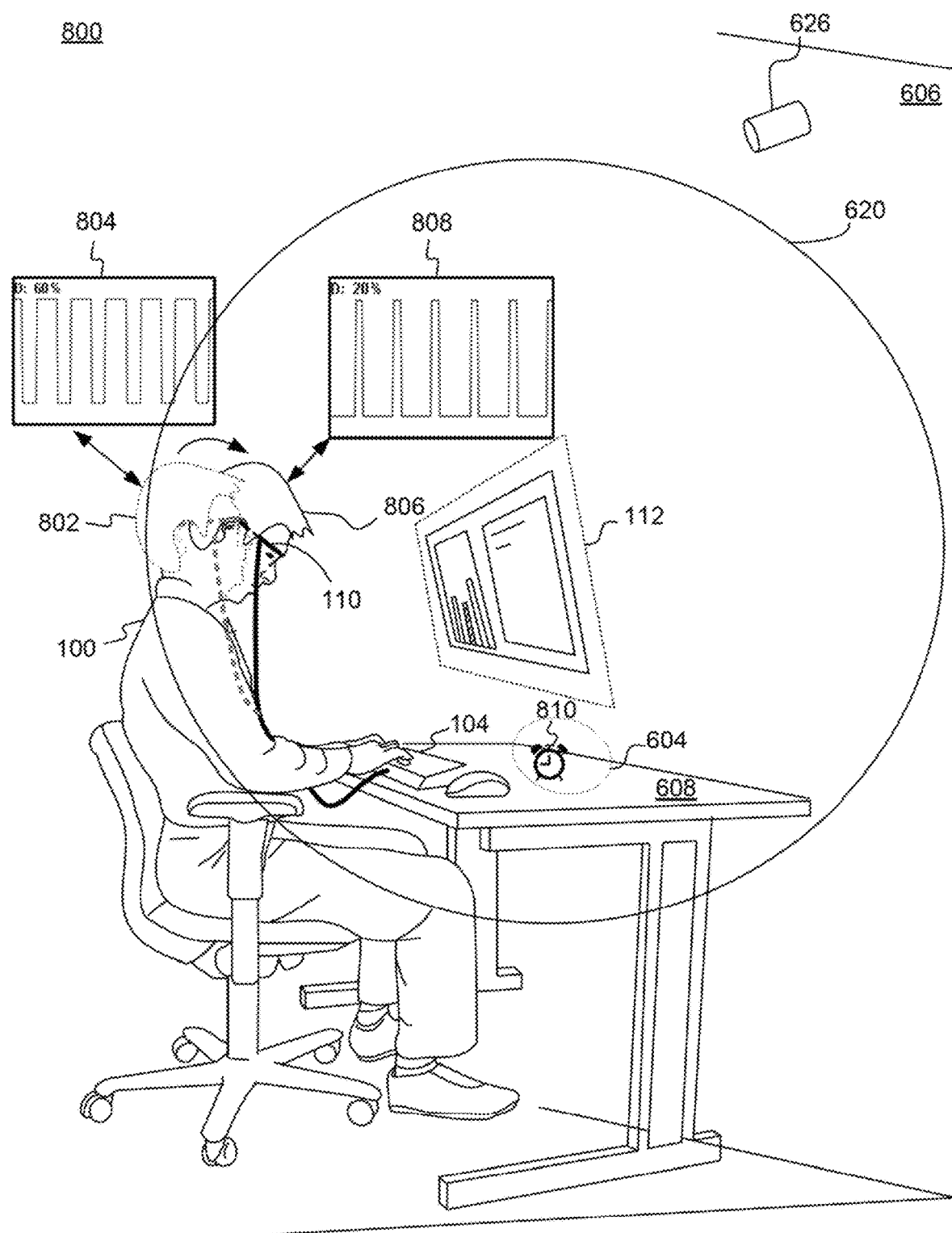
FIG. 8 illustrates another exemplary extended reality environment for displaying virtual content, consistent with some embodiments of the present disclosure.

By way of a non-limiting example, FIG. 8 illustrates an exemplary implementation for using head motions to determine the duty cycle configurations, in place of display regions. FIG. 8 is substantially similar to FIG. 7 with the noted difference that the duty cycle configuration may be based on a head motion, independent of the display region. Thus, a detected head motion may be used determine the duty cycle configuration to apply, instead of the display region. Accordingly, a first head motion leading to head position 802 may be associated with a duty cycle configuration 804, and a second head motion leading to head pose 806 may be associated with a second duty cycle configuration 808, e.g., instead or in place of first and second display regions associated with first and second duty cycle configurations 804 and 808, respectively. For example, first head motion leading to head position 802 may correspond to user 100 invoking virtual screen 112, and second head motion leading to head pose 806 may correspond to user 100 turning the focus away from virtual screen. Processing device 460 in conjunction with motion sensor 473 (FIG. 4) may detect the first head motion (e.g., leading to first head position 802) and determine an invocation of virtual screen 112. In response, processing device 460 may apply duty cycle configuration 804 to display virtual screen 112. For example, duty cycle configuration 802 may be relatively high (e.g., 60%) to allow user to see virtual content on virtual screen 112. Processing device 460 in conjunction with motion sensor 473 may detect the second head motion (e.g., positioning the head of user 100 into second head pose 806) and determine the focus turned away from virtual screen 112. In response, processing device 460 may apply duty cycle configuration 808 for displaying virtual screen 112. For example, duty cycle configuration 808 may be relatively low (e.g., 20%) to conserve energy since user 100 is no longer focused on virtual screen 112.

According to some embodiments, the at least one of the first duty cycle configuration and the second duty cycle configuration is determined based on a speed associated with the detected head motion of the wearer. The term "speed" may refer to velocity, pace, or rate of an activity. Thus, the rate at which the wearer moves his head may be used to determine the first and/or second duty cycle configurations, and/or which duty cycle configuration to apply for displaying virtual content. In some embodiments, the speed that the wearer moves his head may be compared to a predefined threshold, such that if the speed is greater than the threshold, one of the duty cycle configurations may be applied, and if the speed is less than the threshold, the other duty cycle configuration may be applied. For example, the threshold may be associated with nausea or motion sickness. When speed of the head motion is below the threshold, a first duty cycle configuration (e.g., higher of the two duty cycle configurations) may be applied, e.g., to enhance the display of the virtual content. However, when the wearer moves his head at a speed exceeding the threshold, a second duty cycle configuration (e.g., lower of the two duty cycle configurations) may be applied, e.g., to prevent nausea. For example, when the wearer is walking slowly, e.g., the head motion is below the threshold, the higher of the two duty cycle configurations may be applied, and when the wearer is walking quickly, e.g., the head motion exceeds the threshold, the lower of the two duty cycle configurations may be application, e.g., to prevent motion sickness. As another example, a predefined head gesture, e.g., performed at a particular speed, may be associated with invoking a specific application. When the detected head motion corresponds to predefined head gesture at the particular speed (e.g., the wearer deliberately moved his head to invoke the application), the first duty cycle configuration may be applied to display the invocation of the specific application. However, when the speed of the detected head motion does not correspond to the particular speed for the predefined head gesture (e.g., the wearer moved his head arbitrarily, with no intention of invoking the application), the second duty cycle configuration may be applied to display virtual content, e.g., to prevent motion sickness.

By way of a non-limiting example, turning to FIG. 8, a smooth and steady downwards motion of the head from head pose 802 to 806 may be associated with displaying a virtual widget 810 on desktop 608. Upon detecting a smooth head motion by user 100 moving the head from head pose 802 to head pose 806, processing device 460 in conjunction with motion sensor 473 (FIG. 4) may determine that user 100 has deliberately moved his head to perform a predefined gesture associated with displaying virtual widget 810 on desktop 608. In response, processor 460 may display virtual widget 810 on surface 608 according to first duty cycle configuration 806, e.g., 60% duty cycle for an enhanced display. However, upon detecting an abrupt head motion by user 100 from head pose 802 to 806 (e.g., a head motion differing from the predefined gesture due to the speed), processing device 460 in conjunction with motion sensor may determine that the detected head motion is associated with something other than displaying virtual widget 810, e.g., a typing on keyboard 104. In response, processor 460 may avoid displaying virtual widget 810, and instead change the display of virtual content on virtual screen from duty cycle configuration 804 (e.g., higher intensity) to duty cycle configuration 808 (e.g., lower intensity), e.g., to conserve energy.

According to some embodiments, the at least one of the first duty cycle configuration and the second duty cycle configuration is determined based on a direction associated with the detected head motion of the wearer. The term "direction" may refer to an orientation, course, or path along which something moves. Thus, the orientation of a user's head or a path along which the user moves his head may be used to determine the first and/or second duty cycle configurations and/or which duty cycle configuration to apply for displaying virtual content. For example, a gesture recognition application may associate a right turn of the head with invoking an application and a left turn of the head with pausing an application. In response to detecting a right turn of the head, the first duty cycle configuration may be applied to display virtual content for the invoked application. In response to detecting a left turn of the head, the second duty cycle configuration may be applied to display virtual content for the paused application. As another example, a head tilt downwards up to a predefined threshold may be associated with a distraction of fatigue, and thus the lower of the two duty cycle configurations may be applied, whereas a head tilt downwards beyond the predefined threshold may be associated with a deliberate gesture to invoke an application, such as to display a virtual widget on a desktop, and thus the higher of the two duty cycle configurations may be applied.

By way of a non-limiting example, turning to FIG. 8, head pose 806 (e.g., downwards) may be defined as a predefined threshold for invoking virtual widget 810. During a first head motion by user 100 tilting the head downwards from head pose 802, but stopping before reaching head pose 806, processing device 460 in conjunction with motion sensor 473 (FIG. 4) may detect the first head motion and determine that user 100 is fatigued. In response, processing device 460 may display virtual content via virtual screen 112 according to duty cycle configuration 808 (e.g., 20%). During a second head motion by user 100 tilting the head downwards to reach head pose 806, processing device 460 in conjunction with motion sensor 473 (FIG. 4) may detect the second head motion and determine that user 100 wishes to invoke virtual widget 810. In response, processing device 460 may display virtual widget 810 on desktop 608 according to duty cycle configuration 804 (e.g., 60%).

Some embodiments may further involve determining an area of focus of a wearer of the wearable extended reality appliance, and wherein at least one of the first duty cycle configuration and the second duty cycle configuration is determined based on the determined area of focus. The term "area of focus" may be understood as described earlier. Thus, the area of the extended reality environment that the wearer is currently looking at or otherwise focused on may be used to determine the first and/or second duty cycle configurations and/or which duty cycle configuration to apply for displaying virtual content. For example, if the area of focus is inside a predefined region of the extended reality environment, the first duty cycle configuration may be applied, and if the area of focus is outside the predefined region, the second duty cycle configuration may be applied. In some examples, the area of focus of the wearer of the wearable extended reality appliance may be determined based on a gaze direction of the wearer, and the gaze direction may be determined based on an analysis (for example, using a gaze detection algorithm) of one or more images of one or two of the wearer's eyes. For example, the one or more images may be captured using an image sensor included in the wearable extended reality appliance. In some examples, the area of focus of the wearer of the wearable extended reality appliance may be determined based on a head direction of the wearer, and the head direction may be determined as described above. In some examples, the area of focus of the wearer of the wearable extended reality appliance may be determined based on an interaction of the wearer with an object (such as a virtual object or a physical object) in that area, for example through gestures, through a pointing device, through a keyboard, and any other user interfacing technique.

By way of a non-limiting example, turning to FIG. 7, when processing device 460 (FIG. 4) detects the focus of user 100 on virtual screen 112, content may be displayed on virtual screen 112 according to duty cycle 704 (e.g., 60%). When processing device 460 detects the focus of user 100 away from virtual screen 112 (e.g., towards virtual widget 710, content may be displayed on virtual screen 112 according to duty cycle 708 (e.g., 20%).

Some embodiments may further involve detecting a physical object located in proximity to the wearable extended reality appliance, and wherein at least one of the first duty cycle configuration and the second duty cycle configuration is determined based on the detected physical object. The terms "detecting", "wearable extended reality appliance", and "duty cycle configuration" may be understood as described earlier. Regarding detecting a physical object, for example, a sensor (e.g., electric and/or magnetic, optic, acoustic, vibration, olfactory, and any other type of physical sensor) may detect one or more physical characteristics of an object based on a signal emitted from, reflected off, or absorbed by the object. Examples of physical characteristic of a physical object that may be detected may include a distance and/or orientation relative to the wearable extended reality appliance, a color, texture, size (e.g., minimal size), optical properties (e.g., glossiness, roughness, reflectance, fluorescence, refractive index, dispersion, absorption, scattering, turbidity, and any other optical property). For example, image data captured using an image sensor included in the wearable extended reality appliance may be analyzed using an object detection algorithm to detect the physical object. The term "physical object" may include a real or tangible item, such as may be governed by classical laws of physics. The term "located" may refer to a position, placement or station, e.g., in a physical environment. The term "proximity" may refer to being adjacent, or close to (e.g., within a predefined distance). Thus, characteristics of physical objects, such as size, optical properties, distance and/or orientation from the wearable extended reality appliance may be used to determine the first and/or second duty cycle configurations and/or which duty cycle configuration to apply for displaying virtual content. For example, virtual content displayed next to a brightly colored physical object positioned in proximity to the wearable extended reality appliance may be displayed using a relatively high duty cycle configuration, e.g., to allow distinguishing the virtual content next to the brightly colored physical object. Similarly, virtual content displayed next to a small and/or dull object may be displayed using a relatively low duty cycle configuration, e.g., to allow distinguishing the small, dull object next to the virtual content.

In some examples, when the physical object is a person approaching the wearer of the wearable extended reality appliance, one value may be selected for the first duty cycle configuration, and when the physical object is a person not approaching the wearer of the wearable extended reality appliance, a different value may be selected for the first duty cycle configuration. For example, tracking algorithms may be used to analyze images of the person and determine a trajectory of the person, and the determined trajectory may be analyzed to determine if the person is approaching the wearer. In some examples, when the physical object is a person interacting with a wearer of the wearable extended reality appliance, one value may be selected for the first duty cycle configuration, and when the physical object is a person not interacting with a wearer of the wearable extended reality appliance, a different value may be selected for the first duty cycle configuration. For example, audio data captured using an audio sensor included in the wearable extended reality appliance may be analyzed (for example, using a speech recognition algorithm) to determine whether the person is verbally interacting with the wearer. In another example, image data captured using an image sensor included in the wearable extended reality appliance may be analyzed (for example, using a gesture recognition algorithm) to determine whether the person is interacting with the wearer through gestures.

By way of a non-limiting example, processing device 460 (FIG. 4) may apply duty cycle configuration 610 (e.g., 60%) (see FIG. 6) to display virtual screen 112 based on the relatively close proximity to smart glasses 110. Similarly, processing device 460 may apply duty cycle configuration 612 (e.g., 20%) to display virtual content on the far edge of desktop 608 based on the relatively far distance from smart glasses 110.

Some embodiments may further involve detecting a virtual object in the extended reality environment, and wherein at least one of the first duty cycle configuration and the second duty cycle configuration is determined based on the detected virtual object. The term "virtual object" may refer to a visual presentation rendered by a computer in a confined region and configured to represent an object of a particular type (such as an inanimate virtual object, an animate virtual object, virtual furniture, a virtual decorative object, virtual widget, or other virtual representation) as described earlier. The terms "detecting", "extended reality environment", "duty cycle configuration", "determined" may be understood as described above. For example, a virtual object may be detected by a processor controlling the display of content via the wearable extended reality appliance, such as by detecting an increase in memory and/or bandwidth consumption (e.g., indicating a video played in a picture-in-picture, the introduction of a virtual avatar), detecting the response of the wearer to the display of the virtual object (e.g., via an eye tracker, an event listener configured with an electronic pointing device, a voice recognition application configured with a microphone), and any other method for detecting virtual content.

Thus, the existence and/or the display characteristics of a virtual object in the extended reality environment may be used to determine the first and/or second duty cycle configurations and/or which duty cycle configuration to apply. For example, the duty cycle configuration may be based on a distance and/or orientation of the virtual object relative to the wearable extended reality appliance, on the size of the virtual object, on an optical property of the virtual object (e.g., color, luminance, opacity, pixel intensity), and any other visual property of the virtual object. For example, a high duty cycle configuration may be applied to display content in proximity to a large or bright virtual object, and a lower duty cycle configuration may be applied to display content in proximity to a dim or translucent virtual object.

By way of a non-limiting example with reference to FIG. 6, upon detecting the start of a streamed video playing in a picture-in-picture 622 (e.g., based on increase in memory usage), processing device 460 may determine to display virtual screen 112 according to duty cycle configuration 612 instead of duty cycle configuration 610, e.g., to conserve resources.

Some embodiments may further involve detecting a physical movement in proximity to the wearable extended reality appliance, and wherein at least one of the first duty cycle configuration and the second duty cycle configuration is determined based on the detected physical movement. The term "physical movement" may refer to an activity or motion in the real physical world, e.g., requiring an expenditure of energy. For example, an object falling, a person, animal, or robot passing by, may be physical movements. The terms "detecting", "proximity", "wearable extended reality appliance", and "duty cycle configuration" may be understood as described above. Thus, physical movement may be detected based on speed, the region and/or proportion that the physical movement occupies in the extended reality environment, the type of movement (e.g., sudden versus slow), the entity performing the movement (e.g., virtual or real, human or inanimate). The physical movement may be detected via one or more detectors configured in the proximity to the wearable extended reality appliance, such as an optical, acoustic, radio or any other type of detector. For example, a motion detection, visual activity or event detection algorithm may be applied to a sequence of images (e.g., video) captured via a camera. Thus, the existence of physical movement in proximity to the wearable extended reality appliance may be used to determine the first and/or second duty cycle configurations and/or which duty cycle configuration to apply for displaying virtual content. For example, a child entering the extended reality environment or an object falling may cause virtual content to be displayed according to a lower duty cycle configuration, e.g., to draw the attention of wearer away from the extended reality environment so that the wearer may be aware of the child or the falling object.

By way of a non-limiting example with reference to FIG. 6, a ball 624 may be tossed by a child in proximity to user 100 while user 100 is working at home via wearable extended reality appliance 110. A camera 626 positioned on wall 606 in proximity to smart glasses 110 may capture a video of the motion of ball 624 and provide the video to processing device 460 (FIG. 4). Processing device 460 may analyze the video and detect the physical movement of ball 624. In response, processing device 460 may cause virtual content, previously displayed via wearable extended reality appliance 110 according to duty cycle 610, to be displayed according to duty cycle configuration 612, e.g., as a way of notifying user 100 of the presence of ball 624.

Some embodiments may involve identifying a type of virtual content included in the first display region, and wherein at least one of the first duty cycle configuration and the second duty cycle configuration is determined based on the type of virtual content included in the first display region. The term "type of virtual content" may refer to a context, classification, genre, or any other category of virtual content. The terms "virtual content", "display region", and "duty cycle configuration" may be understood as described earlier. Thus, a processing device may identify the type of virtual content, for example based on the format of the virtual content, based on metadata associated with the virtual content, on resources required to process and/or render the virtual content (e.g., memory, CPU, and communications bandwidth), on latency experienced when rendering the virtual content, on timing restrictions regarding the display of the virtual content, and any other identifiable characteristic of the virtual content. The type of virtual content (e.g., category, context, format, priority level) being displayed in a given display region may be used to determine the first and/or second duty cycle configurations and/or which duty cycle configuration to apply for displaying virtual content. For example, a virtual text document may be a different type of virtual content that virtual image, or video content. As another example, virtual content associated with an email application receiving text notifications in real-time may be a different type (e.g., urgent text) than virtual content associated with a dormant graphic editing application displaying graphics (e.g., non-urgent graphics). Thus, the urgent text may be displayed using a higher duty cycle configuration than the non-urgent graphics. As yet another example, virtual content consumed during work hours (e.g., associated with a work context) may be a different type than virtual content consumed after working hours (e.g., associated with a personal context). Thus, content associated with work may be displayed using a higher duty cycle configuration that content associated with personal matters.

By way of a non-limiting example, turning to FIG. 6, display region 604 may include virtual widget 114C providing daily weather updates as graphic content, and virtual widget 114D providing minute-by-minute text notifications. Processing device 460 (FIG. 4) may identify the different types of content displayed by virtual widgets 114C and 114D (e.g., graphic once per day versus text minute-by-minute) and may determine to display virtual widget 114D according to duty cycle configuration 610 (e.g., 60%), and virtual widget 114C according to duty cycle configuration 612 (e.g., 20%).

Some embodiments may further involve determining ambient illumination conditions, and wherein at least one of the first duty cycle configuration and the second duty cycle configuration is determined based on the determined ambient illumination conditions. The term "ambient illumination conditions" may refer to the light that is available or present in an environment. An ambient illumination condition may involve one or more of the direction, intensity, color, quality, and/or the contrast-producing effect of light. For example, a source of light such as a window opening to daylight, a lamp, an electronic display, or any other lighting appliance (e.g., turned on), as well as a physical object casting a shadow, the color of the walls, ceiling and floor, the presence of a mirror, and any other physical object affecting the available light may contribute to the ambient illumination conditions. The terms "determining", and "duty cycle configuration" may be understood as defined earlier. The ambient illumination conditions may be determined, for example, by analyzing one or more images captured by a camera (e.g., by a processor), by a light meter, an ambient light sensor (e.g., including one or more phototransistors, photodiodes, and photonic integrated circuits), or a lux meter (e.g., configured with a mobile phone), or any other type of ambient light detector positioned in proximity to the extended reality environment. According to some embodiments, determining ambient illumination conditions may include determining the source of light (e.g., a window versus a LED lamp or screen), for example based on the luminance, the spectrum (e.g., detectable by a spectrophotometer). According to some embodiments, determining the ambient illumination conditions may include determining properties of a light source, such as the size, the direction, the presence of objects reflecting, absorbing, dispersing, and/or blocking the light source, and any other factor affecting the light source.

Thus, the ambient illumination conditions in the extended reality environment (e.g., and the different display regions included therein) may be used to determine the first and/or second duty cycle configurations and/or which duty cycle configuration to apply for displaying virtual content. For example, a lower duty cycle configuration may be used to display virtual content in a shadowed region of a room (e.g., because less contrast may be needed to discern the virtual content), and a higher duty cycle configuration may be used to display virtual content in a brightly lit region of the room (e.g., because greater contrast may be needed to discern the virtual content). As another example, a higher duty cycle configuration may be applied to display virtual content during the day when the ambient illumination is primarily due to sunlight, and a lower duty cycle configuration may be applied to display virtual content at night when the ambient illumination is primarily due to artificial lighting. As yet another example, while a curtain is drawn (e.g., open) allowing daylight to penetrate the physical space of the extended reality environment, a higher duty cycle configuration may be used to display virtual content (e.g., to provide greater contrast to discern the virtual content displayed in a well-lit area), and when the curtain is closed, a lower duty cycle configuration may be used to display virtual content (e.g., because less contrast may be needed to discern the virtual content displayed in a darkened area).

By way of a non-limiting example, turning to FIG. 6, camera 626 positioned in extended reality environment may detect that display region 602 is situated in a well-lit area (e.g., exposed to daylight). In response, processing device 460 (FIG. 4) may determine to use duty cycle configuration 808 (e.g., 60%) to display virtual content in display region 602, e.g., to provide greater contrast for user 100 to discern the virtual content. Conversely, camera 626 may detect that display region 604 is situated in a darkened area (e.g., due to a shadow cast by a physical object). In response, processing device 460 may determine to use duty cycle configuration 812 (e.g., 20%) to display virtual content in display region 604, e.g., because less contrast may be needed.

Some embodiments may involve estimating a physical condition of a wearer of the wearable extended reality appliance, and wherein at least one of the first duty cycle configuration and the second duty cycle configuration is determined based on the estimated physical condition of a wearer. The term "estimating" may include an approximation or assessment, e.g., based on analysis, calculations and/or inference of measured data. The estimating may be facilitated by artificial intelligence, inference, statistical analysis, machine and/or deep learning, extrapolation, clustering, and any other technique for performing estimations. The term "physical condition" may refer to the physiological state of the body or bodily functions of a user. For example, fatigue, nausea, eye strain, head, back and/or neck pain, posture, nervousness, agitation, illness, or any other physiological condition affecting the physical condition of the user. The physical condition of the wearer may be estimated for example by processor receiving data from a sensor configured to detect one or more biomarkers (e.g., heart or breathing rate, yawning, blinking frequency or eye open and close ratio (EOCR), the percentage of eyelid closure over the pupil over time (PERCLOS), blood pressure, oxygen level in exhaled air, or any other biological indication of a physiological state) detected by one or more sensors provided in the extended reality environment. For example, a smart watch worn by the user may detect heart and/or breathing rate. A camera may capture images of the user yawning, head nodding head, or eye closing or rubbing and may provide the images to a processing device for image analysis. An IMU configured with a pair of smart glasses may detect a nodding motion of the wearer. The terms "wearer of the wearable extended reality appliance", "determining", and "duty cycle configuration" may be understood as defined earlier. Thus, the physical or physiological state of the wearer of the wearable extended reality appliance may be used to determine the first and/or second duty cycle configurations and/or which duty cycle configuration to apply for displaying virtual content. For example, the duty cycle configuration may be lowered if the wearer is determined to be agitated (e.g., based on detecting distracted or jerky motions), fatigued, or suffering from neck or back strain (e.g., by a camera capturing the wearer yawning, rubbing his eyes, or slouching). As another example, the duty cycle configuration may be increased if the wearer is determined to be alert and focused, e.g., based on an upright posture and a low PERCLOS level.

For example, during a learning period, a machine learning algorithm may detect a pattern of behavior for a wearer and may receive feedback from the wearer allowing the machine learning algorithm to learn a schedule of the wearer. The machine learning algorithm may use the schedule and feedback to identify signs indicating the physical condition of the wearer, such as fatigue, stress, anxiety, nausea, a migraine, and any other physical condition that may be alleviated or facilitated by adjusting the duty cycle. A processing device may use the identified signs to modify the duty cycle configuration to accommodate the physiological needs of the wearer. For example, if the wearer is determined to be suffering from fatigue (e.g., based on the detected breathing rate and PERCLOS level), the duty cycle may be reduced, similarly if the wearer is determined to be alert and energetic (e.g., based on reaction time to displayed content), the duty cycle may be increased.

By way of a non-limiting example with reference to FIG. 7, camera 626 may capture images of head nodding and eye closing by user 100, concurrently with motion sensor 473 sensing a nodding motion of the head of user 100. Processing device 460 (FIG. 4) may receive image data from camera 626 and the sensed motion data from sensor 473 and analyze the image and motion data to determine that user 100 is experiencing drowsiness. For example, processing device 460 may enlist a machine learning engine to identify the nodding head motion and the closing of the eyes with sleepiness. In response, processing device 460 may modify the duty cycle configuration used to display virtual content on virtual screen 112 from duty cycle configuration 704 (e.g., 60%) to duty cycle configuration 708 (e.g., 20%).

Some embodiments may involve receiving an indication of a hardware condition of the wearable extended reality appliance, and wherein at least one of the first duty cycle configuration and the second duty cycle configuration is determined based on the hardware condition of the wearable extended reality appliance. The terms "receiving", "wearable extended reality appliance", and "duty cycle configuration" may be understood as described earlier. The term "indication" may include a signal, sign, marker, measurement, or any other type of evidence conveying a situation, state, or condition. The term "hardware condition" may include a state of a hardware component in the wearable extended reality appliance, such as the amount of available power in a battery, the processing load allocated to a processor, the available memory or communications bandwidth, the temperature of an electronic component, and any other measure of one or more hardware components of the wearable extended reality appliance. For example, a processing device may monitor available memory (e.g., stack, buffers, queues, RAM), communications bandwidth (e.g., for internal buses and external communications channels), communication and processing latencies, temperature of electronic components, and any other hardware indication. The processing device may receive one or more indications of the hardware condition by polling various electronic components and/or receiving one or more interrupt notifications, such as a buffer or stack overflow notification, a NACK notification (e.g., a timeout after exceeding a latency limit), an overheating warning from a thermometer monitoring the temperature of one or more electronic components, and/or by detecting a processing latency. The warnings may be issued based on predefined thresholds for a given hardware configuration, e.g., based on recommended specifications. Thus, the state of one or more hardware components included in the wearable extended reality appliance may be used to determine the first and/or second duty cycle configurations and/or which duty cycle configuration to apply for displaying virtual content. For example, upon detecting a low battery level, or a high processing load allocation, the duty cycle configuration may be reduced, whereas upon detecting connection to a wall outlet and/or a low processing load, the duty cycle configuration may be increased.

By way of a non-limiting example, a temperature sensor (e.g., other sensor 475 of FIG. 4) provided with wearable extended reality appliance 110 may detect a temperature of processing device 460 and provide the temperature reading to processing device 460. Processing device 460 may compare the temperature reading to a predefined recommended temperature limit and may determine that processing device 460 is overheated, e.g., due to a high processing load for displaying graphical virtual content in virtual screen 112. In response, processing device 460 may reduce the duty cycle for displaying the virtual content to duty cycle configuration 612 (e.g., 20%) from duty cycle configuration 610 (e.g., 60%) to allow processing device 460 to cool to the recommended temperature limit.

Some embodiments may further involve identifying a virtual event, and wherein at least one of the first duty cycle configuration and the second duty cycle configuration is determined based on the identified virtual event. The terms "identifying", and "duty cycle configuration" may be understood as described earlier. The term "virtual event" may include an occurrence of an action, activity, or any other change of state that is implemented via a computer-generated medium and may not exist outside the computer-generated medium (e.g., in the real, physical world detached from a computer). A virtual event may be identified, for example, based on the processing load of a processing unit (e.g., a GPU), the status of memory resources (e.g., buffers, queues, and stacks, RAM), retrieval of data from a particular location in memory, receiving of data from a specific external source, as a notification from an external device or an event listener (e.g., configured with an operating system of the wearable extended reality appliance), as latency experienced in processing threads other than the virtual event, a response of the wearer of the extended reality appliance, and any other indication of a virtual event. A processing device may identify the virtual event, for example by polling one or more memory resources, monitoring the status of internal buses and/or external communications channels (e.g., by checking latency and time-outs), receiving an interrupt event from an event listener, and any other method for identifying the virtual event. Additionally, or alternatively, a virtual event may be identified based on feedback from a user of an extended reality appliance, such as a head motion, voice command and/or action by an electronic pointing device in response to or related to the virtual event. Thus, one or more synthesized (e.g., virtual) events in the extended reality environment may be used to determine the first and/or second duty cycle configurations and/or which duty cycle configuration to apply for displaying virtual content. For example, the entry of a virtual avatar entering the room may cause virtual content other than the avatar to be displayed according to a lower duty cycle configuration and the avatar to be displayed according to a higher duty cycle configuration. As another example, the sharing (e.g., sending or receiving) of content may cause memory buffer overflow and/or an overload on a bus system and may trigger a change in the duty cycle configuration, e.g., to a lower duty cycle to alleviate processing load.

By way of a non-limiting example, turning to FIG. 6, user 100 may receive an electronic notification (e.g., the occurrence of a virtual event) associated with virtual widget 114D. In response, processing device 460 (FIG. 4) may increase the duty cycle for displaying widget 114D from duty cycle configuration 612 (e.g., 20%) to duty cycle configuration 610 (e.g., 60%).

According to some embodiments, the first duty cycle configuration for the first display region and the second duty cycle configuration for the second display region are determined for a first time period, and the operations further include determining at least one updated duty cycle configuration for the first display region and the second display region for a second time period following the first time period. The terms "duty cycle configuration", "display region", and "determining" may be understood as described earlier. The term "time period" may refer to a duration, length of time for an activity, condition or state (e.g., measured in seconds, minutes, hours, and/or days), a particular time of day (e.g., morning, afternoon, evening or night), a particular day or days of the week (e.g., weekdays versus weekends or holidays), or any other measure of time. The term "updated" may refer to amended, renewed or revised. Thus, a time-based criterion may be used to determine and/or update the first and/or second duty cycle configurations and/or which duty cycle configuration to apply for displaying virtual content. For example, virtual content may be displayed according to a lower duty cycle configuration during morning hours when the wearer of the wearable extended reality appliance is alert. In the afternoon (e.g., following the morning) when the user is fatigued, the duty cycle may be updated to a higher duty cycle configuration, e.g., to draw the wearer's focus. In the evening (e.g., following the afternoon), the duty cycle may be updated yet again to a lower duty cycle configuration, e.g., to allow the wearer to relax during a shutdown ritual.

By way of a non-limiting example, turning to FIG. 6, during daylight hours when the ambient lighting is due to natural sunlight, processing device 460 (FIG. 4) may display virtual content on virtual screen 112 according to duty cycle configuration 610 (e.g., 60%), for example to provide a more intense display to overcome intense daylight illumination. During the evening hours, e.g., when the ambient lighting is based on an artificial light source, such as a light bulb that is dimmer than sunlight, processing device 460 may display virtual content on virtual screen 112 according to duty cycle configuration 612 (e.g., 20%), for example to conserve energy because a less intense display may be sufficient.

According to some embodiments, the operations further include determining when to end the first time period based on detection of an event. The term "determining" and "time period" may be understood as described above. The term "when to end the first time period" may be understood as a boundary for the time period, for example a point in time when the first time period terminates, and a new time period commences. For example, determining when to end the first time period may include calculating, identifying, specifying, setting, or assigning a boundary of for the first time period. For example, a processing device (e.g., configured with the wearable extendible reality appliance) may be configured to calculate, specify, set, or assign a point in time for the termination of the first time period based on detection of an event. The term "event" may refer to an occurrence of an action, activity, change of state, or any other type of development or stimulus, for example detectable by a processing device. The source of the event may be internal or external to the wearable extendible reality appliance.

For example, an internal event may include a signal relating to a state of a component of the wearable extendible reality appliance (e.g., temperature, available communication and/or processing bandwidth, available battery power or memory, or any other criteria relating to the operation of the wearable extendible reality appliance). Internal events that may trigger a processing device to terminate the first time period may include, for example, the internal temperature of the processing device exceeding a predefined limit, the power remaining in a battery for the processing device falling below a predefined threshold, or a memory buffer overflowing.

Examples of an external event may include an alert, trigger or signal received from an external computing device or peripheral device (e.g., configured with a sensor such as an optical, IR, acoustic, vibration, temperature, heat, humidity, electric and/or magnetic, or any other type of sensor), a user (e.g., as a user input) or any other type of external stimulus. The user input may include input via an input device (e.g., keyboard, electronic pointing device, touch-based device), a voice command, a gesture (e.g., eye via an eye tracker, head, hand, body), or any other type of user input. For example, external events that may trigger a processing device to terminate the first time period may include receiving a notification of a scheduled calendar event, receiving a timeout notification (e.g., NACK) from an external device, completing the receiving of data from an external source, or receiving an external warning to update system software, or install protective measures against malware.

Thus, the termination of the first time period may be based on detecting an internal and/or external event. For example, a timer issuing an alert at a predefined hour, or a microphone sensing a child returning home from school may be used to determine the termination of the first time period. As another example, an application invoked by the wearer, or the receiving of a notification from another computing device (e.g., an email or electronic message) detected by an event listener may be used to determine the termination of the first time period.

By way of a non-limiting example, turning to FIG. 6, processing device 460 (FIG. 4) may apply duty cycle configuration 610 to display virtual content on virtual screen during a first time period. Upon user 100 receiving a notification (e.g., associated with virtual widget 114D) relating to an urgently scheduled meeting, processing device 460 (FIG. 4) may analyze the notification and determine to terminate the first time period and initiate the second time period. Processing device 460 may switch the duty cycle for displaying virtual content on virtual screen 112 to correspond to duty cycle configuration 612, e.g., for the second time period, for example to allow user 100 to prepare for the meeting.

According to some embodiments, the at least one updated duty cycle configuration includes a single duty cycle configuration for both the first display region and the second display region. The term "updated", "duty cycle configuration", and "display region" may be understood as described earlier. The term "single" may refer to sole or only. Thus, after the first time period terminates, only one (e.g., single) duty cycle configuration may be used to display content in the first and second display regions, e.g., during the second time period following the first time period. For example, after a predetermine hour (e.g., midnight) any content displayed via the wearable extended reality appliance (e.g., in the first and second display regions) may be displayed according to the same duty cycle configuration, such as a lower duty cycle configuration to conserve energy.

By way of a non-limiting example, turning to FIG. 6, after a time period (e.g., a predetermined time period) of operation, processing device 460 (FIG. 4) may determine that power source 440 providing power to operate wearable extended reality appliance 110 is low on power, for example power source 440 may be a battery and wearable extended reality appliance 110 may be a wireless appliance. In response, processing device 460 may update the duty cycle configuration to a lower duty cycle (e.g., 20%) for virtual content displayed in any of display regions 602 and 604, e.g., to conserve power.

According to some embodiments, the at least one updated duty cycle configuration includes a first updated duty cycle configuration for the first display region and a second updated duty cycle configuration for the second display region. The terms "updated duty cycle configuration", and "display region" may be understood as described earlier. Thus, after the first time period terminates, each display region may be associated with a different updated duty cycle configuration. The duty cycle configurations may be increased or decreased by the same or different amounts. For example, both duty cycle configurations may be increased (e.g., both increased by 10%), one duty cycle configuration may be increased (e.g., by 5%) and the other duty cycle configuration may be decreased (e.g., by 20%), or both duty cycle configurations may be decreased (e.g., one by 5% and the other by 15%). For example, during the first time period, content may be displayed in the first display region according to an 80% duty cycle configuration, and content may be displayed in the second display region according to a 60% duty cycle configuration. When the first time period terminates, the duty cycle configuration may be updated for both the first and second display regions, e.g., by reducing the duty cycle configuration for the first display region by 10% and by increasing the duty cycle configuration for the second display region by 20%. Thus, during the second time period (e.g., following the first time period), content may be displayed in the first display region according to a 70% duty cycle configuration (e.g., the first updated duty cycle configuration), and content may be displayed in the second display region according to an 80% duty cycle configuration (e.g., the second updated duty cycle configuration).

By way of a non-limiting example, turning to FIG. 6, during the first time period, processing device 460 (FIG. 4) may display content in display region 602 according to duty cycle configuration 610 (e.g., 60%) and content in display region 604 according to duty cycle configuration 612 (e.g., 20%). After the lapse of a predetermined time period (e.g., the first time period), processing device 460 may determine that power source 440 (e.g., a battery) is running low, and may update the duty cycle configurations for displaying content in each of display regions 602 and 604, e.g., by reducing the duty cycle for each duty cycle configuration by half. Thus, during the second time period (e.g., following the first time period), processor may display content in display region 602 according to a duty cycle configuration of 30% (e.g., the first updated duty cycle configuration) and content in display region 604 according to a duty cycle configuration of 10% (e.g., the second updated duty cycle configuration).

According to some embodiments, the at least one updated duty cycle configuration includes a first updated duty cycle configuration for the first display region and a first portion of the second display region and a second updated duty cycle configuration for a second portion of the second display region, the first portion of the second display region differs from the second region of the second display region. The terms "updated duty cycle configuration", "display region", and "differs" may be understood as described earlier. Thus, the extended reality environment may be divided into different display regions for the first and second time periods such that the first and second display regions include different sections of the extended reality environment during the first and second time periods. In other words, in addition to updating the duty cycle configurations, the regions of the extended reality environment included in each of the first and second display regions may be updated.

For example, during the first time period, the first display region may be limited to a virtual screen directly facing the user, and the second display region may include a section of the extended reality environment adjacent to the virtual screen as well as a desktop, e.g., supporting a keyboard. During the first time period, content may be displayed in the first display region (including just the virtual screen) according to the first duty cycle configuration, and in the second display region (including the area adjacent to the virtual screen and the desktop) according to the second duty cycle configuration. During the second time period, the display regions may be divided up differently. For example, the first updated display region may now include the virtual screen and additionally the desktop, and the second updated display region may now include only the section adjacent to the virtual screen (e.g., without the desktop). Content in the first updated display region (including the virtual screen and desktop) may be displayed according to the first updated duty cycle configuration, and content in the second updated display region (including only the section adjacent to the virtual screen) may be displayed according to the second updated duty cycle configuration.

By way of a non-limiting example, turning to FIG. 6, during the first time period, processing device 460 (FIG. 4) may display content in display region 602 (e.g., virtual screen 112) according to duty cycle configuration 610 (e.g., 60%) and content in display region 604 (e.g., virtual widgets 114C and 114D) according to duty cycle configuration 612 (e.g., 20%). When the first time period lapses, (e.g., in response to a notification associated with virtual widget 114D), processing device 460 may update the first and second duty cycle configurations, for example by lowering the duty cycle for each by 10%. Thus, the first updated duty cycle configuration may now be 50% and the second updated duty cycle configuration may now be 10%. However, processing device 460 may determine that virtual widget 114D should be displayed according to the higher of the two duty cycle configurations (e.g., 50%), e.g., to draw the attention of user 100 to incoming notifications. Thus, processing device 460 may use the 50% duty cycle configuration (e.g., first updated duty cycle configuration) to display virtual widget 114D (e.g., a first portion of display region 604) and virtual screen 112 and may use the 10% duty cycle configuration (e.g., second updated duty cycle configuration) to display virtual widget 114C (e.g., second portion of display region 604).

Some embodiments may provide a non-transitory computer readable medium containing instructions that when executed by at least one processor cause the at least one processor to perform duty cycle control operations for wearable extended reality appliances, the operations may comprise: receiving data representing virtual content in an extended reality environment associated with a wearable extended reality appliance; causing the wearable extended reality appliance to display the virtual content in accordance with a first duty cycle configuration; after causing the wearable extended reality appliance to display the virtual content in accordance with the first duty cycle configuration, determining a second duty cycle configuration; and causing the wearable extended reality appliance to display the virtual content in accordance with the second duty cycle configuration. The percent during which each cycle of the display signal is set to "active" may be non-zero in both the first duty cycle configuration and the second duty cycle configuration. The second duty cycle configuration may differ from the first duty cycle configuration. According to some embodiments, the operations may further include determining when to switch from the display in accordance with the first duty cycle configuration to the display in accordance with the second duty cycle configuration based on detection of an event, for example as described above.

According to some embodiments, the first duty cycle configuration for the first display region includes a selection of different duty cycles for a display device associated with a left eye of a wearer of the wearable extended reality appliance and for a display device associated with a right eye of the wearer of the wearable extended reality appliance. The terms "duty cycle configuration", "display region", and "different" may be understood as described earlier. The term "selection" may refer to election or choosing an option from several options. The term "display device associated with a left eye" (e.g., or right eye) may refer to a device configured to accommodate vision corrective requirements (e.g., to correct for one or more of emmetropia, myopia, hyperopia, and astigmatism) for the left or right eye, respectively. For example, the display device (e.g., for the left and/or right eye) may include one or more optically lenses to adjust a view seen through the wearable extended reality appliance, for example to adjust the focus of light onto the retina of the left and/or right eye and/or magnify an image. As another example, the display device (e.g., for the left and/or right eye) may include a coating or filter, such as an anti-reflective or polarized coating to reduce glare. As another example, the display device (e.g., for the left and/or right eye) may include one or more photosensitive materials (e.g., photochromic dyes) to block incoming ultraviolet light.

For example, the wearer of the wearable extended reality appliance may have different vision corrective requirements for each eye (e.g., the left eye may require correction for astigmatism and high myopia, and the right eye may require correction only for low myopia). Additionally, or alternatively, the wearer may wish to use the left eye to view content up close and the right eye to see content from a distance. As another example, the wearer of the wearable extendible reality appliance may have undergone cataract surgery in one eye. The wearable extended reality appliance may thus include a different display device for each eye, each display device accommodating the vision requirements of each eye, e.g., to adjust the focus of light onto the retina of each eye, reduce glare, and/or filter certain wavelengths (e.g., ultraviolet light). When determining the duty cycle configuration, a different duty cycle configuration may be selected for each of the display devices, e.g., to accommodate the seeing requirements of each eye of the user. For example, a higher duty cycle configuration may be selected for the display device associated with the higher myopia eye than the lower myopia eye.

By way of a non-limiting example with reference to FIG. 6, the left eye of user 100 may have undergone surgery to remove a cataract and correct for vision impairment, whereas the right eye may have a myopia of −4 diopters. Wearable extended reality apparatus 110 may be a pair of smart glasses allowing user 100 to view the physical environment simultaneously with virtual content. The smart glasses may include a smart left lens (e.g., display device associated with the left eye) that is clear (e.g., no vision correction) with an anti-UV coating, and a smart right lens (e.g., display device associated with the right eye) correcting for the myopia but without any anti-UV coating. When determining the duty cycle configuration, processing device 460 (FIG. 4) may select a different duty cycle configuration for the smart left lens and the smart right lens to accommodate the different corrective needs for each eye. For example, a lower duty cycle configuration may be used for the left eye to ease eye strain following cataract surgery, and a higher duty cycle configuration for the right eye to provide a bright display.

Some embodiments may provide a system for duty cycle control for wearable extended reality appliances, the system including at least one processor programmed to: receive data representing virtual content in an extended reality environment associated with a wearable extended reality appliance; identify in the extended reality environment a first display region and a second display region separated from the first display region; determine a first duty cycle configuration for the first display region; determine a second duty cycle configuration for the second display region, wherein the second duty cycle configuration differs from the first duty cycle configuration; and cause the wearable extended reality appliance to display the virtual content in accordance with the determined first duty cycle configuration for the first display region and the determined second duty cycle configuration for the second display region.

For example, turning to FIG. 6 in conjunction with FIG. 4, system 600 may include processing device 460, which may be programmed to receive data representing virtual content in extended reality environment 620 associated with wearable extended reality appliance 110. Processing device 460 may identify in extended reality environment 620 a first display region 602 and a second display region 604, separated from first display region 602. Processing device 460 may be determined duty cycle configuration 610 (e.g., 60%) for display region 602 and duty cycle configuration 612 for display region 604, where duty cycle configuration 612 differs from duty cycle configuration 610. Processing device 460 may cause wearable extended reality appliance 110 to display the virtual content in accordance with duty cycle configuration 610 for display region 602 and duty cycle configuration 612 for the display region 604.

Figure 9:
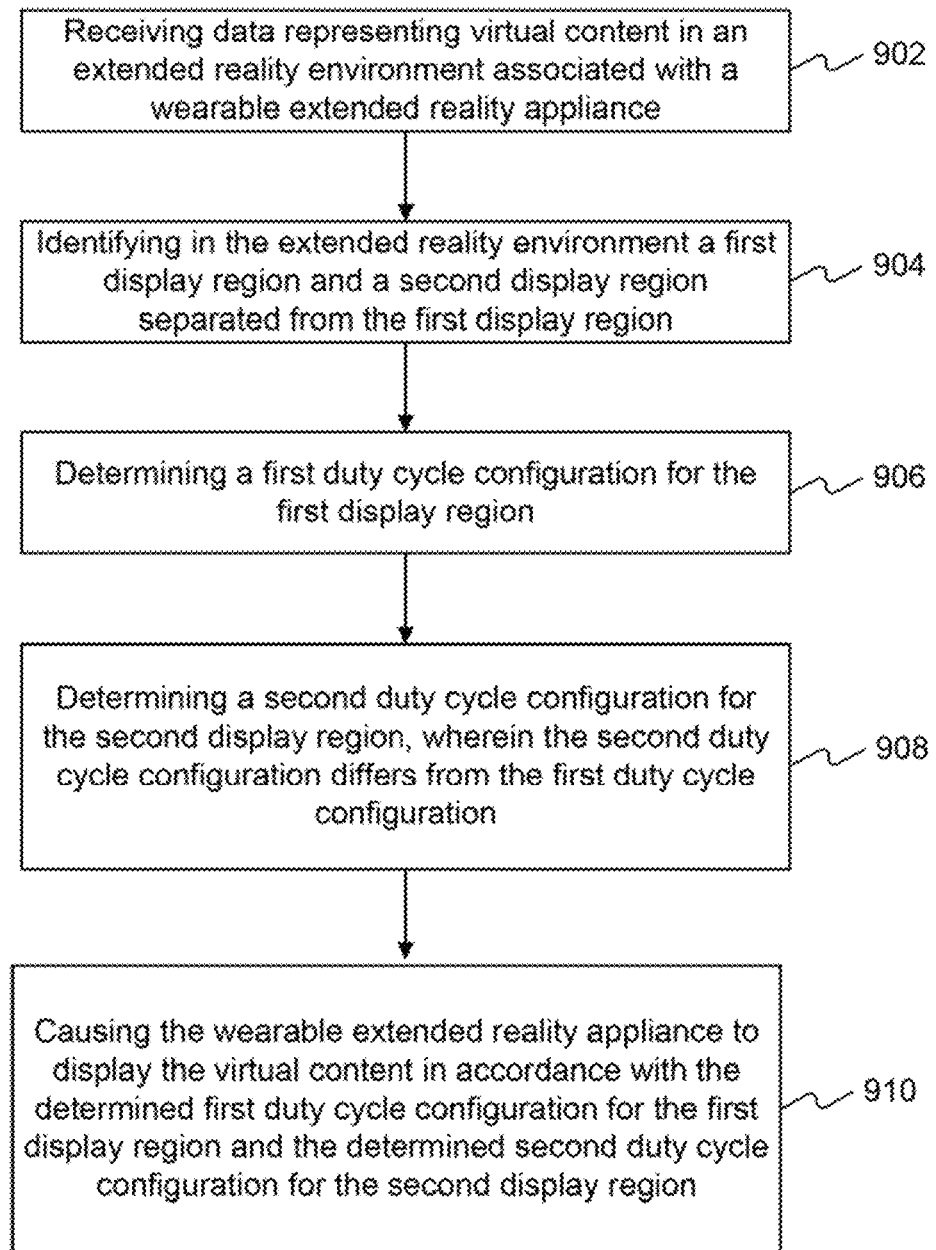
FIG. 9 is a block diagram illustrating an example process for controlling a duty cycle for a wearable extended reality appliance, consistent with embodiments of the present disclosure.

FIG. 9 illustrates a block diagram of an example process 900 for controlling a duty cycle for wearable extended reality appliances consistent with embodiments of the present disclosure. In some embodiments, process 900 may be performed by at least one processor (e.g., processing device 460 of extended reality unit 204, shown in FIG. 4) to perform operations or functions described herein. In some embodiments, some aspects of process 900 may be implemented as software (e.g., program codes or instructions) that are stored in a memory (e.g., memory device 411 of extended reality unit 204, shown in FIG. 4) or a non-transitory computer readable medium. In some embodiments, some aspects of process 900 may be implemented as hardware (e.g., a specific-purpose circuit). In some embodiments, process 900 may be implemented as a combination of software and hardware.

Referring to FIG. 9, process 900 may include a step 902 of receiving data representing virtual content in an extended reality environment associated with a wearable extended reality appliance. As described earlier, data formatted for displaying virtual content in an extended reality environment via a wearable extended reality appliance may be received. For example, the data may be generated by a processor configured with the wearable extended reality appliance or may be received from an external computing device via a transceiver.

By way of a non-limiting example with reference to FIG. 6, processing device 460 (FIG. 4) of wearable extended reality appliance 110 may receive data representing virtual content (e.g., virtual widgets 114D and 114D, and virtual screen) in extended reality environment 620 associated with a wearable extended reality appliance 110.

Process 900 may include a step 904 of identifying in the extended reality environment a first display region and a second display region separated from the first display region may be identified. As described earlier, the extended reality environment may include a virtual display generated, for example, by a wearable extended reality appliance. A processing device may be configured to identify one or more regions in the virtual display. For example, a processing device may identify a first region associated with work-related content, and a second region associated with personal content.

By way of a non-limiting example, processing device 460 (FIG. 4) of wearable extended reality appliance 110 may identify in extended reality environment 620 (FIG. 6), display regions 602 and display region 604 separated from first display region 602. Display region 602 may be associated with displaying work-related documents, such as charts and text documents for editing. Display region 604 may be associated with displaying virtual accessories to assist user 100, such as virtual widgets 114C and 114D providing weather updates and notifications, respectively.

Process 900 may include a step 906 of determining a first duty cycle configuration for the first display region. As described earlier, a processing device may be configured to determine a duty cycle configuration for the first display region, for example to adjust the intensity of the display, and/or manage power consumption. For example, if the first display region is for work-related content, a relatively high duty cycle configuration (e.g., 80%) may be determined, e.g., to draw the attention of the user. By way of a non-limiting example, processing device 460 (FIG. 4) of wearable extended reality appliance 110 may determine duty cycle configuration 610 for display region 602 in FIG. 6. For example, processing device 460 may determine that display region 602 is currently the primary area of focus for user 100 and may apply a duty cycle configuration of 60%.

Process 900 may include a step 908 of determining a second duty cycle configuration for the second display region, where the second duty cycle configuration differs from the first duty cycle configuration. As described earlier, the virtual display generated, for example, by a wearable extended reality appliance may include first and second display regions. A processing device may be configured to determine a different duty cycle configuration for each display region, for example to separately adjust the intensity of the display and/or power consumption for each display region. For example, the second display region may be designated for personal content and the first display region may be designated for work related content. While the wearer of the extended reality applicant is engaged in work, the processing device may determine a lower duty cycle configuration (e.g., 40%) for the second display region, e.g., to facilitate the wearer in maintaining focus on the work-related content.

By way of a non-limiting example, processing device 460 (FIG. 4) of wearable extended reality appliance 110 may determine duty cycle configuration 612 (e.g., 20%) for display region 604, which differs from duty cycle configuration 610 (e.g., 60%) determined for display region 602 of FIG. 6. The different duty cycle configurations 610 and 612 applied to each display region 602 and 604, respectively, may facilitate user 100 in concentrating on display region 602, and avoid being distracted by updates from virtual widgets 114C and 114D in display region 604.

Process 900 may include a step 910 of causing the wearable extended reality appliance to display the virtual content in accordance with the determined first duty cycle configuration for the first display region and the determined second duty cycle configuration for the second display region. As described earlier, a processing device may be configured to control the display of virtual content in different display regions of a virtual display generated by a wearable extended reality appliance. For example, the processing device may control the display of the virtual content by determining the duty cycle configuration for applying to each display region. Additionally, the processing device may cause the wearable extended reality device to display virtual content in each display region according to each determined duty cycle configuration. For example, the processing device may control signals (e.g., by controlling the level, intensity, frequency, timing, power level, phase, and any other signal attribute affecting the duty cycle) carried to each display region via one or more data and/or power lines coupling the processing device to each display region of the display of the wearable extended reality appliance. Consequently, content in the first display region may be displayed according to the first duty cycle configuration, and content in the second display region may be displayed according to the second duty cycle configuration. Returning to the example above, work-related content may be displayed in the first display region according to an 80% duty cycle and personal content may be displayed in the second display region according to a 40% duty cycle.

By way of a non-limiting example, processing device 460 (FIG. 4) of wearable extended reality appliance 110 may cause wearable extended reality appliance 110 to display virtual screen 112 in display region 604 of FIG. 6 according to duty cycle configuration 610 and virtual widgets 114C and 114D in display region 606 according to duty cycle configuration 610.

Extended reality environments may include virtual and physical display areas, such as virtual displays (e.g., bounded regions defining virtual screens), and physical objects such as walls and surfaces. An extended reality appliance may present virtual objects anywhere in the extended reality environment, at differing distances from a user. Users may wish to organize virtual objects, such as to unclutter a virtual display area or to change a presentation mode for content. For example, content extracted from a virtual display may be modified (e.g., magnified) when presented outside the virtual display.

The description that follows includes references to smart glasses as an exemplary implementation of a wearable extended reality appliance. It is to be understood that these examples are merely intended to assist in gaining a conceptual understanding of disclosed embodiments, and do not limit the disclosure to any particular implementation for a wearable extended reality appliance. The disclosure is thus understood to relate to any implementation for a wearable extended reality appliance, including implementations different than smart glasses.

Some embodiments involve a non-transitory computer readable medium containing instructions that when executed by at least one processor cause the at least one processor to perform operations for extracting content from a virtual display. The term "non-transitory computer-readable medium" may be understood as described earlier. The term "instructions" may refer to program code instructions that may be executed by a computer processor. The instructions may be written in any type of computer programming language, such as an interpretive language (e.g., scripting languages such as HTML and JavaScript), a procedural or functional language (e.g., C or Pascal that may be compiled for converting to executable code), object-oriented programming language (e.g., Java or Python), logical programming language (e.g., Prolog or Answer Set Programming), or any other programming language. In some embodiments, the instructions may implement methods associated with machine learning, deep learning, artificial intelligence, digital image processing, and any other computer processing technique. The term "processor" may be understood as described earlier. For example, the at least one processor may be one or more of server 210 of FIG. 2, mobile communications device 206, processing device 360 of FIG. 3, processing device 460 of FIG. 4, processing device 560 of FIG. 5), and the instructions may be stored at any of memory devices 212, 311, 411, or 511, or a memory of mobile device 206. The term "content" may refer to data or media formatted for presenting information to a user via, for example, an interface of an electronic device. Content may include, for example, any combination of data formatted as alphanumerical text, image data, audio data, video data, and any other data type for conveying information to a user. The term "extracting content" may refer to content that is separated or pulled out, e.g., from other content. The term "virtual display" may refer to a virtual object mimicking and/or extending the functionality of a physical display screen, as described earlier. A virtual display may function as a container (e.g., 2D frame or 3D box) for multiple other virtual objects.

For example, at least one processor may display virtual content, including multiple virtual objects, via a wearable extended reality appliance. One of the virtual objects may be a virtual display containing one more of the other virtual objects, e.g., as a frame or box encasing a group of the other virtual objects. The at least one processor may execute instructions to separate or pull out (e.g., extract) one or more virtual objects (e.g., content) of the group of objects contained in the virtual display. As an example, a virtual display may contain a group of virtual objects, including a virtual document and several virtual widgets and the at least one processor may remove one of the widgets (e.g., extract content) from the virtual display.

Figure 10:
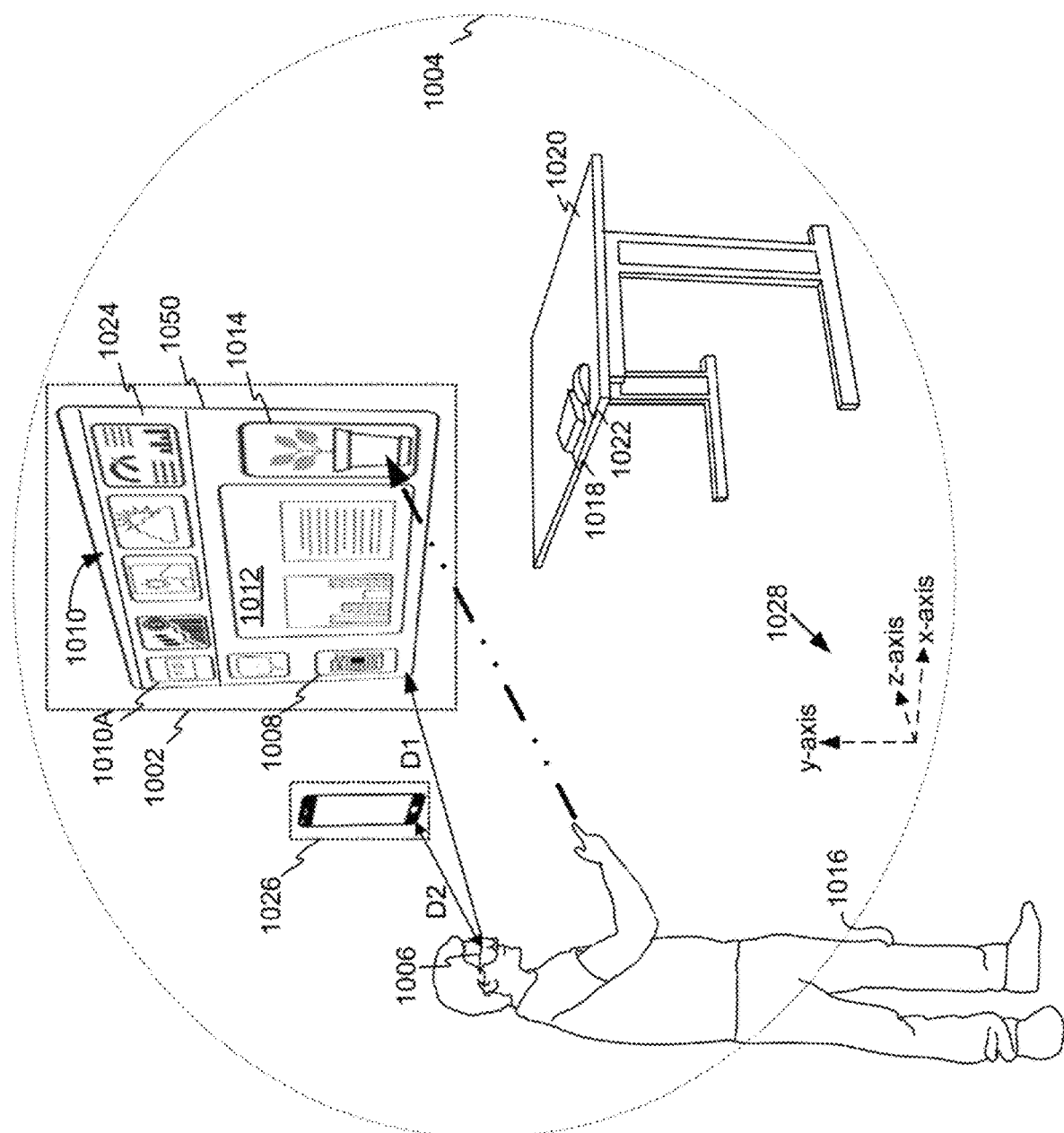
FIGS. 10 and 11 each illustrate an exemplary environment depicting a wearer of a wearable extended reality appliance moving content between a virtual display and an extended reality environment, consistent with some embodiments of the present disclosure.

By way of a non-limiting example, FIG. 10 illustrates an exemplary environment depicting a user 1016 of a wearable extended reality appliance (e.g., a pair of smart glasses 1006) moving content between a virtual display 1002 and an extended reality environment 1004. Extended reality environment 1004 may be generated via a system (e.g., system 200 of FIG. 2). Virtual display 1002 may serve as a frame containing a group 1050 of multiple virtual objects, such as a virtual document 1008, virtual widgets 1010 inside a virtual menu bar 1024, a virtual workspace 1012, and a virtual house plant 1014. A user 1016 donning smart glasses 1006 may interface with content displayed by smart glasses 1006, e.g., via gestures, voice commands, keystrokes on a keyboard 1018, a pointing device such as an electronic mouse 1022, or any other user interfacing means. Processing device 460 (FIG. 4) may extract content from virtual display 1002, (e.g., in response to input from user 1016). As an example, processing device 460 may extract virtual house plant 1014 from virtual display 1002.

Some embodiments involve generating a virtual display via a wearable extended reality appliance, wherein the virtual display presents a group of virtual objects and is located at a first virtual distance from the wearable extended reality appliance. The terms "virtual display" and "wearable extended reality appliance" may be understood as described earlier. The term "generating" may refer to producing, synthesizing, constructing, or creating. The term "virtual object" may refer to a visual rendition of an item by a computer. Such an object may have any form, such as an inanimate virtual object (e.g., icon, widget, document; representation of furniture, a vehicle, real property, or personal property; an animate virtual object (e.g., human, animal, robot); or any other computer-generated or computer supplied representation) as described earlier. For example, an extended reality appliance may produce (e.g., generate) a virtual object by activating selected pixels to render the virtual object overlaid against the physical environment surrounding the user and viewable through transparent portions of the viewer. The term "presents" may refer to displaying, demonstrating, or communicating, e.g., to convey information encoded as text, image data, audio data, video data, haptic data, or any other communications medium. For example, an electronic display may present information visually, and a speaker may present information audibly. The term "group of virtual objects" may refer to a collection or cluster of one or more virtual objects. As an example, one or more virtual objects may be grouped inside a virtual display of the wearable extended reality appliance. The term "located" may refer to a station, placement, or position of an object. The term "virtual distance" may refer to a spatial separation or gap between a wearable extended reality appliance and one or more virtual objects or between the one or more virtual objects, as perceived by a user wearing the wearable extended reality appliance. The distance may be along a two-dimensional plane (e.g., the floor), or through a three-dimensional volume (e.g., accounting for the height of the surrounding physical environment in addition to floor distance). The distance may be absolute (e.g., relative to the Earth, or based on GPS coordinates), or relative (e.g., with respect to an object in the extended reality environment). The distance may be relative to a physical object, a virtual object, the wearable extended reality appliance, and/or the user (e.g., the distance may be relative to more than one reference). As an example, the wearable extended reality appliance may present multiple virtual objects inside a virtual display appearing as though located at particular spatial separations from the user (e.g., at arm's length, or on a wall opposite the user).

By way of a non-limiting example, in FIG. 10, smart glasses 1006 may produce (e.g., generate) virtual display 1002 as a frame containing group 1050 of multiple virtual objects, such as virtual document 100, virtual widgets 1010 inside virtual menu bar 1024, virtual workspace 1012, and virtual house plant 1014. Smart glasses 1006 may display virtual display 1002 to appear at a virtual distance D1 from user 1016. For example, D1 may be measured relative to a 3D coordinate system 1028 as the distance from smart glasses 1006 to the bottom left corner of virtual display 1002.

Some embodiments involve generating an extended reality environment via the wearable extended reality appliance, wherein the extended reality environment includes at least one additional virtual object presented at a second virtual distance from the wearable extended reality appliance. The term "extended reality environment," e.g., also referred to as "extended reality," "extended reality space," or "extended environment," may refer to all types of real- and -virtual combined environments and human-machine interactions at least partially generated by computer technology, as described earlier. For example, an extended reality environment may encompass the field-of-view of a user donning a wearable extended reality appliance and may include the physical environment surrounding the user as well as virtual content superimposed thereon. A processing device of the wearable extended reality appliance may produce or generate an extended reality environment by selectively activating certain pixels of a viewer of the wearable extended reality appliance to render virtual content overlaid on the physical environment viewable via transparent portions of the viewer.

For example, the extended reality environment created by the wearable extended reality appliance may contain multiple virtual objects. Some virtual objects may be grouped inside a virtual display positioned at a first perceived (e.g., virtual) distance from the user. The wearable may display at least one additional virtual object at a second virtual distance from the user. The first and second virtual distances may be measured across a 2D plane (e.g., the floor), or through a 3D space of the extended reality environment (e.g., to account for a height of displayed content). The first and second virtual distances may be the same or different (e.g., larger, or smaller). As an example, the first and second virtual distances may be substantially the same as measured across the floor (e.g., in 2D) but may differ along the height dimension. As another example, the first and second virtual distances may differ in one or more directions as measured across the floor (e.g., in 2D) and also along the height dimension.

As an example, the at least one processor may determine the first and/or second virtual distances based on a 3D spatial map of the physical environment surrounding the wearable extended reality appliance (e.g., as a mesh of triangles or a fused point cloud). The first and/or second virtual distances may be determined based on one or more physical objects in the extended reality environment, data stored in memory (e.g., for the location of stationary objects), predicted behavior and/or preferences of the wearer of the wearable extended reality appliance, ambient conditions (e.g., light, sound, dust), and any other criterion for determining a distance for presenting virtual objects. For example, a physical object may be detected via sensors interface 472 of FIG. 4).

By way of a non-limiting example, in FIG. 10, smart glasses 1006 may generate extended reality environment 1004 to include virtual content, such as virtual objects grouped inside virtual display 1002 and virtual mobile phone 1026. Processing device 460 (FIG. 4) may display the virtual content overlaid on the surrounding physical environment seen by user 1016 through smart glasses 1006. Processing device 460 may display virtual display 1002 to appear at a distance D1 from user 1016 and may display virtual mobile phone 1026 to appear at a distance D2 from user 1016.

Some embodiments involve receiving input for causing a specific virtual object from the group of virtual objects to move from the virtual display to the extended reality environment. The term "receiving" may refer to accepting delivery of, acquiring, retrieving, obtaining, or otherwise gaining access. The term "input" may include information, such as a stimulus, response, command, or instruction, e.g., targeted to a processing device. For example, an input provided by a user may be received by the at least one processor via an input interface (e.g., input interface 430 of FIG. 4 and/or input interface 330 of FIG. 3), by a sensor associated with the wearable extended reality appliance (e.g., sensor interface 470 or 370), by a different computing device communicatively coupled to the wearable extended reality appliance (e.g., mobile device 206 and/or remote processing unit 208 of FIG. 2), or any other source of input. A user input may be provided via a keyboard, a touch sensitive screen, an electronic pointing device, a microphone (e.g., as audio input or voice commands), a camera (e.g., as gesture input), or any other user interfacing means. An environmental input (e.g., relating to ambient noise, light, dust, physical objects, or persons in the extended reality environment) may be provided via one or more sensors (e.g., sensor interface 470 or 370). A device input (e.g., relating to processing, memory, and/or communications bandwidth) may be received by a processing device (e.g., any of server 210 of FIG. 2, mobile communications device 206, processing device 360, processing device 460, or processing device 560 of FIG. 5).

The term "causing" may refer to invoking or triggering an action or effect. For example, a user input to open an application may lead (e.g., cause) at least one processor to open the application. As another example, an ambient light level may be received (e.g., as an environmental input) leading to (e.g., causing) at least one processor to adjust the brightness of displayed content. The term "specific virtual object from the group of virtual objects" may refer to a distinct, or particular virtual object out of a collection of multiple virtual objects. The term "move" may refer to relocating or changing a position. For example, a specific widget (e.g., a specific virtual object) included in a group of virtual objects displayed inside a virtual display may be relocated (e.g., moved) to a different location in the extended reality environment, external to the virtual display, e.g., in response to an input. The input may be a user input, e.g., requesting to move the specific widget, an environmental input, e.g., an ambient light setting affecting the visibility of displayed objects, a device input, e.g., relating to the operation of the wearable extended reality appliance, or any other type of input.

As an example, a wearable extended reality appliance may present a virtual display presenting a group of multiple virtual objects. An input may be received to cause a particular one of the multiple virtual objects to be relocated to a different display location, outside the virtual display. The input may be received from a user who may wish to view the specific virtual object from a distance nearer than the virtual display. As another example, the input may be received from a sensor detecting an obstruction (e.g., bright light, or obstructing object) blocking the specific virtual object. As yet another example, the input may be received from a software application monitoring the density of content displayed inside the virtual display.

Some embodiments include receiving the input from an image sensor indicative of a gesture initiated by a user of the wearable extended reality appliance. The term "image sensor" may include a detector (e.g., a camera) configured to capture visual information by converting light to image data, as described earlier. The term "gesture" may refer to a movement or sequence of movements of part of the body, such as a hand, arm, head, foot, or leg to express an idea or meaning. A gesture may be a form of non-verbal or non-vocal communication in which visible bodily actions or movements communicate particular messages. A gesture may be used to communicate in place of, or in conjunction with vocal communication. For example, raising a hand with the palm forward may be a hand gesture indicating to stop or halt an activity, and raising a thumb with the first closed may indicate approval. A gesture may be detected as an input using an image sensor (e.g., image sensor 472 of FIG. 4) and/or a motion detector (e.g., motion sensor 473) associated with the wearable extended reality appliance. In some examples, the input from the image sensor (such as images and/or videos captured using the image sensor) may be analyzed (for example, using a gesture recognition algorithm) to identify the gesture initiated by the user. In one example, the gesture may be indicative of a desire of the user to cause the specific virtual object to move from the virtual display to the extended reality environment. In one example, the gesture may be indicative of the specific virtual object and/or of a desired position in the extended reality environment for the specific virtual object.

Figure 11:
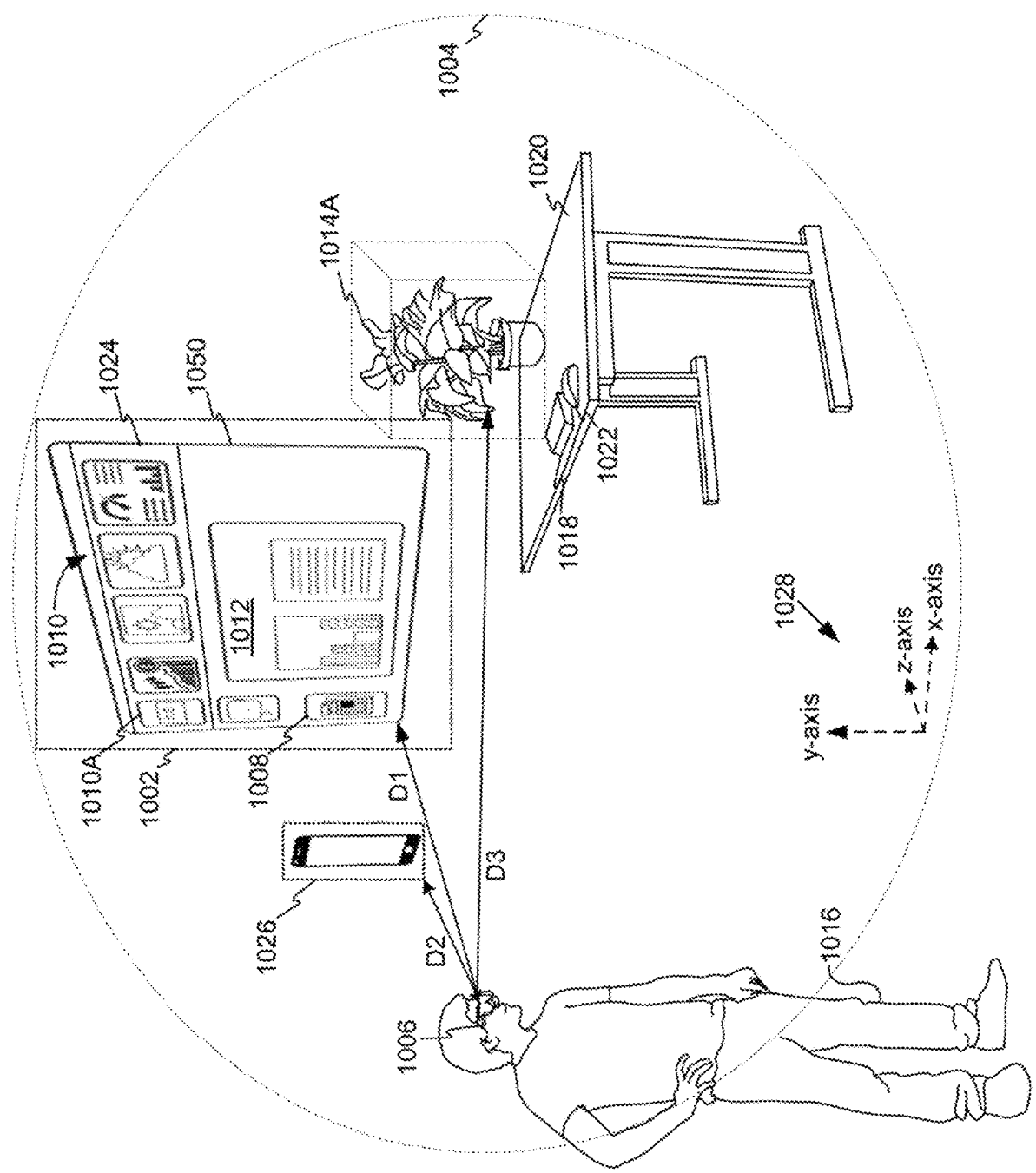

By way of a non-limiting example, reference is made to FIG. 11, which is substantially similar to FIG. 10 with a noted difference in FIG. 10, virtual house plant 1014 is presented inside virtual display 1002, and in FIG. 11, version 1014A of virtual house plant 1014 is displayed external to virtual display 1002, as though resting on a desk top 1020. In FIG. 10, image sensor 472 of smart glasses 1006 may capture an image of a pointing gesture performed by user 1016. Processing device 460 (FIG. 4) may analyze the image using a gesture recognition algorithm and identify the pointing gesture as a user input requesting to relocate (e.g., move) a specific virtual object (e.g., a particular virtual object such as virtual house plant 1014) external to virtual display 1002. In FIG. 11, processing device 460 may respond to the user input by causing virtual house plant 1014 of group 1050 of virtual objects to be displayed at a new location in extended reality environment 1004, external to virtual display 1002, e.g., as though resting on desk top 1020. In some implementations, processing device 460 may present virtual house plant 1014 inside virtual display 1002 concurrently with displaying version 1014A of virtual house plant 1014 external to virtual display 1002.

In some embodiments the input includes at least one signal reflecting keystrokes on a keyboard. The term "signal" may refer to a function that can vary over space and time to convey information observed about a phenomenon via a physical medium. For example, a signal may be implemented in any range of the electromagnetic spectrum (e.g., radio, IR, optic), as an acoustic signal (e.g., audio, sonar, ultrasound), a mechanical signal (e.g., pressure or vibration), as an electric or magnetic signal, or any other type of signal. The phenomenon communicated by the signal may relate to a state, the presence or absence of an object, an occurrence or development of an event or action, or lack thereof. The term "reflecting" may refer to expressing, telling, or revealing a causality or consequence due to an action or state (e.g., temporary, or steady state). The term "keystroke" may refer to an action associated with selecting or operating a key of a physical or virtual keyboard. The term "keyboard" may refer to an input device including multiple keys, each representing an alphanumeric character (letters and numbers), and optionally including a numeric keypad, special function keys, mouse cursor moving keys, and status lights, as described earlier. A keystroke may be implemented by pressing a key of a mechanical keyboard, by touching or swiping a key of a keyboard displayed on a touch-sensitive screen, by performing a typing gesture on a virtual or projected keyboard, or by any other technique for selecting a key. The at least one processor may receive a signal associated with the input indicating (e.g., reflecting) one or more keystrokes performed by the user on a keyboard. In one example, the keystrokes may be indicative of a desire of the user to cause the specific virtual object to move from the virtual display to the extended reality environment. In one example, the keystrokes may be indicative of the specific virtual object and/or of a desired position in the extended reality environment for the specific virtual object.

By way of a non-limiting example, in FIG. 11, user 1016 may enter a request to remove virtual house plant 1014 from virtual display 1002 by performing one or more keystrokes on keyboard 1018 resting on desk top 1020. Processing device 460 (FIG. 4) of smart glasses 1006 may receive one or more signals associated with the keystrokes (e.g., via network interfaces 320 of FIG. 3 and 420 of FIG. 4) as a user input and respond to the input accordingly.

In some embodiments the input includes at least one signal reflecting a movement of a pointer. The term "movement" may refer to a motion dynamically changing a location, position and/or orientation, e.g., of a virtual or physical object. The term "pointer" may include technology enabling the selection of content by targeting the selected content in a focused manner. A pointer may be an electronic pointing device or may be implemented as a bodily gesture e.g., by the eye, head, finger, hand, foot, arm, leg, or any other moveable part of the body. Examples of electronic pointing devices may include an electronic mouse, stylus, pointing stick, or any other electronic pointing device. For example, a processing device may detect an IR signal of an electronic pointer maneuvered by a user. Alternatively, an image and/or motion sensor (e.g., image sensor 472 and/or motion sensor 373 of FIG. 4) may detect a pointing gesture by a user. In one example, the movement of the pointer may be indicative of a desire of the user to cause the specific virtual object to move from the virtual display to the extended reality environment. In one example, the movement of the pointer may be indicative of the specific virtual object and/or of a desired position in the extended reality environment for the specific virtual object.

As an example, a user may extend the index finger to target (e.g., point to) a specific virtual object. Light reflecting off the index finger may be captured (e.g., via image sensor 472 of FIG. 4) and stored as one or more images. The at least one processor may analyze the one or more images to detect a pointing gesture by the index finger (e.g., movement of a pointer) in the direction of the virtual object. As another example, a user may manipulate an IR pointer in the direction of a virtual display. An IR sensor (e.g., sensor 472) may detect IR light (e.g., a signal) emitted by the IR pointer and send a corresponding signal to the at least one processor. The at least one processor may analyze the signal to determine the IR pointer targeting the specific virtual object.

By way of a non-limiting example, in FIG. 11, user 1016 may remove virtual house plant 1014 from virtual display 1002 by selecting and dragging virtual house plant 1014 to desk top 1020, external to virtual display 1002. Processing device 460 (FIG. 4) of smart glasses 1006 may detect the selecting and dragging operations of electronic mouse 1022 (e.g., via network interfaces 320 of FIGS. 3 and 420 of FIG. 4) and display version 1014A of virtual house plant 1014 at the location indicated by electronic mouse 1022.

Some embodiments further include analyzing the input from a pointing device to determine a cursor drag-and-drop movement of the specific virtual object to a location outside the virtual display. The term "analyzing" may refer to investigating, scrutinizing and/or studying a data set, e.g., to determine a correlation, association, pattern, or lack thereof within the data set or with respect to a different data set. The term "pointing device" may refer to a pointer implemented as an electronic pointing device, as described earlier. The term "determine" may refer to performing a computation, or calculation to arrive at a conclusive or decisive outcome. The term "cursor drag-and-drop movement" may refer to interfacing with displayed content using a pointing device to control a cursor. A cursor may be a movable graphic indicator on a display identifying the point or object affected by user input. For example, a user may select a virtual object by controlling the pointing device to position the cursor on the virtual object and pushing a button of the pointing device. The user may move (e.g., drag) the selected object to a desired location by moving the pointing device while the object is selected (e.g., while pressing the button). The user may position the selected object at the desired location by releasing (e.g., dropping) the selection via the pointing device (e.g., by releasing the button). The combination of these actions may be interpreted by the at least one processor as a cursor drag-and-drop movement. The pointing device may include one or more sensors to detect a push and/or release of a button of the pointing device, and one or more motion sensors to detect dragging a selected object to a desired location. An input received from a pointing device may include electronic signals (e.g., caused by pressing or releasing a button, or a motion of a roller ball), IR, ultrasound, radio (e.g., Bluetooth, Wi-Fi), IMU, and any other type of signal indicating selection, dragging, and dropping by a pointing device. The one or more sensors may convert the input to an electronic signal and provide the electronic signal to the at least one processor, as described earlier. The term "location" may refer to a position or region, e.g., inside a larger area. A location may be relative to a physical and/or virtual object. For example, the location outside the virtual display may be relative to the wearable extended reality appliance, to an absolute coordinate system (e.g., GPS), to a physical object (e.g., a desk or wall), to virtual content such as the virtual display, or to any other reference. In one example, the cursor drag-and-drop movement may be indicative of a desire of the user to cause the specific virtual object to move from the virtual display to the extended reality environment. In one example, the cursor drag-and-drop movement may be indicative of the specific virtual object and/or of the location outside the virtual display.

As an example, a user may maneuver a pointing device to move a specific virtual object to a different location external to the virtual display. The user may control the pointing device to position the cursor on a virtual object, press a button of the pointing device to select the virtual object, move the pointing device while pressing the button to reposition the selected object to a new location external to the virtual display, and release the pressed button to drop the virtual object at the new location. The pointing device may provide inputs to the at least one processor indicative of the cursor position, button press, dragging motion, and button release. The at least one processor may analyze the inputs to determine a cursor drag-and-drop movement by the pointing device relocating the virtual object to the new location, e.g., outside the virtual display. In response, the processing device may display the virtual object at the new location.

By way of a non-limiting example, in FIGS. 10 and 11, user 1016 may maneuver electronic mouse 1022 to move virtual house plant 1014 to a location external to virtual display 1002. For example, user 1016 may use electronic mouse 1022 to maneuver a cursor over virtual house plant 1014 and push a button of electronic mouse 1022 to turn the focus thereon. While the focus is on virtual house plant 1014, user 1016 may move (e.g., drag) electronic mouse 1022 to cause a corresponding movement by virtual house plant 1014. When virtual house plant 1014 is positioned on desk top 1020, e.g., external to virtual display 1002, user 1016 may release the button to position (e.g., drop) virtual house plant 1014 on desk top 1020. Throughout the maneuvering by user 1016, electronic mouse 1022 may provide signals indicating any movements, button presses and releases as inputs to processing device 460 (FIG. 4), e.g., as pointer input 331 via input interface 330. Processing device 460 may analyze the inputs and determine a cursor drag-and-drop movement of electronic mouse 1022 corresponding to a repositioning virtual house plant 1014 from inside virtual display 1002 (e.g., as shown in FIG. 10) to desk top 1020, external to virtual display 1002 (e.g., as shown in FIG. 11), and may update the position of virtual house plant 1014, accordingly.

Some embodiments further include analyzing movement of the pointer to determine a selection of an option in a menu bar associated with the specific virtual object. The term "selection" may refer to picking or choosing an object, e.g., from one or more objects. Selecting an object via a pointing device may turn the focus on the selected object such that subsequent input affects the selected object. The term "menu bar" may refer to a graphical control element including one or more selectable items, values, or other graphical widgets (e.g., buttons, checkboxes, list boxes, drop down lists, and pull-down lists). For example, one menu may provide access to functions for interfacing with a computing device and another menu may be used to control the display of content. A menu bar may include multiple drop-down menus that normally hide the list of items contained in the menu. Selecting a menu (e.g., using the pointer) may display the list of items. The term "option in a menu bar" may refer to a specific menu item displayed in the menu bar. The term "associated with" may refer to linked or affiliated with or tied or related to. In one example, the option in the menu bar may be indicative of a desire of the user to cause the specific virtual object to move from the virtual display to the extended reality environment. In one example, the option in the menu bar may be indicative of a desired position in the extended reality environment for the specific virtual object.

As an example, a user may use a pointer to select an option on a menu bar associated with a specific virtual object, (e.g., as pointer input 331 via input interface 330 of FIG. 3). The option may allow altering the display of the virtual object (e.g., to enlarge, shrink, move, hide, or otherwise change the display of the virtual object). The at least one processor may analyze the movements of the pointer to detect the selection of the option and execute a corresponding action.

Some embodiments involve in response to receiving the input, generating a presentation of a version of the specific virtual object in the extended reality environment at a third virtual distance from the wearable extended reality appliance, wherein the third virtual distance differs from the first virtual distance and the second virtual distance. The term "presentation of a version of the specific virtual object" may refer to another rendition or depiction of the specific virtual object. The version of the specific virtual object may be presented alongside or to replace the specific virtual object. The term "differs" may refer to being distinguished or distinct from, or otherwise dissimilar. The term "third virtual distance" may be interpreted in a manner similar to the interpretation of first distance and second distance describe earlier.

For example, the version of the specific virtual object may be displayed (e.g., presented) to appear identical to, similar to, or different from the specific virtual object, e.g., the version of the specific virtual object may be a smaller or larger replica of the specific virtual object. As another example, the version of the specific virtual object may appear identical or similar to the specific virtual object but may be displayed in a different location, e.g., the specific virtual object may be displayed inside a virtual display, whereas the version of the specific object may appear identical but may be displayed external to the virtual display. As another example, the orientations or angular distances of the specific virtual object and the version of the specific virtual object relative to the user and/or the wearable extended reality appliance may be the same or different. As another example, the version of the virtual object may be presented inside the field-of-view of the wearable extended reality appliance, outside the field-of-view, or partially inside and partially outside the field-of-view. As a further example, the version of the specific virtual object may be rendered differently, e.g., using different colors, resolution, or a different coordinate system, e.g., the specific virtual object may be displayed as a two-dimensional (e.g., simplified) object, and the version of the specific virtual object may be presented as a three-dimensional life-like object. Thus, upon receiving an input to move a widget (e.g., specific virtual object) from the virtual display), the wearable extended reality appliance may generate a version of the widget and display the version at a virtual distance different than the virtual distance to the virtual display and to the additional virtual object.

By way of a non-limiting example, In FIG. 10, smart glasses 1006 may visually present virtual display 1002 and virtual mobile phone 1026 at virtual distances D1 and D2, respectively, from user 1016 (e.g., measured with respect to 3D coordinate system 1028). User 1016 may perform a gesture corresponding to a request to move virtual house plant 1014 to a location in extended reality environment 1004, external to virtual display 1002. The gesture may be detected via image sensor 474 (FIG. 4). Processing device 460 may analyze image data acquired by image sensor 474 to identify the gesture as a user input. In FIG. 11, in response to the user input, processing device 460 may obtain a version 1014A of virtual house plant 1014 (e.g., by retrieving version 1014A from memory device 411). Processing device 460 may display version 1014A to appear as though resting on desk top 1020 at a distance D3 from user 1016, where D3 differs from D1 and D2 (e.g., with respect to 3D coordinate system 1028). While the example of FIG. 11 shows version 1014A replacing virtual house plant 1014, in some implementations, version 1014A may be displayed alongside (e.g., concurrently with) virtual house plant 1014. In some implementations, version 1014A may be displayed differently (e.g., larger/smaller, higher/lower resolution, modified color scheme) than virtual house plant 1014, e.g., virtual house plant 1014 may be rendered as a 2D graphic image, and version 1014A may be rendered as a 3D graphic image.

In some embodiments, when the specific virtual object is a window including a group of control buttons in a particular area of the window, the group of control buttons include at least a control button for minimizing the window, a control button for maximizing the window, a control button for closing the window, and a control button for moving the window outside the virtual display; and wherein the input includes an activation of the control button for moving the window outside the virtual display. The term "window" may refer to a graphic control element (e.g., 2D or 3D) providing a separate viewing area on a display screen. A window may provide a single viewing area, and multiple windows may each provide a different viewing area. A window may be part of a graphical user interface (GUI) allowing users to input and view output and may include control elements, such as a menu bar along the top border. A window may be associated with a specific application (e.g., text editor, spread sheet, image editor) and may overlap or be displayed alongside other windows associated with the same, or different applications. A window may be resized (e.g., widened, narrowed, lengthened, or shortened), opened (e.g., by double clicking on an icon or menu item associated with the window), or closed (e.g., by selecting an "X" control element displayed at a corner of the window. The term "control button" may refer to a graphic element that invokes an action upon selection (e.g., via a pointing device, keystroke, or gesture). For example, an operating system may receive a notification when the user selects a control button and may schedule a processing device to execute a corresponding action. The term "group of control buttons" may refer to a collection of one or more control buttons. The term "particular area of the window" may refer to a specific region within a window graphic control element, e.g., the group of control buttons may be located in a specific region of a window, such as across the top, or along a side as a menu bar. The term "minimizing the window" may refer to collapsing the window such to hide the window from view while allowing an application associated with the window to continue running. A minimized window may appear at the bottom of a display as an icon inside a task bar. The term "maximizing the window" may refer to expanding the window to occupy some or all of the display screen. The term "closing the window" may refer to removing the window from a display screen and halting the execution of the associated application. The term "moving the window" may refer to changing the position of a window in a display screen. As an example, a window may be dragged up/down, right/left or diagonally across a two-dimensional display. In a 3D-environment, such as an extended reality environment generated by a wearable extended reality appliance, a window may be additionally or alternatively dragged inwards/outwards. The term "activation of the control button for moving the window outside the virtual display" may be understood as selecting the control button to invoke an action that relocates the window external to the virtual display.

As an example, a virtual display may include a window containing a virtual document. The window may be sized to fit inside the virtual display alongside other virtual objects and may include a menu bar with control buttons to minimize, maximize, close, and move the window. A user wishing to read and edit the virtual document may select the control button to move the window out of the virtual display, to display the window closer and larger (e.g., using a larger font size).

Figure 12:
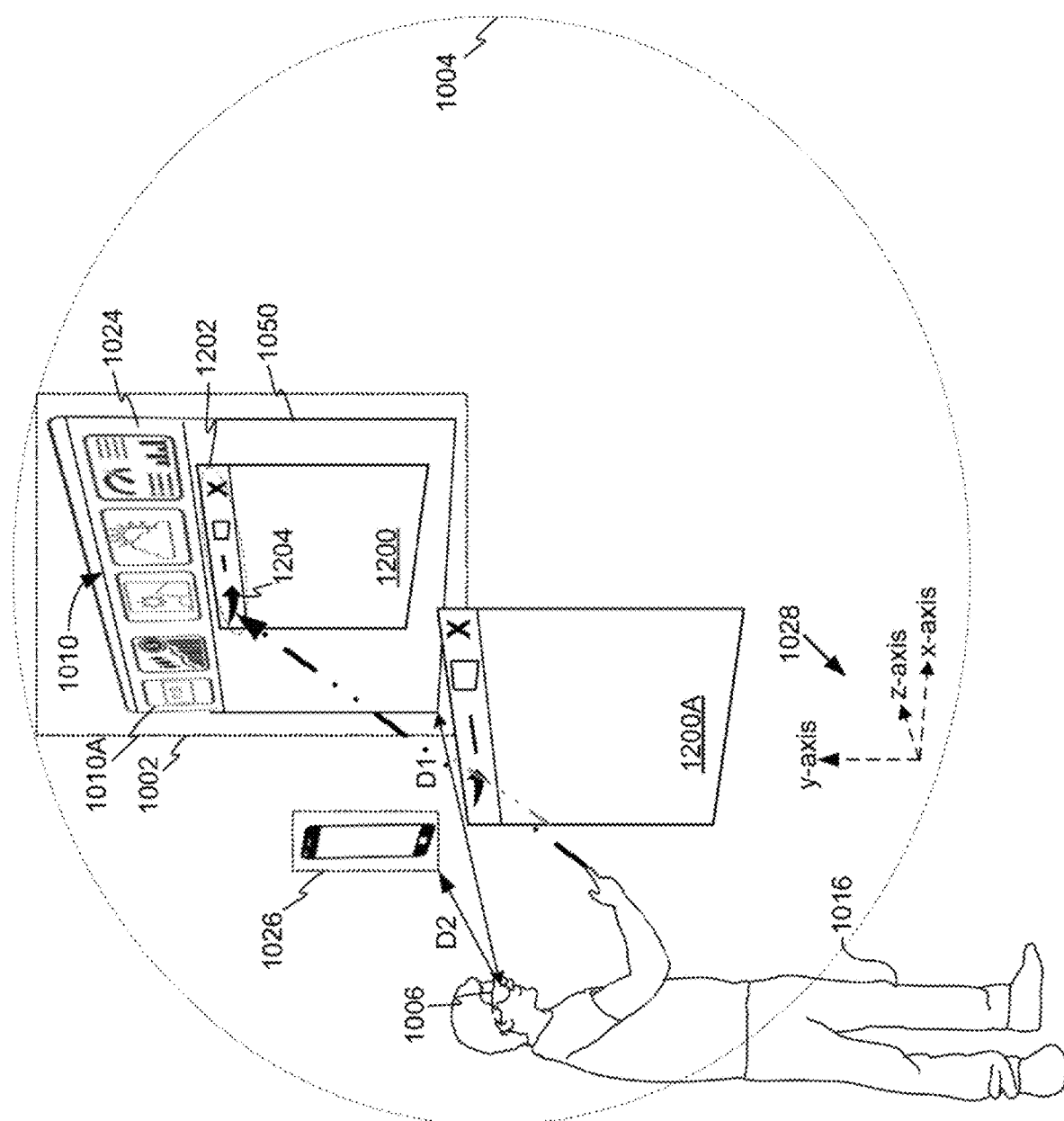
FIG. 12 illustrates an exemplary environment depicting the wearer moving a window from a virtual display to an extended reality environment using a control button, consistent with some embodiments of the present disclosure.

By way of a non-limiting example, reference is made to FIG. 12, which illustrates the exemplary environment of FIGS. 10 and 11 (e.g., generated by system 200) where the content includes a window having a control button for moving content between a virtual display and an extended reality environment, consistent with some embodiments of the present disclosure. FIG. 12 is substantially similar to FIGS. 10 and 11 with the noted difference that virtual display 1002 may present a window 1200 associated with a text editing application. Window 1200 may include a group 1202 of control buttons at the top region of window 1200. From right to left, group 1202 of control buttons may include buttons for closing, maximizing, and minimizing, window 1200, and additionally a control button 1204 for moving window 1200 outside of virtual display 1002. User 1016 may activate control button 1204 by performing a pointing gesture (e.g., captured as image data via image sensor 472 of FIG. 4), using a mouse cursor, using a keyboard, and so forth. In response, processing device 460 may display version 1200A of window 1200 external to virtual display 1002.

Some embodiments involve causing, in response to receiving the input, a presentation of the specific virtual object to be removed from the virtual display. The term "removed" may refer to eliminated or erased. Thus, in response to the input, the wearable extended reality appliance may display a version (e.g., copy) of the specific object in a region external to the virtual display and may remove the presentation of the virtual object from inside the virtual display.

By way of a non-limiting example, in FIG. 11, in response to receiving an input from user 1016, processing device 460 (FIG. 4) may display version 1014A of virtual house plant 1014 (FIG. 10) to appear to desk top 1020 (e.g., external to virtual display 1002), and remove virtual house plant 1014 from being displayed inside virtual display 1002.

Some embodiments involve causing, in response to receiving the input, simultaneous presentations of the specific virtual object on the virtual display and the version of the specific virtual object at another location in the extended reality environment. The term "simultaneous" may refer to concurrent, or at substantially the same time. The term "another location" may refer to a separate location, e.g., different from an original location. Thus, in response to the input, the wearable extended reality appliance may display a version (e.g., copy) of the specific object in a region external to the virtual display and concurrently with displaying the virtual object inside the virtual display.

Figure 13:
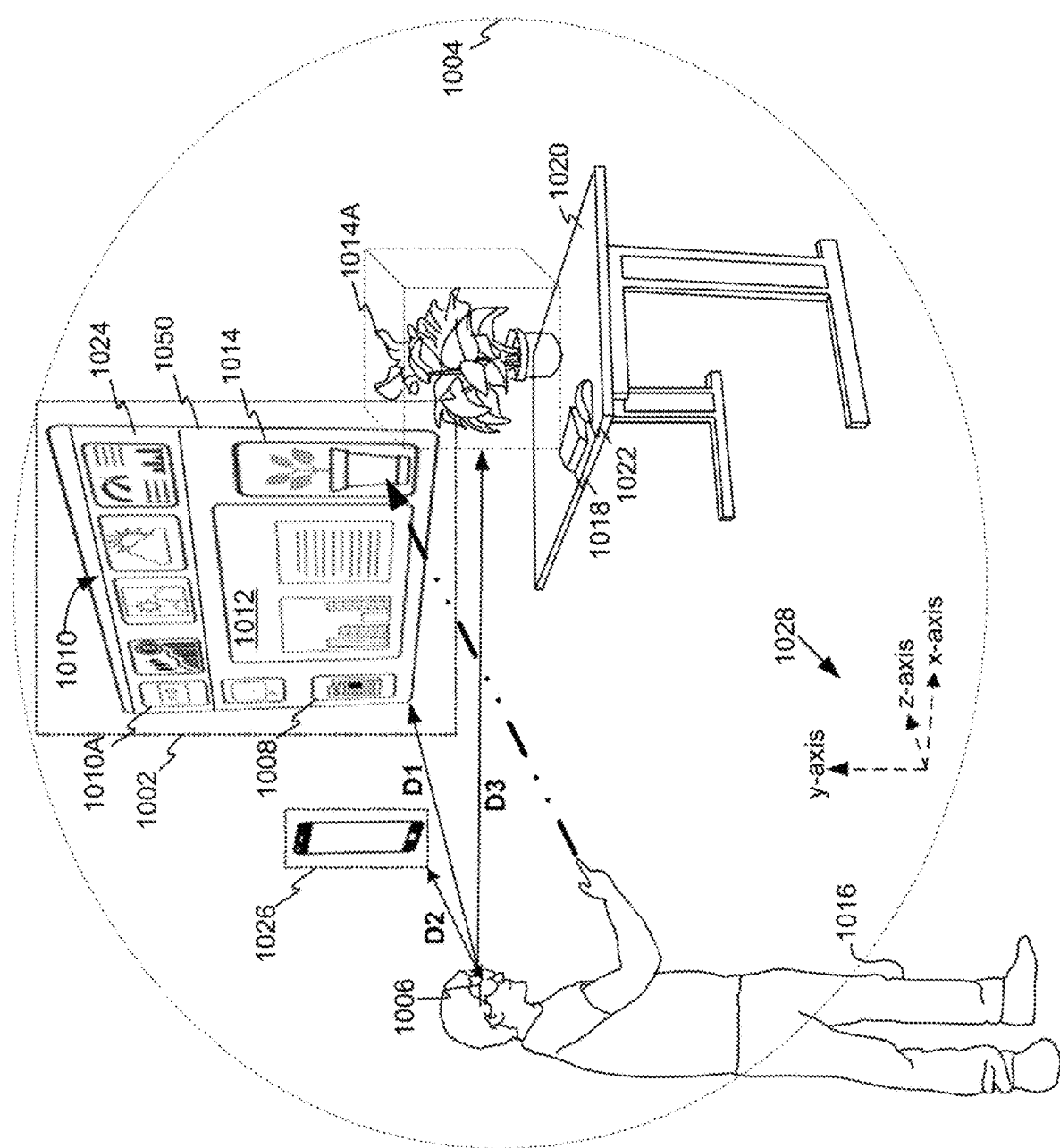
FIG. 13 illustrates an exemplary environment depicting the wearer moving content between the virtual display and the extended reality environment, consistent with some embodiments of the present disclosure.

By way of a non-limiting example, reference is made to FIG. 13 which illustrates the exemplary environment of FIGS. 10 and 11 where a specific virtual object is displayed inside a virtual display concurrently with a version of the specific object displayed external to the virtual display, consistent with some embodiments of the present disclosure. In response to receiving a gesture input from user 1016 to display virtual house plant 1014 external to virtual display 1002, processing device 460 (FIG. 4) may display version 1014A to appear as though resting on desk top 1020 at a distance D3 from smart glasses 1006, concurrently with displaying virtual house plant 1014 inside virtual display 1002 at a distance D from smart glasses 1006. As an example, virtual house plant 1014 may be a two-dimensional icon, and version 1014A may be a realistic three-dimensional rendition of a house plant.

Some embodiments involve determining the third virtual distance for presenting the version of the specific virtual object. The at least one processor may determine the third virtual distance based on, for example, criteria relating to the extended reality environment (e.g., virtual and/or physical considerations), criteria relating to the wearable extended reality appliance (e.g., device considerations), criteria relating to the communications network (e.g., bandwidth considerations), or any other criteria. For example, ambient light, and the presence of obstructing objects may be relevant for determining the third virtual distance. As another example, the type of virtual object may be used to determine the third virtual distance, e.g., a text document may be displayed closer to allow editing, and a decorative virtual object may be displayed further.

By way of a non-limiting example, in FIG. 11, processing device 460 (FIG. 4) may determine virtual distance D3 for presenting version 1014A of virtual house plant 1014. The virtual distance may be based on the distance between user 1016 and desk top 1020.

In some embodiments, the determination of the third virtual distance is based on at least one of the first virtual distance or the second virtual distance. The term "based on" may refer to established or founded upon, or otherwise derived from. For example, the at least one processor may determine the third virtual distance (e.g., the distance for displaying the version of the virtual object extracted from the virtual display) based on one or more of the other distances to the virtual display (e.g., the first virtual distance) and the additional virtual object (e.g., the second virtual distance). The third virtual distance may be determined to avoid obstruction by the virtual display and/or the additional virtual object. The determined third virtual distance may be greater or smaller than one or both the first and second virtual distances, or a combination (e.g., Euclidian distance) of the first and second virtual distances. As an example, the third virtual distance may have the same height along the vertical plane but may differ along the horizontal plane. In some examples, the third virtual distance may be a mathematical function of the first virtual distance and/or the second virtual distance. For example, the mathematical function may be a linear function, may be a non-linear function, may be a polynomial function, may be an exponential function, may be a multivariate function, and so forth.

By way of a non-limiting example, in FIG. 11, processing device 460 (FIG. 4) of smart glasses 1006 may determine virtual distance D3 for displaying version 1014A of virtual house plant 1014 based on virtual distance D1 between virtual display 1002 and user 1016, and/or based on virtual distance D2 between virtual mobile phone 1026 and user 1016. Processing device 460 may determine virtual distance D3 so that virtual house plant 1014A is not obstructed by virtual mobile phone 1026 and/or virtual display 1002.

In some embodiments, the determination of the third virtual distance is based on a type of the specific virtual object. The term "type of the specific virtual object" may refer to a category or classification of the specific virtual object. For example, a virtual object may be classified according to data type (e.g., text, image, video), data size (e.g., related to communications bandwidth, processing, and/or memory requirements), spatial size, whether the specific virtual object is 2D or 3D, whether the specific virtual object is interactive, transparency (e.g., displayed as semi-transparent or opaque), use (e.g., read-only, or editable), priority (e.g., urgent messages or work-related documents versus low priority ornamental objects), security (e.g., proprietary or privileged access), or any other criterion for determining a type for a virtual object.

By way of a non-limiting example, in FIG. 11, processing device 460 (FIG. 4) may determine virtual distance D3 to version 1014A of virtual house plant 1014 based on virtual house plant 1014 being a decorative virtual object. Thus, D3 may be determined to be further from user 1016 than distance D2 to virtual display 1002.

In some embodiments, the determination of the third virtual distance is based on a physical object in the extended reality environment. The term "physical object in the extended reality environment" may refer to a real (e.g., tangible) article or item. For example, a physical object may be a tangible (e.g., real) bookcase, wall, or floor, a light source (e.g., a window, or light fixture), a person or animal. The physical object may be stationary or in motion, all or partially opaque, or transparent. The physical object may be detected by analyzing data acquired via a sensor (e.g., via sensors interface 470 of FIG. 4). For example, image or IR data may be acquired via an image sensor (e.g., image sensor 472 and/or 372 of FIG. 3), motion data may be acquired via a motion sensor (e.g., motion sensor 473 and/or 373), ultrasound and/or other data may be acquired via other sensors (e.g., other sensors 475 and/or 375). For example, image data captured using at least one image sensor may be analyzed using an object detection algorithm to detect the physical object. Thus, the wearable extended reality appliance may determine the distance for displaying the specific virtual object based on one or more physical items present in the extended reality environment, e.g., to prevent obstruction. As another example, the physical object may be used to scale the virtual object (e.g., to appear closer or further) from the wearable extended reality appliance. In some examples, the determination of the at third virtual distance may be based on at least one of a distance to the physical object, a position of the physical object, a size of the physical object, a color of the physical object, or a type of the physical object. In one example, the physical object may include a surface (such as a table including a table top surface), and the third virtual distance may be select to position the version of the specific virtual object on a central portion of the surface. In one example, the third virtual distance may be selected to be shorter than a distance to the physical object, for example to make the specific virtual object hide at least part of the physical object. In one example, the third virtual distance may be selected to be longer than a distance to the physical object, for example to make at least part of the specific virtual object hidden by the physical object. In one example, the third virtual distance may be selected to be similar to a distance to the physical object, for example to make the specific virtual object appear side by side with the physical object.

By way of a non-limiting example, in FIG. 11, processing device 460 (FIG. 4) of smart glasses 1006 may detect physical desk top 1020 inside extended reality environment 1004. Upon receiving an input to extract virtual house plant 1014 from virtual display 1002, processing device 460 may determine to display version 1014A of virtual house plant 1014 to appear as though resting on desk top 1020. Processing device 460 may determine virtual distance D3 separating version 1014A from smart glasses 1006 based on the location of desk top 1020.

Some embodiments involve determining a position for presenting the version of the specific virtual object in the extended reality environment. The term "position" (e.g., for an object in the extended reality environment) may refer to a distance (e.g., relative to a physical and/or virtual object with respect to a 2D or 3D coordinate system) and/or an orientation, bearing, or pose of the object. For example, the position may determine where in the 3D space to display an object, as well as an angular orientation for the object (e.g., turned backwards, upside-down, rotated by an angle). Thus, in response to receiving an input to remove a virtual object from the virtual display, the at least one processor may determine the location and/or orientation, pose, or bearing for the version of the virtual object outside the virtual display. The position may be determined based on other objects (virtual and/or real) in the extended reality environment, on environmental conditions (e.g., ambient light, noise, or wind), on the size and/or shape of the extended reality environment, and any other criterion for determining a position for presenting virtual content. For example, the processor may determine a position of the virtual object in front of, behind, or to one side of another virtual or real object in the extended reality environment.

By way of a non-limiting example, in FIG. 11, processing device 460 (FIG. 4) may determine a position in extended reality environment 1004 for presenting version 1014A of virtual house plant 1014. Processing device 460 may determine the distance D3 between version 1014A of virtual house plant 1014 and smart glasses 1006 as a three-dimensional diagonal with respect to 3D coordinate system 1028. Processing device 460 may additionally determine an orientation for version 1014A of virtual house plant 1014, e.g., with respect to one or more axes of 3D coordinate system 1028. Processing device 460 may determine to orient version 1014A of virtual house plant 1014 such that the pot portion is below the leaves portion (e.g., rotation about the x-axis and z-axis), and to present the largest leaves in the direction of user 1016 (e.g., rotation about the y-axis).

In some embodiments, the determination of the position is based on a physical object in the extended reality environment. For example, the wearable extended reality appliance may determine the position for the version of the specific virtual object based on one or more physical items, e.g., to avoid obstruction by the physical items and/or to integrate the specific virtual object with the physical environment surrounding the user. As another example, the wearable extended reality appliance may determine an angular position or orientation for presenting the version of the specific virtual object in the extended reality environment, e.g., relative to the wearable extended reality appliance and/or the user. In one example, the position for presenting the version of the specific virtual object may be determined based on a third virtual distance, and the third virtual distance may be determined as described earlier. In one example, image data captured using at least one image sensor and/or 3D data captured using Lidar may be analyzed using an object localization algorithm to detect a position of the physical object. Further, the position for presenting the version of the specific virtual object may be a mathematical function of the position of the physical object. In one example, image data captured using at least one image sensor may be analyzed using an object recognition algorithm to identify a type of the physical object. Further, the position for presenting the version of the specific virtual object may be determined based on the type of the physical object.

By way of a non-limiting example, in FIG. 11, processing device 460 (FIG. 4) may detect the presence of physical desk top 1020 in extended reality environment 1004 (e.g., via image sensor 472). Processing device 460 may determine that desk top 1020 may provide a suitable surface for displaying version 1014A of virtual house plant 1014 in a manner that integrates virtual content with the real (e.g., physical) environment surrounding user 1016. Processing device 460 may determine the position for displaying version 1014A of virtual house plant 1014 to appear as though resting on desk top 1020 without colliding with keyboard 1018 and electronic mouse 1022 (e.g., physical objects).

In some embodiments, generating the presentation of the version of the specific virtual object in the extended reality environment includes implementing a modification to the specific virtual object. The term "implementing a modification" may refer to adjusting or changing one or more attributes of the virtual object, e.g., for presenting the specific virtual object. As an example, the modification may include adding or removing an audio presentation (e.g., accompanying sound) for a displayed object, or replacing a displayed object with an audible presentation. As another example, the modification may include adding or removing a haptic response associated with interfacing with the virtual object. As another example, the adjusted attributes may affect the display or appearance of the version of the specific virtual object. For example, such adjusted attributes may include one or more of size, magnification, texture, color, contrast, and other attributes associated with an appearance of the virtual object in the extended reality environment. In yet another example, the modification may include modifying a 2D specific virtual object to an associated 3D virtual object. In an addition example, the modification may include modifying at least one of a color scheme, a size or an opacity associated with the specific virtual object. In another example, the modification may include expanding unexpanded elements of the specific virtual object. For example, the specific virtual object may include a plurality of menus or sections. While in the virtual display, expanding the menus or sections may create clutter due to the limited size within the virtual display. When the specific virtual object is displayed outside the virtual display, the specific virtual object may spread over a larger area, and thus the menus or sections may be expanded without creating clutter.

By way of a non-limiting example, in FIG. 10, virtual house plant 1014 (e.g., the specific virtual object) is displayed inside virtual display 1002 as a simplified two-dimensional drawing or icon. Upon receiving an input to extract virtual house plant 1014 from virtual display 1002, processing device 460 (FIG. 4) may modify the appearance of virtual house plant 1014, e.g., by retrieving from a memory (e.g., data structure 212 of FIG. 2) version 1014A of virtual house plant 1014, which may be a 3D rendition of a physical house plant generated, for example, by combining multiple high-resolution 2D images of the physical house plant.

In some embodiments, the modification to the specific virtual object is based on a type of the specific virtual object. For example, the wearable extended reality appliance may modify how the specific virtual object is presented outside the virtual display based on the object type. Examples of object types include, for example, documents, icons, charts, graphical representations, images, videos, animations, chat bots, or any other category or sub-category of visual display. The object type may indicate how the user wishes to consume or use the content, e.g., a document intended for editing may be enlarged when extracted from the virtual display, and an object displayed inside the virtual display in 2D may be converted to a 3D rendition outside the virtual display. Other examples may include displaying a messaging app as an icon inside the virtual display and adding multiple control elements outside the virtual display, displaying a graphic image using low saturation inside the virtual display and with a higher saturation outside the virtual display, presenting a music widget visually inside the virtual display and audibly outside the virtual display, presenting a video widget as a stationary image inside the virtual display and as an animated video outside the virtual display.

By way of a non-limiting example, in FIG. 11, processing device 460 (FIG. 4) may determine, based on virtual house plant 1014 of FIG. 10 being an ornamental object, to modify the appearance when displayed outside of virtual display 1002 to a 3D version 1014A of a house plant. As another example, in FIG. 12, upon detecting an input to move window 1200 from virtual display 1002, processing device 460 may determine that window 1200 includes an editable document and may increase the size of version 1200A of window 1200.

In some embodiments, the modification to the specific virtual object includes changing a visual appearance of the specific virtual object. The term "changing a visual appearance of the specific virtual object" may refer to adjusting a display characteristic of the virtual object. For example, the modification may change a color, color scheme (e.g., black/white, grey scale, or full color gamut), resolution, size, scaling, transparency, opacity, saturation, intensity, or any other display characteristic of the virtual object. As another example, the modification may convert a 2D image to a 3D rendition, or vice-versa. As another example, the specific virtual object (e.g., displayed inside the virtual display) may be a simplified representation of the virtual object (e.g., such as an icon or 2D drawing) and the version of the specific virtual object displayed external to the virtual display may include additional details and resolution (e.g., based on one or more high resolution images acquired of a physical object representative of the icon or 2D drawing).

By way of a non-limiting example, in FIG. 11, to generate version 1014A of virtual house plant 1014 (e.g., shown as a 2D drawing inside virtual display 1002), processing device 460 (FIG. 4) may convert the 2D drawing to 3D version 1014A.

In some embodiments, the modification to the specific virtual object includes changing a behavior of the specific virtual object. The term "changing a behavior of the specific virtual object" may refer to modifying or adjusting interactive aspects of the specific virtual object, e.g., with respect to a user, a device, a software application, or any other entity interfacing with the virtual object. For example, a graphic image may be displayed as a static image inside the virtual display, and as an animated image (e.g., GIF) outside the virtual display. As another example, a text document may be read-only inside the virtual display and may be editable outside the virtual display. As another example, control elements such as buttons and text boxes may be inactive inside the virtual display and active when displayed external to the virtual display. As another example, when the specific virtual object is presented in the virtual display, menus and/or section of the specific virtual object may be automatically minimized when not in use (for example to minimize clutter, as described earlier), and when the specific virtual object is presented outside the virtual display, the menus and/or sections may be displayed in an expanded form, when not in use.

By way of a non-limiting example, in FIG. 12, window 1200 may be read-only while displayed inside virtual display 1002. Upon receiving an input from user 1016 to move window 1200 out from virtual display 1002 (e.g., by selecting control button 1204), processing device 460 may display version 1200A external to virtual display 1002. Version 1200A of window 1200 may be editable by user 1016, e.g., using a pointing device or hand gestures.

Some embodiments involve receiving an additional input for causing another virtual object from the group of virtual objects to move from the virtual display to the extended reality environment; and in response to receiving the additional input, generating a presentation of a version of the another virtual object in the extended reality environment at a fourth virtual distance from the wearable extended reality appliance, wherein the fourth virtual distance differs from the first virtual distance, the second virtual distance, and the third virtual distance. The term "additional input" may refer to a separate input, e.g., different than the input associated with the specific virtual object (e.g., the first input). The inputs may be via the same or different medium. For example, a gesture input may be used to move a first virtual object (e.g., the specific virtual object) from the virtual display and an electronic pointer or voice command may be used to move a second virtual object. The additional input may be received at the same or different time (e.g., after) the first input, and/or may be associated with a different virtual object or group of objects. The term "in response to receiving the additional input" may refer to in reaction to, or consequent to receiving the additional input. The term "fourth distance" may be interpreted in a manner similar to the interpretation of first distance, second, and third distance describe earlier. Thus, the at least one processor may be responsive to multiple different inputs for manipulating and/or modifying the presentation of the same or different virtual objects in the extended reality environment and may respond to the different inputs accordingly. As an example, the at least one processor may respond to the additional input by moving a virtual object targeted by the additional input from the virtual display to a different location in the extended reality environment, e.g., that does not collide or overlap with another virtual object.

Figure 14:
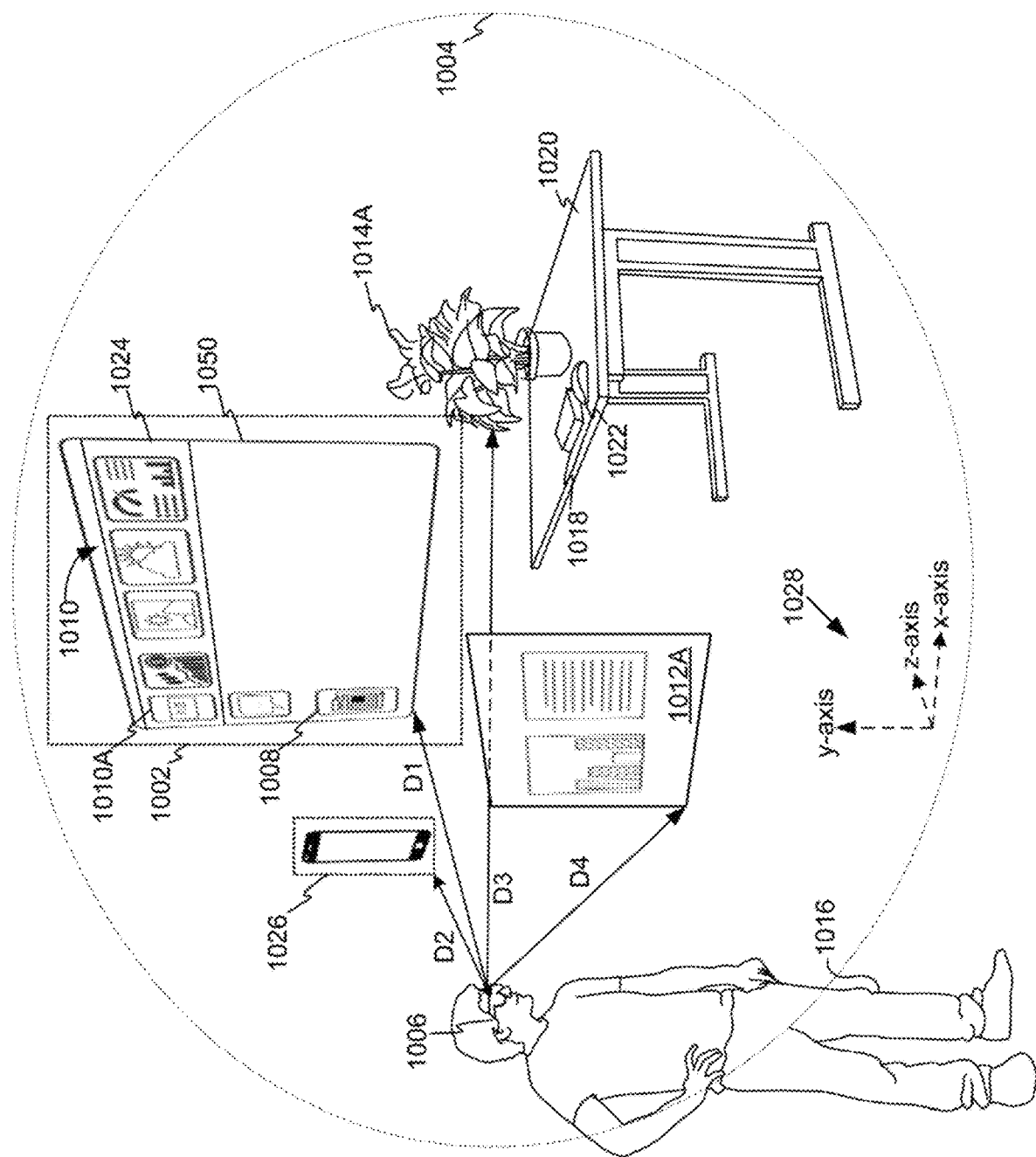
FIG. 14 illustrates an exemplary environment depicting the wearer moving additional content between the virtual display and the extended reality environment, consistent with some embodiments of the present disclosure.
Figure 15:
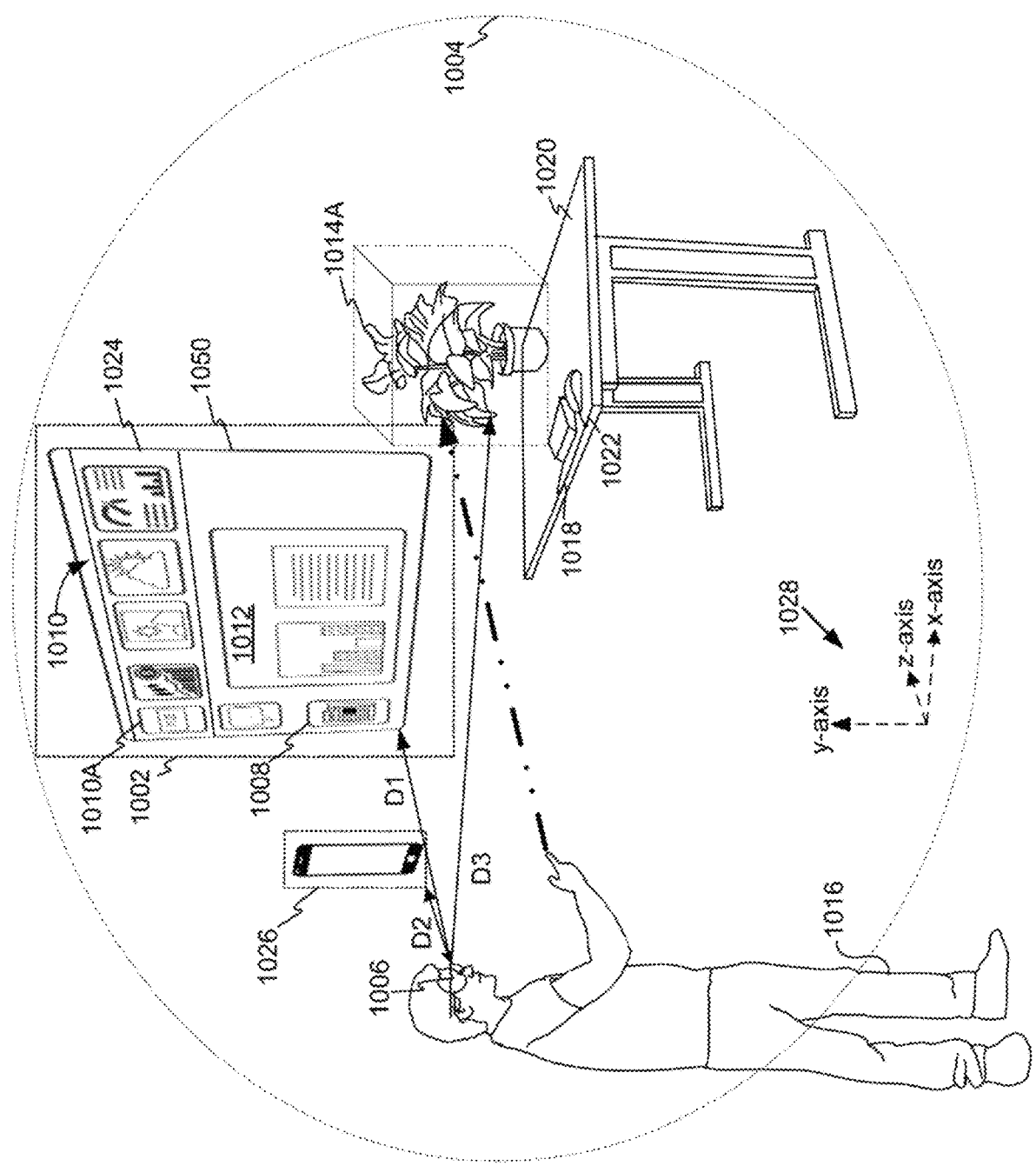
FIG. 15 illustrates an exemplary environment depicting the wearer providing a trigger to halt a presentation of content external to the virtual display, consistent with some embodiments of the present disclosure.

By way of a non-limiting example, reference is now made to FIG. 14, which illustrates the exemplary system of FIGS. 10 and 11 where an additional virtual object included inside the virtual display is moved external to the virtual display, consistent with some embodiments of the present disclosure. FIG. 15 is substantially similar to FIG. 11 with the noted difference that, in addition to version 1014A of virtual house plant 1014 located external to virtual display 1002, virtual workspace 1012 is moved outside of virtual display 1002, (e.g., indicated as version 1012A of virtual workspace 1012). After performing a pointing gesture to move virtual house plant 1014 out from virtual display 1002, user 1016 may use a voice command to move virtual workspace 1012 out of virtual display 1002. The voice command may be detected by a microphone (e.g., audio sensor 472 of FIG. 4) configured with smart glasses 1006. In response, processing device 460 may determine a distance D4 (e.g., a fourth virtual distance) for displaying version 1012A of virtual workspace 1012 smaller than distances D1, D2, or D3, e.g., to facilitate reading.

Some embodiments involve identifying a trigger for halting the presentation of the version of the specific virtual object in the extended reality environment and for presenting the specific virtual object on the virtual display. The term "identifying" may refer to recognizing, perceiving, or otherwise determining or establishing an association. A processing device may identify a type of input by parsing the input and performing one or more comparisons, queries, or inference operations. The term "trigger" may refer to an event, occurrence, condition, or rule outcome that when provokes, causes, or prompts something, in this instance the halting of the presentation. For example, a warning signal that a device is overheating may trigger the device to shut down. The term "halting" may refer to pausing, delaying, ceasing, or terminating, e.g., an execution of an application. Thus, the at least one processor may identify a received input as a prompt (e.g., trigger) to cease presenting the version of the specific virtual object external to the virtual display and revert to presenting the specific virtual object inside the virtual display. The input may be provided as a gesture, via a pointing device or keyboard, as a voice command, or any other user interfacing medium. As an example, the user may drag the version of the specific virtual object back into the virtual display, delete or close the version of the specific virtual object, or perform any other operation to cease presenting the version of the specific virtual object outside the virtual display. In some examples, the trigger may be or include a person approaching the user. For example, a person approaching the user may be identified as described earlier. In some examples, the trigger may be or may include an interaction between the user and another person (e.g., a conversation). For example, audio data captured using an audio sensor included in the wearable extended reality appliance may be analyzed using speech recognition algorithms to identify a conversation of the user with another person.

By way of a non-limiting example, reference is made to FIG. 15, which illustrates the exemplary system of FIGS. 10 and 11 where a trigger is identified for halting a presentation of content external to the virtual display, consistent with some embodiments of the present disclosure. FIG. 15 is substantially similar to FIG. 11 with the noted difference that user 1016 is pointing to version 1014A of virtual house plant 1014. Processing device 460 (FIG. 4) may identify the point gesture as a trigger to halt presenting version 1014A of virtual house plant 1014 on desk top 1020 (e.g., in extended reality environment 1004), and to revert presenting virtual house plant 1014 inside virtual display 1002, e.g., as illustrated in FIG. 10.

In some embodiments, the trigger includes at least one of: an additional input, a change in operational status of the wearable extended reality appliance, or an event associated with predefined rules. For example, the additional input may originate from the user, from the wearable extended reality appliance, or from another computing device (e.g., a peripheral device, server, mobile phone). The term "operational status of the wearable extended reality appliance" may refer to a functioning or working state of the wearable extended reality appliance. Examples of operational status of the wearable extended reality appliance may include a battery level, an amount of available memory, computation or communications capacity, latency (e.g., for communications, processing, reading/writing), a temperature (e.g., indicating overheating of an electronic component), a setting of a switch (e.g., hardware and/or software switch) relating to the operation of the wearable extended reality appliance, and any other parameter affecting the operation of the wearable extended reality appliance. The term "change in operational status" may refer to a development that alters the functioning of the wearable extended reality appliance, e.g., a battery level may become low, electronic components may overheat, memory buffers and communications channels may overflow.

The term "predefined rules" may refer to a set of guidelines, regulations, or directives specified in advance, e.g., to govern the operation of the wearable extended reality appliance. Predefined rules may include general rules, and/or rules defined for a specific device, user, system, time, and/or context. The predefined rules may be stored in a database on a memory device (e.g., local and/or remote) and accessed via query. The memory device may be accessible only for privileged users (e.g., based on a device and/or user ID) or generally accessible. For example, one rule may increase the display intensity when ambient light exceeds a threshold, another rule may reorganize the display of content when the number of displayed virtual objects exceeds a threshold, and a third rule may invoke a second application in reaction to invoking a first application. The term "event associated with predefined rules" may refer to data or signal that is generated or received indicating a circumstance affiliated with one or more predefined rules. Examples of events may include an ambient light warning, a clutter event indicating the number of displayed virtual objects exceeds a threshold, a user input to move an object, or any other occurrence triggering a corresponding action. The at least one processor may handle each event in compliance with an associated rule. As an example, an ambient light warning may cause content to be displayed using an increased intensity, a clutter event may cause some content to be minimized, and a user input may cause the object to be displayed in a different location.

Thus, the trigger received by the at least one processor (e.g., to halt the presentation of the version of the specific virtual object) may include one or more of an input, a notification indicating a change in the operating state of the wearable extended reality appliance, or an event affiliated with one or more rules. For example, the trigger may be a user pointing to close a virtual object, a voice command to move a virtual object back to the virtual display (e.g., additional inputs), a timeout event relating to the execution of a procedure (e.g., a change in operational status), or a clutter warning that the displayed virtual content exceeds a threshold.

By way of a non-limiting example, in FIG. 15, processing device (460) may receive a pointing gesture (e.g., additional input) from user 1016, and may identify the pointing gesture as a trigger to halt the presentation of version 1014A of virtual house plant 1014 on desk top 1020). As another example, processing device 460 may receive a latency warning from network interface 420 as a trigger to halt the presentation of version 1014A. As another example, processing device 460 may receive an ambient light warning from image sensor 472 as a trigger to halt the presentation of version 1014A.

Some embodiments involve, after generating the presentation of the version of the specific virtual object in the extended reality environment: while a focus of an operating system controlling the group of virtual objects is a particular virtual object presented in the virtual display, receiving a first input for task switching from a keyboard; and in response to receiving the first input for task switching, causing the focus of the operating system to switch from the particular virtual object presented in the virtual display to the version of the specific virtual object presented in the extended reality environment; while the focus of the operating system is the version of the specific virtual object presented in the extended reality environment, receiving a second input for task switching from a keyboard; and in response to receiving the second input for task switching, causing the focus of the operating system to switch from the version of the specific virtual object presented in the extended reality environment to another virtual object presented in the virtual display.

The term "operating system" may refer to system software governing hardware and/or software resources of a computing device and providing services, such as resource allocation, task scheduling, memory storage and retrieval, and other administrative services. For example, a wearable extended reality appliance may be configured with an operating system to manage system resources needed to generate the extended reality environment. Referring to FIG. 4, the operating system may allocate space in memory device 411, schedule processing time for processing device 460, schedule the sending and receiving of data via network interface 420, manage event listeners for receiving notifications via sensors interface 470, output interface 450, and input interface 430, and perform additional task needed by the wearable extended reality appliance to generate the extended reality environment. The term "operating system controlling the group of virtual objects" may refer to the operating system administering computing resources of a computing device, such a wearable extended reality appliance, for presenting virtual objects. The term "focus of an operating system" may refer to an element in a graphical user interface that is currently designated by the operating system as active. The operating system may allocate resources (e.g., stack, queue, and buffer memory) and schedule processing time such that user inputs received while a specific graphical element is in focus affect the specific graphical element. For example, if a user inputs a move, maximize, or minimize instruction while a specific graphical element in focus, the move, maximize or minimize instruction may be implemented with respect to that specific graphical element. In another example, if a user enters text (for example, through voice, through a virtual keyboard, through a physical keyboard, etc.) while a specific application is in focus, the text may be directed to the specific application. During an extended reality session, the focus of the operating system may switch between different virtual objects, some presented inside the virtual display, and some presented external to the virtual display. While the focus of the operating system is on a particular virtual object inside the virtual display, the operating system may allocate system resources for the particular virtual object such that received inputs are implemented with respect to that particular virtual object.

The term "task switching" may refer to swapping a currently executed process with a different process. An operating system may suspend a currently executed process (e.g., task) by removing (e.g., popping) the process from a call stack and storing state data for the suspended process. The state data may allow to subsequently restore the execution of the suspended process from the point of suspension. The operating system may initiate the execution of the different process by retrieving state data for the different process, and adding (e.g., pushing) the different process onto the call stack. Task switching may be invoked automatically (e.g., determined internally by the operating system), based on a user input, e.g., via voice command, pointing device, gesture, keyboard, or any other input means, based on an external input (e.g., from a peripheral device), or any other technique for invoking task switching. Thus, for example, "receiving a first input for task switching from a keyboard" may refer to receiving one or more keystroke inputs (e.g., "Alt+Tab") via a keyboard requesting to switch to a different task. The operating system may identify the input as a request for task switching and may schedule the new task accordingly.

The term "causing the focus of the operating system to switch from the particular virtual object presented in the virtual display to the version of the specific virtual object presented in the extended reality environment" may be understood as implementing a task switching that transfers the focus of the operating system from the particular virtual object inside the virtual display onto the specific virtual object external to the virtual display. Subsequent inputs may be implemented with respect to the version of the specific virtual object external to the virtual display. Thus, while the version of the specific object external to the virtual display is in focus, the operating system may allocate system resources such that received inputs are implemented with respect to the version of the specific object.

The term "causing the focus of the operating system to switch from the version of the specific virtual object presented in the extended reality environment to another virtual object presented in the virtual display" may be understood as implementing a task switching that transfers the focus of the operating system from the version of the specific virtual object external to the virtual display onto the particular virtual object inside the virtual display. Subsequent inputs may be implemented with respect to the particular virtual object inside the virtual display.

Thus, a user may use the keyboard to switch the focus between different virtual objects, inside and external to the virtual display, allowing the user to manipulate and control virtual objects anywhere in the extended reality environment. For example, a wearable extended reality appliance may present a virtual display including an editable document and a messaging widget. The wearable extended reality appliance may additionally present a larger, editable version of the messaging widget external to the virtual display. The user may use a keyboard to toggle the focus between the editable document inside the virtual display and the version of the messaging widget external to the virtual display, allowing the user to switch between editing the editable document and editing a message via the version of the messaging widget.

Figure 16:
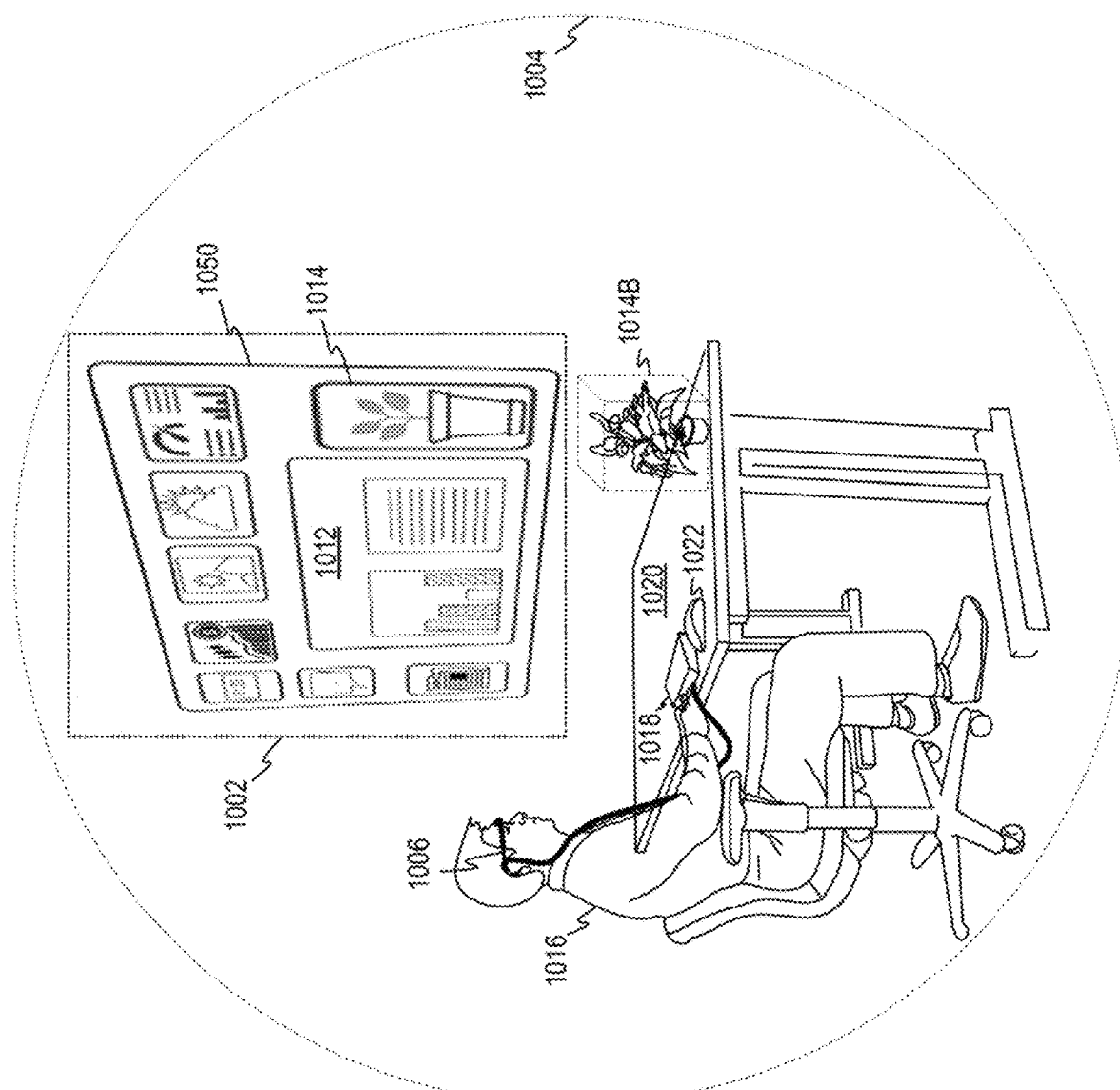
FIG. 16 illustrates an exemplary environment depicting the wearer using a keyboard to move content between the virtual display and the extended reality environment, consistent with some embodiments of the present disclosure.

By way of a non-limiting example, reference is now made to FIG. 16, which illustrates the exemplary environment of FIGS. 10 and 11 where a keyboard is provided for controlling the presentation of content in extended reality environment 1004, consistent with some embodiments of the present disclosure. FIG. 16 is substantially similar to FIG. 11 with the noted difference that user 1016 is seated at desk top 1020 in position to type via keyboard 1018. Virtual display 1002 may include group 1050 of multiple virtual objects, such as virtual workspace 1012 and virtual house plant 1014. User 1016 may provide an input to generate version 1014B of virtual house plant 1014 resting on desk top 1020, e.g., inside extended reality environment 1004 and external to virtual display 1002. While the focus of an operating system configured with smart glasses 1006 is on virtual workspace 1012, user 1016 may type "Alt+Tab" on keyboard 1018 to switch the focus from virtual workspace 1012 (e.g., inside virtual display 1002) to version 1014B of virtual house plant 1014 on desk top 1020 (e.g., inside extended reality environment 1004 and external to virtual display 1002). Switching the focus to version 1014B of virtual house plant 1014 may allow an input entered by user 1016 to be applied to decrease the size of version 1014B. Since version 1014B of virtual house plant 1014 is currently in focus, processing device 460 (FIG. 4) may decrease the size of version 1014B of virtual house plant 1014 based on the input.

While the focus of the operating system is on version 1014B of virtual house plant 1014, user 1016 may type "Alt+Tab" on keyboard 1018 to switch the focus from version 1014B of virtual house plant 1014 to virtual workspace 1012 inside virtual display 1002). Switching the focus to virtual workspace 1012 may allow edits entered by user 1016 via keyboard 1018 to be applied to virtual workspace 1012. Since virtual workspace 1012 is now in focus, processing device 460 (FIG. 4) may edit virtual workspace 1012 based on inputs entered by user 1016.

Some embodiments involve, after generating the presentation of the version of the specific virtual object in the extended reality environment, receiving an input from a keyboard for a thumbnail view presentation of virtual objects associated with the virtual display, and including a thumbnail version of the specific virtual object presented in the extended reality environment in the thumbnail view presentation of the virtual objects associated with the virtual display. The term "thumbnail view presentation" may refer to a miniature, symbol, icon or simplified depiction of a larger and/or more detailed object. A "thumbnail view presentation of virtual objects associated with the virtual display" may include one or more miniature, symbol, icon or simplified depictions (e.g., thumbnails) of objects affiliated with the virtual display. A "thumbnail version of the specific virtual object" may include a miniature, symbol, icon or simplified depiction of the specific virtual object. A group of image thumbnails may serve as an index for organizing multiple objects, such as images, videos, and applications. Objects affiliated (e.g., associated) with the virtual display may include objects displayed inside the virtual display or derived there from. For example, a version of a virtual object displayed inside a virtual display may be associated with the virtual display, even when the version is presented external to the virtual display. Thus, after the at least one processor presents the version of the specific virtual object external to the virtual display, the user may request a thumbnail view of any objects associated with the virtual display. The at least one processor may display a thumbnail view of objects presented inside the virtual display and any virtual objects associated there with. As an example, a virtual display may present a read-only virtual document. An editable version of the virtual document may be displayed external to the virtual display. A thumbnail view presentation of objects associated with the virtual display may include the read-only virtual document as well as the editable version of the virtual document.

Figure 17:
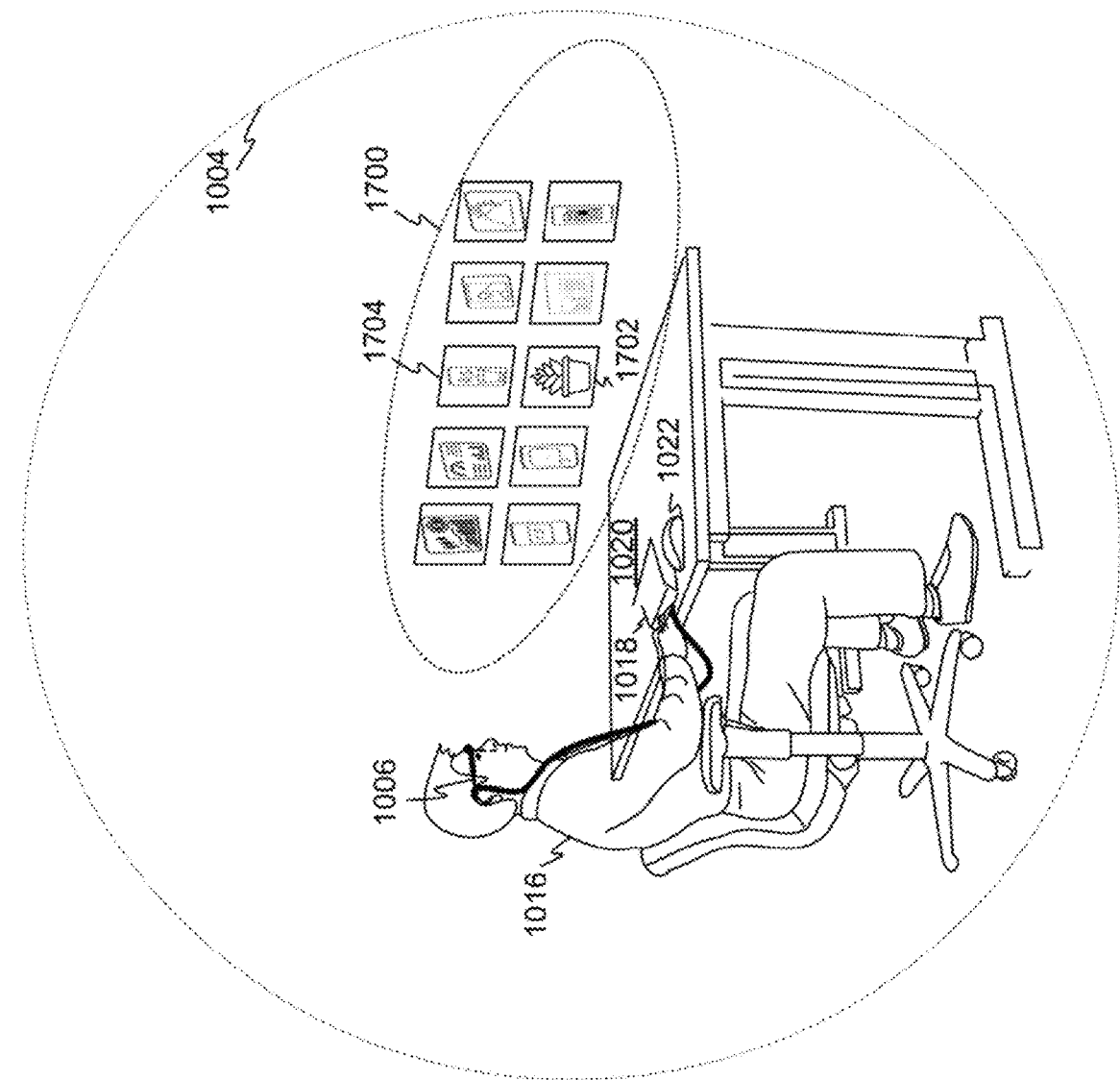
FIG. 17 illustrates an exemplary environment depicting the wearer viewing content as a thumbnail view, consistent with some embodiments of the present disclosure.

By way of a non-limiting example, reference is now made to FIG. 17, which illustrates the exemplary system of FIGS. 10 and 11 where the content in the virtual display is presented as a thumbnail view, consistent with some embodiments of the present disclosure. FIG. 17 is substantially similar FIG. 16 with the noted difference of a thumbnail view 1700 of virtual objects associated with virtual display 1002. User 1016 may request to view thumbnail view 1700 via keyboard 1018, or via other input devices (e.g., input interface 330 of input unit 202 of FIG. 3). Upon receiving the request, processing device 460 (FIG. 4) may add to or replace the presentation of virtual display 1002 (FIG. 10), virtual objects included therein, and virtual objects derived therefrom, such as version 1014B (FIG. 16) of virtual house plant 1014 (FIG. 11) with thumbnail view 1700. Thumbnail view 1700 may include a thumbnail representation of each virtual object included in virtual display 1002 and additionally, any virtual object associated there with, such as a thumbnail representation 1702 of version 1014B of virtual house plant 1014. In some implementations, processing device 460 may replace virtual display 1002 and objects derived therefrom with thumbnail view 1700, e.g., as illustrated in FIG. 17. In some implementations, processing device 460 may display virtual display 1002 and objects derived therefrom alongside thumbnail view 1700. Thumbnail representation 1702 may correspond to version 1014B of virtual house plant 1014 and thumbnail representation 1704 may correspond to virtual house plant 1014.

Some embodiments involve a system for extracting content from a virtual display, the system including at least one processor programmed to: generate a virtual display via a wearable extended reality appliance, wherein the virtual display presents a group of virtual objects and is located at a first virtual distance from the wearable extended reality appliance; generate an extended reality environment via the wearable extended reality appliance, wherein the extended reality environment includes at least one additional virtual object presented at a second virtual distance from the wearable extended reality appliance; receive input for causing a specific virtual object from the group of virtual objects to move from the virtual display to the extended reality environment; and in response to receiving the input, generate a presentation of a version of the specific virtual object in the extended reality environment at a third virtual distance from the wearable extended reality appliance, wherein the third virtual distance differs from the first virtual distance and the second virtual distance.

By way of a non-limiting example, FIG. 10 shows extracting content from virtual display 1002. The content may be extract using a system that may include at least one processor (e.g., one or more of server 210 of FIG. 2, mobile communications device 206, processing device 360 of FIG.

3, processing device 460 of FIG. 4, processing device 560 of FIG. 5). The at least one processor may be programmed to generate virtual display 1002 via smart glasses 1006 (e.g., a wearable extended reality appliance). Virtual display 1002 may present a group of virtual objects (e.g., virtual document 100, virtual widgets 1010 inside a virtual menu bar 1024, a virtual workspace 1012, and a virtual house plant 1014). Virtual display 1002 may be located at a first virtual distance D1 from smart glasses 1006. In the implementation shown, virtual display 1002 may be a flat (e.g., two-dimensional) display, and D1 may be the distance from smart glasses 1006 to the bottom left corner of virtual display 1002. The at least one processor may generate extended reality environment 1004 via smart glasses 1006. Extended reality environment 1004 may include at least one additional virtual object, such as virtual mobile phone 1026, presented at a second virtual distance D2 from smart glasses 1006 (e.g., measured from smart glasses 1006 to the bottom left corner of virtual mobile phone 1026). The at least one processor may receive input, such as a pointing gesture by user 1016 for causing a specific virtual object, such as virtual house plant 1014 from group 1050 of virtual objects to move from virtual display 1002 to the extended reality environment 1004 (e.g., external to virtual display 1002). With reference to FIG. 11, in response to receiving the input, the at least one processor may generate a presentation of a version 1014A of virtual house plant 1014 in extended reality environment 1004 at a third virtual distance D3 from smart glasses 1006, where the third virtual distance D3 differs from the first virtual distance D1 and the second virtual distance D2.

FIG. 18 illustrates a block diagram of an example process 1800 for moving content between a virtual display and an extended reality environment, consistent with embodiments of the present disclosure. In some embodiments, process 1800 may be performed by at least one processor (e.g., one or more of server 210 of FIG. 2, mobile communications device 206, processing device 360 of FIG. 3, processing device 460 of FIG. 4, processing device 560 of FIG. 5) to perform operations or functions described herein. In some embodiments, some aspects of process 1800 may be implemented as software (e.g., program codes or instructions) that are stored in a memory (e.g., any of memory devices 212, 311, 411, or 511, or a memory of mobile device 206) or a non-transitory computer readable medium. In some embodiments, some aspects of process 1800 may be implemented as hardware (e.g., a specific-purpose circuit). In some embodiments, process 1800 may be implemented as a combination of software and hardware.

Referring to FIG. 18, process 1800 may include a step 1802 of generating a virtual display via a wearable extended reality appliance, wherein the virtual display presents a group of virtual objects and is located at a first virtual distance from the wearable extended reality appliance. As described earlier, a wearable extended reality appliance may present multiple virtual objects grouped inside a virtual display rendered to appear as though located at particular distance from the wearer.

Process 1800 may include a step 1804 of generating an extended reality environment via the wearable extended reality appliance, wherein the extended reality environment includes at least one additional virtual object presented at a second virtual distance from the wearable extended reality appliance. As described earlier, the wearable extended reality appliance may present one or more virtual objects appearing as though located at a distance from the user different from the particular distance to the virtual display.

Process 1800 may include a step 1806 of receiving input for causing a specific virtual object from the group of virtual objects to move from the virtual display to the extended reality environment. As described earlier, the wearable extended reality appliance may receive an input (e.g., from the user) to relocate one of the virtual objects grouped inside the virtual display, external to the virtual display.

Process 1800 may include a step 1808 of in response to receiving the input, generating a presentation of a version of the specific virtual object in the extended reality environment at a third virtual distance from the wearable extended reality appliance, wherein the third virtual distance differs from the first virtual distance and the second virtual distance. As described earlier, the wearable extended reality appliance may respond to the input by presenting another rendition of the specific virtual object external to the virtual display appearing as though located at a distance from the user (e.g., third virtual distance) different from the distance to the virtual display (e.g., the first virtual distance) and from the distance to the additional virtual object (e.g., the second virtual distance). The rendition of the specific virtual object may be presented in place of, or concurrently with the specific virtual object inside the virtual display.

The relative orientation of a wearable extended reality appliance to an associated physical input device may correspond to an operational mode for the wearable extended reality appliance. For example, when the wearable extended reality appliance is in a first orientation relative to the input device (e.g., the wearer is close to and facing the input device), a first operational mode may be applied to interface with the wearer. Conversely, when the wearable extended reality appliance is in a second orientation relative to the input device (e.g., the wearer is remote from, or facing away from the input device), a second (e.g., different) operational mode may be applied to interface with the wearer.

In some embodiments, operations may be performed for selectively operating a wearable extended reality appliance. A link between a wearable extended reality appliance and a keyboard device may be established, e.g., communicatively coupling the wearable extended reality appliance to the keyboard device. Sensor data from at least one sensor associated with the wearable extended reality appliance may be received. The sensor data may be reflective of a relative orientation of the wearable extended reality appliance with respect to the keyboard device. Based on the relative orientation, a specific operation mode for the wearable extended reality appliance may be selected from a plurality of operation modes. For example, one specific operation mode may be associated with receiving input via the physical input device. A user command based on at least one signal detected by the wearable extended reality appliance may be identified. An action responding to the identified user command in a manner consistent with the selected operation mode may be executed.

In some instances, the description that follows may refer to FIGS. 19 to 24, which taken together, illustrate exemplary implementations for performing operations for selectively operating a wearable extended reality appliance, consistent with some disclosed embodiments. FIGS. 19 to 24 are intended merely to facilitate the conceptualizing of one exemplary implementation for performing operations for selectively operating a wearable extended reality appliance and do not limit the disclosure to any particular implementation. The description that follows includes references to smart glasses as an exemplary implementation of a wearable extended reality appliance. It is to be understood that these examples are merely intended to assist in gaining a conceptual understanding of disclosed embodiments, and do not limit the disclosure to any particular implementation for a wearable extended reality appliance. The disclosure is thus understood to relate to any implementation for a wearable extended reality appliance, including implementations different than smart glasses.

Some embodiments provide a non-transitory computer readable medium containing instructions for performing operations for selectively operating a wearable extended reality appliance. The term "non-transitory computer-readable medium" may be understood as described earlier. The term "containing instructions" may refer to including program code instructions stored thereon, for example to be executed by a computer processor. The instructions may be written in any type of computer programming language, such as an interpretive language (e.g., scripting languages such as HTML and JavaScript), a procedural or functional language (e.g., C or Pascal that may be compiled for converting to executable code), object-oriented programming language (e.g., Java or Python), logical programming language (e.g., Prolog or Answer Set Programming), or any other programming language. In some embodiments, the instructions may implement methods associated with machine learning, deep learning, artificial intelligence, digital image processing, optimization algorithms, and any other computer processing technique. The term "performing operations" may involve calculating, executing, or otherwise implementing one or more arithmetic, mathematic, logic, reasoning, or inference steps, for example by a computing processor. The term "wearable extended reality appliances" may refer to a head-mounted device, for example, smart glasses, smart contact lens, headsets or any other device worn by a human for purposes of presenting an extended reality to the human, as described earlier. The term "selectively operating a wearable extended reality appliance" may include choosing how the wearable extended reality appliance functions or operates, for example based on one or more criteria or conditions. Thus, program code instructions (e.g., a computer program) may be provided (e.g., stored in a memory device of a computing device, such as any of memory devices 311 of FIG. 3, 411 of FIG. 4, or 511 of FIG. 5). The program code instructions may be executable by a processing device (any of processing devices 360, 460, and 560, and mobile device 206 of FIG. 2). Executing the program code instructions may cause the processing device to choose or elect how a wearable extended reality appliance functions (e.g., operates). For example, the wearable extended reality appliance may function in a different manner depending on one or more criterion, and the processing device may elect a specific manner of functioning based on a determined criterion.

For example, the wearable extended reality appliance may be configured to display content according to a first display configuration when the wearer is seated at a work station and display the content according to a second display configuration when the wearer is away from the work station. As another example, the first/second display configurations may define a specific region of the field of view of the wearer of the extended reality appliance, a specific size, intensity, transparency, opacity, color, format, resolution, level of detail, or any other display characteristic. By way of example, when the wearer is seated at the work station, an electronic mail application may be displayed larger and brighter than when the wearer is away from the work station. As another example, when the wearer is seated at the desk, the wearable extended reality appliance may be configured to present content visually (e.g., on a virtual screen), whereas when the wearer is walking outdoors, the wearable extended reality appliance may be configured to present the content audibly, e.g., via a speaker.

Figure 19:
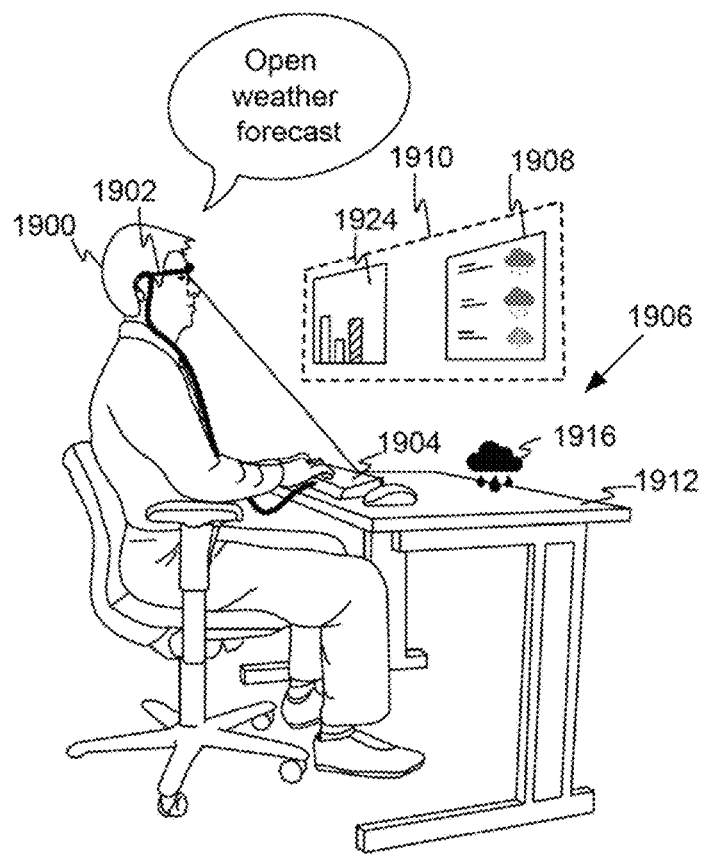
FIG. 19 illustrates an exemplary environment depicting a wearer of the wearable extended reality appliance sitting adjacent to a keyboard device, consistent with some embodiments of the present disclosure.
Figure 20:
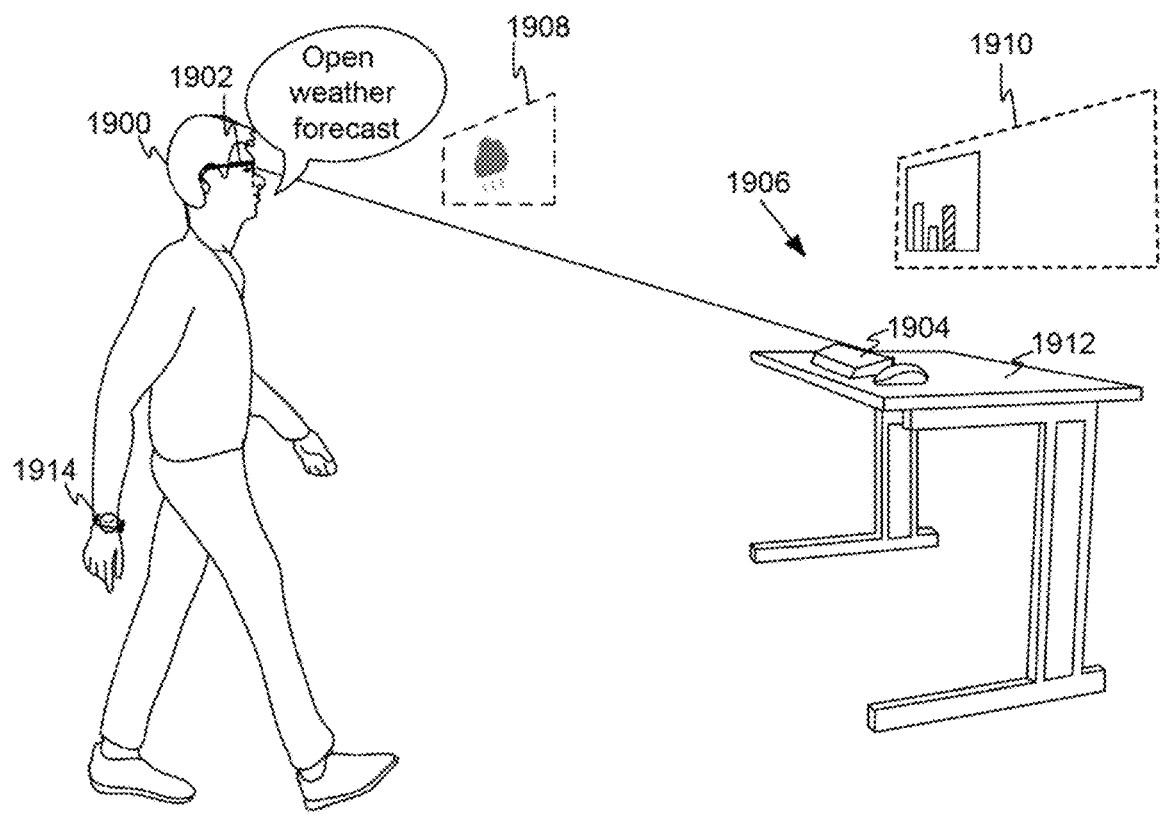
FIG. 20 illustrates another exemplary environment depicting a wearer of the wearable extended reality appliance walking towards a keyboard device, consistent with some embodiments of the present disclosure.

Reference is now made to FIGS. 19 and 20 which, together, are a conceptual illustration of an environment for selectively operating a wearable extended reality appliance, consistent with some disclosed embodiments. FIGS. 19 and 20 include a wearer 1900 donning a wearable extended reality appliance (e.g., a pair of smart glasses 1902). Smart glasses 1902 may be associated with a keyboard 1904 resting on a table surface 1912 included with a work station 1906. Smart glasses 1902 may be configured to display content, such as a forecast weather app 1908. Processing device 460 (FIG. 4) may be configured to control the operation of smart glasses 1902 based on one or more criterion. For example, turning to FIG. 19, when wearer 1900 is sitting at a work station 1906 in proximity to keyboard 1904, processing device 460 may cause smart glasses 1902 to display forecast weather app 1908 inside a virtual screen 1910 at a fixed distance from work station 1906 and/or from keyboard 1904 (e.g., tethered to work station 1906). Turning to FIG. 20, when wearer 1900 is away from work station 1906, processing device may cause smart glasses 1902 to display forecast weather app 1908 at a fixed distance from smart glasses 1902 and follow the gaze of wearer 1900 (e.g., tethered to smart glasses 1902).

Some embodiments include establishing a link between a wearable extended reality appliance and a keyboard device. The term "establishing" may refer to setting up, creating, implementing, participating in, or constructing. The term "link" may refer to a connection that joins or couples two separate entities, such as, a wearable extended reality appliance and a keyboard device. For example, a communications link may couple two disparate entities to create a channel for exchanging information as signals. The signals may be analog (e.g., continuous) or digital signals (e.g., discrete) and the communications link may be synchronous, asynchronous, or isochronous.

In some embodiments, the link between the wearable extended reality appliance and the keyboard is wireless. A wireless communications link may be established between the wearable extended reality appliance and/or the keyboard device via scanning (e.g., actively and/or passively) and detecting nearby devices according to a predetermined wireless communications protocol. Wireless links may be established by recognizing authorized devices, sharing of recognized credentials, or through any form of pairing. Examples of wireless communications technology may include transceivers for sending and receiving information via radio waves (e.g., Wi-Fi, Bluetooth, Zigbee, RFID, GPS, broadband, long, short or medium wave radio), microwave, mobile (e.g., telephony) communications, infrared signals, and ultrasound signals. In some embodiment, a wireless infrared communications link may be established by optically coupling an IR emitter with an IR detector configured with one or both of the wearable extended reality appliance and a keyboard device. As another example, a wireless ultrasound communications link may be established by coupling an ultrasound emitter (e.g., speaker) with an ultrasound receiver (e.g., microphone) configured with one or both of the wearable extended reality appliance and a keyboard device.

In some embodiments, the communications link between the wearable extended reality appliance and the keyboard is a wired connection. For example, a wired communications link may be created by physically coupling the wearable extended reality appliance and/or the keyboard device using a wire, cable, or fiber, for example, in compliance with a wired communications standard (e.g., USB, USB-C, micro-USB, mini-B, coaxial cable, twisted cable, Ethernet cable). Other examples of wired communications technology may include serial wires, cables (e.g., multiple serial wires for carrying multiple signals in parallel such as Ethernet cables), fiber optic cables, waveguides, and any other form of wired communication technology. In some embodiments, the communications link may include some combination of the wired and wireless technologies described earlier.

The term "wearable extended reality appliance" may be understood as described earlier. The term "keyboard device" may refer to an input device including multiple keys representing alphanumeric characters (letters and numbers), and optionally, a numeric keypad, special function keys, mouse cursor moving keys, and status lights. In some embodiments, the keyboard device is selected from a group consisting of: a laptop computer, a standalone network connectable keyboard, and a wireless communication device having a display configured to display a keyboard. For example, the keyboard device may be a mechanical keyboard, an optical keyboard, a laser projected keyboard, a hologram keyboard, a touch sensitive keyboard (e.g., displayed on a touch-sensitive electronic display), a membrane keyboard, a flexible keyboard, a QWERTY keyboard, a Dvorak keyboard, a Colemak keyboard, a chorded keyboard, a wireless keyboard, a keypad, a key-based control panel, a virtual keyboard (e.g., synthesized by a processor and displayed in an extended reality environment), or any other array of control keys. Selecting a key of a keyboard (e.g., by pressing a mechanical key, touching a touch sensitive key, selecting a key of projected or hologram keyboard) may cause a character corresponding to the key to be stored in an input memory buffer of a computing device.

Thus, a communications channel (e.g., link) may be created (e.g., established) between a wearable extended reality appliance and a keyboard device, allowing the exchange of data there between. For example, a user donning a wearable extended reality appliance may enter a workspace including a keyboard device. The wearable extended reality appliance and the keyboard device may each include transceivers for transmitting and receiving radio signals, for example according to a Bluetooth protocol, allowing the wearable extended reality appliance and the keyboard device to detect each other (e.g., pair) and communicate along a Bluetooth channel.

By way of a non-limiting example, turning to FIG. 20, network interface 320 (FIG. 3) of keyboard device 1904 may emit a Bluetooth radio signal configured to be detected by a Bluetooth receiver. Network interface 420 (FIG. 4) of smart glasses 1902 may scan for a Bluetooth radio signal and detect the Bluetooth radio signal emitted via network interface 320 of keyboard device 1904. Keyboard device 1904 and smart glasses 1902 may exchange data via network interface 320 and network interface 420, respectively, complying with a Bluetooth protocol to pair smart glasses 1902 with keyboard device 1904.

Some embodiments include receiving sensor data from at least one sensor associated with the wearable extended reality appliance, the sensor data being reflective of a relative orientation of the wearable extended reality appliance with respect to the keyboard device. The term "receiving" may refer to accepting delivery of, acquiring, retrieving, obtaining or otherwise gaining access to. For example, information or data may be received in a manner that is detectable by or understandable to a processor. The processor may be local (e.g., integrated with the wearable extended reality appliance, or in the vicinity thereof, such as a local server or mobile phone) or remote (e.g., as a cloud or edge server). The data may be received via a communications channel, such as a wired channel (e.g., cable, fiber) and/or wireless channel (e.g., radio, cellular, optical, IR) and subsequently stored in a memory device, such as a temporary buffer or longer-term storage. The data may be received as individual packets or as a continuous stream of data. The data may be received synchronously, e.g., by periodically polling a memory buffer, queue or stack, or asynchronously, e.g., via an interrupt event. For example, the data may be received by any of processors 360 of FIG. 3, 460 of FIG. 5, 560 of FIG. 6, and/or a processor associated with mobile device 206 of FIG. 1, and stored in any of storage devices 311, 411, 511, or a memory of mobile device 206.

The term "sensor" may include one or more components configured to detect a signal (e.g., visible and/or IR light, radio, electric and/or magnetic, acoustic such as sound, sonar or ultrasound, mechanical, vibration, heat, humidity, pressure, motion, gas, olfactory, or any other type of physical signal) emitted, reflected off, and/or generated by an object. The term "sensor data" may refer to information produced by the sensor based on a signal detected by the sensor. For example, the sensor may include a converter that converts a sensed signal to a format configured for communicating to a processing device, such as an electronic signal (e.g., for communicating via a wired communications link), a radio signal (e.g., for communication via a radio communications link), an IR signal (e.g., for communication via an infrared communications link), or an acoustic signal (e.g., for communicating via an ultrasound communications link) The sensor data may be transmitted in a binary format (e.g., as discrete bits) or an analog format (e.g., as continuous time-variant waves).

The term "associated" may refer to the existence of an affiliation, relationship, correspondence, link or any other type of connection or correlation. Thus, the wearable extended reality appliance may be affiliated (e.g., associated) with a sensor. For example, the sensor may be mechanically coupled (e.g., physically attached) to the wearable extended reality appliance. Additionally, or alternatively, the sensor may be non-mechanically coupled (e.g., physically detached but communicatively coupled) to the wearable extended reality appliance, e.g., via optic, infrared, radio, ultrasound or any other type of non-wired communications means. In one example, the sensor may be mechanically coupled (e.g., physically attached) to the keyboard. In one example, the sensor may be physically separated and/or remote from both the keyboard and the wearable extended reality appliance. In one example, the sensor may be associated with the wearable extended reality appliance via a data structure stored in a memory device (e.g., the memory device may be included in the wearable extended reality appliance, may be included in the keyboard, or may be external to both the wearable extended reality appliance and the keyboard). In one example, the sensor may capture data associated with the wearable extended reality appliance and the association between the wearable extended reality appliance and the sensor may be through the captured data. For example, the sensor may be an image sensor, and the captured data may include an image of the wearable extended reality appliance. The sensor may detect signals associated with the wearable extended reality appliance. For example, the detected signals may relate to the state of the wearable extended reality appliance (e.g., e.g., position, orientation, velocity, acceleration, alignment, angle) relative to physical environment of the wearable extended reality appliance. For example, the physical environment may include physical objects, such as a floor surface, ceiling, walls, table surface, obstructing objects (e.g., book case, house plant, person) and the detected signal may relate the state of the wearable extended reality appliance relative to one or more of the physical objects. The sensor may convert the detected signals to sensor data and transmit the sensor data to a processing device via a communications link as described earlier. For example, the data may be received via an input device or sensor configured with an input device (e.g., input unit 202 of FIG. 1), from mobile communications device (e.g., device 206), from remote processing unit (e.g., processing unit 208), by a processing device configured with smart glasses 1902 (processing device 460 of FIG. 4), or from any other local and/or remote source.

For example, the wearable extended reality appliance may include a GPS sensor (e.g., motion sensor 473 of FIG. 4) to detect a location of wearable extended reality appliance. The GPS sensor may convert the detected location to an electric signal that may be transmitted via a wired communications link to a processing device configured inside the wearable extended reality appliance (e.g., processing device 460). As another example, the wearable extended reality appliance may include a motion sensor (e.g., motion sensor 472 of FIG. 4), such as an inertial measurement unit (IMU) to detect the motion (e.g., velocity and acceleration) and orientation of the wearable extended reality appliance. The IMU may convert the detected motion and orientation to a radio signal (e.g., sensor data) for transmission (e.g., via network interface 420) to a remote processing device (e.g., remote processing unit 208 of FIG. 2). As another example, a camera (e.g., image sensor) may be configured with a work station in the vicinity of the wearable extended reality appliance. The camera may be configured to capture one or more images of the wearable extended reality appliance as the wearer approaches the work station. The camera may convert the captured images pixels to radio signals (e.g., sensor data), for transmitting to a mobile device (e.g., mobile device 206).

The term "being reflective of" may refer to indicating, expressing, revealing, or in any other way suggesting an associated state or condition (e.g., temporary, or steady state). For example, sensor data transmitted by an IMU integrated with a wearable extended reality appliance may reveal (e.g., be reflective of) a motion and/or current position and orientation of the wearer of the wearable extended reality appliance. As another example, image data (e.g., sensor data) captured by a camera of a wearable extended reality appliance adjacent to an object may indicate (e.g., be reflective of) the position of the wearable extended reality appliance relative to the object.

The term "orientation" may refer to the direction (e.g., alignment and/or position in 2D and/or 3D) in which an object (e.g., a person, animal, or thing) is pointing. The term "relative orientation" may refer to an orientation (e.g., direction, alignment, distance and/or position) of an object with respect to a coordinate system or with respect to another object. The coordinate system may be fixed (e.g., relative to the Earth) or non-fixed (e.g., relative to a different object whose position and/or orientation may change with time and/or context). Thus, for example, the relative orientation between the wearable extended reality appliance and the keyboard may be determined directly, or by calculating the orientation of each of the wearable extended reality appliance and the keyboard relative to a fixed object (e.g., relative to the floor, ceiling), for example based on a 3D spatial map of the physical environment including the wearable extended reality appliance and the keyboard device (e.g., as a mesh of triangles or a fused point cloud). The relative orientation may be determined based on any combination of image data acquired by a camera, position, location, and orientation data acquired by an IMU and/or GPS unit configured with the wearable extended reality appliance, based on ultrasound, radio, and/or IR signals emitted and reflected off objects in the environment including the wearable extended reality appliance and the keyboard device, data store in memory (e.g., for a stationary keyboard device), predicted behavior of the wearer of the wearable extended reality appliance, and/or any other means for tracking the relative orientation between the wearable extended reality appliance and the keyboard device.

Thus, a sensor may detect a relative alignment, position, distance or orientation of the wearable extended reality appliance as compared to (e.g., with respect to) the keyboard device. For example, a camera within imaging range of the wearable extended reality appliance and the keyboard device may acquire an image of both the wearable extended reality appliance and the keyboard device. The image data may be converted to an electronic or radio signal (e.g., sensor data) and transmitted to a processing device via a network interface. The processing device may analyze the information encoded in the electronic or radio signal to determine the relative orientation of the wearable extended reality appliance and the keyboard device. The image data may thus be reflective of the orientation of the wearable extended reality appliance relative to the keyboard device. As another example, the wearable extended reality appliance may include an IR emitter, and the position of the keyboard device may be known in advance (e.g., physically tethered to a surface of a work station). A processing device (e.g., associated with the work station) may receive an IR signal (e.g., sensor data) from by the IR emitter of the wearable extended reality appliance and analyze the received signal to determine the position and orientation of the wearable extended reality appliance relative to the surface of the work station. The IR signal may thus be reflective of the relative orientation of the wearable extended reality appliance to the surface, and thus the keyboard device tethered thereto. As another example, a gyroscope of an IMU configured with the wearable extended reality appliance may detect an orientation of the wearable extended reality appliance. The IMU may convert the orientation to an electronic signal (e.g., sensor data) and transmit the electronic signal to a processing device via a radio communications channel (e.g., Wi-Fi, Bluetooth). The processing device may analyze the received signal to determine the orientation of the wearable extended reality appliance relative to the keyboard device (e.g., having a known, fixed position).

By way of a non-limiting example, turning to FIG. 20, wearer 1900 donning smart glasses 1902 (such as smart glasses) may approach work station 1906. A camera (e.g., image sensor 472 of FIG. 4) configured with (e.g., associated with) smart glasses 1902 may capture an image of keyboard device 1904 resting on table surface 1912 and provide the image to processing device 460. In addition, an IMU configured with motion sensor 473 of smart glasses 1902 may sense the orientation of smart glasses 1902 relative to a floor parallel to surface 1912 and transmit the sensed orientation to processing device 460. The image data and/or orientation data may be analyzed by processing device 460 to determine the relative orientation of smart glasses 1902 with respect to keyboard device 1904, and thereby may be reflective of the relative orientation there between.

In some embodiments, the relative orientation includes a distance between the wearable extended reality appliance and the keyboard device, wherein the operations further include analyzing the sensor data to determine an indicator of the distance. The term "distance" may refer to a spatial separation or gap between the wearable extended reality appliance and the keyboard device. For example, the distance may be measured in absolute terms, such as a Euclidian distance measured in centimeters, meters, feet, yards, or any other distance unit (e.g., floor tiles separating two objects accounting for only a horizontal planar distance). For example, the distance may be measure in relative terms, such as by measuring a distance relative to other objects (e.g., fixed and/or mobile objects) in the environment, such as a bookcase, window, or beacon (e.g., emitting a signal). Techniques for measuring distance between two objects may include capturing and analyzing images of the objects, receiving GPS signals from a GPS satellite, detecting sonar, Lidar, or radar signals emitted, reflected, and/or absorbed from the objects, applying interferometry (e.g., by detecting a Doppler shift) on signals emitted and/or reflected from the objects, and any other technique for measuring distance. The term "analyzing" may refer to investigating, scrutinizing and/or studying a data set, for example, to determine a correlation, association, pattern, or lack thereof within the data set or with respect to a different data set. The term "indicator of a distance" may refer to information allowing determination of the distance between two objects, for example by expressing or revealing an effect of the distance, e.g., on a signal. For example, distance may cause attenuation, a phase or time shift on a signal, such as a light, infrared, radio, or acoustic wave. In some embodiments, image data received by an image sensor may be analyzed, for example, using one or more image processing techniques such as convolutions, fast Fourier transforms, edge detection, pattern recognition, and clustering to identify objects from the image pixels. Mathematical functions, such as geometric, algebraic, and/or scaling functions may be applied to the identified objects to determine the distance there between. For example, a beacon may emit signals (e.g., IR, radio, ultrasound) that may be reflected off the wearable extended reality appliance and the keyboard device. The reflected signals may be investigated (e.g., analyzed), for example based on timing, angle, phase, attenuation, Doppler shift, as indicators of the distance between the wearable extended reality appliance and the keyboard device. Additionally, or alternatively, the wearable extended reality appliance may include a camera and/or a beacon emitting signals, and the distance to the keyboard device may be determined based on images acquired by the wearable camera, and/or signals emitted by the wearable beacon reflected off an object (e.g., the keyboard device).

By way of a non-limiting example, turning to FIG. 19, a camera (e.g., image sensor 472 of FIG. 4) configured with smart glasses 1902 may acquire an image of keyboard device 1904 while wearer 1900 is seated at work station 1906. Processing device 460 may analyze the image to identify the perspective angle and scale of keyboard device 1904, for example, relative to other identified objects captured in the image, and/or based on absolute dimensions of keyboard device 1904 known in advance. The image analysis may indicate the distance between smart glasses 1902 and keyboard device 1904.

In some embodiments, the relative orientation includes a facing direction of the wearable extended reality appliance with respect to the keyboard device, wherein the sensor data reflective of the relative orientation includes image data, and where the operations further include analyzing the image data to determine an indicator of the facing direction. The term "facing direction" may refer to an angle or orientation corresponding to a line-of-sight of the wearer of the wearable extended reality appliance or corresponding to at least a portion of the field of view of the wearer, e.g., at a particular point in time. The term "image data" may refer to information acquired by a camera, e.g., as image pixels. The term "an indicator of the facing direction" may refer to information allowing determination of the orientation of the gaze of the wearer of the wearable extended reality appliance, by expressing or revealing an effect of the gaze. For example, a camera configured with the wearable may be aligned with a frontal head pose of the wearer such that the camera acquires images substantially corresponding to the field-of-view, or directional gaze of the wearer, e.g., as the wearer turns his head, the camera acquires images corresponding to what the wearer sees. Image data (e.g., sensor data) acquired by the camera may be provided to a processing device for analysis. The processing device may apply image processing techniques (such as egomotion or egopositioning algorithms) to the image data to detect the presence of the keyboard device. Based on the analysis, the processing device may determine the facing direction of the wearable extended reality appliance with respect to the keyboard. For example, if the keyboard device is positioned substantially centered in the image data, the processing device may determine that the facing direction of the wearable extended reality appliance is aligned with the keyboard. Conversely, if no keyboard is detected in the image data or the keyboard is detected in a peripheral region of the image, the processing device may determine that the facing direction of the wearable is not aligned with the keyboard device, e.g., aligned with an object other than the keyboard device. As another example, a camera tethered to the keyboard device may capture an image of the wearer of the wearable extended reality appliance and the image data (e.g., sensor data) provided to a processing device for analysis. The processing device may apply image processing techniques to the image data to detect the directional gaze (e.g., head pose) of the wearer. Based on the analysis, the processing device may determine the facing direction of the wearable extended reality appliance with respect to the keyboard. In some examples, a machine learning model may be trained using training examples to determine facing directions from images and/or videos. An exemplary training example may include a sample image and/or a sample video and an associated label indicating a facing direction corresponding to the sample image and/or the sample video. The trained machine learning model may be used to analyze the image data and determine the indicator of the facing direction. In some examples, at least part of the image data may be analyzed to calculate a convolution of the at least part of the image data and thereby obtain a result value of the calculated convolution. Further, in response to the result value of the calculated convolution being a first value, one indicator of the facing direction may be determined, and in response to the result value of the calculated convolution being a second value, a different indicator of the facing direction may be determined.

Figure 21:
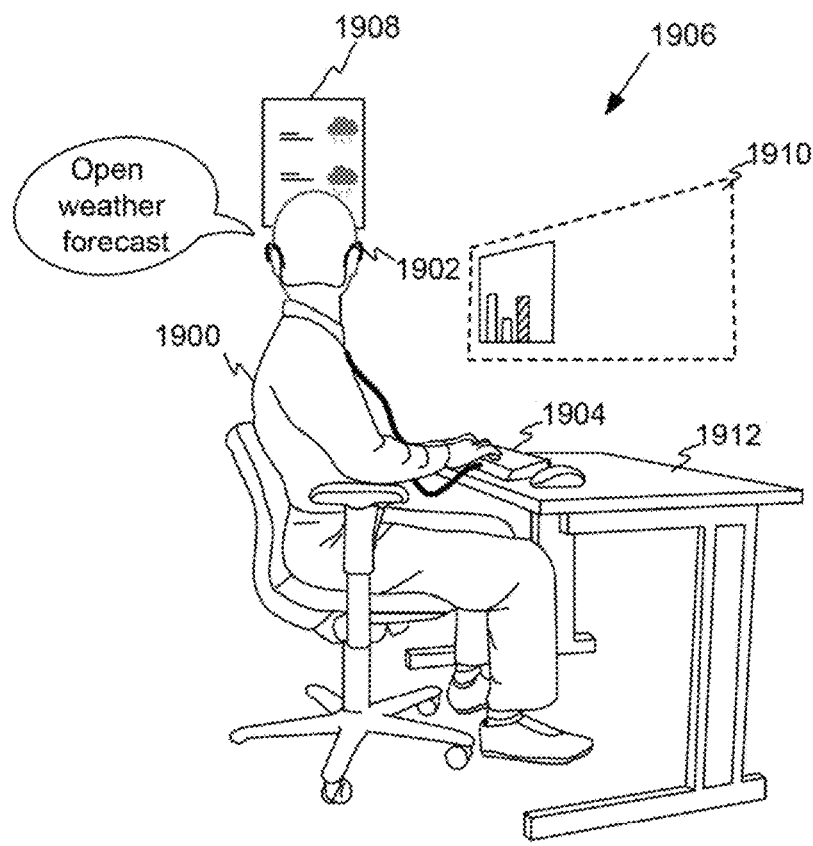
FIG. 21 illustrates another exemplary environment depicting a wearer of the wearable extended reality appliance in proximity to and facing away from a keyboard device, consistent with some embodiments of the present disclosure.

By way of a non-limiting example, reference is now made to FIG. 21 which is substantially similar to FIGS. 19 and 20 with the notable difference that wearer 1900 is facing away from keyboard device 1904. Image sensor 472 (FIG. 4) configured with smart glasses 1902 may acquire an image of the field of view of wearer 1900. Processing device 460 may analyze the image data. When keyboard device 1904 is absent from or in a peripheral region of the image data, processing device 460 may determine that the facing direction of smart glasses 1902 is away from keyboard device 1904.

In some embodiments, the sensor data reflective of the relative orientation is received from the keyboard device while the keyboard device is located on a surface. The term "sensor data reflective of the relative orientation is received from the keyboard device" may be understood as the keyboard device reflecting and/or emitting a signal from which the relative orientation may be determined. For example, light reflecting off the keyboard device may be captured by a camera and converted to image pixels (e.g., sensor data). The term "located" may refer to a station, placement, or position of an object. The term "surface" may include an upper layer of an object, such as a flat or top planar layer of a supporting plank, or board; or a contoured outer surface. For example, a surface may be a topmost layer of a table, and may be made of a hard, smooth material (e.g., wood, plastic, stone, metal, ceramic) capable of supporting other objects in a steady-state (e.g., stable) manner. For example, the keyboard device may be stationed or placed (e.g., located) on a plank or board forming an upper layer (e.g., surface) of a desk. A camera (e.g., configured with the wearable extended reality appliance and/or a work station including the surface and keyboard device) may sense light waves (e.g., ambient light) reflecting off the keyboard device during the time period (e.g., while) the keyboard device is positioned on the desk. The camera may convert the sensed light waves to pixels or image data (e.g., sensor data). A processing device may analyze the image data and detect the keyboard device and the alignment and size of the keyboard device relative to other objects detected in the image data. Based on the alignment and size, the processing device may determine the relative orientation of the keyboard device and the wearable extended reality appliance.

By way of a non-limiting example, turning to FIG. 19, image sensor 472 (FIG. 4) configured with smart glasses 1902 may acquire an image of keyboard device 1904 resting on table surface 1912. Processing device 460 may analyze the image to determine the distance between keyboard device 1904 and smart glasses 1902 (e.g., based on known absolute size and dimensions of keyboard device 1904), for example using triangulation.

Some embodiments include, based on the relative orientation, selecting from a plurality of operation modes a specific operation mode for the wearable extended reality appliance. The term "based on" may refer to being established by or founded upon, or otherwise derived from. The term "selecting" may refer to choosing, electing, or discriminately picking, for example one from multiple possible choices. For example, the selection may be performed by a processing device integrated with, local to, and/or remote from the wearable extended reality appliance or any combination thereof (such as one or more of processing devices 360 of FIG. 3, 460 of FIG. 4, 560 of FIG. 5). For example, a selection may be implemented by querying a database storing multiple possible choices using one or more criterion as filters, rules, and/or conditions for the search query. The database may be local or remote (e.g., with respect to a processing device implementing the search). Additionally, or alternatively, the selection may include performing one or more of logical, inference, interpolation, extrapolation, correlation, clustering, convolution, and machine learning operations, e.g., based on one or more criterion. The criterion may be, for example, user defined, hardware defined, software defined, or any combination thereof. The criterion may relate, for example, to distance, orientation, alignment, communication and/or processor latency and/or bandwidth (e.g., for either one or both of the wearable extended reality appliance and keyboard device), use context, the type of application for which the operation mode is being applied (e.g., work or personal use, high or low priority), the location of the wearer (e.g., private or public location, work or home, indoor or outdoor), the type of keyboard device (e.g., virtual, physical, or projected), user defined preferences, system defined preferences, or any other criterion relating to the operation of the wearable extended reality appliance and/or the keyboard device.

The term "operation modes" may refer to configurations, arrangements (e.g., including one or more parameter settings, default or custom settings, preferences) for performing or implementing one or more actions, functions, or procedures. For example, the operation modes may be based on one or more default settings (e.g., hardware and/or software), and/or user-defined settings and preferences. In some embodiments, the operation modes may be based one use context, use type, preferences, or user needs. Examples of user needs may include visibility and/or attention needs (e.g., based on user feedback and/or machine learning of the behavior and/or preferences of the wearer), the presence of noise and/or objects in the vicinity of the wearer, and any other criterion affecting the user experience of the wearer. In some embodiments, the operation modes may be based on an efficiency goal, a power consumption goal, an emissions goal, or environmental conditions (e.g., ambient light, dust level, wind, temperature, pressure, humidity). In some embodiments, the operation modes may correspond to device requirements of the wearable extended reality appliance and/or keyboard device, such as processing, memory, and internal communication (e.g., bus) capacity, availability and/or limitations. In some embodiments, the operation modes may be based on communications requirements of the communications network linking the wearable extended reality appliance with the keyboard device (e.g., communications bandwidth capacity, availability, or latency).

For example, different operation modes may be defined for indoor versus outdoor use of a wearable extended reality appliance. As another example, different operation modes may be defined based the time of day, day of week (e.g., holiday or work day). As another example, different operation modes may be defined for relatively mobile uses (e.g., regularly moving away from a work station) versus relatively stationary uses of a wearable extended reality appliance (e.g., rarely moving away from a work station). As another example, different operation modes may be defined for when the wearer is in proximity to a work station or remote from the work station (e.g., affecting the ability to communicate with another device tethered to the work station).

The term "specific operation mode" may refer to a distinct, special, or precise configuration or arrangement for performing one or more action, functions, or procedures. For example, from multiple different operation modes defined for the wearable extended reality appliance, a single (e.g., specific) operation mode may be chosen (e.g., selected) based on one or more criterion, such as any one or more of the criterion described earlier.

The operation modes may be store in memory, such as a memory device integrated with the wearable extended reality appliance or otherwise accessible by the wearable extended reality appliance. For example, the operation modes may be stored in a memory device, such as one or more of a memory device configured with the wearable extended reality appliance (e.g., memory device 411 of FIG. 4), in a memory device of a remote processing unit (e.g., memory device 511 of FIG. 5), in a memory device of a mobile device (e.g., mobile device 206 of FIG. 1) or any other memory device. A processing device (e.g., one or more of processing device 460, processing device 560, a processing device configured with mobile device 206 of FIG. 2, or any other processing device) may access one or more of the operation modes by querying the memory device based on one or more rules. For example, one rule for querying the memory device for an operation mode may be related to the relative orientation between the wearable extended reality appliance and the keyboard device.

Thus, the relative orientation of the wearable extended reality appliance to the keyboard device may be used to choose a specific operation mode from multiple candidate operation modes for wearable extended reality appliance. For example, one operation mode may be suitable for Bluetooth or Wi-Fi communication. Thus, when the wearable extended reality appliance is sufficiently close to the keyboard device to establish a Bluetooth or Wi-Fi communications channel, the Bluetooth or Wi-Fi operation mode may be selected, respectively. As another example, an operation mode that tethers the display to the keyboard device may be suitable for when the wearable extended reality appliance is facing towards the keyboard device and a different operation mode that tethers the display to the directional gaze of the wearer may be suitable for when the wearer is facing away from the keyboard device. As another example, an operation mode presenting content audibly may be suitable for when the wearable extended reality appliance is moving quickly relative to the keyboard device (e.g., in the context of an exercise application) and a different operation mode presenting content visually may be suitable for when the wearer is relatively stationary relative to the keyboard device (e.g., in the context of editing a document, or viewing content.

By way of a non-limiting example, turning to FIG. 19, image sensor 472 (FIG. 4) configured with smart glasses 1902 may capture an image of keyboard device 1904 and send the image pixels to processing device 460. Concurrently, motion sensor 473 configured with smart glasses 1902 may detect that smart glasses 1902 are relatively stationary (e.g., over a time period, such as 5 seconds) and send the motion sensor data to processing device 460. Processing device 460 may analyze the image pixels and the motion data received from image sensor 472 and motion sensor 473, respectively, and the relatively close and stable (e.g., steady state) position and orientation of smart glasses 1902 with respect to keyboard device 1904. Processing device 460 may determine that wearer 1900 is in a sitting position at work station 1906 and facing keyboard device 1904. In response, processing device 460 may query memory device 411 for an operation mode suited to sitting at work station 1906 from multiple operation modes for smart glasses 1902 stored in memory device 411, thereby selecting a specific mode from the plurality of available operation modes for smart glasses 1902. The selected operation mode may cause a forecast weather app 1908 to be displayed inside virtual screen 1910 tethered to work station 1906. The forecast may include a high level of detail, such as the forecast for the next twelve hours.

Turning to FIG. 20, based on data received from image sensor 472 and motion sensor 473, processing device 460 may determine that wearer 1900 is relatively distant from keyboard device 1904 and the position and orientation of smart glasses 1902 with respect to keyboard device 1904 is unstable (e.g., not in steady state). For example, a smart watch 1914 tracking steps walked wearer 1900 may notify processing device 460 that wearer 1900 is in motion (e.g., walking). In response, processing device 460 may query memory device 411 for an operation mode suited to walking while away from work station 1906 from the multiple operation modes stored in memory device 411, thereby selecting a specific mode from the plurality of available operation modes. The selected operation mode may cause forecast weather app 1908 to be displayed at a predefined distance from smart glasses 1902 (e.g., tethered to wearer 1900 while moving). The forecast may include a lower level of detail, such as the forecast only for the next two hours.

Some embodiments include identifying a user command based on at least one signal detected by the wearable extended reality appliance. The term "identifying" may refer to recognizing, perceiving, or otherwise determining or establishing an association with a known entity. For example, identifying may be a result of performing one or more logical and/or arithmetic operations associated with a comparison (e.g., via query), inference, interpolation, extrapolation, correlation, convolution, machine learning function, and any other operation facilitating identification. The term "user command" may refer to an order, direction or instruction issued by an individual interfacing with a computing device. Examples of user commands may include vocalized instruction (e.g., detected by a microphone), head, hand, foot, and/or leg motions or gestures (e.g., detected by a camera and/or an IMU or GPS device), eye motions (e.g., detected via an eye tracker), data entered, or selections made via a manual input device (e.g., buttons, switches, keyboard, electronic pointing device, touch-sensitive screen), data entered or selections made via a foot-operated device (e.g., pedal, footswitch), and/or any other technique for interfacing between a user and a computing device. The term "identifying a user command" may involve recognizing the user command, e.g., based on a comparison, correlation, clustering algorithm, or any other identification technique. For example, a vocalized user command may be identified by invoking voice recognition software. As another example, a head, eye, hand, foot, and/or leg gesture or motion command may be identified via gesture and/or motion recognition software. As another example, a command entered as data via in input interface of a computing device may be identified by an event listener configured with an operating system running on the computing device. Examples of user commands may include a request to invoke, close, or change the execution of an application on a device, turn on/off a device or device setting and/or change the operation of a device, send and/or receive a notification or document, retrieve, upload, store, or delete a notification or document, or perform any other user-invoked activity.

The term "signal" may refer to an information transmission. A signal, for example, may involve a function that can vary over space and time to convey information observed about a phenomenon via a physical medium. For example, a signal may be implemented in any range of the electromagnetic spectrum (e.g., radio, IR, optic), as an acoustic signal (e.g., audio, sonar, ultrasound), a mechanical signal (e.g., motion or pressure on a button or keyboard), as an electric or magnetic signal, or via any other physical medium. For example, the phenomenon may relate to a state, presence or absence of an object, an occurrence or development of an event or action, or lack thereof. For example, light waves (e.g., signals) reflecting off a body in motion and/or performing a gesture may be detected by a camera and stored as image data. As another example, motion and/or a gesture may be detected by a motion detector (e.g., IMU, GPS signals).

The term "detected" may refer to sensing (e.g., discovering or discerning) information embedded or encoded in a signal via a sensor (e.g., detector) corresponding to the signal type. Examples of detectors corresponding to signal types may include an antenna detecting electro-magnetic signals, a camera detecting optical and/or infrared signals, a microphone detecting acoustic signals, electrical and/or magnetic sensors detecting electric and/or magnetic fields (e.g., in analog electronic circuitry), semiconductor diodes or switches detecting an electric current or voltage (e.g., consequent to the performing of one or more logical operations, such as based on a user input), and any other type of detector capable of sensing a signal.

For example, the wearable extended reality appliance may include a detector integrated thereon. For example, the detector may be an audio sensor (e.g., audio sensor 472 of FIG. 4), an image sensor (e.g., image sensor 472), a motion sensor (e.g., motion sensor 472), an environmental sensor (e.g., environmental sensor 474), and additional sensors (e.g., sensors 472). The detector may sense an incoming analog signal (e.g., sound, light, motion, temperature) and convert the analog signal to an analog electronic signal via a transducer. The analog electronic signal may be processed (e.g., using a filter, transform, convolution, compression) and converted to a digital format (e.g., encoded as bits) via an analog-to-digital converter. The digitized signal may be stored in memory (e.g., memory device 411). A processing device (e.g., processing device 460) may retrieve the digitized signal and apply one or more digital signal processing techniques, such as a digital filter, a smoothing algorithm, a transformation, a convolution, a correlation, a clustering algorithm, or any other digital signal processing technique. The processing device may compare the processed signal to a database of user commands (e.g., store in memory device 411). Based on the comparison, the processing device may identify the user command, for example if the digitized signal matches a predefined user command within a threshold, such as a cluster associated with the user command. Optionally, the processing device may apply a machine learning algorithm to identify the digitized signal as a user command.

In some embodiments, the user command includes a voice command and the at least one signal is received from a microphone included in the wearable extended reality appliance. The term "voice command" may refer to a user command implemented by speaking words or uttering predefined sounds associated with a user command. The term "microphone" may refer to an audio sensor or voice input device as described earlier. The microphone may generate an audio signal that may be digitized and stored in a memory device. A processing device may apply a voice recognition algorithm to the digitized audio signal to identify the user command.

By way of a non-limiting example, turning to FIG. 19, audio sensor 471 (FIG. 4) configured with smart glasses 1902 may detect a sound produced by a words uttered by wearer 1900. Audio sensor 471 may generate an audio signal corresponding to the detected sound. The audio signal may be sampled (e.g., digitized) and stored in memory device 411 (e.g., as bits). Processing device 460 may apply a speech recognition algorithm to the digitized sound to identify a sequence of words associated with a user command.

In some embodiments, the user command includes a gesture and the at least one signal is received from an image sensor included in the wearable extended reality appliance. The term "gesture" may refer to a movement or sequence of movements of part of the body, such as a hand, arm, head, foot, or leg to express an idea or meaning. A gesture may be a form of non-verbal or non-vocal communication in which visible bodily actions or movements communicate particular messages. A gesture may be used to communicate in place of, or in conjunction with vocal communication. For example, raising a hand with the palm forward may be a hand gesture indicating to stop or halt an activity, and raising a thumb with the first closed may be a hand gesture indicating approval. A camera (e.g., image sensor) associated with the wearable extended reality appliance may capture one or more images of a gesture performed by the wearer (e.g., using the hand, arm, head, foot, and/or leg). The camera may store the image pixels in a memory device. A processing device may analyze the image pixels using a gesture recognition algorithm to identify the gesture as the user command.

Figure 22:
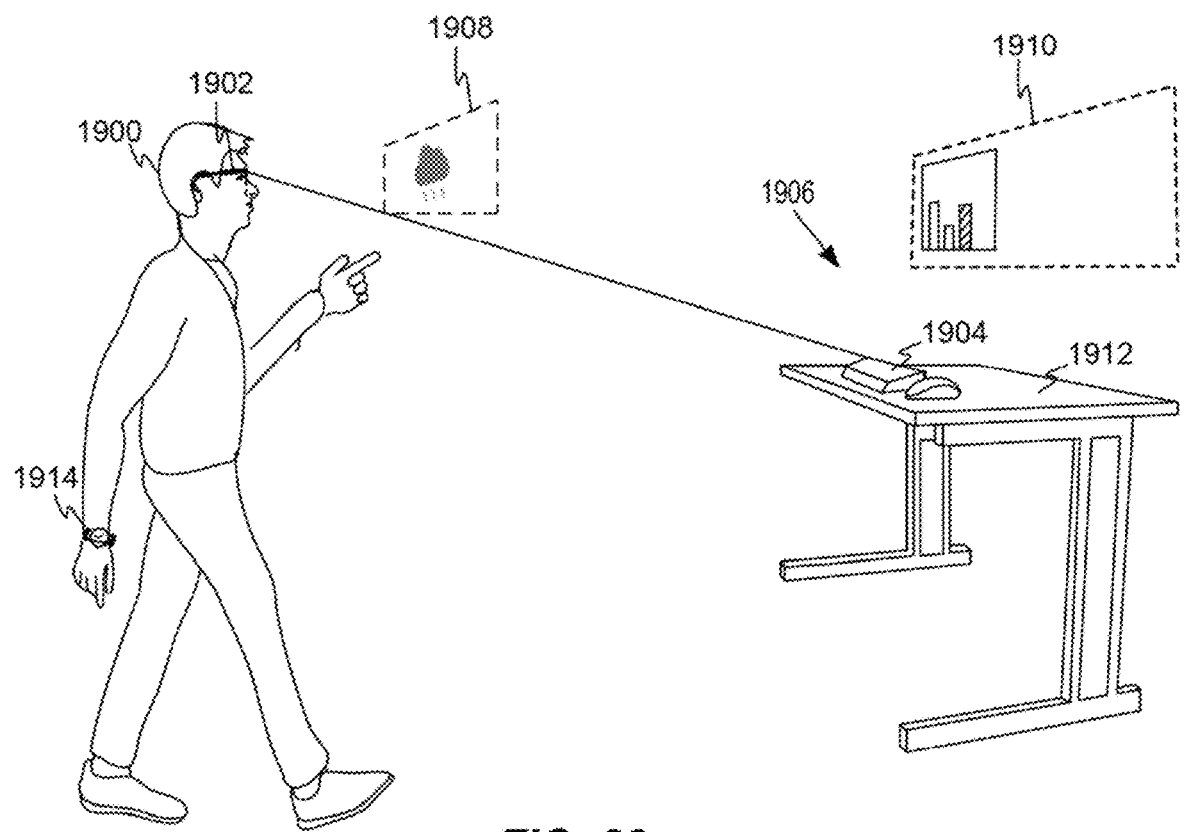
FIG. 22 illustrates another exemplary environment depicting a wearer of the wearable extended reality appliance walking towards a keyboard device and performing a gesture-based command, consistent with some embodiments of the present disclosure.

By way of a non-limiting example, turning to FIG. 22, image sensor 472 (FIG. 4) configured with smart glasses 1902 may detect light reflected off a hand of wearer 1900 and convert the reflected light as image pixels. Processing device 460 may apply a gesture recognition algorithm to the image pixels to identify a hand gesture (e.g., pointing of the index finger) associated with a user command. For example, the user command may be associated with invoking forecast weather app 1908.

As another example, a motion detector (e.g., IMU) configured with the wearable extended reality appliance may detect a head gesture performed by the wearer and convert the head gesture to an electronic signal via a transducer. The electronic motion signal may be digitized (e.g., sampled) and stored in a memory device. A processing device may apply a head gesture recognition algorithm to the digitized motion signal to identify the user command.

In some embodiments, identifying the user command may account for context and/or circumstances associated and/or unassociated with a user issuing the user command. For example, identifying the user command may take into account the time of day, and/or physical environment, location (e.g., public or private), a history of the user issuing the user command (e.g., habits and behavior based on machine learning), a context of the user command (e.g., based on actions performed immediately prior to the user command), and any other criterion relevant to identifying a user command.

Additionally, or alternatively, a user command may be identified based on a signal detected by the wearable extended reality appliance by receiving the signal from an additional device (e.g., smart watch, mobile phone) in communication (e.g., wireless communication) with the wearable extended reality appliance. For example, the wearer of the wearable extended reality appliance may enter text into an application of a mobile phone and the mobile phone may send a notification to a processing device configured with the wearable extended reality appliance (e.g., processing device 460 of FIG. 4). As another example, the wearer of the wearable extended reality appliance may push a button on a smart watch and the smart watch may send a notification to a processing device configured with the wearable extended reality appliance (e.g., processing device 460 of FIG. 4).

By way of a non-limiting example, turning to FIG. 20, a microphone (e.g., audio sensor 471 of FIG. 4) configured with smart glasses 1902 may sense a sound emitted by wearer 1900. The microphone may convert the sound to an electronic signal, which may be digitized (e.g., via sampling) and store in memory device 411. Processing device 460 may retrieve the digitized sound from memory device 411 and perform a voice recognition algorithm to identify the words "Open Weather Forecast", corresponding to a user command for invoking forecast weather app 1908, thereby detecting the user command. As another example, wearer 1900 may don a smart watch 1914 communicatively coupled to smart glasses 1902. Wearer 1900 may press a button of smart watch 1914 associated with invoking forecast weather app 1908. Smart watch 1914 may transmit a notification to smart glasses 1902 indicating the button press (e.g., via a Bluetooth link) Processing device 460 may receive the notification (e.g., detect the signal) and determine an association with a user command to invoke weather application 108, thereby detecting the user command.

Some embodiments include executing an action responding to the identified user command in a manner consistent with the selected operation mode. The term "executing" may refer to carrying out or implementing one or more operative steps. For example, a processing device may execute program code instructions to achieve a targeted (e.g., deterministic) outcome or goal, e.g., in response to receiving one or more inputs. The term "action" may refer to the performance of an activity or task. For example, performing an action may include executing at least one program code instruction (e.g., as described earlier) to implement a function or procedure. The action may be user-defined, device or system-defined (e.g., software and/or hardware), or any combination thereof. The action may correspond to a user experience (e.g., preferences, such as based on context, location, environmental conditions, use type, user type), user requirements (attention or visibility limitations, urgency or priority of the purpose behind the action), device requirements (e.g., computation capacity/limitations/latency, resolution capacity/limitations, display size capacity/limitations, memory and/or bus capacity/limitations), communication network requirements (e.g., bandwidth, latency), and any other criterion for determining the execution of an action, e.g., by a processing device. The action may be executed by a processing device configured with the wearable extended reality appliance, a different local processing device (e.g., configured with a device in proximity to the wearable extended reality appliance), and/or by a remote processing device (e.g., configured with a cloud server), or any combination thereof.

Thus, "executing an action responding to the identified command" may include performing or implementing one or more operations in reaction to an identified user command, e.g., to address the user command or in association with or correspond to the user command. For example, upon receiving a request from a user for data, a computing device may query a database stored on a memory device to locate and retrieve the requested data, thereby executing an action responding to the identified user command. As another example, upon receiving a voice command from a user to send a message to a second user, a computing device may apply a voice recognition algorithm to identify the user command, query a table storing a device ID associated with the second user, establish a communications link with the computing device of the second user (e.g., based on the device ID), and transmit the message over the communications link, thereby executing an action responding to the identified user command.

The term "in a manner consistent with" may refer to complying with one or more predefined rules or conditions, meeting one or more requirements, or keeping within defined limitations, settings, or parameters, e.g., defined for the selected operation mode. For example, compliance with a selected operation mode may relate to specifying display parameters, such as the resolution, color, opacity, size and amount of rendered content. As another example, compliance with a selected operation mode may relate to available memory, processor and/or communications bandwidth, latency requirements (e.g., to display less or lower resolution content under lower bandwidth capacity and more or higher resolution content under higher bandwidth capacity). As another example, compliance with a selected operation mode may relate to user defined preferences (e.g., to display less detail while the user is walking and more detail when the user is stationary). By way of another example, compliance with a selected operation mode may relate to environmental conditions (e.g., to replace a visual display with an audible representation under bright sunlight or very windy conditions, or conversely to replace an audible rendition with a visual display under noise conditions). As another example, compliance with a selected operation mode may relate to a location of the wearer of the wearable extended reality appliance (e.g., content may be rendered differently at work versus at home). As another example, compliance with a selected operation mode may relate to the current activity (e.g., sitting, walking, driving, lying down) of the wearer, e.g., the display of content may be limited while the wearer is driving.

Thus, an action performed in response to a user command may be performed in compliance with the operation mode of the wearable extended reality appliance (e.g., based on the relative orientation to the keyboard device). For example, a sensor may detect a wearable extended reality appliance while in motion and located beyond a threshold distance from a keyboard device. Thus, the orientation between the wearable extended reality appliance and the keyboard device may change dynamically due to the wearer walking. This may correspond to a walking mode for the extended reality appliance when the wearer is away from the keyboard device. The walking mode may include settings to present content in a manner to avoid distracting the wearer while walking (e.g., to avoid having to read text). While walking, the wearer of the wearable extended reality appliance may vocalize a command to receive a message. In response, the message may be presented audibly via a speaker using a speech synthesizer, e.g., consistent with the walking mode.

As another example, a sensor may detect a wearable extended reality appliance in a second orientation (e.g., leaning back in a chair in proximity to but facing away from the keyboard device). The second orientation may correspond to a resting mode for the wearable extended reality appliance. The resting mode may include settings to present content visually via the wearable tethered to the line-of-sight of the wearer, e.g., to allow the wearer to view content while facing away from the keyboard device. In response to the user command, the message may be presented visually locked to the line-of-sight of the wearer, e.g., consistent with the resting mode allowing the wearer to read the message while facing away from the keyboard device.

As another example, a sensor may detect a wearable extended reality appliance in a third orientation (e.g., sitting upright in a chair adjacent to the keyboard device). The third orientation may correspond to a work mode for the wearable extended reality appliance. The work mode may include settings to present content visually via the wearable tethered to the work station, e.g., the keyboard device, allowing the wearer to view content displayed in a virtual screen above the keyboard device. In response to the user command, the message may be presented visually in the virtual screen, tethered to the work station and keyboard device.

By way of a non-limiting example, turning to FIG. 19, a camera (e.g., image sensor 472 of FIG. 4) may capture an image of keyboard device 1904 in proximity to wearer 1900 and at an angle indicating that wearer is seated upright facing keyboard device 1904. Processing device 460 may analyze the image and determine a close-upright orientation between smart glasses 1902 and keyboard device 1904. Based on the close-upright orientation, a close-upright mode may be selected for smart glasses 1902. For example, the close-upright mode may be associated with displaying more content than when positioned far from keyboard device 1904 and displaying content inside virtual screen 1910 locked (e.g., tethered) to work station 1906. Wearer 1900 may vocalize the user command "Open weather forecast", corresponding to invoking a weather application and displaying the weather forecast. Processing device 460 may display forecast weather app 1908 to include the forecast for the next twelve hours. Forecast weather app 1908 may be displayed inside virtual screen 1910, locked to work station 1906 and keyboard device 1904, e.g., in a manner consisted with the close-upright mode.

By way of another non-limiting example, turning to FIG. 20, a camera (e.g., image sensor 472 of FIG. 4) may capture an image of keyboard device 1904 beyond a predefined threshold from wearer 1900. Processing device 460 may analyze the image and determine a remote orientation between smart glasses 1902 and keyboard device 1904. Based on the remote orientation, a remote operation mode may be selected for smart glasses 1902. For example, the remote operation mode may be associated with displaying less content than when positioned in proximity to keyboard device 1904, and displaying content locked (e.g., tethered) to the line-of-sight of wearer 1900. Wearer 1900 may vocalize the words "Open weather forecast", corresponding to a user command to invoke a weather application and display the weather forecast. Processing device 460 may display the weather forecast for the next two hours and locked to the line-of-sight of wearer 1900, e.g., in a manner consisted with the remote operation mode.

Some embodiments include accessing a group of rules associating actions responding to user commands with relative orientations between the keyboard device and the wearable extended reality appliance, determining that the relative orientation corresponds to a specific rule of the group of rules, and implementing the specific rule to execute an associated action responding to the identified user command. The term "accessing" may refer to obtaining, e.g., at least for the purpose of reading, or acquiring relevant information. For example, data may be accessed by a processing device querying a data store, such as a database. The term "group of rules" may refer to a set of guidelines, regulations, or directives. A group of rules may include general rules, or may include rules defined for a specific device, user, system, time, and/or context. Thus, a group of rules may be stored in a database on a memory device (e.g., local and/or remote) and accessed via query. The memory device may be accessible only for privileged users (e.g., based on a device and/or user ID) or generally accessible. The term "associating" may refer to linking, tying, relating, or affiliating.

Thus, the group of rules may link or relate one or more actions to one or more relative orientations between the keyboard device and the wearable extended reality appliance. The actions (e.g., linked to relative orientations via the rules) may be performed in response to user commands. For example, an action to invoke an application may be performed in response to a vocalized user command "invoke app". Moreover, one or more rules may define how to perform the action, in other words, how to invoke the application. In particular, a rule may define how to invoke the application based on the relative orientation between the wearable extended reality appliance and the keyboard. For example, when the wearable extended reality appliance is within Bluetooth communication range of the keyboard (e.g., a first orientation), a rule may cause a first version of the application to be invoked. However, when the wearable is outside Bluetooth communication range from the keyboard (e.g., a second orientation), a rule (e.g., the same or different rule) may cause a second version of the application to be invoked. For example, the first version of the application may include more content and/or may be displayed in a larger format than the second version.

As another example, an action to display content may be performed in response to a hand gesture (e.g., user command) performed by a wearer of a wearable extended reality appliance. However, a rule may define how to display the content, depending on the orientation between the wearable extended reality appliance and the keyboard device. For example, when the wearable extended reality appliance is facing towards the keyboard (e.g., a third orientation), a rule may cause content to be displayed according to a first color scheme, and when the wearable extended reality appliance is facing away from the keyboard (e.g., a fourth orientation), the same or different rule may cause content to be displayed according to a second color scheme. For example, the first color scheme may be suitable for displaying content against a blank wall positioned behind the keyboard device, and the second color scheme may be suitable for displaying content suspended (e.g., floating) in a room together with other distracting objects.

The term "determining" may refer to performing a computation, or calculation to arrive at a conclusive or decisive outcome. The term "specific rule of the group of rules" may refer to a distinct, special, or precise rule from multiple different rules. Thus, a particular (e.g., specific) rule may be selected from a group of rules based on a computation resulting in a decisive conclusion. For example, when the relative orientation changes dynamically the processing device may calculate an associated velocity and query for a specific rule corresponding to the velocity. As another example, when the relative orientation indicates a stationary position facing a blank wall, the processing device may query for a specific rule corresponding to viewing content on a blank wall while in a stationary position.

The term "corresponds" may refer to correlated with, or in conformance with. Thus, a relative orientation (e.g., between a user and a device, or between two devices) may be used to decide (e.g., determine) which rule to apply when performing an action. For example, a first rule causing content to be presented using a small format may correspond to a first relative orientation (e.g., when the relative distance between a wearable extended reality appliance and a keyboard device is large, e.g., above a threshold). A second rule causing content to be presented using a large format may correspond to a second relative orientation (e.g., when the relative distance between the wearable appliance and the keyboard device is small, e.g., below a threshold). Thus, in response to a user command to display content, if the wearable extended reality apparatus is beyond the threshold from the keyboard device (e.g., the first relative orientation), the first rule may be applied to display content (e.g., using the small format). When the wearable extended reality apparatus is within the threshold of the keyboard (e.g., the second relative orientation), the second rule may be applied to display content (e.g., using the larger format).

The term "implementing" may refer to materializing, fulfilling, carrying out, or applying. For example, implementing a rule may cause the rule to be applied when performing an action. The term "associated action responding to a user command" may refer to an action (e.g., performed in response to a user command, as defined earlier) that is linked, or corresponds to a relative orientation between the wearable extended reality appliance and the keyboard device by the rule. Thus, the rule may create the association (e.g., link) between the action performed in response to a user command and the relative orientation between the wearable extended reality appliance and the keyboard device. For example, changing the relative orientation of the wearable extended reality appliance may affect the ambient lighting conditions, and/or introduce virtual and/or real obstructions. The changed orientation may thus affect how displayed content appears to the wearer of the wearable extended reality appliance (e.g., the result of executing an action in response to a user command). The specific rule may address the effect of the changed orientation by modifying one or more display settings (e.g., to accommodate the different ambient lighting, or obstruction). For example, the specific rule may rearrange content and adjust the brightness to produce a more satisfactory user experience.

For example, a user command "display message" may cause a wearable extended reality appliance to present a message including an image (e.g., perform an action responding to an identified user command). However, the relative orientation of the wearable to the keyboard device may determine how the message and image will be presented, based on one or more predefined rules. For example, when the wearable extended reality appliance is in motion and moving away from the keyboard device (e.g., the wearer is walking away from the keyboard) a first rule may be implemented to present the message and accompanying image audibly, e.g., to avoid distracting the wearer with visual content while walking and to conserve communications bandwidth as the wearer exits Bluetooth range of the work station. When the wearable extended reality appliance is in motion and moving towards from the keyboard device, (e.g., the wearer is walking towards the keyboard), a second rule may be implemented to present the message audibly but present the accompanying image visually, e.g., to avoid distracting the wearer with text while walking, but allow the wearer to see the image since there is sufficient bandwidth. When the wearable extended reality appliance is stationary and facing the keyboard device, (e.g., the wearer is sitting at the work station facing the keyboard), a third rule may be implemented to present the message and accompanying image visually, e.g., to provide a full visual experience to the wearer and avoid distracting while working.

By way of a non-limiting example, turning to FIGS. 19 and 20, in response to the voice command "Open weather forecast" (e.g., a user command), smart glasses 1902 may be configured to display the forecast (e.g., perform an action responding to a user commands). However, based on the relative orientation between smart glasses 1902 and keyboard device 1904, one or more rules may be defined governing how the action is to be performed. Referring to FIG. 19, wearer 1900 is shown sitting at work station 1906. Processing device 460 (FIG. 4) may determine the relative orientation between smart glasses 1902 and keyboard device 1904 (e.g., in proximity, facing, and stationary). Processing device 460 may query a rules database for a rule to apply when smart glasses 1902 are in proximity to, facing, and stationary with respect to keyboard device 1904 (e.g., determine that the relative orientation corresponds to a specific rule). The selected rule may define parameters for rendering content suitable to situations where a wearer of a pair of smart glasses is sitting at a work station, facing a keyboard. For example, the rule may cause content to be displayed in a virtual screen tethered to the work station, using a large format and rich with details. Accordingly, processing device 460 may implement the rule to present forecast weather app 1908, using a large display format and including the weather for the next twelve hours, inside virtual screen 1910, (e.g., implement the specific rule to execute an associated action responding to the identified user command).

Referring to FIG. 20, wearer 1900 is shown walking towards work station 1906. Processing device 460 may determine the relative orientation between smart glasses 1902 and keyboard device 1904 (e.g., distant, facing, and moving towards). Processing device 460 may query the rules database for a rule to apply when smart glasses 1902 are distant from, facing, and moving towards keyboard device 1904. The rule may cause content to be displayed in a virtual screen tethered to smart glasses 1902, using a small format with few details. Accordingly, processing device 460 may implement the rule to present forecast weather app 1908, using a small display format and including the weather for only the next two hours, locked to the directional gaze of smart glasses 1902.

In some embodiments, the relative orientation includes both distance information and facing information, and wherein the operations further include, for distances within a threshold: when the wearable extended reality appliance is facing the keyboard device, selecting a first operation mode, and when the wearable extended reality appliance is facing away from the keyboard device, selecting a second operation mode. The term "distance information" may include one or more measurements, assessments, or evaluations indicating an amount of space (e.g., distance as described earlier) separating two objects, such as between a wearable extended reality appliance and a keyboard device.

The term "facing information" may include one or more measurements, assessments, or evaluations indicating a facing direction as described earlier. For example, the facing information may include a relative angle there between, a vertical (e.g., height) disparity, a planar (e.g., horizontal) disparity, an orientation relative to another object in the vicinity (e.g., a wall, floor, bookcase), and/or with respect to the Earth (e.g., based on a compass). For example, a processing device may apply a facial recognition algorithm to an image acquired from the perspective of the keyboard device to determine if the wearer is facing the keyboard device. Additionally, or alternatively, a processing device may apply an object recognition algorithm to an image acquired from the perspective of the wearable extended reality appliance to detect the presence of the keyboard device in the field of view of the wearer, to determine the facing information.

The term "distances within a threshold" may refer to a position inside or within a zone, for example demarcated by a boundary, limit, or border (e.g., threshold) marking the zone. For example, a threshold may be defined relative to another object (e.g., fixed or mobile), based on the ability of a device to interface with another device, based on a sensory capability inside the zone (e.g., within the threshold), and/or lack of sensory capability outside the zone (e.g., beyond the threshold). For example, when the distance between a wearer of a wearable appliance and a virtual screen is within reading range, the distance may be within the threshold. As another example, when a device is within Bluetooth range of another device, the distance between the two devices may be within the threshold. As another example, a threshold may demarcate a zone based on a focus or attention capability of a user (e.g., based on environmental conditions such as ambient light, ambient noise, or the presence of distracting objects, or people). For example, the distance between a wearer of a wearable appliance and another device may be determined to be within the threshold based on one or more environmental conditions. As another example, a threshold may demarcate a zone based on user preferences or user behavior, e.g., determined based on user input and/or machine learning. For example, when the distance between a wearer of a wearable appliance and a keyboard device is within a manual typing range, the distance may be within the threshold. A processing device (e.g., processing device 460 of FIG. 4) may determine when a wearable extended reality appliance is within a threshold of a keyboard device based on the distance information received with the relative orientation.

The term "facing the keyboard device" may refer to a pose of the wearable extended reality appliance substantially aligned with or pointing in a direction toward the keyboard device, such that a wearer of the wearable extended reality appliance sees the keyboard device in a substantially centered region of his field of view. The term "facing away from the keyboard device" may refer to a pose of the wearable extended reality appliance substantially unaligned with or pointing in a direction away from the keyboard device, such that a wearer of the wearable extended reality appliance does not see the keyboard device or sees the keyboard device in a peripheral region of his field of view. Thus, the relative orientation may include data relating to the distance between the wearable and the keyboard (e.g., distance information), and additionally, data relating to the directional gaze of the wearer of the wearable with respect to the keyboard device (e.g., facing information). Either one or both of the distance information and the facing information may be used to determine the operation mode for the wearable extended reality appliance.

For example, when the wearable extended reality appliance is sufficiently close to the keyboard device (e.g., to establish a Bluetooth connection), a Bluetooth operation mode may be applied to the wearable extended reality appliance. For example, the Bluetooth channel may allow displaying content using a high resolution. However, the directional gaze of the wearer (e.g., the facing information) may be used to determine additional settings for the wearable extended reality appliance. For example, when the wearable is facing the keyboard device, an operation mode corresponding to a forward-facing pose may be applied to display content on a virtual screen tethered to the keyboard device, and when the wearable extended reality appliance is facing to the side (e.g., away from the keyboard device), an operation mode corresponding to the side-facing pose may be applied to display content on a virtual screen tethered to the wearable extended reality appliance.

By way of a non-limiting example, turning to FIGS. 19 and 21, processing device 460 (FIG. 4) may detect smart glasses 1902 positioned within 50 cm of keyboard device 1904 (e.g., distance information). For example, processing device may receive image data from image sensor 472 and analyze the image data to determine the distance information. Based on the distance information, processing device 460 may determine that the distance between smart glasses 1902 and keyboard device falls within a threshold for presenting content visually with a high level of detail. For example, a weather forecast may be displayed visually and include the forecast for the next twelve hours. Additionally, processing device 460 may determine where to display the weather forecast based on the directional gaze of wearer 1900. For example, processing device 460 may receive facing information from an IMU (e.g., motion sensor 473) configured with smart glasses 1902 to determine the directional gaze. Turning to FIG. 19, based on the facing information, processing device 460 may detect a forward-facing pose for smart glasses 1902 and select a forward-facing operation mode (e.g., from multiple operation modes stored in memory device 411). For example, the forward-facing operation mode may cause twelve-hour forecast 1908 to be displayed on virtual screen 1910 tethered (e.g., docked) to work station 1906. Turning to FIG. 21, based on the facing information, processing device 460 may detect a side-facing pose for smart glasses 1902 and select a side-facing operation mode for smart glasses 1902. For example, the side-facing operation mode may cause twelve-hour forecast 1908 to be displayed tethered to smart glasses 1902.

Some embodiments include determining that the user command is a query, and wherein in the first operation mode, the action responding to the query involves providing a first response that includes displaying information on a virtual display screen associated with the keyboard device, and in the second operation mode, the action responding to the query involves providing a second response that excludes from displaying information on the virtual display screen. The term "query" may refer to a search request, question, or inquiry. A query may include conditions that must be fulfilled, such as filters or rules that narrow down the search results. For example, a query may be formulated using a query language (e.g., SQL, OQL, SPARQL, OntoQL, and any other query language), and a processing device may determine the user command is a query by identifying query language terms in the user command. As another example, a query may target a database or knowledge base, and the processing device may determine the user command is a query based on the target. A processing device may receive a user command and determine that the user command is a query. For example, if the user command is text (e.g., entered via the keyboard device), a processing device may parse and tokenize the text to identify the query. As another example, if the user command is a voice command, a processing device may apply a speech recognition package to the voice command to tokenize and identify spoken words as the query. By way of another example, if the user command is a gesture, a processing device may apply a gesture recognition package to identify the query.

The term "action responding to the query" may be understood as an action reacting or replying to a user command, as described earlier, where the user command is a query. The term "response" may include information received in reply or reaction to submitting a query. For example, a response to a query for an address for a contact name may be a single address for a single contact with the name), several addresses for the contact), several contacts with the same name all having one address, each with one or more addresses).

The term "displaying" may refer to selectively activating pixels of an electronic display device or otherwise visually presenting information (e.g., a viewer of a wearable extended reality appliance). The term "displaying information" may refer to selectively activating pixels or otherwise presenting information to convey a facts and/or knowledge.

For example, a processing device of the wearable extended reality appliance may display content on a virtual screen by selectively activating certain pixels of the viewer to render virtual content overlaid on the physical environment viewable via transparent portions of the viewer. The term "excludes" may refer to omitting or precluding.

Thus, if the wearable extended reality appliance is facing the keyboard device (e.g., the first operation mode is selected), a response to the query may display information on a virtual display associated with the keyboard device. If the wearable extended reality appliance is facing away from the keyboard device (e.g., the second operation mode is selected), a response to the query may omit (e.g., exclude) information from being display on the virtual display associated with the keyboard device. For example, the information may be presented audibly, in a tactile manner, or on a virtual screen associated with the wearable extended reality appliance. As another example, the query may be a request for directions to a target location. When the wearer is facing the keyboard device, the directions may be displayed on a virtual screen above the keyboard device (e.g., in the line-of-sight of the wearer). When the wearer is facing away from the keyboard device, however, the directions may be recited audibly via a speaker, and/or displayed in a virtual screen tethered to the wearable extended reality display.

By way of a non-limiting example, turning to FIGS. 19 and 21, wearer 1900 submits a query by vocalizing the words "open weather forecast". Processing device 460 (FIG. 4) may submit a query to a remote weather server (not shown) via network 214 (FIG. 2), for example using a weather API, and retrieve the current weather forecast. Turning to FIG. 19, based on the front-facing orientation of smart glasses 1902 with respect to keyboard device 1904, processing device 460 may apply the first operation mode and display forecast weather app 1908 in virtual screen 1910, tethered to work station 1906 and keyboard device 1904. Turning to FIG. 21, based on the side-facing orientation of smart glasses 1902, e.g., away from keyboard device 1904, processing device 460 may apply the first operation mode and exclude forecast weather app 1908 from being displayed in virtual screen 1910. Instead, processing device 460 may display forecast weather app 1908 tethered to smart glasses 1902.

In some embodiments, the first response includes visually presenting a most likely answer to the query and at least one alternative answer to the query; and the second response includes audibly presenting the most likely answer to the query without presenting the at least one alternative answer to the query. The term "visually presenting" may include displaying information on a virtual and/or physical display. The term "audibly presenting" may include conveying information by playing an audio signal via a speaker and voice synthesizer. The term "a most likely answer" may refer to a response having a high degree of certainty associated with the response. Thus, for example, when there are multiple possible responses to a query, the responses may be assigned a probability. In one example, the response may be based on an output of a machine learning model trained using training examples to generate answers to queries. An example of such a training example may include a sample query, together with a desired answer to the sample query. In one example, the machine learning model may be a generative model, or more specifically text generation model. In one example, the machine learning model may provide two or more possible answers, and may provide confidence level associated with each possible answer. Each possible response may be based on a possible answer, and the probability assigned to the possible response may be a mathematical function (such as a linear function, a nonlinear function, a polynomial function, etc.) of the confidence level. And a response having a maximum probability may be selected from among the possible responses as the "most likely answer." The term "alternative answer" may refer to a response to a query different than a probably or expected response to a query, e.g., having a relatively lower probability. Thus, when the wearer is facing the keyboard device (e.g., the first operation mode is applied to display the first response on the virtual screen associated with the keyboard device), the most probable answer to the query may be displayed together with another, e.g., alternative answer. For example, the query may request a driving route to a destination, and in response, the shortest driving route may be visually presented (e.g., on a map) together with an additional (e.g., longer) route. When the wearer is facing away from the keyboard device (e.g., the second response is provided that avoids displaying information on the virtual screen associated with the keyboard device), the most probable response may be vocalized via a speaker, without providing the alternative response. For example, in response to the query requesting the driving route, the shortest driving route may be described audibly via a speaker, and audible description of the additional route may be omitted.

Figure 23:
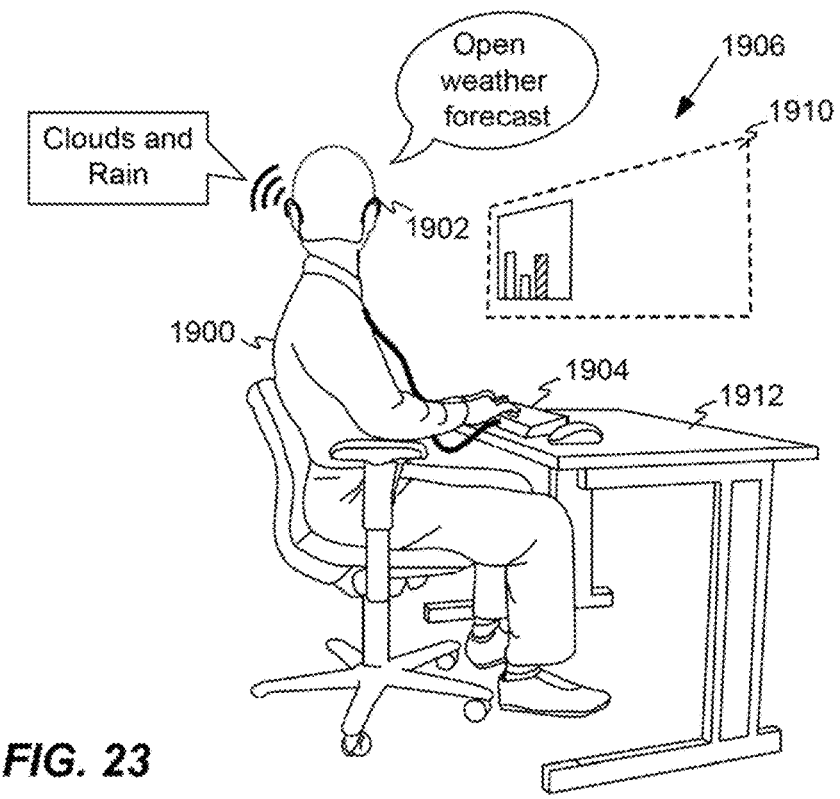
FIG. 23 illustrates another exemplary environment depicting a wearer interfacing with the wearable extended reality appliance via audio while facing away from a keyboard device, consistent with some embodiments of the present disclosure.

By way of a non-limiting example, turning to FIGS. 19 and 23, wearer 1900 submits a query to receive a weather forecast by issuing a voice command "Open weather forecast". FIG. 23 is substantially similar to FIG. 19 with the notable different that wearer 1900 is facing away from keyboard device 1904 and receives content audibly via a speaker configured with smart glasses 1902 (e.g., speaker 453 of FIG. 4). Referring to FIG. 19, processing device 460 (FIG. 4) may determine that smart glasses 1902 are within the threshold distance and facing keyboard device 1904 and may present the first response to the query using the first operation mode for smart glasses 1902. Accordingly, processing device 460 (FIG. 4) may visually present the weather forecast on virtual display 1910, where the forecast may include the most probable forecast (e.g., topmost forecast), in addition to two other alternative forecasts (e.g., bottom two forecasts). Referring to FIG. 23, processing device 460 may determine that smart glasses 1902 are within the threshold distance but face away from keyboard device 1904. Processing device 460 may present the second response to the query using the second operation mode for smart glasses 1902. Accordingly, processing device 460 may audibly present the most probable forecast ("clouds and rain") via a speakers configured with smart glasses 1902 (e.g., speaker 453) and may omit presenting the alternative forecasts.

In some embodiments, the first response includes visually presenting an answer to the query and additional relevant information, and the second response includes audibly presenting the answer to the query without presenting the additional relevant information. The term "answer" may refer to a response or information provided as feedback to a query. The term "additional relevant information" may refer to supplementary facts, advice, or data pertaining to the query, that may not be included in a direct or narrow response to a query. The term "without presenting the additional relevant information" may refer to omitting or withholding presenting the additional information. For example, in response to a query for directions, when the user is facing the keyboard device, a driving route may be displayed together with indications for service stations along the route, and opening hours for the service stations. However, when the user is facing away from the keyboard device, the driving route may be described audibly, and the information relating to the service stations may be omitted.

By way of a non-limiting example, turning to FIGS. 19 and 23, wearer 1900 submits a query to receive a weather forecast by issuing a voice command "Open weather forecast". Referring to FIG. 19, smart glasses 1902 are within the threshold distance and facing keyboard device 1904. Thus, processing device (FIG. 4) may apply the first operation mode and display forecast weather app 1908 predicting rain. In addition, processing device may present wind speeds (e.g., additional relevant information) as text accompanying the rain forecast. Referring to FIG. 23, smart glasses 1902 are within the threshold distance but facing away from keyboard device 1904. Thus, processing device may apply the second operation mode and audibly present the weather forecast (e.g., clouds and rain) via speakers configured with smart glasses 1902 (e.g., speakers 453), and may withhold presenting the wind speeds.

Some embodiments include determining that the user command is an instruction to present a new virtual object, wherein in the first operation mode, the action responding to the instruction includes presenting the new virtual object in a first location associated with a location of the keyboard device, and in the second operation mode, the action responding to the instruction includes presenting the new virtual object in a second location associated with a location of the wearable extended reality appliance. The term "instruction" may refer to a directive or order, e.g., to perform an action. The term "new virtual object" may refer to a virtual (e.g., computer synthesized) item not presented previously. Examples of a virtual object may include a virtual screen, virtual widget, virtual icon or image, virtual application, or any other virtual item or entity. The term "location" may refer to a position, e.g., relative to the keyboard device, work station, wearable extended reality appliance, or any other object of reference. For example, a user command may be a directive to open a new window or widget for an application. When the user is facing the keyboard device, the new virtual object may be displayed docked, or relative to the keyboard device (e.g., above or to the side of the keyboard device). However, when the user is facing away from the keyboard device, the new virtual object may be displayed docked, or relative to the wearable extendable reality appliance.

By way of a non-limiting example, turning to FIGS. 19 and 21, processing device 460 (FIG. 4) may determine that the voice command "Open weather forecast" is an instruction to invoke a weather application, requiring to display a new virtual window to display the weather forecast. Referring to FIG. 19, smart glasses 1902 are within the threshold distance and facing keyboard device 1904. Thus, processing device may apply the first operation mode. Accordingly, processing device 460 may present forecast weather app 1908 as a new virtual object inside a location of virtual screen 1910 associated with work station 1906 and keyboard device 1904. Referring to FIG. 23, smart glasses 1902 are within the threshold distance but facing away from keyboard device 1904. Thus, processing device may apply the second operation mode. Accordingly, processing device 460 may present forecast weather app 1908 as a new virtual object in a location associated with (e.g., relative to) smart glasses 1902.

In some embodiments, the first location is docked relative to the location of the keyboard device, and the second location changes with head movements of a user of the wearable extended reality appliance. The term "docked" may refer to locked, anchored or tethered. For example, a virtual widget docked to a work station may be anchored to the work station such that when a user leaves the work station, the virtual widget is no longer visible. As another example, a virtual widget docked to a wearable extended reality appliance may follow the gaze of the wearer. The term "relative to the location" may refer to with respect to, or as compared to the location, e.g., using the location as a reference. The term "changes with head movements of a user of the wearable extended reality appliance" may refer to following or tracking head motions (e.g., up/down, left/right, sideways) performed by the wearer of the wearable extended reality appliance. For example, a virtual widget displayed in a location that changes with head movements of a user of the wearable extended reality appliance may be anchored to the wearable extended reality appliance such that when the user turns his head, the virtual widget remains within the field of view of the user. Thus, when the wearer is facing the keyboard device, the virtual object may be displayed in a manner that is anchored or fixed (e.g., docked) relative to the keyboard device. When the wearer is facing away from the keyboard device, the virtual object may be displayed in a manner that is anchored to the wearable extended reality appliance and follows the gaze of the user as the user turns his head.

By way of a non-limiting example, referring to FIG. 19, smart glasses 1902 are within the threshold distance and facing keyboard device 1904. In response to the voice command "Open weather forecast", processing device may apply the first operation mode and present forecast weather app 1908 as a new virtual object inside a location of virtual screen 1910, that is tethered (e.g., fixed relative to) work station 1906 and keyboard device 1904. Referring to FIG. 23, while wearer 1900 is within the threshold distance of keyboard device 1904, wearer 1900 moves the head to the left until smart glasses 1902 are facing away from keyboard device 1904. In response to the voice command "Open weather forecast", processing device 460 may apply the second operation mode and present forecast weather app 1908 as a new virtual object tethered to smart glasses 1902, e.g., moving leftwards following the directional gaze of wearer 1900 as wearer 1900 moves the head leftwards. In a similar manner, when wearer 1900 moves the head rightwards, smart glasses 1902 may present forecast weather app 1908 in a manner that tracks the head motion of wearer 1900, e.g., moving rightwards.

In the second operation mode, some embodiments further include: receiving image data captured using an image sensor included in the wearable extended reality appliance; analyzing the image data to detect a person approaching the user; and causing a modification to the second location based on the detection of the person approaching the user. In some examples, the image data may be analyzed using an object detection algorithm to detect the person. Further, the image data may be analyzed using a motion tracking algorithm to determine that the detected person is approaching the user. In some examples, the image data may be analyzed using a visual classification algorithm to determine that a person is approaching the user. The term "image data captured using an image sensor" may refer to the detection of light signals by an image sensor and conversion of the light signal to image pixels. The term "person approaching the user" may refer to another individual (e.g., other than the user) moving towards the user who may be wearing the wearable extended reality appliance. The term "causing a modification to the second location based on the detection of the person approaching the user" may include changing or adjusting the position where content is presented by accounting for the person approaching the user, e.g., so that the content does not obstruct the person, or vice-versa. For example, the modification may be based on a direction from which the person is approaching the user (for example, moving the second location to another direction). In one example, the modification may be based on a distance of the approaching person (for example, avoiding the modification for far away persons). In one example, the modification may be based on a direction of movement of the person (for example, estimating whether the person is indeed approaching the user based on the direction of motion), e.g., when the person approaches from the left, the location for presenting content may be shifted rightwards and the reverse. In one example, the modification may be based on a speed of the person (for example, applying the modification when the person stops moving or moves very slowly). In one example, the modification may be based on a gesture or a facial expression of the person (for example, when the person is gesturing to the user, the modification may be applied), e.g., when the person is seeking the attention of the wearer, the location for presenting content may be shifted to the side.

Figure 24:
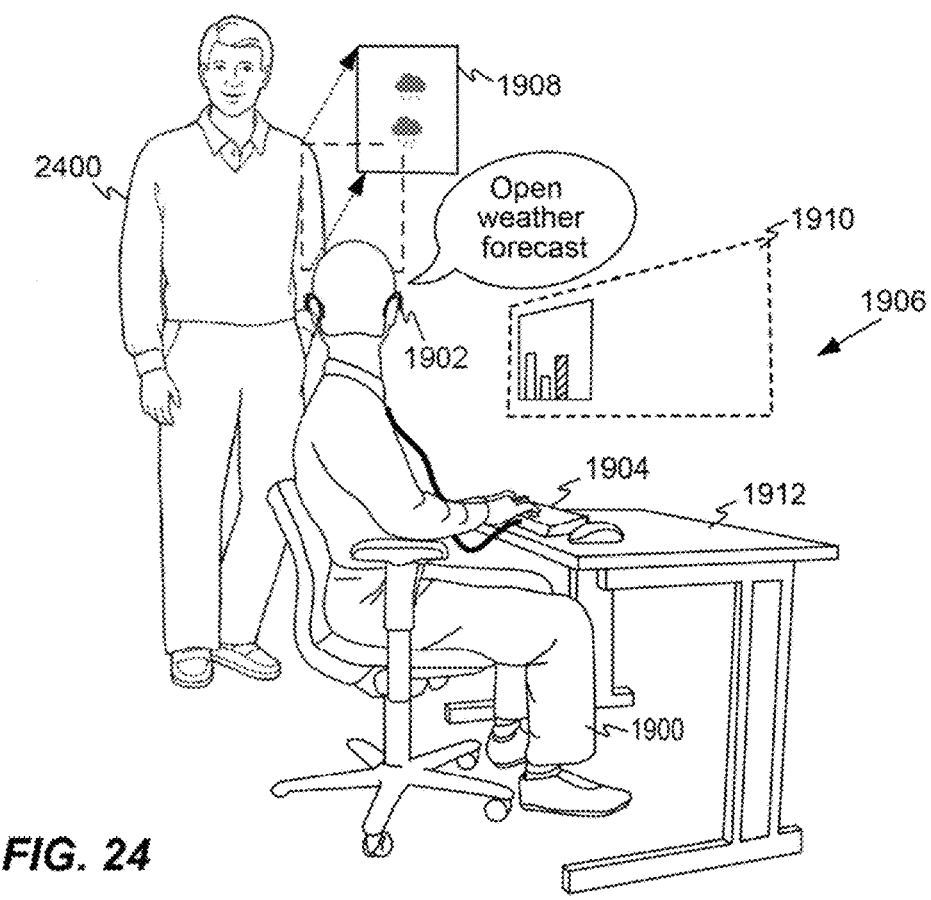
FIG. 24 illustrates another exemplary environment depicting a wearer of the wearable extended reality appliance facing away from a keyboard device while a person approaches, consistent with some embodiments of the present disclosure.

By way of a non-limiting example, reference is now made to FIG. 24 which is substantially similar to FIG. 22 with the notable difference of a person 2400 approaching wearer 1900. A camera configured with smart glasses 1902 (e.g., image sensor 472 of FIG. 4) may capture an image of person 2400 approaching wearer 1900. Processing device 460 may analyze the image to detect person 2400 approaching the wearer 1900 from the left. For example, the position of person 2400 may overlap with and thus obstruct the display of forecast weather app 1908. Processing device 460 may cause the location of forecast weather app 1908 to move (e.g., shift) upwards and rightwards, based on the detected position of person 2400, e.g., to prevent forecast weather app 1908 from obstructing person 2400.

In the first operation mode, some embodiments further include: receiving image data captured using an image sensor included in the wearable extended reality appliance; analyzing the image data to detect a surface that the keyboard device is placed on; and selecting the first location based on the detected surface. A surface may include the top layer of a desk, table, stool, a sliding tray (e.g., for a keyboard), or any other flat, level area positioned as the top layer of an object. A surface may support another object resting on the surface such that the object is immobile. For example, when the wearer is facing the keyboard device, an optical sensor configured with the wearable extended reality appliance may capture an image of the work station including a table supporting the keyboard device. The image may be analyzed (e.g., by one or more of processing devices 360 of FIG. 3, 460 of FIG. 4, 560 of FIG. 5) to detect the keyboard device resting on the surface of a desk. The new virtual object instructed by the user command may be displayed based on the surface of the desk. For example, the new virtual object may be displayed as a virtual widget resting on the desk, or inside a virtual screen docked to the desk surface. In one example, the first location may be selected based on a position of an edge of the surface that the keyboard device is placed on.

By way of a non-limiting example, turning to FIG. 19, wearer 1900 is seated at work station 1906 adjacent to table surface 1912. A camera configured with smart glasses 1902 (e.g., image sensor 472 of FIG. 4) may capture an image of work station 1906 with keyboard device 1904 resting thereon. Processing device 460 may analyze the image and detect keyboard device 1904 resting on table surface 1912. Processing device 460 may determine to apply the first operation mode for smart glasses 1902 based on the distance and orientation of smart glasses 1902 to keyboard device 1904. Processing device 460 may select the location to display forecast weather app 1908 based on table surface 1912, e.g., by displaying forecast 1908 inside virtual screen 1910 located just above table surface 1912. As another example, processing device 460 may select a location on table surface 1912 to display a weather widget 1916.

Some embodiments further include determining the action for responding to the identified user command based on the relative orientation of the wearable extended reality appliance with respect to the keyboard device and a posture associated with a user of the wearable extended reality appliance. The term "posture" may refer to a position for holding the body. In some embodiments, the posture is selected from a group including: lying, sitting, standing, and walking. The term "lying" may refer to reclining, e.g., horizontally. The term "sitting" may refer to a semi-upright position, resting the weight of the upper body on a horizontal surface. The term "standing" may refer to a stationary upright pose whereby the weight of the body is supported by the legs. The term "walking" may refer to an upright pose whereby the weight of the body is supported by the legs while in motion. For example, if the wearer is in an upright seated position such the wearable extended reality appliance is substantially above the keyboard device, content may be displayed in a virtual screen located above the keyboard device using a high resolution. However, if the wearer is reclining while sitting next to the keyboard device (e.g., the wearer is facing the ceiling), content may be displayed in a virtual screen against the ceiling using a lower resolution.

By way of a non-limiting example, turning to FIG. 19, based on the sitting posture and front-facing orientation of wearer 1900, processing device 460 (FIG. 4) may display forecast weather app 1908 in virtual screen 1910 above keyboard device 1904 and directly in front of wearer 1900. Turning to FIG. 20, based on the walking posture of wearer 1900 and relatively unstable (e.g., dynamic) orientation of smart glasses 1902, processing device 460 may display forecast weather app 1908 tethered to smart glasses 1902 in a manner that tracks the directional gaze of wearer 1900.

Some embodiments further include determining the action for responding to the identified user command based on the relative orientation of the wearable extended reality appliance with respect to the keyboard device and types of virtual objects displayed by the wearable extended reality appliance. The term "types of virtual objects" may refer to a category or characterization of a virtual item. For example, a virtual object may be categorized according to context, time of presentation, duration of presentation, size, color, resolution, content type (e.g., text, image, video, or combinations thereof), resource demands (e.g., processing, memory, and or communications bandwidth), and any other characterization of virtual objects. For example, the response to a user command may depend on what additional virtual objects are currently displayed by the wearable extended reality appliance. When the wearer is seated at a desk adjacent to the keyboard device and is facing forwards, and the wearable extended reality appliance displays a calendar widget resting on the desk top, in response to a request to view a meeting schedule, an upcoming meeting may be displayed via the calendar widget (e.g., by one or more of processing devices 360 of FIG. 3, 460 of FIG. 4, 560 of FIG. 5). When the wearer is seated at the desk but facing away from the keyboard device, in response to a request to view the meeting schedule, the upcoming meeting may be displayed in a virtual window tethered to the directional gaze of the wearer.

By way of a non-limiting example, turning to FIG. 19, wearer 1900 is adjacent to and facing keyboard device 1904 while viewing content 1924 via smart glasses 1902. In response to a request by wearer 1900 to open a weather forecast, processing device 460 (FIG. 4) may display forecast weather app 1908 to the side of content 1924, so as not to obstruct content 1924.

Some embodiments provide a system for selectively operating wearable extended reality appliance, the system including at least one processor programmed to: establish a link between a wearable extended reality appliance and a keyboard device; receive sensor data from at least one sensor associated with the wearable extended reality appliance, the sensor data being reflective of a relative orientation of the wearable extended reality appliance with respect to the keyboard device; based on the relative orientation, select from a plurality of operation modes a specific operation mode for the wearable extended reality appliance; identify a user command based on at least one signal detected by the wearable extended reality appliance; and execute an action responding to the identified user command in a manner consistent with the selected operation mode.

For example, turning to FIG. 19, processing device 460 (FIG. 4) may be programmed to establish a link between smart glasses 1902 and keyboard device 1904. Processing device 460 may receive position data (e.g., sensor data) from at least one sensor (e.g., GPS of motion sensor 473) associated with smart glasses 1902. The sensor data may be reflective of a relative orientation of smart glasses 1902 with respect to keyboard device 1904. Based on the relative orientation, processing device 460 may select from a plurality of operation modes (e.g., stored in memory device 411) a specific operation mode for smart glasses 1902 (e.g., to display content in virtual screen 1910). Processing device 460 may identify a user command based on at least one signal (e.g., an audio signal) detected by audio sensor 471 of smart glasses 1902. Processing device 460 may execute an action responding to the identified user command in a manner consistent with the selected operation mode (e.g., by displaying forecast weather app 1908 in virtual screen 1910).

Figure 25:
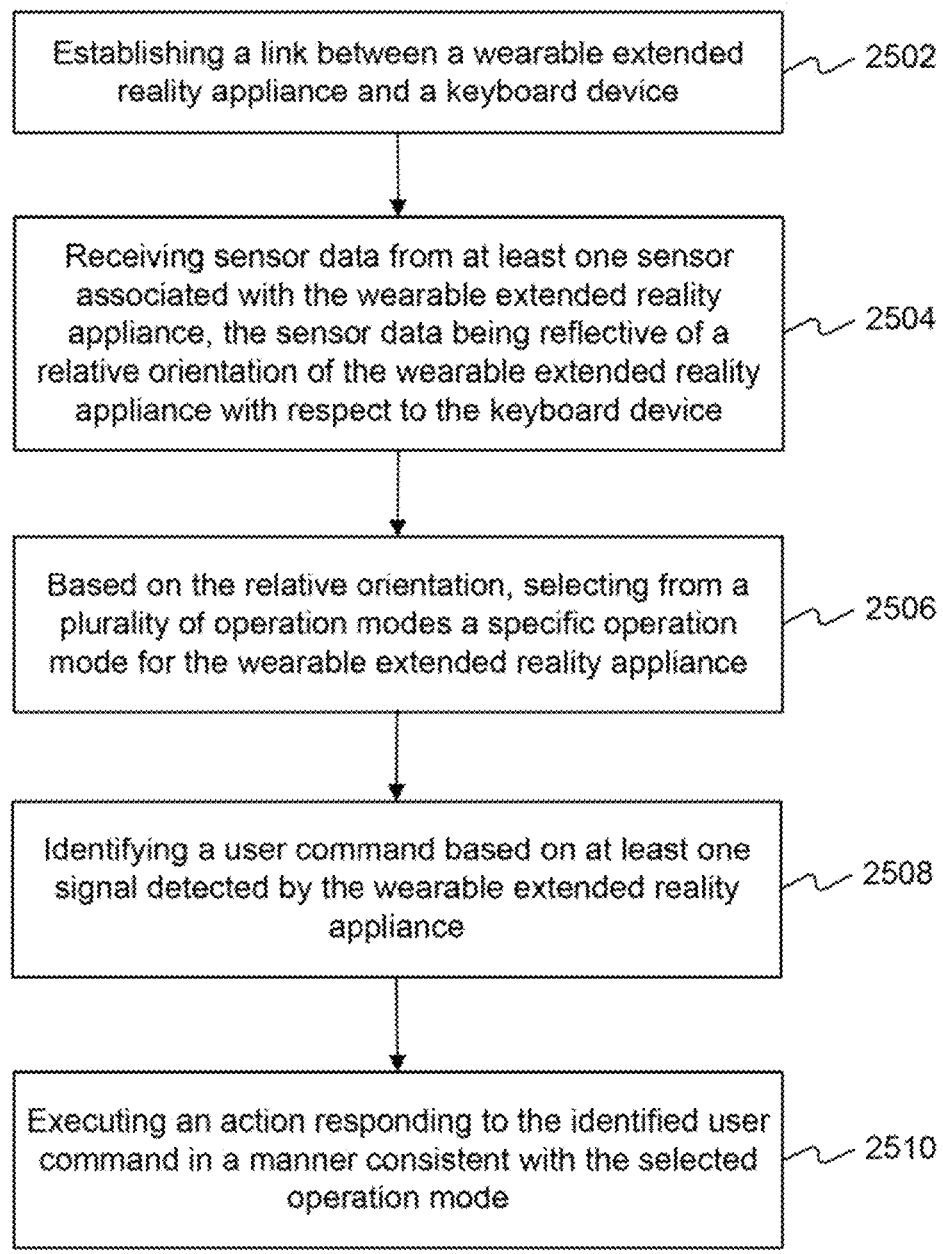
FIG. 25 is a block diagram illustrating an example process for interpreting commands in extended reality environments based on distances from physical input devices, consistent with embodiments of the present disclosure.

FIG. 25 illustrates a block diagram of example process 2500 for interpreting commands in extended reality environments based on distances from physical input devices, consistent with embodiments of the present disclosure. In some embodiments, process 2500 may be performed by at least one processor (e.g., processing device 460 of extended reality unit 204, shown in FIG. 4) to perform operations or functions described herein. In some embodiments, some aspects of process 2500 may be implemented as software (e.g., program codes or instructions) that are stored in a memory (e.g., memory device 411 of extended reality unit 204, shown in FIG. 4) or a non-transitory computer readable medium. In some embodiments, some aspects of process 2500 may be implemented as hardware (e.g., a specific-purpose circuit). In some embodiments, process 2500 may be implemented as a combination of software and hardware.

Referring to FIG. 25, process 2500 may include a step 2502 of establishing a link between a wearable extended reality appliance and a keyboard device. As described earlier, a communications channel may be created between a wearable extended reality appliance and a keyboard device. For example, a Bluetooth channel may communicatively couple the wearable extended reality appliance with the keyboard device.

Process 2500 may include a step 2504 of receiving sensor data from at least one sensor associated with the wearable extended reality appliance, the sensor data being reflective of a relative orientation of the wearable extended reality appliance with respect to the keyboard device. As described earlier, a sensor, such as an image sensor, a motion sensor, an IR sensor, and/or a radio sensor configured with the wearable extended reality appliance may sense data expressing the relative orientation of the wearable extended reality appliance and the keyboard device.

Process 2500 may include a step 2506 of, based on the relative orientation, selecting from a plurality of operation modes a specific operation mode for the wearable extended reality appliance. As described earlier, the relative orientation of the wearable extended reality appliance to the keyboard device may be used to choose a specific operation mode from multiple candidate operation modes for wearable extended reality appliance.

Process 2500 may include a step 2508 of identifying a user command based on at least one signal detected by the wearable extended reality appliance. As described earlier, the wearable extended reality appliance may include a detector, such as a microphone (e.g., audio sensor 472 of FIG. 4), an image sensor (e.g., image sensor 472), a motion sensor (e.g., motion sensor 472), an environmental sensor (e.g., environmental sensor 474), and additional sensors (e.g., sensors 472). A processing device (e.g., one or more of processing devices 360 of FIG. 3, 460 of FIG. 4, 560 of FIG. 5) may analyze the detected signal to identify a user command.

Process 2500 may include a step 2510 of executing an action responding to the identified user command in a manner consistent with the selected operation mode. As described earlier, the action performed in response to a user command may be performed in compliance with the operation mode of the wearable extended reality appliance (e.g., based on the relative orientation to the keyboard device).

Videos of users wearing an extended reality appliance interacting with virtual objects tend to depict the interaction from the perspective of the user. For example, a video may be from the perspective of the user wearing the extended reality appliance, such as a virtual depiction of the user's hands interacting with a virtual object.

An outside observer would only see the user's hands moving in the physical environment while the user interacts with the virtual object (e.g., the observer would not be able to see the virtual object as the user interacts with it). There is a desire to be able to generate a video of the user interacting with the virtual object from the perspective of the outside observer, such that the outside observer may see the virtual object as the user interacts with the virtual object.

Disclosed embodiments may include methods, systems, and non-transitory computer readable media for facilitating generating videos of individuals interacting with virtual objects. It is to be understood that this disclosure is intended to cover methods, systems, and non-transitory computer readable media, and any detail described, even if described in connection with only one of them, is intended as a disclosure of the methods, systems, and non-transitory computer readable media.

Some disclosed embodiments may be implemented via a non-transitory computer readable medium containing instructions for performing the operations of a method. In some embodiments, the method may be implemented on a system that includes at least one processor configured to perform the operations of the method. In some embodiments, the method may be implemented by one or more processors associated with the wearable extended reality appliance. For example, a first processor may be located in the wearable extended reality appliance and may perform one or more operations of the method. As another example, a second processor may be located in a computing device (e.g., an integrated computational interface device) selectively connected to the wearable extended reality appliance, and the second processor may perform one or more operations of the method. As another example, the first processor and the second processor may cooperate to perform one or more operations of the method. The cooperation between the first processor and the second processor may include load balancing, work sharing, or other known mechanisms for dividing a workload between multiple processors.

Some embodiments include a non-transitory computer readable medium containing instructions for causing at least one processor to perform operations for generating videos of individuals interacting with virtual objects. The terms "non-transitory computer readable medium," "processor," "instructions," and "virtual objects" may be understood as described elsewhere in this disclosure. As described below, one or more processors may execute the one or more instructions for generating one or more videos. As used herein, the term "video" may include a single still image, a series of one or more still images (e.g., a time lapsed sequence), or a continuous series of images (e.g., a video).

The one or more videos may illustrate one or more interactions of an individual with one or more virtual objects. An individual may interact with a virtual object in the extended reality environment in a similar manner as the individual may interact with an object in the physical environment. In some embodiments, any interaction that an individual could have with an object in the physical environment may be replicated in the extended reality environment. For example, the individual may interact with the virtual object by holding it in one or both of their hands and may rotate the virtual object, by squeezing the virtual object, by manipulating the virtual object, by looking at the virtual object, by bringing the virtual object closer to themselves, or by moving the virtual object farther away from themselves. In some embodiments, the individual may select one of several virtual objects by performing a predefined hand gesture, for example "picking up" the virtual object in the extended reality environment. In some embodiments, the individual may release a virtual object they are holding by performing a predefined hand gesture, for example "dropping" or "tossing" the virtual object in the extended reality environment. In some embodiments, the individual may interact with the virtual object through voice commands or gesture commands. In one example, a gesture command for interacting with the virtual object may include virtually touching the virtual object. In another example, a gesture command for interacting with the virtual object may be remote from the virtual object and include no virtual touch.

Some embodiments include causing a wearable extended reality appliance to generate a presentation of an extended reality environment including at least one virtual object. The terms "wearable extended reality appliance," "extended reality environment," and "virtual object" may be understood as described elsewhere in this disclosure. The presentation of the extended reality environment may be what the user sees while wearing the extended reality appliance and may permit the user to perceive and/or interact with the extended reality environment. The extended reality environment may be presented to the user of the wearable extended reality appliance by any of the mechanisms described earlier.

Causing the wearable extended reality appliance to generate the presentation of the extended reality environment may be performed by a processor associated with the wearable extended reality appliance. In some embodiments, the processor may be a part of the wearable extended reality appliance, such as the processing device 460 shown in FIG. 4. In some embodiments, the wearable extended reality appliance may receive data for display from a processor remote from and in communication with the wearable extended reality appliance, such as from a computing device associated with the wearable extended reality appliance. For example, the remote processor may include processing device 360 in input unit 202 as shown in FIG. 3. As another example, the remote processor may include processing device 560 in remote processing unit 208 as shown in FIG. 5.

The at least one virtual object may be, for example, at least one virtual two-dimensional (2D) object (such as a virtual display screen, a virtual glass or other transparent surface, a virtual 2D graph, a virtual 2D presentation/slides, a 2D virtual user interface, etc.). In another example, the at least one virtual object may be at least one virtual three-dimensional (3D) object (i.e., have volume), such as a puzzle cube, a ball, etc. In another example, the at least one virtual object may include at least one virtual 2D object and at least one virtual 3D object.

Some embodiments include receiving first image data from at least a first image sensor, the first image data reflecting a first perspective of an individual wearing the wearable extended reality appliance. It is noted that the phrase "user of the wearable extended reality appliance" and "individual wearing the wearable extended reality appliance" may be interchangeable and for purposes of description herein may have a similar meaning. Similarly, the short forms of these terms (e.g., "user" and "individual") may also be interchangeable and have a similar meaning.

Some embodiments include receiving image data (such as the first image data) from the wearable extended reality appliance. An "image sensor" as used herein may include a CCD sensor, a CMOS sensor, or any other detector capable of detecting images Image data includes the output of the image sensor, or data derived or developed from the output of the image sensor. In some embodiments, the image data may be received from an image sensor (e.g., the at least a first image sensor), such as a CCD sensor or a CMOS sensor located on or otherwise associated with the wearable extended reality appliance. Image data may be received via either a wired or wireless transmission, which transmission may be in the form of digital signals.

For example, an image sensor 472 as shown in FIG. 4 may be employed in the wearable extended reality appliance. The image data received from or captured by the image sensor (such as the first image data) may be associated with the physical environment of the user and may include one or more still images, a series of still images, or video.

In some embodiments, the first image data reflecting the first perspective of the individual wearing the wearable extended reality appliance may represent what the individual would see (i.e., the "first perspective") when the extended reality environment is not being displayed. For example, the first image data may capture an image of the physical environment where the user is located while wearing the extended reality appliance, such as a room. In some embodiments, the first perspective may include items within the field of view of the user when the extended reality environment is not being displayed.

In some embodiments, the first image data may be stored in the wearable extended reality appliance. In some embodiments, the first image data may be stored in a device separate from the wearable extended reality appliance and in wired or wireless communication with the first image sensor such that the first data may be transmitted to the device, either upon initiation by the wearable extended reality appliance or by the device.

In some embodiments, the first image sensor is part of the wearable extended reality appliance. In some embodiments, the first image sensor may be considered to be "part" of the wearable extended reality appliance when it is physically attached to, physically embedded in, or otherwise associated with the wearable extended reality appliance. For example, the first image sensor may be physically attached to the wearable extended reality appliance via a physical connection mechanism such as a clip, a bracket, or a snap-fit arrangement. As another example, the first image sensor may be physically attached to the wearable extended reality appliance via an adhesive. In some embodiments, the first image sensor may be located elsewhere on the user and may be in communication with the wearable extended reality appliance. For example, the first image sensor may be clipped or attached to the user's shirt or clothing.

Figure 26:
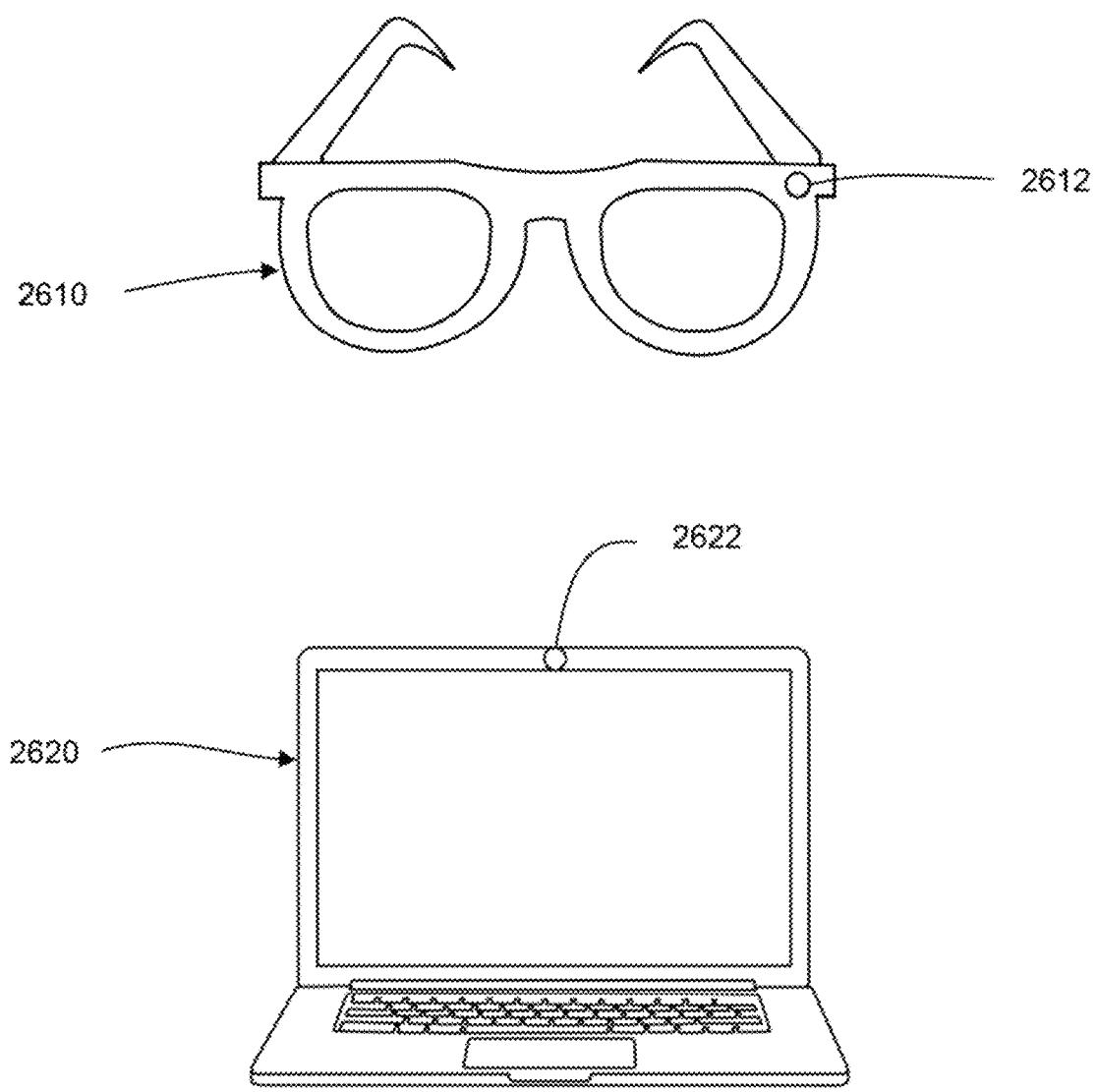
FIG. 26 illustrates an exemplary wearable extended reality appliance including a first image sensor and a computing device including a second image sensor, consistent with some embodiments of the present disclosure.

In some embodiments, the first image sensor may be located on an exterior portion of the wearable extended reality appliance, such that the image sensor may be positioned to capture first image data corresponding to the individual's head position. FIG. 26 illustrates an exemplary wearable extended reality appliance 2610 including a first image sensor 2612. While FIG. 26 illustrates wearable extended reality appliance 2610 as a pair of glasses, wearable extended reality appliance 2610 may take on other forms (e.g., goggles) as described herein. First image sensor 2612 is shown in FIG. 26 as being located to one side of a frame portion of wearable extended reality appliance 2610 (e.g., the left side of the individual's head). In some embodiments, first image sensor 2612 may be located on other portions of wearable extended reality appliance 2610 without affecting the operation of first image sensor 2612. For example, first image sensor 2612 may be located on the right side of wearable extended reality appliance 2610 relative to the individual's head. As another example, first image sensor 2612 may be located in the middle of wearable extended reality appliance 2610 such that first image sensor 2612 does not block the individual's vision through the lenses of wearable extended reality appliance 2610. In some embodiments, more than one image sensor 2612 may be located on the exterior portion of wearable extended reality appliance 2610. For example, a first image sensor may be located on the left side of the frame and a second image sensor may be located on the right side of the frame. As another example, a first image sensor may be located on the left side of the frame, a second image sensor may be located on the right side of the frame, and a third image sensor may be located in the middle of the frame.

Figure 27:
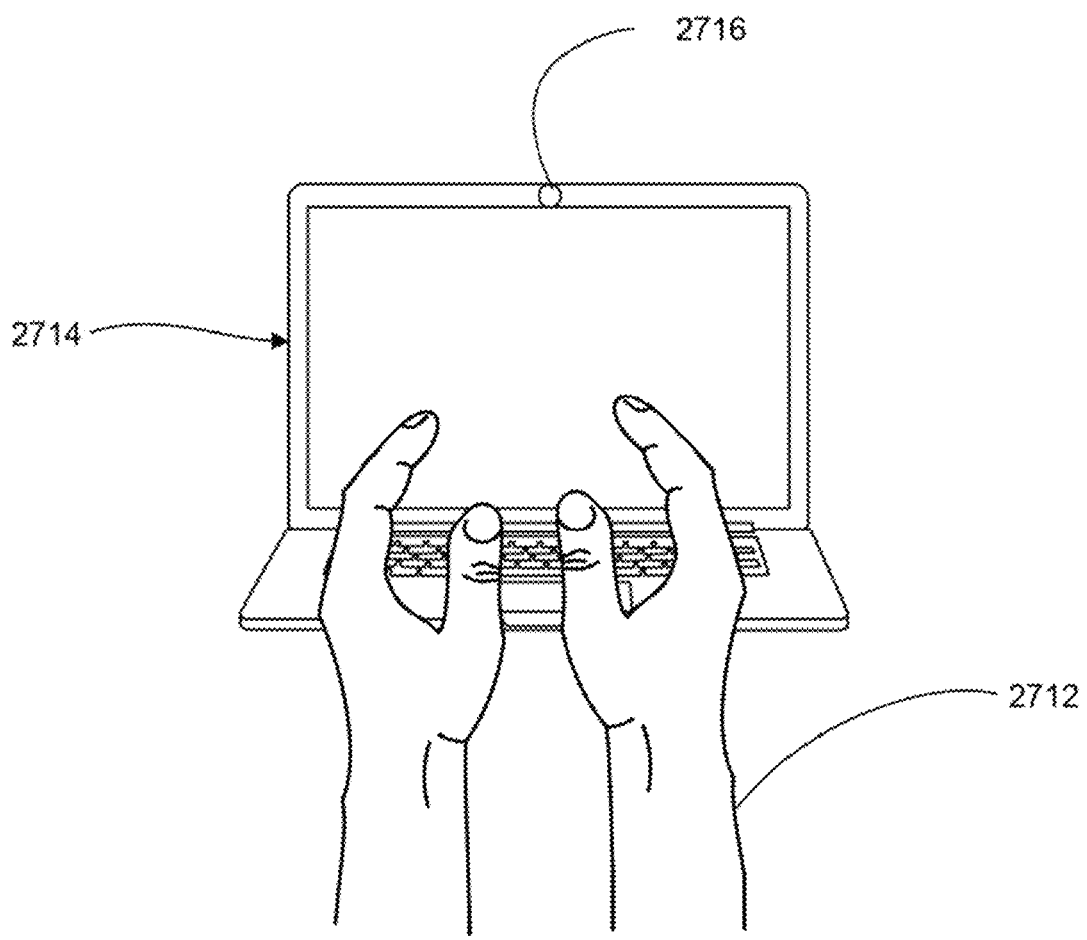
FIG. 27 illustrates an exemplary view from the perspective of an individual wearing the extended reality appliance, consistent with some embodiments of the present disclosure.

FIG. 27 illustrates an exemplary view from the perspective of the individual wearing the extended reality appliance (for example, as captured by first image sensor 2612). Image 2710 is an image of the physical environment around the user and is captured from the perspective of the first image sensor (i.e., the perspective of the individual wearing the extended reality appliance). Image 2710 includes a depiction 2712 of the user's hands (and may include a portion of the user's arms) in the physical environment and a depiction of a computing device 2714 including an image sensor 2716. It is understood that computing device 2714 and image sensor 2716 are provided for purposes of illustration, and that other devices including one or more image sensors may also be used, or the device including the second image sensor may not be depicted or may be only partly depicted in image 2710.

Some embodiments include receiving second image data from at least a second image sensor, the second image data reflecting a second perspective facing the individual. In some embodiments, the second image sensor may have similar structural and/or functional characteristics as the first image sensor described herein. The second image data reflecting the second perspective facing the individual wearing the extended reality appliance may be from a position in the physical environment such that the second image sensor faces the individual. In some embodiments, the second image sensor may be placed in any location in the physical environment of the individual (and within an imaging range of the second image sensor) such that the second image sensor may capture one or more images of the individual.

In some embodiments, the second image sensor is a part of a computing device selectively connected to the wearable extended reality appliance. In some embodiments, the computing device may include an input device or an integrated computational interface device as described herein. The computing device may be selectively connected to the wearable extended reality appliance via a wired connection or a wireless connection as described herein. In some embodiments, the second image sensor may be considered to be "part" of the computing device when it is physically attached to, physically embedded in, or otherwise associated with the computing device. For example, the second image sensor may be physically attached to the computing via a physical connection mechanism such as a clip, a bracket, or a snap-fit arrangement. As another example, the second image sensor may be physically attached to the computing device via an adhesive. As another example, the second image sensor may be embedded in a portion of a housing of the computing device. As another example, the second image sensor may be associated with the computing device by being located separate from the computing device (such as in a standalone device) and in wired or wireless communication with the computing device.

FIG. 26 illustrates an exemplary computing device 2620 including a second image sensor 2622. In some embodiments, computing device 2620 may include more than one second image sensor. In some embodiments, second image sensor 2622 may be included in a standalone device (i.e., not selectively connected to computing device 2620 or to the wearable extended reality appliance), but may be configured to communicate with computing device 2620 or the wearable extended reality appliance via either wired or wireless communication. For example, second image sensor 2622 may be included in a security camera in wireless communication with computing device 2620. In some embodiments, if a plurality of second image sensors are used, the second image sensors may each be located in a separate device, and each separate device may be in wired or wireless communication with each other and/or with computing device 2620. For example, one second image sensor may be located in computing device 2620 and another second image sensor may be located in a security camera separate from computing device 2620. As another example, a plurality of security cameras may be used, each security camera including a separate second image sensor.

In embodiments where the method is performed by a processor, the processor may be configured to receive the second image data from the second image sensor. In some embodiments, the second image data may be stored in a device that includes the second image sensor, such as the computing device or the separate device. In such embodiments, the second image data may be transmitted to the processor, for example, upon receiving a command from the processor or on a periodic basis.

Some disclosed embodiments include obtaining image data from the computing device. In some embodiments, the image data may be obtained from an image sensor, such as a CCD or CMOS sensor located on or otherwise associated with the computing device. For example, the image sensor 372 as shown in FIG. 3 may be employed in the computing device. The image data received or generated by the image sensor may be associated with the physical environment of the user and may include one or more still images, a series of still images, or video.

Figure 28:
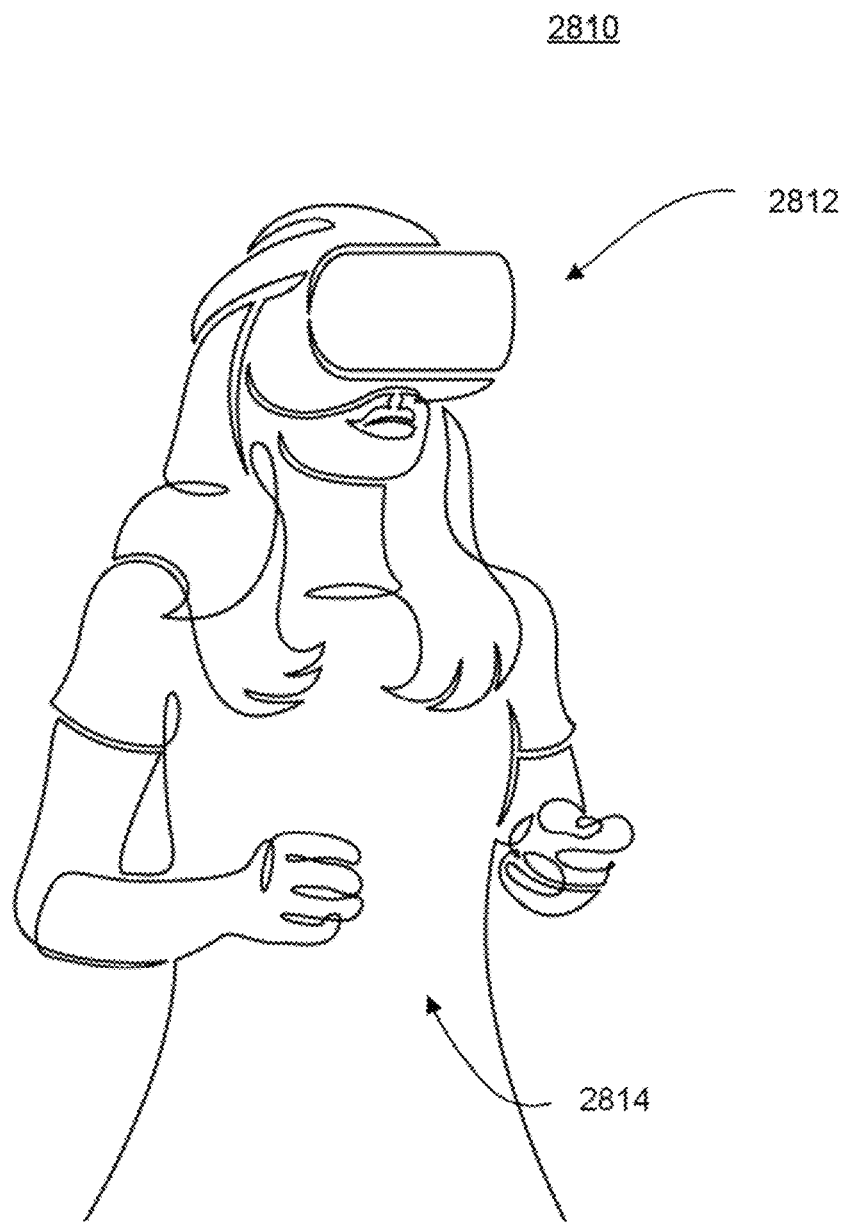
FIG. 28 illustrates an exemplary view from the perspective of a second image sensor facing an individual wearing the extended reality appliance, consistent with some embodiments of the present disclosure.

FIG. 28 illustrates an exemplary view from the perspective of the second image sensor in the computing device, facing the individual wearing the extended reality appliance (i.e., from the second perspective). Image 2810 includes a depiction 2812 of the user in the physical environment and a depiction 2814 of the user's hands in the physical environment. As shown in image 2810, while the user's hands may interact with a virtual object, the virtual object cannot be seen from the second perspective.

FIG. 29 illustrates exemplary virtual objects, as seen from the perspective of the user of the wearable extended reality appliance. Image 2910 shows the virtual objects as seen in the extended reality environment. Image 2910 includes a virtual depiction 2912 of a puzzle cube, a virtual depiction 2914 of a volleyball, and a virtual depiction 2916 of a vase of flowers. As shown in image 2910, the relative sizes of virtual depictions 2912, 2914, and 2916 may vary depending on the virtual distance the virtual object is from the user. The term "virtual distance," as used herein, represents a distance between virtual objects displayed in the extended reality environment, or a distance between the user or the wearable extended reality appliance and a virtual object displayed in the extended reality environment. Similar to the relative sizes of objects in the physical environment, using perspective geometry, a virtual object near the user may appear larger than a virtual object in the background. For example, if the user is holding the puzzle cube, virtual depiction 2912 may appear larger than virtual depictions 2914 or 2916.

In some embodiments, the virtual objects may have "fixed" locations when the user is not interacting with the virtual object. As shown in image 2910, the user is interacting with the puzzle cube and not the volleyball or the vase of flowers. If the user were to change the virtual object the user is interacting with, for example by virtually releasing the puzzle cube and virtually picking up the vase of flowers, image 2910 may be updated to reflect that the user is now interacting with the vase of flowers and not the puzzle cube. For example, the puzzle cube may be placed in the same location that the vase of flowers was in before the user virtually picked up the vase of flowers. In some embodiments, the virtual objects may change locations and/or appearance, even when the user is not interacting with the virtual object.

Some embodiments include identifying in the first image data first physical hand movements interacting with the at least one virtual object from the first perspective. Referring to FIG. 27, image 2710 (including the first image data) may be analyzed to identify user hand movements (i.e., the first physical hand movements) while interacting with the virtual object. For example, the first physical hand movements may be identified by performing an image recognition algorithm, a visual detection algorithm, or a visual recognition algorithm, such as a visual activity recognition algorithm or a visual gesture recognition algorithm. In some embodiments, the algorithm may include any machine learning algorithm described earlier. For example, a machine learning model may be trained using training examples to identify hand movements interacting with virtual objects in images and/or videos. An example of such training example may include a sample image and/or a sample video of sample hands, together with a label indicating movements of the sample hands interacting with a sample virtual object. The trained machine learning model may be used to analyze the first image data and identify the first physical hand movements interacting with the at least one virtual object. In another example, the first image data may be analyzed to calculate a convolution of the at least part of the first image data and thereby obtain a result value of the calculated convolution. Further, the identification of the first physical hand movements interacting with the at least one virtual object may be based on the result value of the calculated convolution. For example, in response to the result value of the calculated convolution begin a first value, the first physical hand movements may be identified as interacting with the at least one virtual object, and in response to the result value of the calculated convolution begin a second value, the first physical hand movements may be identified as not interacting with any virtual object. In embodiments where the method is performed by a processor, the processor may be configured to perform one or more of these algorithms to identify the first physical hand movements. In some embodiments, the algorithms to identify the first physical hand movements may be performed by a specialized processor in communication with the processor performing the method, for example, by a graphics processing unit (GPU), an application specific integrated circuit (ASIC), a digital signal processor (DSP), or a field programmable gate array (FPGA).

Some embodiments include identifying in the second image data second physical hand movements interacting with the at least one virtual object from the second perspective. Referring to FIG. 28, image 2810 may be analyzed to identify user hand movements (i.e., the second physical hand movements) while interacting with the virtual object. In some embodiments, the second physical hand movements may be identified in a similar manner as the first physical hand movements.

In some embodiments, the first physical hand movements and the second physical hand movements may be the same physical hand movements, but from different perspectives (i.e., from the first perspective and the second perspective). In some embodiments, the first physical hand movements and the second physical hand movements may be different physical hand movements. For example, the first physical hand movements and the second physical hand movements may be captured at different moments in time.

Some embodiments include analyzing at least one of the first image data or the second image data to determine an interaction with the at least one virtual object. Analyzing the first image data and/or the second image data to determine an interaction with the virtual object may include performing an image recognition algorithm, a visual detection algorithm, or a visual recognition algorithm, such as a visual activity recognition algorithm or a visual gesture recognition algorithm. In some embodiments, the algorithm may include any machine learning algorithm described earlier. For example, a machine learning model may be trained using training examples to determine interaction with virtual objects. An example of such training example may include a sample image and/or a sample video, together with a label indicating interaction with a sample virtual object. The trained machine learning model may be used to analyze the first image data and/or the second image data and identify the interaction with the at least one virtual object. In another example, the first image data may be analyzed to calculate a convolution of the at least part of the first image data and thereby obtain a first result value of the calculated convolution. Further, the second image data may be analyzed to calculate a convolution of the at least part of the second image data and thereby obtain a second result value of the calculated convolution. Further, the identification of the first physical hand movements interacting with the at least one virtual object may be based on the first result value of the calculated convolution and the second result value of the calculated convolution. For example, in response to a first combination of the first and second result values, an interaction with the at least one virtual object may be determined, and in response to a second combination of the first and second result values, no interaction with the at least one virtual object may be determined. In embodiments where the method is performed by a processor, the processor may be configured to perform the one or more algorithms to determine the interaction. In some embodiments, the algorithms to determine the interaction may be performed by a specialized processor in communication with the processor performing the method, for example, by a graphics processing unit (GPU), an application specific integrated circuit (ASIC), a digital signal processor (DSP), or a field programmable gate array (FPGA).

In some embodiments, the analyzing may include analyzing both the first image data and the second image data. In some embodiments, the interaction may correspond only to the first physical hand movements. In some embodiments, the interaction may correspond only to the second physical hand movements. In some embodiments, the interaction may correspond to both the first physical hand movements and the second physical hand movements.

The interaction with the virtual object may include any interaction the user may have with a virtual object in the extended reality environment. The scope of the possible interactions with the virtual object may mirror the scope of possible interactions an individual may have with a corresponding physical object in the physical environment. For example, if the user is holding the virtual puzzle cube, the possible interactions include any interaction the user may have with a physical puzzle cube in the physical environment, such as turning the entire puzzle cube in their hands, turning one portion of the puzzle cube with one hand while holding the rest of the puzzle cube with the other hand, picking up the puzzle cube, putting the puzzle cube on a surface, throwing the puzzle cube, or handing the puzzle cube to another person. As another example, if the user is holding a virtual volleyball, the possible interactions include any interaction the user may have with a physical volleyball in the physical environment, such as turning the volleyball in their hands, hitting the volleyball from a variety of different hand positions (e.g., serving, bumping, setting, or spiking), throwing the volleyball, or handing the volleyball to another person.

As the user interacts with the virtual object in the extended reality environment, the appearance of the virtual object may change. For example, if the user is holding the virtual volleyball and rotates the volleyball away from themselves with both hands, it may appear to the user in the extended reality environment that both hands are rotating away from themselves while the volleyball is also rotating. In some embodiments, the changes in the extended reality environment may be detected by an input device as described herein, such as a pair of haptic gloves. To properly display these changes to the user, the presentation of the extended reality environment may be updated to reflect these changes. While such changes are occurring in the presentation of the extended reality environment, the first image sensor and the second image sensor may capture the first image data and the second image data of the user's hands rotating away from the user's body (i.e., the first physical hand movements and the second physical hand movements).

In some embodiments, determining the interaction with the virtual object may include determining how the appearance of the virtual object is changed based on the user's interaction. For example, if the user is holding the virtual puzzle cube and the interaction is that the user turns the top portion of the puzzle cube in a counterclockwise direction, in the extended reality environment, the user would see the top portion of the puzzle cube turning in the counterclockwise direction.

Some embodiments include rendering for display a representation of the at least one virtual object from the second perspective. So that the virtual object may be properly seen from the second perspective (i.e., as the virtual object may appear to an outside observer as if the outside observer is "looking into" the extended reality environment), it needs to be rendered (e.g., generated, drawn, illustrated, pictured, shown, represented, or presented) from the second perspective. In the extended reality environment, the virtual object may be rendered (e.g., generated as part of the presentation of the extended reality environment) from the user's perspective. The virtual object may therefore be shown (or generated for presentation to the user) from the second perspective (e.g., that of an external observer "looking into" the extended reality environment).

For example, if the user is holding the virtual puzzle cube, the user may see a certain color combination facing in the user's direction in the extended reality environment. To render the puzzle cube from the second perspective (i.e., to render the face of the puzzle cube that the outside observer would see if the user were holding the puzzle cube in the physical environment), the rendering may include using ray casting algorithms, artificial intelligence (AI) algorithms, machine learning (ML) algorithms, 3D models of the puzzle cube, and/or information from the wearable extended reality device (e.g., what the user sees in the extended reality environment) about the puzzle cube. For example, the algorithms may use information about the virtual object to render the virtual object from any angle (i.e., from the first perspective or the second perspective). Then, as the user interacts with the virtual object, changing what the user sees in the extended reality environment (i.e., from the first perspective), the algorithm may correspondingly update how the virtual object appears from other angles (i.e., from the second perspective). In some embodiments, the rendering may be based on stored views of the virtual object from various angles and may select a view that represents an opposite side of the virtual object from what the user is currently viewing in the extended reality environment. In some embodiments, the information about the virtual object may be stored in a database or other data storage that may be accessed as part of the rendering.

Some embodiments include melding the rendered representation of the at least one virtual object from the second perspective with the second image data to generate a video of the individual interacting with the at least one virtual object from the second perspective. As noted above, the rendered representation of the virtual object from the second perspective is what the outside observer would see if they could "look into" the extended reality environment. The melding may include a process of combining the rendered virtual object from the second perspective with the second image data (for example, similar to a "green screen" or "chroma key" effect in television or movies where one image is layered or composited with a second image). In some examples, the melding may include image stitching and/or object blending algorithms. In some examples, the melding may include using a generative model analyze the rendered representation of the at least one virtual object from the second perspective and the second image data to generate the video of the individual interacting with the at least one virtual object from the second.

In embodiments where the method is performed by a processor, the processor may be configured to perform the melding, such as by performing a chroma keying algorithm. In some embodiments, the melding may be performed by a specialized processor in communication with the processor performing the method, for example, by a graphics processing unit (GPU), an application specific integrated circuit (ASIC), a digital signal processor (DSP), or a field programmable gate array (FPGA).

In some embodiments, generating the video of the individual interacting with the virtual object from the second perspective may be performed by combining several melded still images together. In some embodiments, generating the video may be performed by melding a video of the rendered representation of the virtual object from the second perspective with a video of the individual from the second perspective. In embodiments where the method is performed by a processor, the processor may be configured to generate the video. In some embodiments, the video may be generated by a specialized processor in communication with the processor performing the method, for example, by a graphics processing unit (GPU), an application specific integrated circuit (ASIC), a digital signal processor (DSP), or a field programmable gate array (FPGA).

In some embodiments, the generated video may be stored for later playback. For example, the generated video may be stored on the computing device. As another example, the generated video may be stored on a separate storage remote from the wearable extended reality appliance and the computing device, such as on a cloud-based storage service. In some embodiments, the generated video may not be stored and may be displayed on a screen (e.g., a television, a monitor, a tablet, a mobile phone, a mobile device, or other display device).

Figure 30:
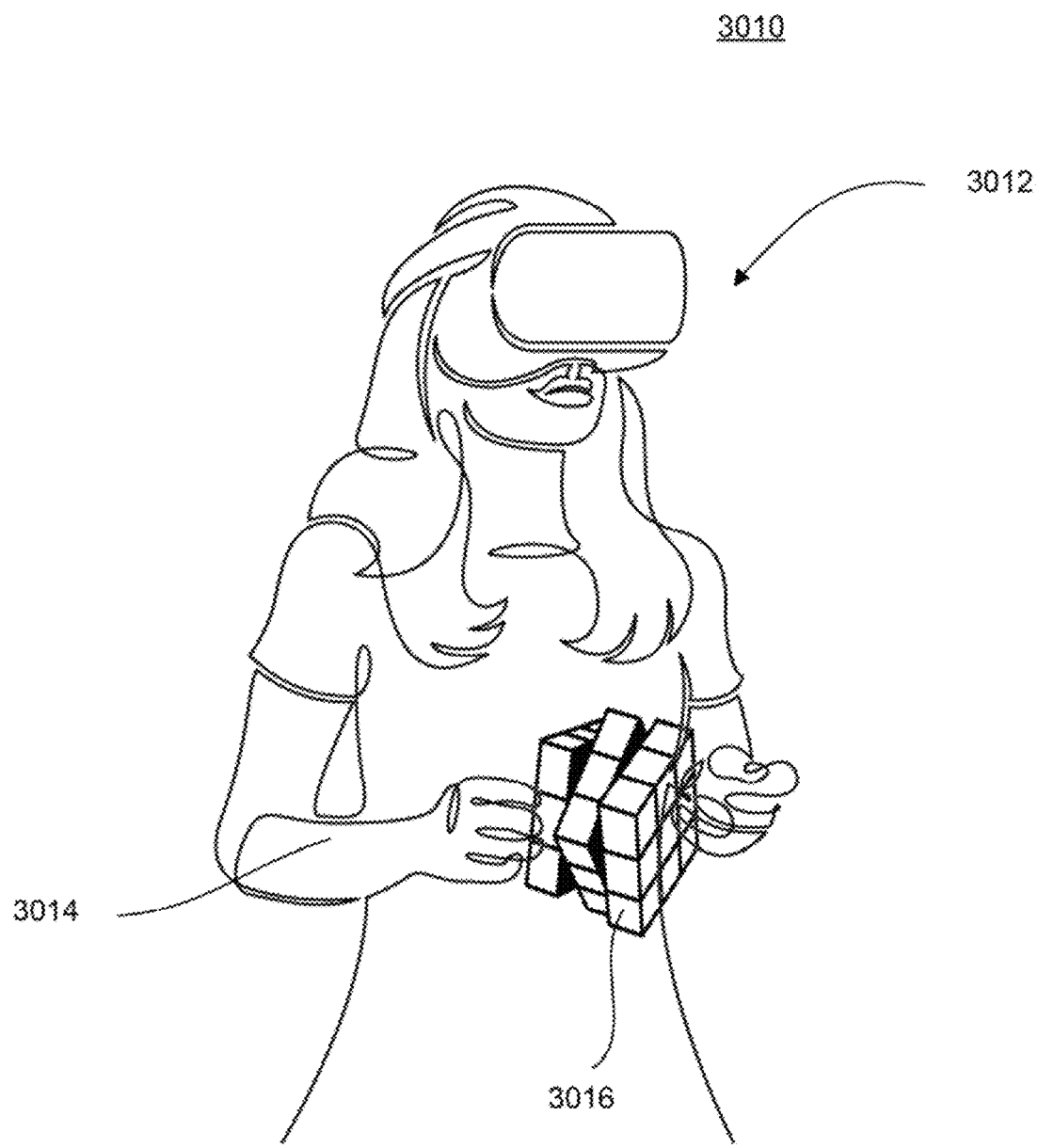
FIG. 30 illustrates an exemplary melded view from the perspective of the second image sensor, consistent with some embodiments of the present disclosure.

FIG. 30 illustrates an exemplary melded view from the perspective of the second image sensor. As illustrated in the figure, melded image 3010 includes an individual wearing extended reality appliance 3012 and interacting with a virtual object 3016. Melded image 3010 also includes a depiction 3014 of the user's hands, in the physical environment from the second perspective, holding a virtual object 3016 (shown as a puzzle cube). In some embodiments, melded image 3010 may include a still image, a series of one or more still images, or a video. By melding the rendered representation of the virtual object from the second perspective with the second image data (i.e., the video captured from the second perspective), the generated video may represent what the outside observer sees as the user interacts with the virtual object.

In some embodiments, the identified first physical hand movements are associated with a gesture for causing a movement of the at least one virtual object. A gesture for causing a movement of the virtual object may include any hand motion that the user may make to move the virtual object in the extended reality environment. For example, the user may turn the virtual object (i.e., a movement of the virtual object) in their hands by rotating one or both of their hands in the direction that they wish to turn the virtual object (i.e., physical hand movements associated with a gesture). In some embodiments, the identified second physical hand movements may be associated with a gesture for causing the movement of the at least one virtual object. In some embodiments, both the identified first physical hand movements and the identified second physical hand movements may be associated with a gesture for causing the movement of the at least one virtual object. The gesture may cause movement of a virtual object as the result of the gesture being recognized through machine vision as having a particular function. For example, image analysis performed on hand motion may detect a type of rotation that corresponds in memory to a particular object movement, and that movement may then be translated to the associated virtual object.

In some embodiments, rendering the representation of the at least one virtual object from the second perspective reflects the movement of the at least one virtual object. As the virtual object is moved in the extended reality environment, the rendered representation of the virtual object from the second perspective is updated to reflect the movement. The rendering to reflect the movement of the virtual object may be performed in a similar manner as described above. For example, as shown in FIG. 30, if the user turns one portion of the virtual puzzle cube away from the user, the rendered representation of the virtual puzzle cube from the second perspective would show that the portion of the virtual puzzle cube is turned toward the outside observer.

In some embodiments, the user may interact with the virtual object in ways other than by moving the virtual object. For example, the user interaction may include changing the virtual object's size by simultaneously moving both hands toward the virtual object to make the virtual object smaller or by simultaneously moving both hands away from the virtual object to make the virtual object larger. As another example, the user may change the orientation of the virtual object by turning it. As another example, the user may change the location of the virtual object in the extended reality environment by moving the virtual object from one portion of the extended reality environment to another portion of the extended reality environment. For example, the user may move the virtual object from the left side of the extended reality environment to the right side of the extended reality environment.

As another example, the user may change the appearance of the virtual object by changing the color of the virtual object. In some embodiments, the user may change the appearance of the virtual object by using a user interface tool. For example, to change the color of a virtual object, the user may use a color picker tool.

In some embodiments, the user may change information presented by the virtual object. For example, if the virtual object is a virtual screen containing a text document, the user may scroll through the text, may add text, or may delete text, thereby changing the information presented on the virtual screen. In such an example, the rendered representation of the virtual screen may include a "backwards" version of the text document such that the text orientation is the opposite of what the user sees in the extended reality environment (i.e., the rendered representation may appear to the outside observer as if the outside observer was looking through a transparent screen of text from behind).

In some embodiments, the identified first physical hand movements are associated with a gesture for causing a modification to a visual appearance of a portion of a surface of the at least one virtual object. For example, the identified first physical hand movements may be associated with a predefined gesture (i.e., the user moves their hands in a predefined way or to a predefined location in the extended reality environment) to activate a user interface tool to enable the user to change a color of a portion of the surface of the virtual object. For example, if the user moves their left hand to the upper left corner of the extended reality environment, a user interface tool panel may be activated (i.e., appear in the extended reality environment) from which the user may select a tool with which they may interact with the virtual object. For example, the user may use a color picker tool to change the color of a virtual object. As another example, the user may size changing tool to change the size of the virtual object. As another example, the user may use a text tool to add text to the virtual object. As another example, the user may use one or more drawing tools, such as a predefined shape tool (e.g., a square, a rectangle, or a circle) or a freehand drawing tool (e.g., a pencil, a marker, or a paintbrush), to draw on the virtual object. In some examples, the at least one virtual object may include a user interface, and the gesture for causing the modification to the visual appearance of the portion of the surface of the at least one virtual object may include at least one of gesture for entering data into the user interface, gesture for selecting an element of the user interface, gesture for minimizing at least one element of the user interface, or gesture for expanding at least one element of the user interface.

In some embodiments, the portion of the surface is visible from the second perspective and is not visible from the first perspective. For example, if the virtual object is a volleyball, the user may change the color of one panel of the volleyball (i.e., a portion of the surface of the volleyball) and that one panel may be visible from the outside observer's perspective (i.e., the second perspective) but not from the user's perspective (i.e., the first perspective).

In some embodiments, rendering the representation of the at least one virtual object from the second perspective reflects the modification to the visual appearance of the surface of the at least one virtual object. The rendering to reflect the modification to the visual appearance of the surface of the virtual object may be performed in a similar manner as described above. The rendering would show the modified appearance of the surface of the virtual object as seen from the perspective of the outside observer.

In some embodiments, the modification to the visual appearance of the portion of the surface of the virtual object may be visible to the user interacting with the virtual object in the extended reality environment but may not be visible from the second perspective (i.e., to the outside observer) in the generated video. For example, if the virtual object is a volleyball, the user may change the color of one panel of the volleyball (i.e., a portion of the surface of the volleyball) and that one panel may be visible from the user's perspective in the extended reality environment (i.e., the first perspective) but not from the outside observer's perspective (i.e., the second perspective).

In some embodiments, the operations include determining a position of the at least one virtual object in the extended reality environment. In some embodiments, determining the position of the virtual object may be based on a location of the virtual object relative to a fixed location in the extended reality environment (for example, relative to the user's location in the extended reality environment). For example, in the extended reality environment, the virtual object may not be in the user's hands but may be located at a distance from the user (i.e., the user would have to reach to hold the virtual object). In some embodiments, determining the position of the virtual object may be based on a location of the virtual object relative to one or more other virtual objects. In some embodiments, the position of the virtual object may be determined based on a distance from a fixed location or on a distance from a predetermined coordinate position. For example, the extended reality environment may include an internal coordinate system and the position of a virtual object may be determined based on the location of the virtual object in that coordinate system. In some embodiments, the coordinate system may include a field-of-view of the extended reality environment, as described elsewhere in this disclosure. In some embodiments, the coordinate system may include an entirety of the extended reality environment, including portions of the extended reality environment outside the field-of-view.

In some embodiments, rendering the representation of the at least one virtual object from the second perspective is based on the determined position. The rendering of the virtual object from the second perspective based on the determined position may be performed in a similar manner as described above. Continuing the above example, the virtual object may be rendered from the second perspective as being positioned at a distance from the user. For example, from the second perspective, the virtual object may appear to be closer than to the user (i.e., the virtual object may appear to be located between the outside observer and the user).

In some embodiments, the determined position of the at least one virtual object includes a distance between the at least one virtual object and the individual. For example, in the extended reality environment, the virtual object may appear to be 0.5 meters away from the individual. In some embodiments, the distance may be any distance and may be measurable in any units, such as, but not limited to, millimeters, centimeters, meters, inches, or feet.

In some embodiments, rendering the representation of the at least one virtual object from the second perspective is based on the determined distance. The rendering of the virtual object from the second perspective based on the determined distance may be performed in a similar manner as described above. Since objects appear smaller at greater distances, the determined distance may impact the size of the object rendered. Similarly, the determined distance may also impact perspective, and the rendered perspective may reflect the determined distance. Continuing the above example, if the virtual object is 0.5 meters away from the individual in the extended reality environment, then from the second perspective, the virtual object may also be rendered to be 0.5 meters away from the individual.

As another example, in the extended reality environment, the user may move the virtual object toward the user or away from the user. So, if the user moves the virtual object toward herself, the virtual object may appear to the user in the extended reality environment as getting larger, whereas from the second perspective, the virtual object may appear to the outside observer as getting smaller. Similarly, if the user moves the virtual object away from herself in the extended reality environment, the virtual object may appear to the user in the extended reality environment as getting smaller, whereas from the second perspective, the virtual object may appear to the outside observer as getting larger.

In some embodiments, the determined position of the at least one virtual object includes a spatial orientation of the at least one virtual object within the extended reality environment. The spatial orientation of the virtual object within the extended reality environment relates to the position, attitude, inclination, and/or rotation of the virtual object in the extended reality environment relative to other objects in the extended reality environment, including the user. For example, if the extended reality environment includes multiple virtual objects in different locations, the relative orientation of each virtual object (i.e., the spatial orientation of each virtual object relative to each other) may be determined. As another example, the spatial orientation of a virtual object may be determined based on a predetermined coordinate position. For example, the extended reality environment may include an internal coordinate system and the spatial orientation of a virtual object may be determined based on the spatial orientation of the virtual object in that coordinate system. In some embodiments, the coordinate system may include a field-of-view of the extended reality environment, as described elsewhere in this disclosure. In some embodiments, the coordinate system may include an entirety of the extended reality environment, including portions of the extended reality environment outside the field-of-view. In some examples, the spatial orientation of the at least one virtual object may be selected to make a selected side of the at least one virtual object to face the user. For example, the selected side may include textual data, and the selection of the spatial orientation may make the textual data viewable (and in some cases readable) by the user. In some examples, the spatial orientation of the at least one virtual object may be selected to make a selected side of the at least one virtual object be directed to a selected direction in the extended reality environment. For example, a spatial orientation for virtual vase of flowers 2916 may be selected so that the opening of the virtual vase is facing up. In another example, a spatial orientation of a virtual arrow may be selected so that the virtual arrow points to a selected location and/or direction.

In some embodiments, rendering the representation of the at least one virtual object from the second perspective is based on the determined spatial orientation. The rendering of the virtual object from the second perspective based on the determined spatial orientation may be performed in a similar manner as described above. Continuing the above example, the relative position of each virtual object as viewed in the extended reality environment may be maintained when the virtual objects are rendered from the second perspective. As another example, the position of each virtual object when rendered from the second perspective may be maintained based on the location and/or spatial orientation of the virtual object in a coordinate system as described above.

Referring to FIG. 29, image 2910 includes virtual depiction 2912 of a puzzle cube, virtual depiction 2914 of a volleyball, and virtual depiction 2916 of a vase of flowers. Image 2910 is from the first perspective and shows how virtual objects 2912, 2914, and 2916 may appear to a user while viewing the extended reality environment. As shown in image 2910, the spatial orientation of the virtual objects is that the vase of flowers 2916 appears to the user's left, the puzzle cube 2912 appears in front of the user or in the user's hands (i.e., in the center of the extended reality environment), and the volleyball 2914 appears to the user's right.

Figure 31:
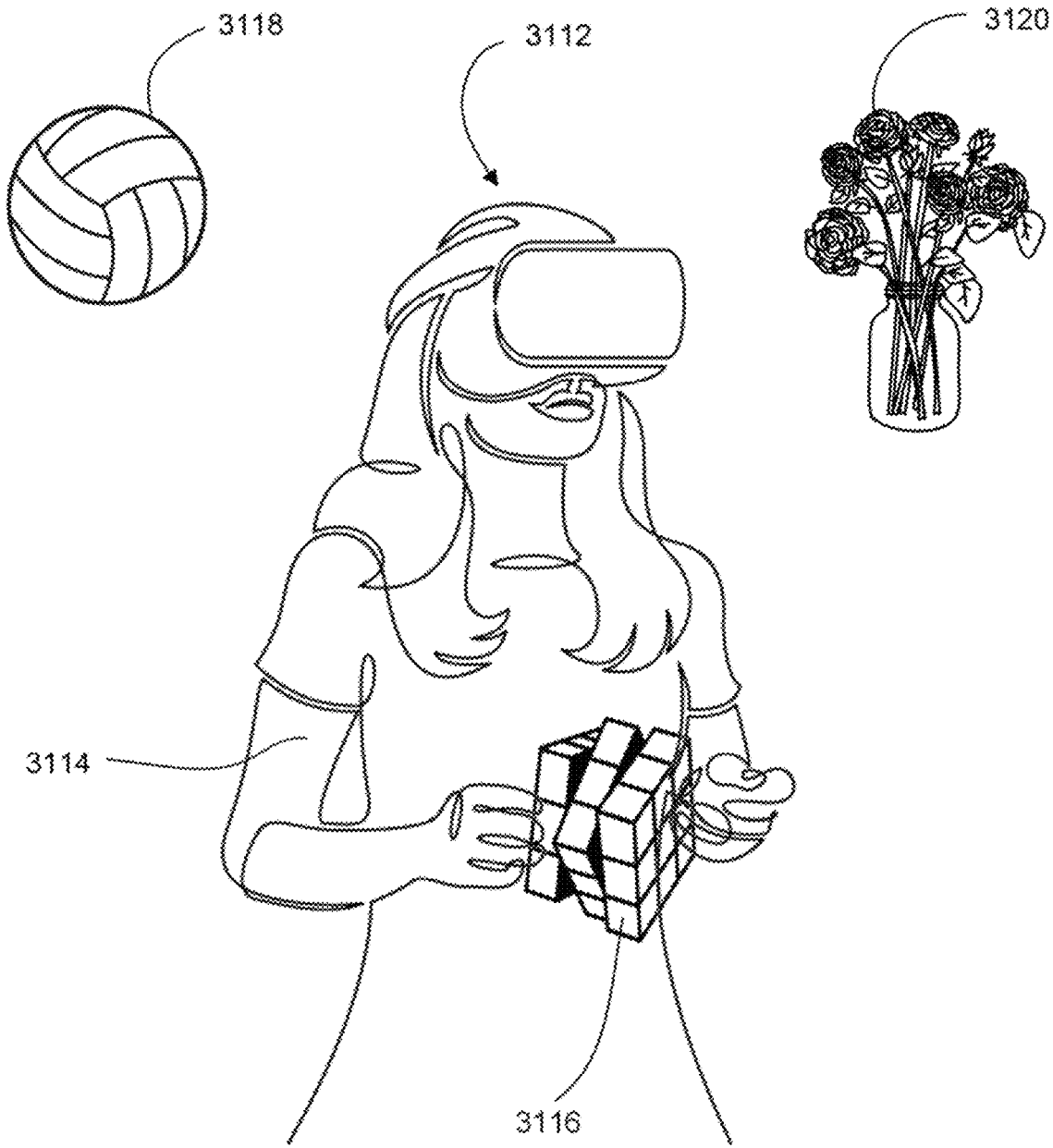
FIG. 31 illustrates an exemplary melded view from the perspective of the second image sensor, consistent with disclosed embodiments.

FIG. 31 is a melded image 3110 from the second perspective Image 3110 includes a depiction 3112 of the user in the physical environment, a depiction 3114 of the user's hands in the physical environment holding a virtual object 3116 of a puzzle cube, a depiction 3118 of a volleyball, and a depiction 3120 of a vase of flowers. As can be seen by comparing image 2910 and image 3110, the relative positions of the virtual objects (i.e., the spatial orientation) from the first perspective (as shown in image 2910) are maintained in the second perspective (as shown in image 3110). From the second perspective as shown in image 3110, the spatial orientation of the volleyball 3118 appears to the outside observer's left, the puzzle cube 3116 appears in front of the user or in the user's hands (i.e., in the center of image 3110), and the vase of flowers 3120 appears to the outside observer's right.

In some embodiments, the at least one virtual object includes text presented by the wearable extended reality appliance on a side of the at least one virtual object that faces the individual. In some embodiments, the text may be presented as a layer on top of the virtual object such that part of the virtual object is occluded. In some embodiments, "text" as used herein may also include an image, a logo, a text message, instructions, icons, arrows, or an alert.

In some embodiments, generating the video includes providing a representation of the text in the video. Text may include characters, words, sentences, lettering, symbols, or any other form of expression. A representation of text may include an illustration or presentation of the particular form of expression from an associated perspective. For example, if the virtual object is transparent or intended to be transparent (e.g., a virtual screen including a text document), the generated video may include a representation of the text appearing as a "backwards" image of what the user sees (i.e., the text may appear to the outside observer to be in the opposite orientation). For example, if the text appears to the user in the extended reality environment (i.e., from the first perspective) in a left-to-right orientation, the representation of the text in the generated video may appear to the outside observer (i.e., from the second perspective) in a right-to-left orientation.

In some embodiments, the text may only be visible to the individual in the extended reality environment and may not be visible to the outside observer (i.e., may be visible from the first perspective and may not be visible from the second perspective). For example, if the virtual object is a solid object (e.g., a coffee mug) with text on one side facing the individual in the extended reality environment, the outside observer would not be able to see through the coffee mug to read the text from the second perspective. This is the same result as would occur in the physical environment with a physical coffee mug (i.e., in the physical environment, the outside observer cannot see through the physical coffee mug to read the text facing the individual).

In some embodiments, rendering the representation of the at least one virtual object includes determining an opacity for the representation of the at least one virtual object. The opacity of the virtual object represents how transparent the virtual object is and whether the user can "see through" the virtual object to be able to observe the physical environment. In some embodiments, the opacity of the virtual object may be automatically adjusted based on detection of activity in the physical environment. For example, if the outside observer approaches the individual wearing the extended reality appliance, the opacity of one or more virtual objects (or of the entire extended reality environment) may be adjusted such that the individual can see the outside observer in the physical environment.

For example, if the virtual object is a virtual screen including text, the opacity of the virtual screen may be determined such that the outside observer may see the text when rendered from the second perspective; i.e., the opacity may be determined to be low enough that the outside observer may see through the virtual object when rendered from the second perspective. In some embodiments, the opacity is determined to be less than 75% when the at least one virtual object obscures at least a portion of the individual from the second perspective. For example, if the virtual object is a solid object (i.e., not meant to be transparent), then the opacity of the virtual object when rendered from the second perspective may be reduced (e.g., to 75% or less) such that the individual may be visible "through" the virtual object even if the individual may not be fully visible. For example, the opacity of the virtual object may be reduced such that the outside observer may be able to see through the virtual object to see the individual. As another example, the opacity of the virtual object may be reduced such that the outside observer may be able to see through the virtual object to read text or see an image on a side of the virtual object that faces the individual in the extended reality environment.

In some embodiments, the at least one virtual object contains private information and rendering the representation of the at least one virtual object includes obscuring the private information. Private information may include any data or representation designated as confidential to one or more persons, or otherwise restricted for viewing purposes. The rendering of the virtual object to obscure the private information may be performed in a similar manner as described above. For example, the virtual object may include a virtual screen with a text document and the text document may contain private information. In some embodiments, the fact that the virtual object contains private information may be indicated by a private information identifier, such as a flag or other type of identifier. If the private information identifier is detected (e.g., the private information identifier is set or otherwise indicates that the virtual object contains private information), then rendering the virtual object from the second perspective may include obscuring the private information. For example, the rendered virtual object may include "greeked" text (e.g., rendering of the text as unreadable symbols or lines) such that the private information is not readable from the second perspective. As another example, the opacity of the virtual object may be adjusted such that the outside observer cannot see through the virtual object from the second perspective to read the private information. As another example, the text may be obscured by other means, such as blurring or distorting the text, covering the text with an opaque box, or changing the color of the text to match the background. In any of these examples, the user in the extended reality environment would still be able to read the private information.

In some embodiments, the at least one virtual object includes a first object in a position visible from the second perspective and a second object in a position hidden from the second perspective. For example, in the extended reality environment, the second virtual object may appear to be closer to the user and the first virtual object may appear to be behind the second virtual object. In some embodiments, the first virtual object may be larger than the second virtual object such that the first virtual object may be partially obscured by the second virtual object in the extended reality environment. From the second perspective, the first virtual object may be visible to the outside observer, but the second virtual object may be blocked from view by the first virtual object (e.g., if the first virtual object is larger than the second virtual object) such that the outside observer cannot see the second virtual object.

In some embodiments, the generated video includes a representation of the first object from the second perspective in a first visual format and a representation of the second object from the second perspective in a second visual format, the second visual format differs from the first visual format and is indicative of the second object being in the position hidden from the second perspective. Generating the video may be performed in a similar manner as described earlier. In some embodiments, different virtual objects may be rendered in different visual formats. A visual format may include parameters of how a virtual object is to be rendered, for example, object size, line width, line color, line style, object fill, object fill color, intensity, texture, or transparency/opacity. In some embodiments, the different visual formats may include an indicator or a parameter (e.g., a flag, a tag, or other indicator) in the visual format that the virtual object is in a hidden position. In some examples, the different visual formats may be indicative of the virtual object being in a hidden position. For example, a half transparent rendering of a normally non-transparent virtual object may be indicative of the virtual object being in a hidden position.

For example, in the extended reality environment, the first virtual object may be larger than the second virtual object and may be behind the second virtual object such that from the second perspective the second virtual object may be hidden behind the first virtual object (i.e., the outside observer cannot see the second virtual object). To render the image from the second perspective such that the outside observer may see both the first virtual object and the second virtual object, the first virtual object may be rendered with a reduced opacity (i.e., the first visual format) and the second virtual object may be rendered with its "normal" opacity (i.e., the second visual format) such that the outside observer may see "through" the first virtual object to see the second virtual object. As another example, the first virtual object may be rendered in an outline representation (i.e., not "filled in" or as a "wireframe" in the first visual format) and the second virtual object may be rendered with its "normal" opacity (i.e., the second visual format) such that the outside observer may see "through" the first virtual object to see the second virtual object.

In some embodiments, in the generated video the rendered representation of the at least one virtual object from the second perspective hides the physical hand and includes a virtual representation of the physical hand. Generating the video may be performed in a similar manner as described earlier. For example, the generated video may include a virtual representation of the user's hands instead of a representation of the user's hands in the physical environment. The virtual representation of the user's hands from the second perspective may be rendered in a similar manner as rendering the virtual object from the second perspective. In some embodiments, the virtual representation of the user's hands may be based on the first image data including the user's hands in the physical environment from the first perspective and the second image data including the user's hands in the physical environment from the second perspective. In some embodiments, the virtual representation of the user's hands from the second perspective may be generated using a machine learning algorithm, such as a generative adversarial network (GNN), a convolutional neural network (CNN), a recurrent neural network (RNN), or other machine learning algorithm as described earlier. In some embodiments, the generated video may include a virtual representation of the user's hands and a generated representation of the user's face without the wearable extended reality appliance.

In some embodiments, the operations include analyzing at least one of the first image data or the second image data to determine an absence of interaction with a particular virtual object. Analyzing the first image data or the second image data may be performed in a similar manner as described earlier. In some embodiments, in the extended reality environment, the user may have stopped interacting with the virtual object. For example, the user may place the virtual object on a surface or drop the virtual object. In some embodiments, when a user "drops" the virtual object in the extended reality environment, the virtual object may "float" in front of the user until the user moves the virtual object to a different location. In some embodiments, when a user "drops" the virtual object in the extended reality environment, the virtual object may automatically be placed in a predetermined location.

In some embodiments, when the user stops interacting with the virtual object, the generated video excludes a representation of the particular virtual object. Generating the video may be performed in a similar manner as described above. For example, if the user stops interacting with the virtual object, the user may be able to see the virtual object in the extended reality environment, but the outside observer would no longer see the virtual object in the generated video. In some embodiments, however, when the user stops interacting with the virtual object, the generated video may include the representation of the particular virtual object. For example, the virtual object may "float" near the user from the second perspective. As another example, the virtual object may be automatically placed in a predetermined location, visible both in the extended reality environment and in the generated video from the second perspective.

In some embodiments, the operations include rendering for display a representation of the extended reality environment from the second perspective. The rendering may be performed in a similar manner as described earlier. For example, the entire extended reality environment as seen by the user wearing the extended reality appliance may be rendered from the second perspective; i.e., the outside observer may see everything that the user sees, but from the second perspective, similar to what the outside observer would see if they wore an extended reality appliance and were viewing the same extended reality environment as the user.

In some embodiments, the operations include generating an additional video of the individual in the extended reality environment interacting with the at least one virtual object from the second perspective. Generating the additional video may be performed in a similar manner as described earlier. In some embodiments, the additional video may include a complete representation of the extended reality environment melded with a representation of the user in the physical environment. For example, in the generated video, it may appear that the extended reality environment is placed between the outside observer and the individual in the physical environment. In some embodiments, the additional video may include a complete representation of the extended reality environment melded with a virtual representation of the individual in the extended reality environment. For example, in the generated video, it may appear to the outside observer as if the outside observer was wearing an extended reality appliance and viewing the same extended reality environment as the individual.

In some embodiments, the operations include artificially deleting the wearable extended reality appliance from the second image data. Artificially deleting the wearable extended reality appliance from the second image data may enable the outside observer to see the user's entire face, as if the user were not wearing the extended reality appliance. In some embodiments, the artificially deleting may be performed in a similar manner as the rendering described earlier.

In some embodiments, the operations include generating the video of the individual, without the wearable extended reality appliance, interacting with the at least one virtual object from the second perspective. Generating the video may be performed in a similar manner as described above. In some embodiments, an image of the individual's face from the second perspective may be replaced with a previously captured image of the individual's face taken while the individual was not wearing the extended reality appliance. The previously captured image of the individual's face may be retrieved from a storage location. For example, the storage location may be on the wearable extended reality appliance, on the computing device, or on a remote storage separate from the wearable extended reality appliance and the computing device. For example, an image similar to image 3010 as shown in FIG. 30 may be generated and may include showing the individual's full face. In some embodiments, an AI algorithm, such as any one of the AI or machine learning algorithms described earlier, may be used to render the image of the individual's full face from the second perspective without the wearable extended reality appliance. For example, the AI algorithm may combine the previously captured image of the individual's face with image 3010 to generate the new image from the second perspective.

In some embodiments, the operations include causing the wearable extended reality appliance to present a preview of the video of the individual interacting with the at least one virtual object from the second perspective while the individual is interacting with the at least one virtual object. The preview video may be generated in a similar manner as generating the video described earlier. For example, the generated video may be previewed by the user in the extended reality environment, such as by displaying the preview of the generated video in a separate virtual window in the extended reality environment.

In some embodiments, the operations include sharing the generated video with at least one other individual while the individual wearing the wearable extended reality appliance is interacting with the at least one virtual object. Generating the video may be performed in a similar manner as described earlier. For example, the operations may include automatically sending the generated video to another individual. In some embodiments, the generated video may be sent to another individual by any one or more of: an email message, a social media account message, a social media account post, a hyperlink or other type of link, or by displaying the generated video on a screen (e.g., a television, a monitor, a tablet, a mobile phone, a mobile device, or other display device).

In some embodiments, the individual wearing the wearable extended reality appliance may initiate the sharing of the generated video. For example, the individual may activate a user interface control in the extended reality environment to initiate the sharing. As another example, the individual may activate a physical control on the wearable extended reality appliance or on the computing device to initiate the sharing. In some embodiments, the outside observer may initiate the sharing of the generated video. For example, the outside observer may activate a physical control on the wearable extended reality appliance or on the computing device to initiate the sharing.

In some embodiments, the operations include receiving input that an additional video of the individual interacting with the at least one virtual object from the first perspective is preferred. In some embodiments, the input may be received from the individual in the extended reality environment, for example, by the individual activating a user interface control in the extended reality environment. In some embodiments, the input may be received from the user by the user activating a physical control on the wearable extended reality appliance or on the computing device. In some embodiments, it may be easier to observe how the user is interacting with the virtual object from the first perspective than from the second perspective. For example, if the virtual object is a virtual screen including a text document and the user is typing text into the document, it may be easier for the outside observer to read the document from the first perspective than from the second perspective because in the first perspective the outside observer would see the text oriented in the same direction as the user. As another example, if the user is repairing a bicycle in the extended reality environment, it would be easier for the outside observer to understand how the user is repairing the bicycle if the outside observer was able to see the video from the first perspective.

In some embodiments, the operations include melding a representation of the at least one virtual object from the first perspective with the first image data to generate the additional video of the individual interacting with the at least one virtual object from the first perspective. The melding may be performed in a similar manner as described earlier. In this embodiment, the additional video may be generated from the first perspective in a similar manner as generating the video from the second perspective as described earlier. While different image data may be used in generating the additional video (i.e., substituting the first image data for the second image data), the methods for melding and generating may be similar. For example, an image of the user's hands in the physical environment (i.e., the first image data) may be melded with the virtual object from the first perspective to generate the additional video.

In some embodiments, the operations include switching from the video from the second perspective to the additional video from the first perspective. In some embodiments, the switching may be initiated by the user by activating a user interface control in the extended reality environment. In some embodiments, the switching may occur based on a predetermined action by the individual. For example, the individual may perform a predetermined hand gesture in the extended reality environment to activate the switching. In some embodiments, the switching may be initiated by the user activating a physical control on the wearable extended reality appliance or on the computing device. In some embodiments, the video may begin from the second perspective and switch to being from the first perspective. In some embodiments, the video may switch between the first perspective and the second perspective multiple times. In some embodiments, a "split screen" video may be generated where one portion of the video (e.g., the left side) is video from the second perspective and another portion of the video (e.g., the right side) is video from the first perspective.

In some embodiments, the input is received from the at least one other individual. For example, the other individual may be the outside observer. For example, the outside observer may enter a command or activate a physical control on the computing device selectively connected to the wearable extended reality appliance to initiate the switching.

Figure 32:
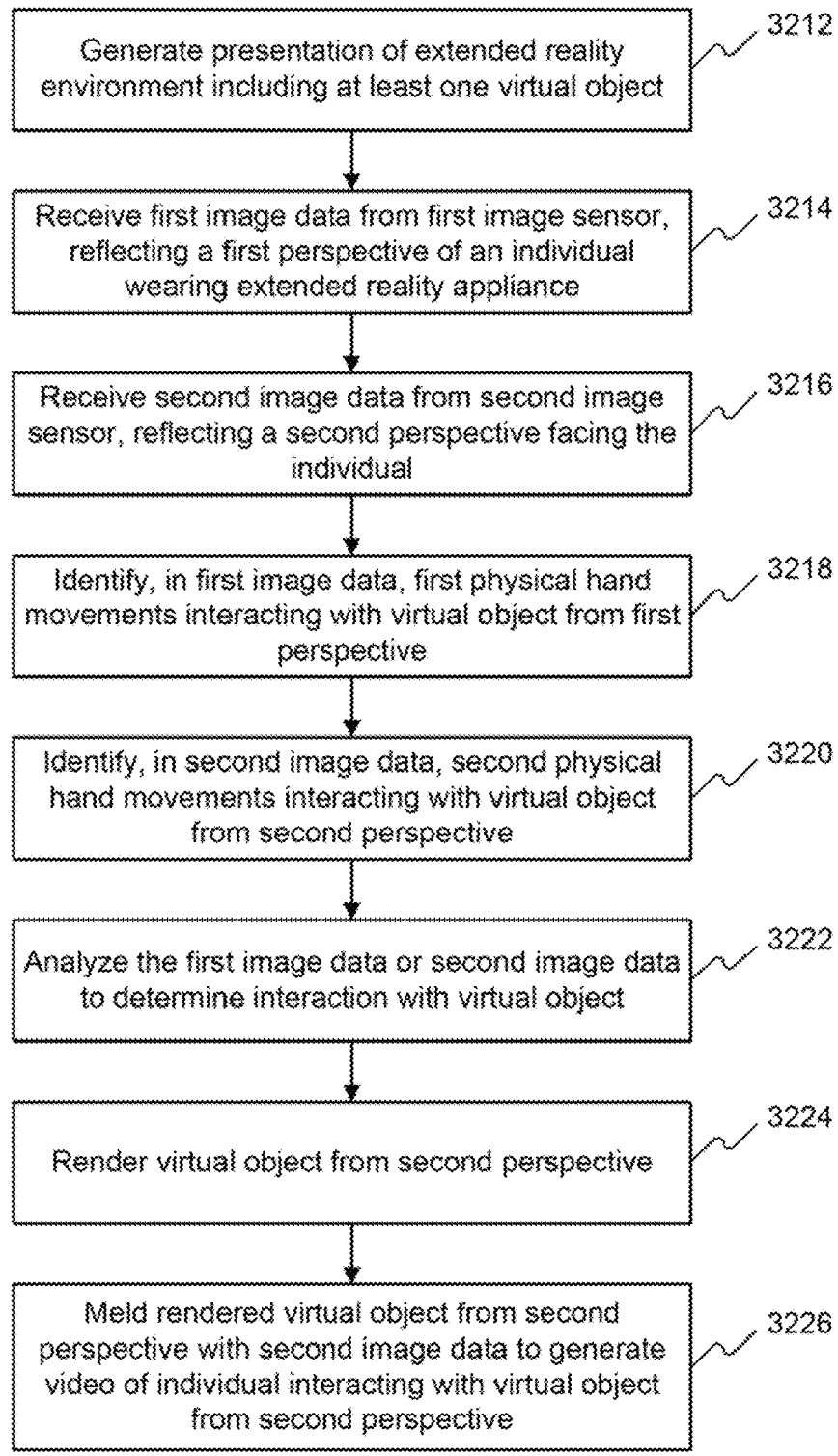
FIG. 32 is a block diagram illustrating an example process for generating videos of individuals interacting with virtual objects, consistent with some embodiments of the present disclosure.

FIG. 32 is a flowchart of an exemplary method 3210 for generating videos of individuals interacting with virtual objects. The terms "generating," "videos," and "interacting" as used in a similar manner as described above. FIG. 32 is an exemplary representation of just one embodiment, and it is to be understood that some illustrated elements might be omitted and others added within the scope of this disclosure. One or more operations of method 3210 may be performed by a processor associated with a wearable extended reality appliance. For example, a first processor may be located in the wearable extended reality appliance and may perform one or more operations of the method 3210. As another example, a second processor may be located in a computing device selectively connected to the wearable extended reality appliance, and the second processor may perform one or more operations of the method 3210. As another example, the first processor and the second processor may cooperate to perform one or more operations of the method 3210. The cooperation between the first processor and the second processor may include load balancing, work sharing, or other known mechanisms for dividing a workload between multiple processors.

Method 3210 may include a step 3212 of generating a presentation of an extended reality environment including at least one virtual object. In some embodiments, the extended reality environment may be presented via the wearable extended reality appliance. The extended reality environment may be generated and presented in a similar manner as described above.

Method 3210 may include a step 3214 of receiving first image data from at least a first image sensor. The terms "first image data" and "first image sensor" are used in a similar as described above. In some embodiments, the first image data may reflect a first perspective of an individual wearing the wearable extended reality appliance. In some embodiments, the first image sensor may be a part of the wearable extended reality appliance.

Method 3210 may include a step 3216 of receiving second image data from at least a second image sensor. The terms "second image data" and "second image sensor" are used in a similar as described above. In some embodiments, the second image data may reflect a second perspective facing the individual wearing the wearable extended reality appliance. In some embodiments, the second image sensor may be a part of a computing device selectively connected to the wearable extended reality appliance.

Method 3210 may include a step 3218 of identifying first physical hand movements in the first image data. The terms "first physical hand movements" and "identified" are used in a similar manner as described above. In some embodiments, the first physical hand movements may represent the individual interacting with the at least one virtual object from the first perspective.

Method 3210 may include a step 3220 of identifying second physical hand movements in the second image data. The terms "second physical hand movements" and "identified" are used in a similar manner as described above. In some embodiments, the second physical hand movements may represent the individual interacting with the at least one virtual object from the second perspective.

Method 3210 may include a step 3222 of analyzing the first image data or the second image data to determine an interaction with the at least one virtual object. The term "analyzing" is used in a similar manner as the term "analyzed" described above. In some embodiments, the analyzing may include analyzing both the first image data and the second image data. In some embodiments, the interaction may correspond only to the first physical hand movements. In some embodiments, the interaction may correspond only to the second physical hand movements. In some embodiments, the interaction may correspond to both the first physical hand movements and the second physical hand movements.

Method 3210 may include a step 3224 of rendering the at least one virtual object for display from the second perspective. The term "rendering" is used in a similar manner as the term "rendered" described above. For example, if the user is holding a virtual puzzle cube, the user will see a certain color combination facing in the user's direction. To render the puzzle cube from the second perspective (i.e., the face of the puzzle cube that the outside observer would see), the rendering may include using use artificial intelligence (AI) algorithms machine learning (ML) algorithms as described above and/or information from the wearable extended reality device about the puzzle cube.

Method 3210 may include a step 3226 of melding the rendered representation of the at least one virtual object from the second perspective with the second image data to generate a video of the individual interacting with the at least one virtual object from the second perspective. The term "melding" is used in a similar manner as the term "rendered" described above. In some embodiments, instead of a video, a still melded image, or a series of one or more still melded images may be generated.

In an alternative embodiment, the generated video may be based on only the second image data and the rendered virtual object from the second perspective; i.e., the first image data may not be received or may not be analyzed. In such alternative embodiment, the second image data from the second image sensor may be received. The second physical hand movements interacting with the at least one virtual object from the second perspective may be identified. The second image data may be analyzed to determine an interaction with the at least one virtual object. The at least one virtual object may be rendered from the second perspective and may be melded with the second image data to generate the video. It is noted that in this alternative embodiment, the generated video would be limited to the second perspective.

Some embodiments may provide a system for generating videos of individuals interacting with virtual objects. The system includes at least one processor programmed to cause a wearable extended reality appliance to generate a presentation of an extended reality environment including at least one virtual object; receive first image data from at least a first image sensor, the first image data reflecting a first perspective of an individual wearing the wearable extended reality appliance; receive second image data from at least a second image sensor, the second image data reflecting a second perspective facing the individual; identify in the first image data first physical hand movements interacting with the at least one virtual object from the first perspective; identify in the second image data second physical hand movements interacting with the at least one virtual object from the second perspective; analyze at least one of the first image data or the second image data to determine an interaction with the at least one virtual object; render for display a representation of the at least one virtual object from the second perspective; and meld the rendered representation of the at least one virtual object from the second perspective with the second image data to generate a video of the individual interacting with the at least one virtual object from the second perspective.

For example, the system may include system 200 shown in FIG. 2. The at least one processor may include processing device 360 shown in FIG. 3 and/or processing device 460 shown in FIG. 4. The steps may be performed entirely by processing device 360, entirely by processing device 460, or jointly by processing device 360 and processing device. The cooperation between processing device 360 and processing device 460 may include load balancing, work sharing, or other known mechanisms for dividing a workload between multiple processing devices.

Disclosed embodiments, including methods, systems, apparatuses, and non-transitory computer-readable media, may relate to enabling collaboration between physical writers and virtual writers, or between physical writers and virtual viewers. Some embodiments involve a non-transitory computer readable medium containing instructions for causing at least one processor to perform operations to enable collaboration between physical writers and virtual writers. The term "non-transitory computer readable medium" may be understood as described earlier. The term "instructions" may refer to program code instructions that may be executed by a computer processor. The instructions may be written in any type of computer programming language, such as an interpretive language (e.g., scripting languages such as HTML and JavaScript), a procedural or functional language (e.g., C or Pascal that may be compiled for converting to executable code), object-oriented programming language (e.g., Java or Python), logical programming language (e.g., Prolog or Answer Set Programming), or any other programming language. In some embodiments, the instructions may implement methods associated with machine learning, deep learning, artificial intelligence, digital image processing, and any other computer processing technique. The term "processor" may be understood as described earlier. For example, the at least one processor may be one or more of server 210 of FIG. 2, mobile communications device 206, processing device 360 of FIG. 3, processing device 460 of FIG. 4, processing device 560 of FIG. 5, and the instructions may be stored at any of memory devices 212, 311, 411, or 511, or a memory of mobile communications device 206.

A physical writer may be any individual. A virtual writer may be any individual. A virtual viewer may be any individual. Collaboration between physical writers and virtual writers may include interactions between physical writers and virtual writers in extended reality environments. For example, disclosed embodiments may relate to one or more ways for individuals working in extended reality to add annotations to a physical surface (e.g., a physical document or whiteboard) concurrently edited in a physical space, even when the individuals are not located in the same physical space (e.g., physical room). Disclosed embodiments may involve augmenting virtual markings of a remote writer over tangible markings of an individual wearing an extended reality appliance. Collaboration between physical writers and virtual viewers may include interactions between physical writers and virtual viewers in extended reality environments.

Some embodiments involve receiving image data representing a hand of a first physical writer holding a physical marking implement and engaging with a physical surface to create tangible markings, wherein the image data is received from an image sensor associated with a wearable extended reality appliance worn by the first physical writer. A physical marking implement may include, for example, a pen, pencil, piece of chalk, highlighter, marker, brush, or any other implement configured to create markings on a physical surface. The physical surface may be a surface of a physical object, which may include, for example, a notebook, whiteboard, desk, table, wall, window, touch pad, cup, mobile device, screen, shelf, machine, vehicle, door, chair, or any other physical item or object. In some embodiments, the physical surface is at least one of a whiteboard or a paper. In some embodiments, the physical surface is a compilation of pages. The tangible markings may include, for example, a letter, word, sentence, paragraph, text, line, arc, freeform, shape, symbol, figure, drawing, feature, sign, or any other indication on a physical surface.

The first physical writer may be any individual and may wear a wearable extended reality appliance. In some examples, the wearable extended reality appliance may include an image sensor. In some examples, an image sensor separate from the wearable extended reality appliance may be placed in the environment of the first physical writer. The image sensor, whether part of or separate from the wearable extended reality appliance, may be configured to capture images of the scenes in front of the image sensor. For example, the image sensor may continuously or periodically capture image data. The image data may represent a hand of the first physical writer holding a physical marking implement and engaging with a physical surface to create tangible markings. In some examples, at least one processor associated with the wearable extended reality appliance may receive, from the image sensor, the captured image data.

Figure 33:
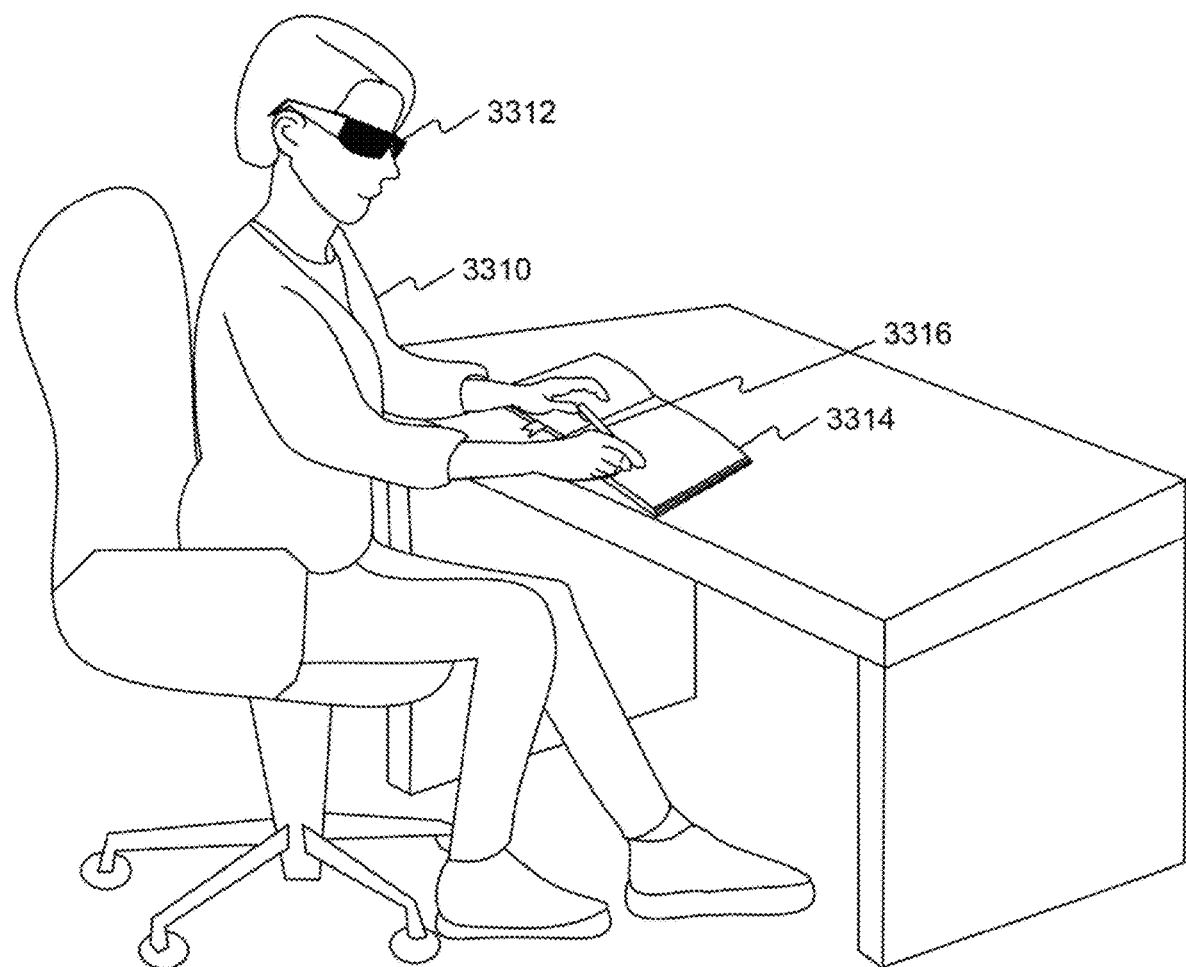
FIG. 33 is a schematic diagram illustrating use of an exemplary wearable extended reality appliance consistent with some disclosed embodiments.

FIG. 33 is a schematic diagram illustrating use of an exemplary wearable extended reality appliance consistent with some embodiments of the present disclosure. With reference to FIG. 33, a first physical writer 3310 may be an individual. First physical writer 3310 may wear a wearable extended reality appliance 3312. A hand of first physical writer 3310 may hold a physical marking implement 3316 and may engage (for example, via the physical marking implement 3316) with a physical surface 3314 to create tangible markings. The physical marking implement 3316 may be, for example, a pen, a pencil, a chalk, a highlighter, a marker, a brush, or any other apparatus configured to create markings on a surface. An example of the physical surface 3314 as shown in FIG. 33 may be a notebook. In some examples, the physical surface 3314 may be a whiteboard, a piece of paper, a wall, a window, a physical glass surface, a physical table top, or a surface of any other physical object as desired by a person of ordinary skill in the art. An image sensor, whether part of or separate from wearable extended reality appliance 3312, may capture image data representing the hand of first physical writer 3310 holding physical marking implement 3316 and engaging with physical surface 3314 to create tangible markings. At least one processor associated with wearable extended reality appliance 3312 may receive the captured image data from the image sensor.

Figure 34:
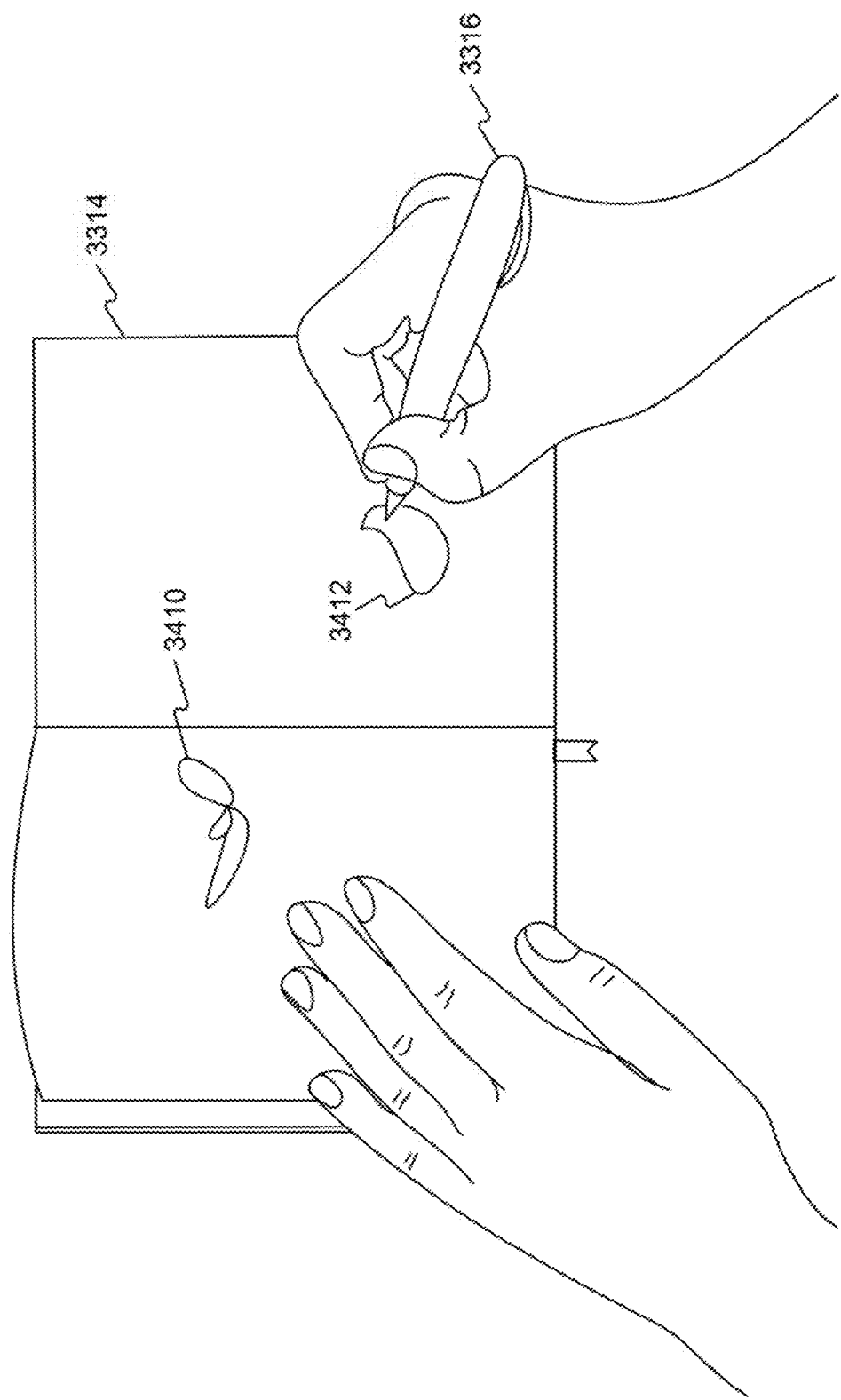
FIG. 34 illustrates tangible markings on a physical surface, which markings may be captured by a sensor of a wearable extended reality device consistent with some disclosed embodiments.
Figure 35:
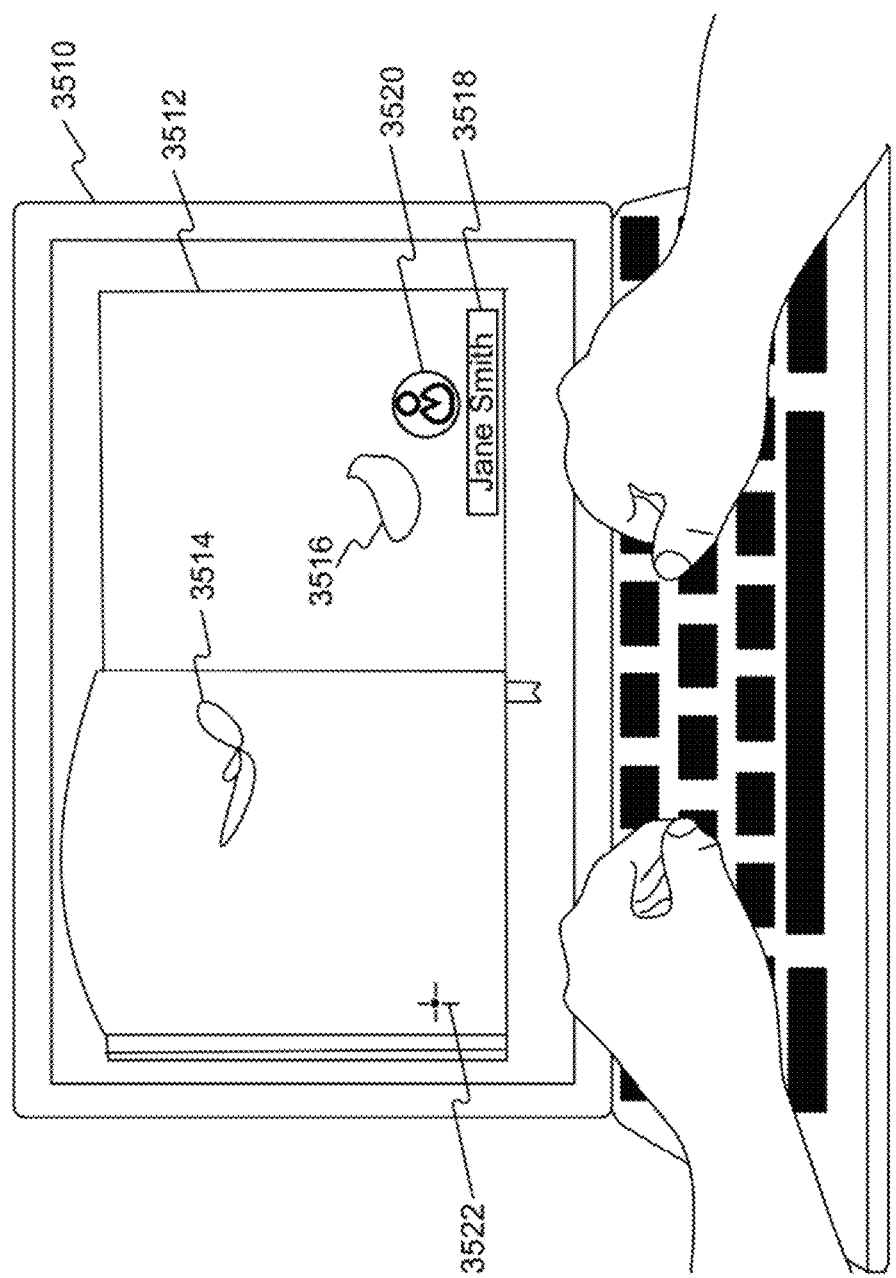
FIG. 35 illustrates the tangible markings of FIG. 34, received by a computing device consistent with some disclosed embodiments.
Figure 36:
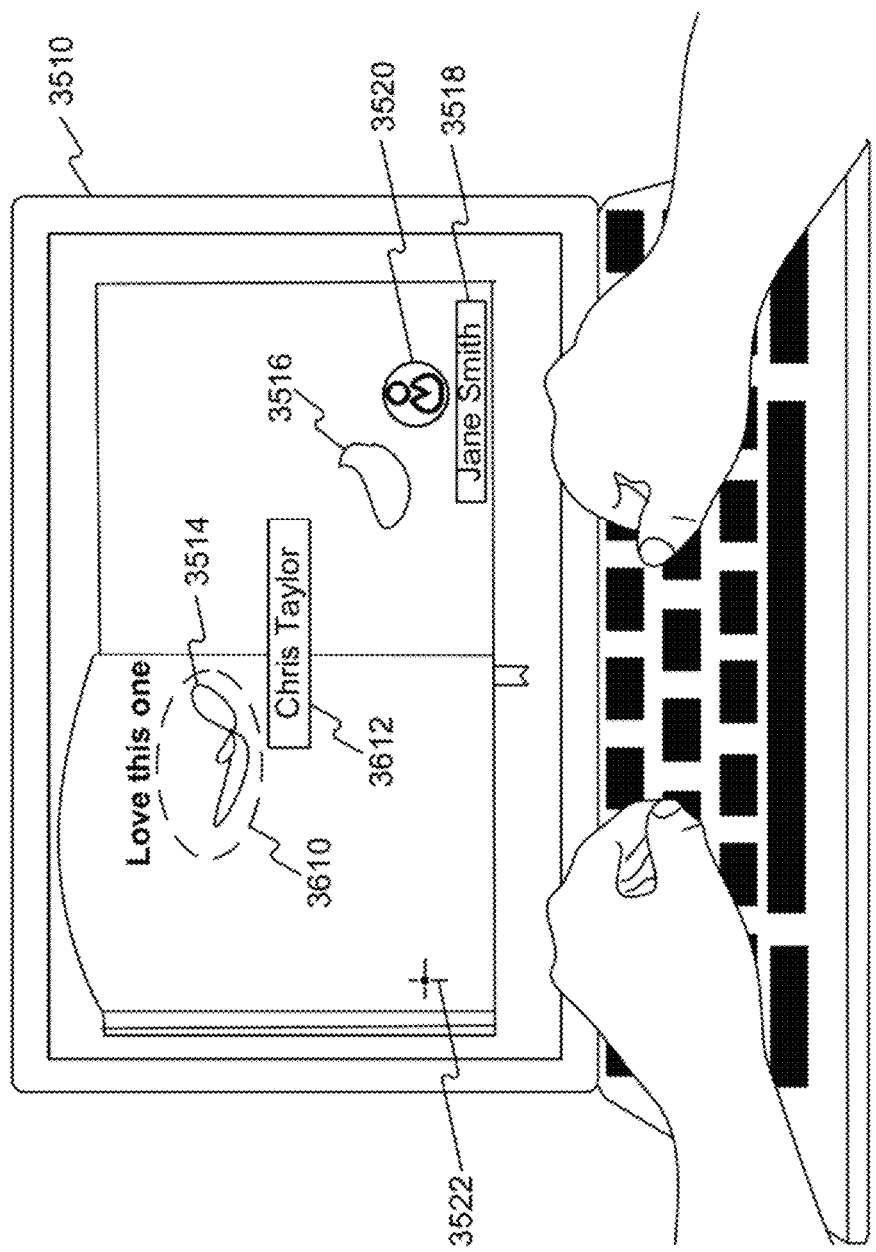
FIG. 36 illustrates the computing device of FIG. 35, displaying later-added additional markings, consistent with some disclosed embodiments.
Figure 37:
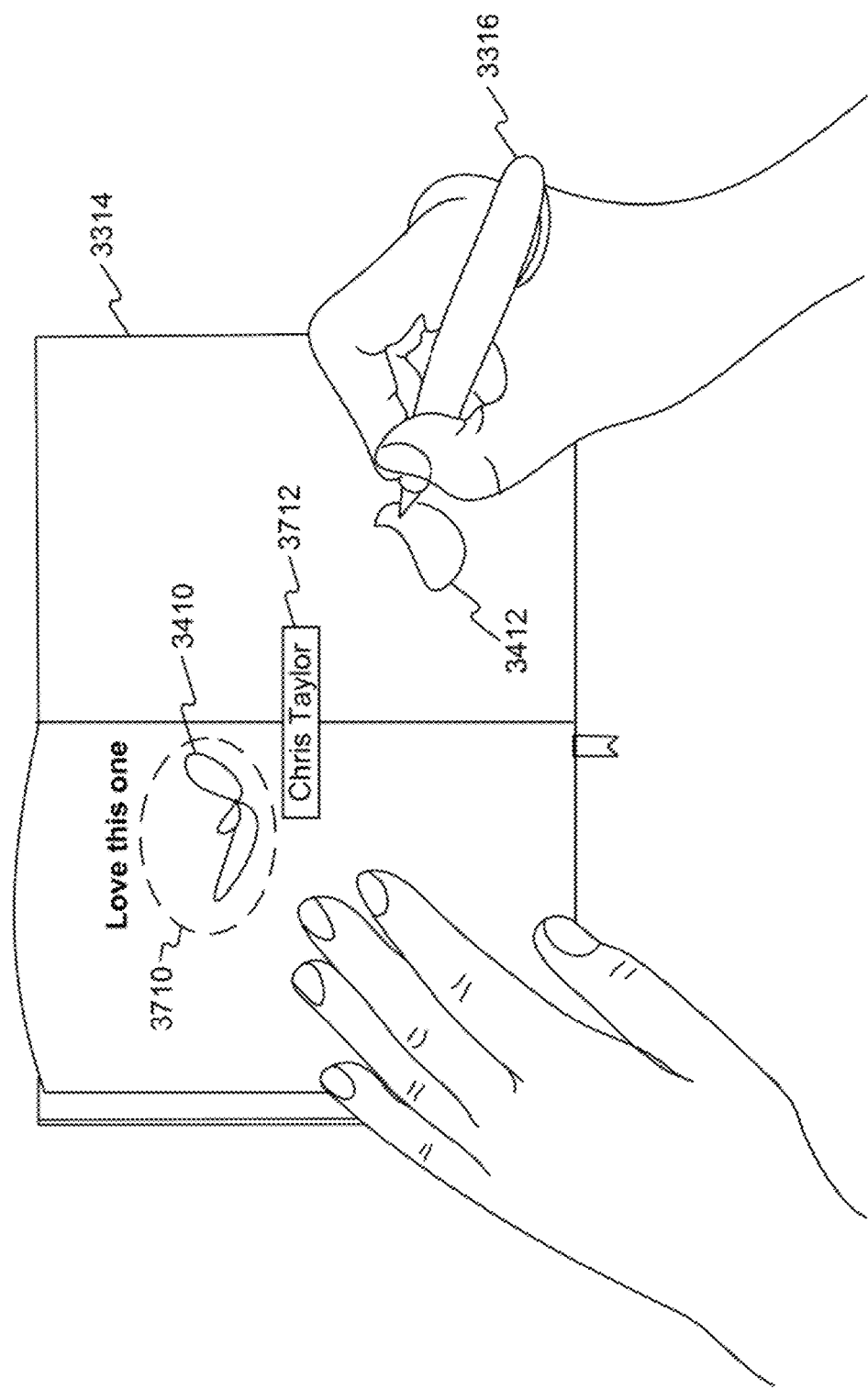
FIG. 37 illustrates the additional markings displayed by the wearable extended reality device, consistent with some disclosed embodiments.

FIGS. 34, 35, 36, and 37 are schematic diagrams illustrating various use snapshots of an example system for virtual sharing of a physical surface consistent with some embodiments of the present disclosure. FIGS. 34 and 37 may illustrate one or more elements as described in connection with FIG. 33 from another perspective (e.g., the perspective of first physical writer 3310, the perspective of wearable extended reality appliance 3312, or the perspective of the image sensor that may be part of or separate from wearable extended reality appliance 3312). With reference to FIG. 34, a hand of first physical writer 3310 may hold physical marking implement 3316 and may engage with physical surface 3314 to create tangible markings 3410, 3412. Examples of tangible markings 3410, 3412 as shown in FIG. 34 may be two patterns of drawings. In some examples, any other type of tangible marking as desired may be created on physical surface 3314. An image sensor associated with (e.g., part of or separate from) wearable extended reality appliance 3312 may capture the scenes of creating tangible markings using physical marking implement 3316 on physical surface 3314, including, for example, the scene as shown in FIG. 34.

Some embodiments involve transmitting information based on the image data to at least one computing device associated with at least one second virtual writer, to thereby enable the at least one second virtual writer to view the tangible markings created by the first physical writer. The at least one second virtual writer may include one or more individuals (e.g., different from the first physical writer). In some examples, the at least one second virtual writer may be present in one or more locations different from a location in which the first physical writer may be present. For example, the at least one second virtual writer and the first physical writer may be present in different rooms, buildings, cities, countries, or in different locations having any desired distance therebetween. The at least one computing device associated with the at least one second virtual writer may include any type of computing device that the at least one second virtual writer may use (e.g., for collaborating, interacting, or communicating with the first physical writer and/or the wearable extended reality appliance worn by the first physical writer). In some embodiments, the at least one computing device associated with the at least one second virtual writer includes at least one of another wearable extended reality appliance, a desktop computer, a laptop, a tablet, or a smartphone. In some embodiments, the at least one computing device associated with the at least one second virtual writer may include one or more computing devices based on virtualization and/or cloud computing technologies, such as virtual machines. The at least one computing device associated with the at least one second virtual writer may be located in proximity to or remote from the at least one second virtual writer and may be accessed by the at least one second virtual writer.

At least one processor associated with the wearable extended reality appliance worn by the first physical writer may process the image data captured by the image sensor and may, based on the processing, determine information for transmitting to the at least one computing device associated with the at least one second virtual writer. In some examples, the information to be transmitted to the at least one computing device associated with the at least one second virtual writer may represent the scenes as captured by the image sensor. For example, the transmitted information may allow the at least one second virtual writer to view (via the at least one computing device) the scenes as viewed by the first physical writer and/or as captured by the image sensor. The processing of the image data may include, for example, converting the captured image data into a format suitable for transmission.

Additionally or alternatively, the information to be transmitted may be determined in such a manner that the information may allow one or more aspects of the scenes captured by the image sensor to be presented to the at least one second virtual writer. The one or more aspects may include, for example, the tangible markings created by the first physical writer, the physical surface on which the tangible markings may be created, and/or any other feature of the captured scenes. For example, the processing of the captured image data may include analyzing the captured image data to extract features such as the tangible markings created by the first physical writer and/or the physical surface on which the tangible markings may be created. For example, at least one processor may analyze the image data to track the movement of the physical writing implement relative to the physical surface and may, based on the tracked movement, determine the created tangible markings. In some examples, at least one processor may determine the look of the physical surface based on captured image data where the hand of the first physical writer and/or the physical writing implement are not covering portions of the physical surface.

Some embodiments involve analyzing the image data received from the image sensor to remove at least one of the hand or the physical marking implement from the image data to thereby create modified image data, and using the modified image data to enable the at least one second virtual writer to view the tangible markings created by the first physical writer without the at least one of the hand or the physical marking implement. For example, by deleting the representation of the at least one of the hand or the physical marking implement and using an inpainting algorithm to fill the deleted portions, at least one processor may generate the modified image data. When the image data includes multiple images of the physical surface (for example, multiple frames of a video of the physical surface), the deleted portions of one image may be filled based on pixel data corresponding to the deleted portions in other images. For example, image processing software may recognize hands and marking implements (e.g., using content aware processing), and may remove them from an image. Alternatively and equivalently, markings may be recognized and removed from an image containing one or more of a hand or a marking implement. In some examples, a generative machine learning model may be trained using training examples to remove depictions of hands and/or depictions of marking implements from images and/or videos. An example of such training example may include a sample image or video including a depiction of a sample hand and/or marking implement, together with a modified version of the sample image or video not including the depiction of the sample hand and/or marking implement. The trained generative machine learning model may be used to analyze the image data received from the image sensor to remove at least one of the hand or the physical marking implement from the image data to thereby create modified image data. In some examples, the image data may be analyzed to calculate a convolution of at least part of the image data and thereby obtain a result value of the calculated convolution. Further, the creation of the modified image data may be based on the result value of the calculated convolution. In one example, one or more pixels associated with a depiction of the at least one of the hand or the physical marking implement may be identified based on the result value of the calculated convolution. In another example, pixels values of pixels associated with a depiction of the at least one of the hand or the physical marking implement may be modified to new pixel values, and the new pixel values may be determined based on the result value of the calculated convolution.

At least one processor associated with the wearable extended reality appliance worn by the first physical writer may transmit the information based on the image data to the at least one computing device associated with the at least one second virtual writer. The at least one computing device associated with the at least one second virtual writer may receive the information from the wearable extended reality appliance and may use the received information to cause display to the at least one second virtual writer, for example, of the tangible markings created by the first physical writer. For example, the at least one computing device may cause display of the tangible markings, for example, via one or more screens associated with the at least one computing device. In some examples, the at least one computing device may include a wearable extended reality appliance and may cause display of the tangible markings virtually via a display system of the wearable extended reality appliance, which may include, for example, an optical head-mounted display, a monocular head-mounted display, a binocular head-mounted display, a see-through head-mounted display, a helmet-mounted display, or any other type of device configured to show images to a user.

In some examples, the tangible markings may be presented to the at least one second virtual writer with the physical surface. In some examples, the image data may be analyzed to separate the tangible markings from the background physical surface, and the tangible markings may be presented to the at least one second virtual writer over a different surface, such as another physical surface in an environment of the at least one second virtual writer, a virtual surface in an extended reality environment of the at least one second virtual writer, or any other desired surface. Similarly, the tangible markings may be presented to the at least one second virtual viewer with the physical surface.

With reference to FIG. 34, at least one processor associated with wearable extended reality appliance 3312 may transmit information based on captured image data to a computing device associated with a second virtual writer. The transmitted information may indicate, for example, the tangible markings 3410, 3412, and/or the physical surface 3314. In some examples, the hands of the first physical writer 3310 and/or the physical writing implement 3316 may be not indicated in the transmitted information. Additionally or alternatively, the hands of the first physical writer 3310 and/or the physical writing implement 3316 may be indicated in the transmitted information.

With reference to FIG. 35, an example of the computing device 3510 associated with the second virtual writer that may receive the information transmitted from the at least one processor associated with wearable extended reality appliance 3312 is shown. Computing device 3510 may include a laptop computer. FIG. 35 shows that the second virtual writer (e.g., an individual) is using the computing device 3510 with two hands. The screen of computing device 3510 may, based on the received information, display a representation 3512 of the physical surface 3314 and display representations 3514, 3516 of the tangible markings 3410, 3412. The computing device 3510 may thus allow the second virtual writer or a virtual viewer to view, for example, the tangible markings 3410, 3412 created by the first physical writer 3310. In some examples, one or more visual indicators indicative of an identity of the first physical writer 3310 may be displayed in association with the representations 3512, 3514, and/or 3516. The one or more visual indicators may include, for example, an image 3520 of the first physical writer 3310, a textual indicator 3518 of the first physical writer 3310, or any other type of desired indication. In some examples, the first physical writer 3310 may be in a different location than the second virtual writer (or the virtual viewer), and a communication channel may be established between the wearable extended reality appliance 3312 and the computing device 3510 (e.g., for transmission of desired information), so that the first physical writer 3310 and the second virtual writer (or the virtual viewer) may collaborate based on virtual sharing of a physical surface as described herein. In some examples, the computing device 3510 may be any other type of computing device, such as a second wearable extended reality appliance. One or more of the elements 3512, 3514, 3516, 3518, and/or 3520 may be displayed virtually to the second virtual writer using a display system of the second wearable extended reality appliance.

Some embodiments involve receiving from the at least one computing device annotation data representing additional markings in relative locations with respect to the tangible markings created by the first physical writer. For example, via a user interface of the at least one computing device on which the tangible markings created by the first physical writer may be displayed to the at least one second virtual writer, the at least one second virtual writer may input additional markings in locations relative to the displayed tangible markings. The user interface may include, for example, an application running on a laptop computer, a virtual surface presented by a wearable extended reality appliance, or any other interface via which the at least one second virtual writer may provide input. In some examples, the additional markings may be added onto the surface on which the tangible markings created by the first physical writer may be displayed by the at least one computing device. The additional markings may include, for example, a letter, word, sentence, paragraph, text, line, arc, freeform, shape, symbol, figure, drawing, annotation, feature, sign, or any other indication that may be input via a computing device. The additional markings may be generated using one or more of a keyboard, stylus, mouse, touch sensitive input, voice to text input, gesture command, or any other manner of adding indicia. In some examples, the additional markings may be associated with one or more particular items of the tangible markings created by the first physical writer and may be displayed in proximity to the one or more associated items. For example, an additional marking that the at least one second virtual writer may input may include a comment on a particular tangible marking created by the first physical writer. Such an additional marking may be displayed in proximity to the particular tangible marking to indicate the association therebetween.

Based on the input of the additional markings, the at least one computing device may determine the relative locations of the additional markings with respect to the tangible markings created by the first physical writer (e.g., as the additional markings and the tangible markings are on a surface presented by the at least one computing device). In some examples, the relative locations may be encoded based on a coordinate system that moves with the tangible markings or with the physical surface, and therefore the locations may be relative to the tangible markings. In some examples, the relative locations may be encoded as a distance and a relative direction with respect to at least part of the tangible markings.

The at least one computing device may transmit, to the wearable extended reality appliance worn by the first physical writer, annotation data representing the additional markings in relative locations with respect to the tangible markings created by the first physical writer. The annotation data may include, for example, representations of the additional markings and/or the relative locations of the additional markings with respect to the tangible markings created by the first physical writer. At least one processor associated with the wearable extended reality appliance worn by the first physical writer may receive the annotation data from the at least one computing device.

With reference to FIG. 36, the second virtual writer may, via a user interface of the computing device 3510, input additional markings 3610. An example of the additional markings 3610 may include a comment ("Love this one") on the representation 3514 of the tangible marking 3410. The additional markings 3610 may include a circle around, and/or may be in proximity to, the representation 3514 of the tangible marking 3410, to indicate an association between the additional markings 3610 and the representation 3514 of the tangible marking 3410. The computing device 3510 may transmit, to the wearable extended reality appliance 3312, annotation data representing the additional markings 3610 in relative locations with respect to the representation 3514 of the tangible marking 3410. The wearable extended reality appliance 3312 may receive the annotation data from the computing device 3510. In some examples, one or more visual indicators indicative of an identity of the second virtual writer may be displayed in association with the additional markings 3610. The one or more visual indicators may include, for example, an image of the second virtual writer, a textual indicator 3612 of the second virtual writer, or any other type of desired indication. The computing device 3510 may additionally or alternatively transmit the one or more visual indicators to the wearable extended reality appliance 3312.

Some embodiments involve in response to receiving the annotation data, causing the wearable extended reality appliance to overlay the physical surface with virtual markings in the relative locations. At least one processor associated with the wearable extended reality appliance worn by the first physical writer may receive, from the at least one computing device associated with the at least one second virtual writer, the annotation data representing the additional markings in relative locations with respect to the tangible markings created by the first physical writer. In response to receiving the annotation data, the at least one processor associated with the wearable extended reality appliance may cause the wearable extended reality appliance to overlay the physical surface with the virtual markings in the relative locations. The virtual markings may correspond to the additional markings created by the at least one second virtual writer. The overlaying may occur using any knowing virtual reality or extended reality tool that causes virtual information to be displayed in a physical environment. Overlaying the physical surface with the virtual markings may use a display system of the wearable extended reality appliance, which may include, for example, an optical head-mounted display, a monocular head-mounted display, a binocular head-mounted display, a see-through head-mounted display, a helmet-mounted display, or any other type of device configured to show images to a user. In some embodiments, the annotation data includes cursor data associated with a pointing device. Some embodiments involve analyzing the cursor data to determine the relative locations of the additional markings. For example, the pointing device may be of the at least one computing device associated with the at least one second virtual writer. The at least one second virtual writer may use the pointing device to input the additional markings and to indicate the relative locations for the additional markings. The indicated relative locations for the additional markings may be recorded in the cursor data, which may be transmitted by the at least one computing device associated with the at least one second virtual writer to the wearable extended reality appliance worn by the first physical writer. The at least one processor associated with the wearable extended reality appliance worn by the first physical writer may analyze the cursor data to determine the relative locations of the additional markings.

In some examples, causing the wearable extended reality appliance to overlay the physical surface with the virtual markings in the relative locations may include analyzing images captured using the image sensor associated with the wearable extended reality appliance to determine a position and/or an orientation of at least one of the physical surface or the tangible markings created by the first physical writer, and determining the locations to place the virtual markings based on the determined position and/or orientation. For example, the relative locations of the additional markings created by the at least one second virtual writer with respect to the tangible markings created by the first physical writer as presented by the at least one computing device associated with the at least one second virtual writer may be mapped onto the physical surface, so that the tangible markings and the additional markings may be presented to the first physical writer and the at least one second virtual writer in a similar way. This would enable collaboration between the first physical writer and the at least one second virtual writer by virtual sharing of the physical surface.

With reference to FIG. 37, at least one processor associated with the wearable extended reality appliance 3312 may receive the annotation data from the computing device 3510 and may, in response, cause the wearable extended reality appliance 3312 to overlay the physical surface 3314 with virtual markings 3710 in the relative locations with respect to the tangible markings 3410, 3412. The virtual markings 3710 may correspond to the additional markings 3610 created by the second virtual writer. Based on the additional markings 3610 created by the second virtual writer, the virtual markings 3710 may include a comment ("Love this one") on the tangible marking 3410. Based on the additional markings 3610, the virtual markings 3710 may include a circle around, and/or may be in proximity to, the tangible marking 3410, to indicate an association between the virtual markings 3710 and the tangible marking 3410. In some examples, the wearable extended reality appliance 3312 may receive, from the computing device 3510, one or more visual indicators associated with the additional markings 3610. The one or more visual indicators may be indicative of an identity of the second virtual writer and may be displayed virtually by the wearable extended reality appliance 3312 in association with the virtual markings 3710 corresponding to the additional markings 3610. The one or more visual indicators may include, for example, an image of the second virtual writer, a textual indicator 3712 of the second virtual writer, or any other type of desired indication.

In some embodiments, the computing device 3510 may transmit, to the wearable extended reality appliance 3312, cursor data associated with a pointing device (e.g., of the computing device 3510). For example, the second virtual writer may use the pointing device (which may control a cursor 3522 as shown in FIGS. 35 and 36) to input the additional markings 3610 and to indicate the relative locations for the additional markings 3610. The indicated relative locations for the additional markings 3610 may be recorded in the cursor data, which may be transmitted to the wearable extended reality appliance 3312. The at least one processor associated with the wearable extended reality appliance 3312 may analyze the cursor data to determine the relative locations of the additional markings 3610.

In some embodiments, the physical surface is a compilation of pages and the annotation data received from the at least one computing device associated with the at least one second virtual writer represents first virtual markings associated with a first page of the compilation and second virtual markings associated with a second page of the compilation. For example, the at least one second virtual writer may input additional markings specific to each of one or more pages of the compilation. Such specific markings may be different for different pages. The at least one computing device may transmit, to the wearable extended reality appliance worn by the first physical writer, the page-specific markings created by the at least one second virtual writer, for presenting as page-specific virtual markings by the wearable extended reality appliance.

In some embodiments, the compilation is a notebook and the embodiments involve analyzing the image data (e.g., as captured by the image sensor associated with the wearable extended reality appliance worn by the first physical writer) to determine that the notebook is opened to the first page, and causing the wearable extended reality appliance to overlay the first virtual markings on the first page of the notebook and exclude overlaying the second virtual markings on the first page of the notebook. For example, at least one processor associated with the wearable extended reality appliance worn by the first physical writer may analyze specific characteristics of the pages of the notebook to identify particular pages. In some examples, the pages of the notebook may include page numbers, and the at least one processor may identify particular pages of the notebook based on the page numbers in the image data. In other examples, notebook pages may each contain a unique code to enable page identification. In further examples, images of each of one or more pages of the notebook, or other feature information representing each page, may be stored in memory, and the at least one processor may compare the stored information for each page with the captured information for a particular page in the image data, to identify the particular page. Based on identifying the page, the at least one processor may cause display of virtual markings specific to the identified page (e.g., in the annotation data), for example, by overlaying the specific virtual markings on the identified page of the notebook and not overlaying other virtual markings (e.g., in the annotation data) on the identified page of the notebook.

Some embodiments involve analyzing the image data to determine when the first page is turned, and causing the first virtual markings to disappear in response to the determination that the first page is turned. For example, at least one processor associated with the wearable extended reality appliance worn by the first physical writer may use the image data captured by the image sensor associated with the wearable extended reality appliance to detect a gesture of the first physical writer turning the first page of the notebook. Additionally or alternatively, the at least one processor may analyze the image data (e.g., periodically, continuously, or when page flipping is detected) to determine whether a currently showing page of the notebook is a particular page (e.g., the first page), based on the content (e.g., the tangible markings and/or a page number) of the currently showing page. For example, the at least one processor may determine that the first page is turned based on determining that the currently showing page of the notebook is changing from the content of the first page to the content of another page. In response to the determination that the first page is turned, the at least one processor may cause the first virtual markings to disappear. For example, a machine learning model may be trained using training examples to determine when a page is turned from images and/or videos. An example of such training example may include a sample image or a sample video, together with a label indicating whether the sample image or the sample video depicts a turn of a page. The trained machine learning model may be used to analyze the image data to determine when the first page is turned.

Some embodiments involve analyzing the image data to determine when the first page is flipped back, and causing the first virtual markings to reappear in response to the determination that the first page is flipped back. For example, at least one processor associated with the wearable extended reality appliance worn by the first physical writer may use the image data captured by the image sensor associated with the wearable extended reality appliance to detect a gesture of the first physical writer flipping back to the first page of the notebook. Additionally or alternatively, the at least one processor may analyze the image data (e.g., periodically or continuously) to determine whether a currently showing page of the notebook is a particular page (e.g., the first page), based on the content (e.g., the tangible markings and/or a page number) of the currently showing page. For example, the at least one processor may determine that the first page is flipped back based on determining that the currently showing page of the notebook is changing to the content of the first page from the content of another page. In response to the determination that the first page is flipped back, the at least one processor may cause the first virtual markings to reappear. In some examples, a machine learning model may be trained using training examples to distinguish between different pages and recognize particular pages from images and/or videos. An example of such training example may include two sample images, each image depicting a sample page, together with label(s) indicating whether the two sample pages are the same page or different pages. The trained machine learning model may be used to analyze the image data and determine when the first page is flipped back (for example, when the first page reappears and a second page disappears).

Some embodiments involve causing the wearable extended reality appliance to present a virtual representation of the second page with the second virtual markings away from the notebook. For example, at least one processor associated with the wearable extended reality appliance worn by the first physical writer may store in memory the content (e.g., the tangible markings and/or a page number) of each of one or more pages of the notebook, using captured image data when the notebook is showing various pages. When the notebook is opened to the first page (e.g., with the first virtual markings overlaying thereon), the at least one processor may cause the wearable extended reality appliance to present a virtual representation of the second page of the notebook with the second virtual markings (e.g., representing one or more additional markings created by the at least one second virtual writer for the second page of the notebook).

The second virtual markings may be displayed together with the virtual representation of the second page of the notebook in a similar manner as the second virtual markings would have been displayed to overlay on the second page of the notebook. For example, the second virtual markings may be displayed on the surface of the second page in virtual representation, and/or may be displayed in locations relative to the virtual representation of the tangible markings of the second page (for example, the relative locations may be specified by the at least one second virtual writer). The virtual representation of the second page of the notebook with the second virtual markings may be displayed away from the notebook. For example, the virtual representation of the second page of the notebook with the second virtual markings may be displayed next to, or in any other desired location relative to, the notebook (which may be opened to the first page), so that the first page with the first virtual markings overlaying thereon and the virtual representation of the second page of the notebook with the second virtual markings may be displayed at the same time to the first physical writer.

In some embodiments, the annotation data includes second image data representing a hand of an additional physical writer holding a second physical marking implement and engaging with a second physical surface to create second tangible markings Some embodiments involve analyzing the second image data to determine the relative locations of the second tangible markings. For example, at least one processor associated with the wearable extended reality appliance worn by the first physical writer may transmit information based on the captured image data to a wearable extended reality appliance worn by the additional physical writer, to thereby enable the additional physical writer to view the tangible markings created by the first physical writer. The wearable extended reality appliance worn by the additional physical writer may, based on receiving the information, cause display of the tangible markings created by the first physical writer, for example, by overlaying the second physical surface with the tangible markings created by the first physical writer. The additional physical writer may use a second physical marking implement to create second tangible markings on the second physical surface in locations relative to the virtual representations, of the tangible markings created by the first physical writer, overlaying on the second physical surface.

An image sensor associated with the wearable extended reality appliance worn by the additional physical writer may capture second image data representing a hand of the additional physical writer holding the second physical marking implement and engaging with the second physical surface to create the second tangible markings. The second image data may be transmitted to the wearable extended reality appliance worn by the first physical writer (e.g., in the annotation data). At least one processor associated with the wearable extended reality appliance worn by the first physical writer may analyze the second image data to determine the relative locations of the second tangible markings (e.g., with respect to the tangible markings created by the first physical writer) and may cause display of the second tangible markings, for example, by overlaying the first physical surface with the second tangible markings in the relative locations.

In some embodiments, the at least one second virtual writer includes a plurality of virtual writers. Some embodiments involve causing the wearable extended reality appliance to present in association with virtual markings made by a virtual writer of the plurality of virtual writers, a visual indicator indicative of an identity of the virtual writer. For example, the identity of the virtual writer may be transmitted to the wearable extended reality appliance worn by the first physical writer in connection with the data indicating the virtual markings made by the virtual writer. The visual indicator may be, for example, displayed in proximity to the virtual markings to indicate the association therebetween. In some examples, additional indications (e.g., an arrow, a linking line, or a dotted line) may be displayed to show the association between the visual indicator and the virtual markings. In some examples, virtual markings made by multiple virtual writers may be displayed by the wearable extended reality appliance worn by the first physical writer and, in association with virtual markings made by each of the multiple virtual writers, a visual indicator indicative of an identity of the corresponding virtual writer may be displayed. In some embodiments, the visual indicator includes at least one of an image of a virtual writer, a textual indicator of a virtual writer, or a symbol associated with a virtual writer. The visual indicator may additionally or alternatively include any other type of desired indication. In some examples, the visual indicator may be configured by the virtual writer. For example, the virtual writer may upload an image and enter a name for the visual indicator of the virtual writer. With reference to FIG. 37, one or more visual indicators (e.g., including the textual indicator 3712) indicative of an identity of the second virtual writer that created the additional markings 3610 may be displayed virtually by the wearable extended reality appliance 3312 in association with the virtual markings 3710 corresponding to the additional markings 3610.

In some embodiments, transmitting the image data to the at least one computing device associated with the at least one second virtual writer includes transmitting the image data to a group of computing devices associated with a group of virtual writers. For example, at least one processor associated with the wearable extended reality appliance worn by the first physical writer may transmit the image data to the group of computing devices associated with the group of virtual writers. Some embodiments involve receiving input from the first physical writer designating one or more virtual writers of the group of virtual writers for participation, and displaying virtual markings associated with the one or more virtual writers of the group of virtual writers designated for participation while preventing display of virtual markings associated with others in the group of virtual writers not designated for participation. For example, at least one processor associated with the wearable extended reality appliance worn by the first physical writer may cause display of a listing of the group of virtual writers. The listing may allow the first physical writer to select the one or more virtual writers for designating for participation. The listing may include a menu, a list of entries, a number of tiles, or any other desired form. Based on receiving the first physical writer's designation of the one or more virtual writers for participation, the at least one processor associated with the wearable extended reality appliance worn by the first physical writer may cause display of virtual markings associated with the one or more virtual writers of the group of virtual writers designated for participation. The at least one processor associated with the wearable extended reality appliance worn by the first physical writer may not cause display of virtual markings associated with others in the group of virtual writers, who were not designated for participation by the first physical writer.

In some embodiments, the at least one second virtual writer includes a plurality of virtual writers. Some embodiments involve causing the wearable extended reality appliance to display a listing of individuals permitted to view the tangible markings of the first physical writer. The listing of individuals may include, for example, one or more virtual writers of the plurality of virtual writers. The listing of individuals may be configured by the first physical writer. For example, the first physical writer may add individual(s) to, or remove individual(s) from, the listing of individuals. The listing may include a menu, a list of entries, a number of tiles, or any other desired form. Based on the listing of individuals, at least one processor associated with the wearable extended reality appliance worn by the first physical writer may transmit data indicating the tangible markings of the first physical writer to the listed individuals, so that those individuals may view the tangible markings of the first physical writer.

Some embodiments involve transmitting additional data to the at least one computing device associated with the at least one second virtual writer, to thereby enable the at least one second virtual writer to view the tangible markings with a visual indicator indicative of an identity of the first physical writer associated with the tangible markings. For example, at least one processor associated with the wearable extended reality appliance worn by the first physical writer may determine the identity of the first physical writer and may transmit additional data indicating the identity of the first physical writer to the at least one computing device associated with the at least one second virtual writer. The determining of the identity of the first physical writer may be based on, for example, the first physical writer uploading an image and/or entering a name, symbol, or any other information associated with the first physical writer. Based on receiving the additional data, the at least one computing device associated with the at least one second virtual writer may cause display of the visual indicator indicative of the identity of the first physical writer. The visual indicator may be displayed in association with (e.g., in proximity to or next to) the tangible markings of the first physical writer as displayed using the at least one computing device associated with the at least one second virtual writer. In some examples, additional indications (e.g., an arrow, a linking line, or a dotted line) may be displayed to show the association between the visual indicator and the displayed tangible markings. In some examples, the visual indicator may include at least one of an image of the first physical writer, a textual indicator of the first physical writer, a symbol associated with the first physical writer, and/or any other type of desired indication. With reference to FIG. 35, the computing device 3510 may receive the additional data indicating the identity of the first physical writer 3310 from at least one processor associated with the wearable extended reality appliance 3312 and may, based on the additional data, cause display of one or more visual indicators indicative of an identity of the first physical writer 3310. The one or more visual indicators indicative of an identity of the first physical writer 3310 may be displayed in association with the representations 3512, 3514, and/or 3516, allowing the second virtual writer to view. The one or more visual indicators may include, for example, an image 3520 of the first physical writer 3310, a textual indicator 3518 of the first physical writer 3310, or any other type of desired indication. The one or more visual indicators may indicate, for example, that the representations 3512, 3514, and/or 3516 are associated with (e.g., created by, used by, or belonging to) the first physical writer 3310.

Some embodiments involve, after overlaying the physical surface with the virtual markings, receiving input for causing a modification in the virtual markings. Some embodiments involve, in response to receiving the input, causing the wearable extended reality appliance to modify the virtual markings. For example, at least one processor associated with the wearable extended reality appliance worn by the first physical writer may overlay the physical surface with the virtual markings and may thereafter receive an input for causing the modification in the virtual markings. The input may be received from the first physical writer and/or the at least one second virtual writer. For example, the first physical writer may provide the input via an input device of the wearable extended reality appliance. In some embodiments, the input includes additional image data received from the image sensor associated with the wearable extended reality appliance worn by the first physical writer. Some embodiments involve analyzing the additional image data to identify a gesture indicting the modification in the virtual markings. The gesture may include, for example, any finger or hand motion, such as a drag, a pinch, a spread, a swipe, a tap, a pointing, a scroll, a rotate, a flick, a touch, a zoom-in, a zoom-out, a thumb-up, a thumb-down, a touch-and-hold, or any other action of a finger or hand. The at least one processor associated with the wearable extended reality appliance worn by the first physical writer may use image analysis algorithms to identify the gesture directed to the virtual markings in the additional image data. In some examples, the at least one second virtual writer may provide the input (e.g., via an input device or using a gesture as captured by an image sensor) to the at least one computing device associated with the at least one second virtual writer, and the at least one computing device may transmit, to the wearable extended reality appliance worn by the first physical writer, data of the input.

In some embodiments, the modification includes at least one of a deletion of at least a portion the virtual markings, changing a size of at least a portion the virtual markings, changing a color of at least a portion the virtual markings, or changing a location of at least a portion the virtual markings. In some examples, the modification may include changing a texture of at least a portion of the virtual markings, changing the text in the virtual markings, changing the shape of at least a portion of the virtual markings, and/or changing an orientation of at least a portion of the virtual markings. Additionally or alternatively, the modification may include any other type of desired change to at least a portion of the virtual markings.

Some embodiments involve a system for enabling collaboration between physical writers and virtual writers, the system including at least one processor programmed to: receive image data representing a hand of a first physical writer holding a physical marking implement and engaging with a physical surface to create tangible markings, wherein the image data is received from an image sensor associated with a wearable extended reality appliance worn by the first physical writer; transmit information based on the image data to at least one computing device associated with at least one second virtual writer, to thereby enable the at least one second virtual writer to view the tangible markings created by the first physical writer; receive from the at least one computing device annotation data representing additional markings in relative locations with respect to the tangible markings created by the first physical writer; and in response to receiving the annotation data, cause the wearable extended reality appliance to overlay the physical surface with virtual markings in the relative locations.

Some embodiments involve a method for enabling collaboration between physical writers and virtual writers, the method including: receiving image data representing a hand of a first physical writer holding a physical marking implement and engaging with a physical surface to create tangible markings, wherein the image data is received from an image sensor associated with a wearable extended reality appliance worn by the first physical writer; transmitting information based on the image data to at least one computing device associated with at least one second virtual writer, to thereby enable the at least one second virtual writer to view the tangible markings created by the first physical writer; receiving from the at least one computing device annotation data representing additional markings in relative locations with respect to the tangible markings created by the first physical writer; and in response to receiving the annotation data, causing the wearable extended reality appliance to overlay the physical surface with virtual markings in the relative locations.

Figure 38:
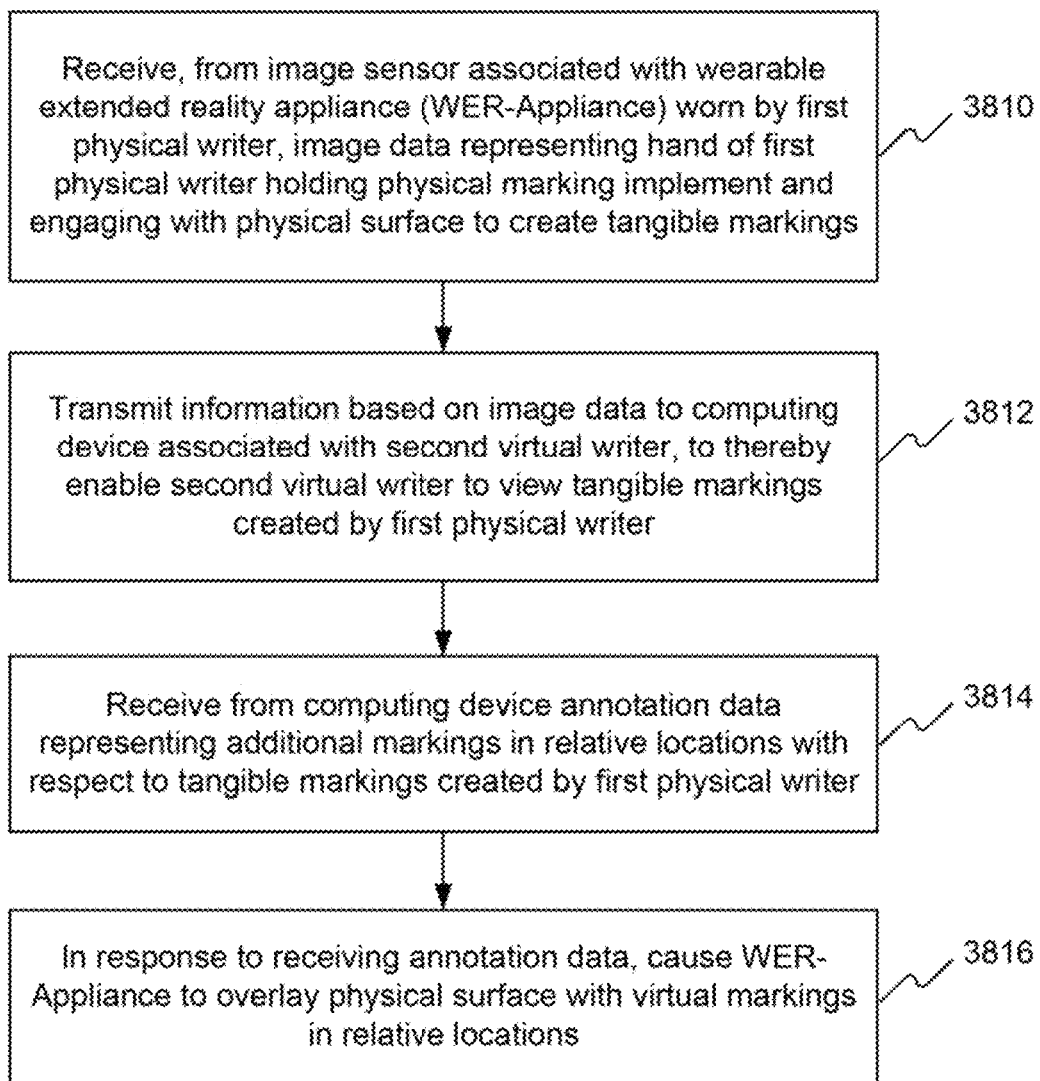
FIG. 38 is a block diagram illustrating an example process for virtual sharing of a physical surface consistent with some disclosed embodiments.

FIG. 38 is a flowchart illustrating an exemplary process 3800 for virtual sharing of a physical surface consistent with some embodiments of the present disclosure. To the extent details of the process were previously discussed, all of those details may not be repeated below to avoid unnecessary repetition. With reference to FIG. 38, in step 3810, instructions contained in a non-transitory computer-readable medium when executed by a processor may cause the processor to receive image data representing a hand of a first physical writer holding a physical marking implement and engaging with a physical surface to create tangible markings, wherein the image data may be received from an image sensor associated with a wearable extended reality appliance (WER-Appliance) worn by the first physical writer. In step 3812, instructions contained in a non-transitory computer-readable medium when executed by a processor may cause the processor to transmit information based on the image data to at least one computing device associated with at least one second virtual writer, to thereby enable the at least one second virtual writer to view the tangible markings created by the first physical writer. In step 3814, instructions contained in a non-transitory computer-readable medium when executed by a processor may cause the processor to receive from the at least one computing device annotation data representing additional markings in relative locations with respect to the tangible markings created by the first physical writer. In step 3816, instructions contained in a non-transitory computer-readable medium when executed by a processor may cause the processor to, in response to receiving the annotation data, cause the wearable extended reality appliance to overlay the physical surface with virtual markings in the relative locations.

A physical audio system is located in a physical space, for example, by mounting a speaker on a wall in a room. In this example, the speaker is "tied to" the location in the room where the speaker is mounted (for example, a corner of the room) such that a person in the room will be able to determine where the speaker is located when she hears sounds emanating from the speaker. Similarly, a virtual audio system may be tied to physical spaces. For example, a virtual speaker may be "mounted" or otherwise placed in a corner of a room in the physical environment. When a user with a wearable extended reality appliance enters the room, it may appear to the user that sounds they hear are emanating from the corner of the room where the virtual speaker is mounted or placed.

Similar to adjusting the audio settings for a physical speaker (for example, volume, bass, or treble), the user of the wearable extended reality appliance in an area of the virtual audio system may change and save audio settings (for example, volume, bass, or treble) for later use when the user returns to the area or when another user arrives in the location of the virtual audio system.

Disclosed embodiments may include methods, systems, and non-transitory computer readable media for facilitating tying a virtual speaker to a physical space. It is to be understood that this disclosure is intended to cover methods, systems, and non-transitory computer readable media, and any detail described, even if described in connection with only one of them, is intended as a disclosure of the methods, systems, and non-transitory computer readable media. It is noted that as used herein, the terms "physical space" and "physical environment" are understood to have similar meanings and may be used interchangeably.

Some disclosed embodiments may be implemented via a non-transitory computer readable medium containing instructions for performing the operations of a method. In some embodiments, the method may be implemented on a system that includes at least one processor configured to perform the operations of the method. In some embodiments, the method may be implemented by one or more processors associated with the wearable extended reality appliance. For example, a first processor may be located in the wearable extended reality appliance and may perform one or more operations of the method. As another example, a second processor may be located in a computing device (e.g., an integrated computational interface device) selectively connected to the wearable extended reality appliance, and the second processor may perform one or more operations of the method. As another example, the first processor and the second processor may cooperate to perform one or more operations of the method. The cooperation between the first processor and the second processor may include load balancing, work sharing, or other known mechanisms for dividing a workload between multiple processors.

Some embodiments involve a non-transitory computer readable medium containing instructions for causing at least one processor to perform operations to tie at least one virtual speaker to a physical space. The terms "non-transitory computer readable medium," "processor," and "instructions" may be understood as described elsewhere in this disclosure. A "virtual speaker" refers to a location from which it may be perceived that sounds are emitted, in an absence of a physical speaker at that location. For example, a user may wear headphones that emit sound waves simulating sound as it would be heard if a physical speaker were located at a location where no speaker is physically located. Or sound waves emitted from non-wearable physical speakers in a space may be tuned to cause an impression that sound is being emitted from locations other than from the physical speakers. Tying the at least one virtual speaker to the physical space is similar to how a physical speaker is tied to a physical space (for example, by mounting the speaker in a corner of a room). For example, the virtual speaker may be virtually "placed" in a corner of a room (i.e., the virtual speaker is "tied" to the corner of the room) or in any other location in the room. When a user with a wearable extended reality appliance enters the room, it will appear to the user that sounds are emanating from the location in the physical space where the virtual speaker is located (e.g., the corner of the room).

Some embodiments involve receiving, via a wireless network, a first indication that a first wearable extended reality appliance is located in an area associated with a virtual speaker. The term "wearable extended reality appliance" may be understood as described elsewhere in this disclosure. As used herein, the phrase "an area associated with a virtual speaker" is an area in a physical space from which sound is perceived to emanate in an absence of a speaker in that area. For example, the area may include a room in the physical space or a portion of a room in the physical space. As another example, the area may include a predetermined distance (measured in any units, such as centimeters, meters, inches, or feet) as measured from the location of the virtual speaker in the physical space. In some embodiments, the virtual speaker may be an omnidirectional speaker, and the area may include the predetermined distance in any direction from the virtual speaker (e.g., a predetermined radius around the omnidirectional speaker). In some embodiments, the virtual speaker may be a directional speaker, and the area may include the predetermined distance in the direction of the directional speaker (i.e., the predetermined distance in the direction which the directional speaker is aimed).

In some embodiments, the area of the virtual speaker may be determined based on a user's location. For example, a virtual speaker may be defined a particular distance from the user at, for example, a particular angle from a reference axis through the user. Or, the space may be defined by a virtual coordinate system and the speaker placed at or in an area of a particular set of coordinates (e.g., x, y or x, y, z).

In some embodiments, the first wearable extended reality appliance may include Global Positioning System (GPS) and/or an indoor localization functionality to determine the location of the first wearable extended reality appliance in the physical space. The first wearable extended reality appliance may include Wi-Fi, Bluetooth®, or other wireless communication functionality as described elsewhere in this disclosure which may be used to determine the location of the first wearable extended reality appliance in the physical space.

In some embodiments, the physical space may include a device (e.g., an input device, such as an integrated computational interface device as described elsewhere in this disclosure) configured to receive wireless signals (e.g., GPS, Wi-Fi, Bluetooth®, or other wireless signal) from the first wearable extended reality appliance which may be used to determine when the first wearable extended reality appliance enters the physical space.

The first indication may include a wireless signal from the GPS, Wi-Fi, Bluetooth®, or other wireless communication functionality included in the first wearable extended reality appliance.

Some embodiments involve transmitting to the first wearable extended reality appliance first data corresponding to first sounds associated with the virtual speaker, to thereby enable a first user of the first wearable extended reality appliance to hear the first sounds during a first time period, wherein the first sounds correspond to first settings of the virtual speaker. The first wearable extended reality appliance may include (or otherwise have associated with it) headphones and/or speakers as described elsewhere in this disclosure. The first data may include data such as digital signals representing sounds in a data format that may be transmitted to and received by the first wearable extended reality appliance. For example, the data format may be an audio data format such as an uncompressed format (e.g., WAV or AU), a lossless compression format (e.g., Windows Media Audio (WMA) Lossless), or a lossy compression format (e.g., WMA Lossy).

The phrase "first time period" as used herein is a time period or duration in which the first user is located in the area associated with the virtual speaker. The first settings of the virtual speaker may include any settings that may adjust the output of the virtual speaker, such as volume, bass, treble, balance (e.g., left and right balance), or an equalizer (e.g., specific frequency adjustments on a frequency band or range).

In some embodiments, the first settings of the virtual speaker may be the settings of the virtual speaker that exist when the first user enters the area associated with the virtual speaker. In such embodiments, the virtual speaker settings may be associated with the virtual speaker and not with the first user or with the first wearable extended reality appliance, meaning that the virtual speaker settings will be the same regardless of which user or which wearable extended reality appliance is associated with the first indication.

In some embodiments, the first settings may correspond to the first wearable extended reality appliance and the virtual speaker may be automatically adjusted to the first settings when the first indication is received. The first indication may include virtual speaker settings preferred by the first user and the settings may be stored in the first wearable extended reality appliance. The first indication may include a "trigger" (e.g., a signal or an instruction) to the virtual speaker to retrieve settings associated with the first wearable extended reality appliance from an external storage, such as an integrated computational interface device or a cloud-based storage.

Figure 39:
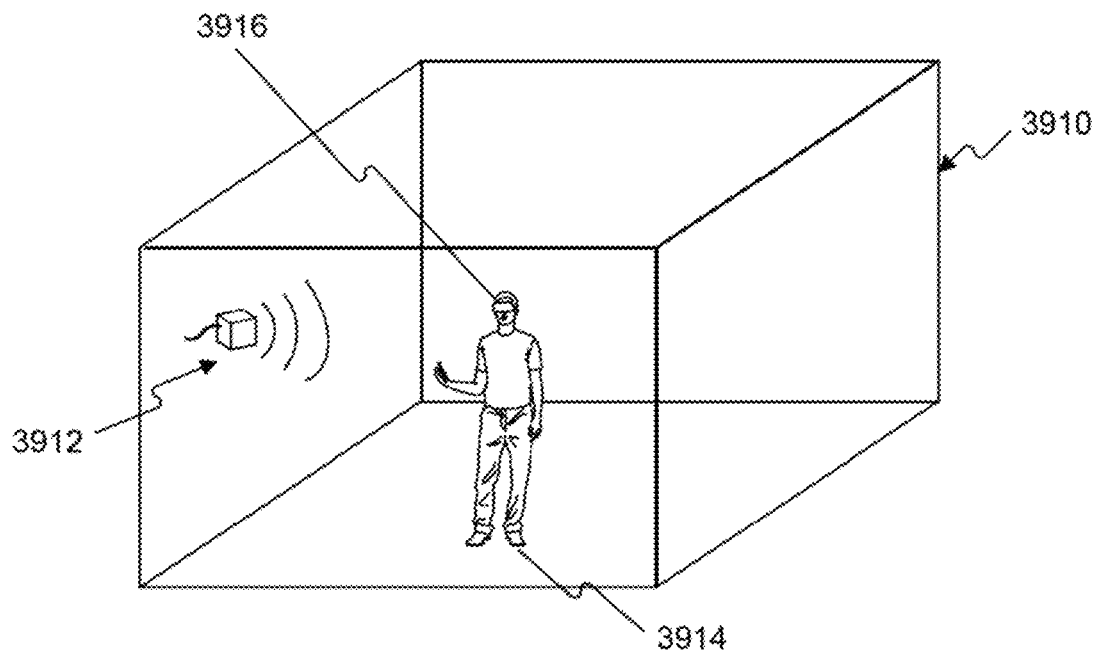
FIG. 39 illustrates an area in a physical space where a first user with a first wearable extended reality appliance is listening to audio at first settings of a virtual speaker, consistent with some embodiments of the present disclosure.

FIG. 39 illustrates an area in a physical space where a first user with a first wearable extended reality appliance is listening to audio at first settings of a virtual speaker. A physical space 3910 includes a virtual speaker 3912 tied to a location in physical space 3910. As shown in FIG. 39, virtual speaker 3912 is located in one corner of physical space 3910. It is noted that the system, method, and non-transitory computer readable medium will perform in a similar manner if virtual speaker 3912 is in a different location of physical space 3910, and as described below, virtual speaker 3912 may be moved to different locations in physical space 3910. A first user 3914 wearing a first wearable extended reality appliance 3916 is located in physical space 3910 and is able to hear first sounds associated with virtual speaker 3912 at first settings of virtual speaker 3912 (represented in FIG. 39 by three curved lines). FIG. 39 represents the first time period as described elsewhere in this disclosure, during which first user 3914 listens to the first sounds at the first settings of virtual speaker 3912.

Some embodiments involve receiving input associated with the first wearable extended reality appliance during the first time period, wherein the received input is indicative of second settings for the virtual speaker. The input may be received via a physical control located on an exterior portion of the first wearable extended reality appliance, such as a button, a knob, a dial, a switch, touchpad or a slider. Alternatively or additionally, the input may be received via a virtual user interface element in the extended reality environment. For example, the first user may activate a user interface element by invoking a command or by a predefined hand gesture in the extended reality environment. The input may be received as the result of interaction with a virtual control, such as a virtual button, knob, switch, touchpad, or slider, displayed in the user's field of view. Other examples of virtual user interface controls include a radio button, a checkbox, a dial, or a numerical entry field. In some embodiments, the input may be received via a voice command spoken by the first user. For example, the input may be received from a device paired with the first wearable extended reality appliance, such as the input device as described elsewhere in this disclosure. For example, the device may include one or more physical controls, such as a button, a knob, a dial, a switch, or a slider, or may include a user interface with one or more user interface elements or controls. In some embodiments, the input may be received via a physical input device that is physically separated from the first wearable extended reality appliance, such as a physical keyboard, a physical touchpad, a physical touchscreen, or a physical computer mouse.

The input may be a signal resulting from an environmental change detected by a sensor associated with the wearable extended reality appliance. For example, an image sensor may detect that a meeting has begun, which may correspond to second desired settings for the virtual speaker (e.g., lower volume). Similarly, the input may be a sound signal from a microphone that picks up increased ambient noise (e.g., from a nearby construction site) corresponding to a setting of increased volume. Alternatively or additionally, the input may be a gesture by a user, reflecting the user's intent to adopt a second sound setting (e.g., more bass after the first user determines that a particular soundtrack playing in the area of the virtual speaker sounds better with increased bass).

In some embodiments, the second settings may include any settings that may adjust the output of the virtual speaker, similar to the first settings, such as volume, bass, treble, balance (e.g., left and right balance), or an equalizer (e.g., specific frequency adjustments on a frequency band or range). In some examples, the second settings may include a new location or new orientation for the virtual speaker. Thus, the first user may be able to change any settings of the virtual speaker.

In some embodiments, the first user may only be permitted to change certain settings of the virtual speaker. For example, the first user may only be able to adjust the volume. In such embodiments, the other settings of the virtual speaker (i.e., settings other than the volume) may be "locked" by the system or the method. For example, if the first user uses a virtual user interface to change the settings, only the settings that the first user is permitted to change may be displayed. For example, if the first user is only permitted to change the volume, then only a volume control may be displayed. Controls related to other settings may either not be displayed or may be presented in a "greyed out" manner such that while the first user may see the controls related to the other settings, such controls are not enabled.

Some embodiments involve transmitting to the first wearable extended reality appliance second data corresponding to second sounds associated with the virtual speaker, to thereby enable the first user of the first wearable extended reality appliance to hear the second sounds during a second time period, wherein the second sounds correspond to the second settings of the virtual speaker. The second data may include data in a data format that may be transmitted to and received by the first wearable extended reality appliance, similar to the first data as described elsewhere in this disclosure. The second data may include data such as digital signals representing sounds in a data format that may be transmitted to and received by the first wearable extended reality appliance. In some examples, the second time period may be a time period or duration in which the first user is located in the area associated with the virtual speaker and is listening to sounds at the second settings of the virtual speaker. In some examples, the second time period may be a time period after the input indicative of second settings for the virtual speaker is received and/or after the first time period has ended. In some implementations, the second sounds may be the same as the first sounds, but at the second settings (e.g., at a higher volume level).

Figure 40:
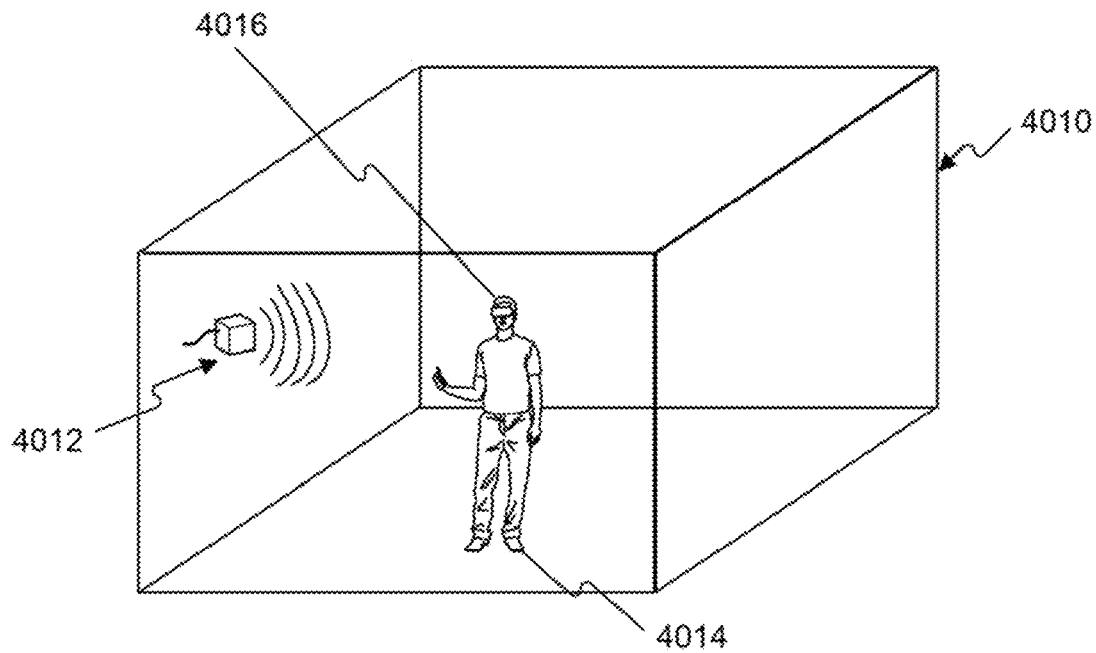
FIG. 40 illustrates the area in the physical space where the first user with the first wearable extended reality appliance is listening to audio at second settings of the virtual speaker, consistent with some embodiments of the present disclosure.

FIG. 40 illustrates the area in the physical space where the first user with the first wearable extended reality appliance is listening to audio at second settings of the virtual speaker. A physical space 4010 includes a virtual speaker 4012 tied to a location in physical space 4010. As shown in FIG. 40, virtual speaker 4012 is located in one corner of physical space 4010. A first user 4014 wearing a first wearable extended reality appliance 4016 is located in physical space 4010 and is able to hear second sounds associated with virtual speaker 4012 at second settings of virtual speaker 4012 (represented in FIG. 40 by five curved lines). FIG. 40 represents the second time period as described elsewhere in this disclosure, after first user 4014 has changed the settings of virtual speaker 4012 to the second settings.

Some embodiments involve after determining that the first user and the first wearable extended reality appliance left the area associated with the virtual speaker, receiving, via the wireless network, a second indication that a second wearable extended reality appliance is located in the area associated with the virtual speaker. As used herein, the phrase "left the area associated with the virtual speaker" means that the first user and the first wearable extended reality appliance are no longer physically present in a physical environment where the virtual speaker is virtually located. For example, the first user may have left a particular room, a portion of the room, or has moved more than the predetermined distance from the location of the virtual speaker in the physical space.

The second wearable extended reality appliance may be constructed in a similar manner and operate in a similar way as the first wearable extended reality appliance as described elsewhere in this disclosure. The second indication may be similar to the first indication as described elsewhere in this disclosure and may be used to determine when the second wearable extended reality appliance enters the physical space. The second indication may include a wireless signal from the GPS, Wi-Fi, Bluetooth®, or other wireless communication functionality included in the second wearable extended reality appliance and may be used to determine the location of the second wearable extended reality appliance in the physical space.

Some embodiments involve transmitting to the second wearable extended reality appliance third data corresponding to third sounds associated with the virtual speaker, to thereby enable a second user of the second wearable extended reality appliance to hear the third sounds during a third time period, wherein the third sounds correspond to the second settings of the virtual speaker. The third data may include data in a format that may be transmitted to and received by the second wearable extended reality appliance, similar to the first data as described elsewhere in this disclosure. Additionally or alternatively, the third data may include data such as digital signals representing sounds in a data format that may be transmitted to and received by the second wearable extended reality appliance. The third time period may correspond to a period or duration in which the second user is located in the area associated with the virtual speaker and is listening to sounds at the second settings of the virtual speaker. The third sounds may be the same as the second sounds, but heard by the second user of the second wearable extended reality appliance. Thus, for example, after the first user adopts the second settings, when the second user enters the area of the virtual speaker, the second user is exposed to the second sound settings.

While, in some embodiments, the second sound settings alter a sound characteristic, in other embodiments, the second sound setting may additionally or alternatively change the underlying substance of the sound. For example, the original sound may correspond to a first song, the second sound setting may be a second song, different from the first song. In such an example, when the second user enters the area of the virtual speaker, the second user may be exposed to the second song, as opposed to the original first song.

Figure 41:
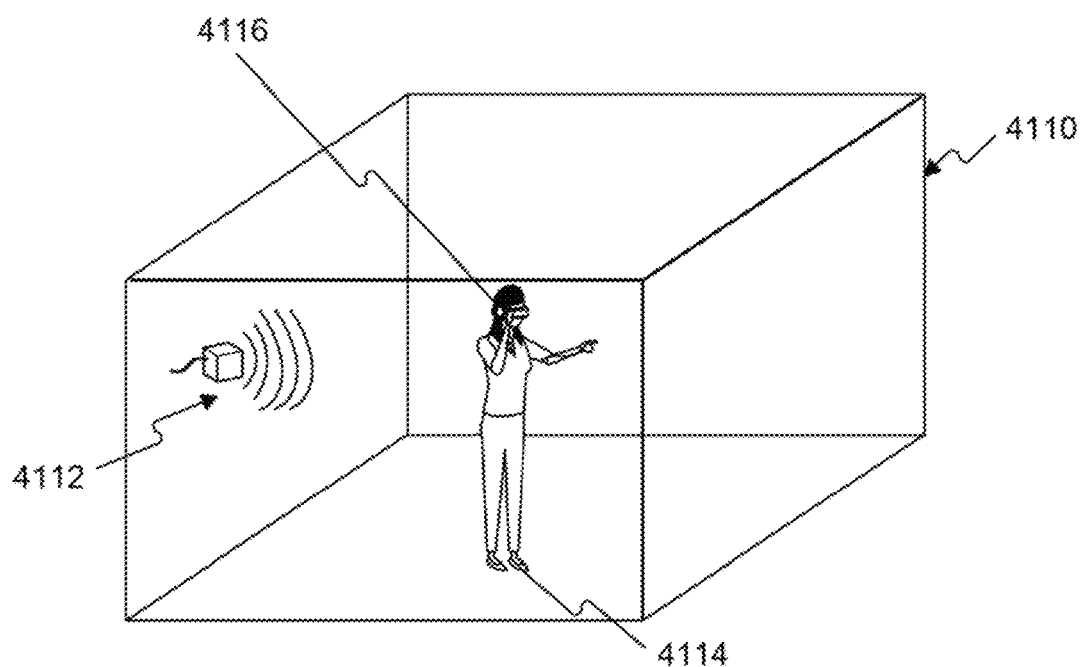
FIG. 41 illustrates the area in the physical space where a second user with a second wearable extended reality appliance is listening to audio at second settings of the virtual speaker, consistent with some embodiments of the present disclosure.

FIG. 41 illustrates the area in the physical space where a second user with a second wearable extended reality appliance is listening to audio at second settings of the virtual speaker. A physical space 4110 includes a virtual speaker 4112 tied to a location in physical space 4110. As shown in FIG. 41, virtual speaker 4112 is located in one corner of physical space 4110. A second user 4114 wearing a second wearable extended reality appliance 4116 is located in physical space 4110 and is able to hear third sounds associated with virtual speaker 4112 at second settings of virtual speaker 4112 (represented in FIG. 41 by five curved lines). FIG. 41 represents the third time period as described elsewhere in this disclosure, during which second user 4114 listens to third sounds from virtual speaker 4112 corresponding to the second settings.

In some embodiments, the first wearable extended reality appliance is the second extended reality appliance. For example, the second user may be the same person as the first user; e.g., the first user left the area associated with the virtual speaker and then later returned to the area. As another example, the second user may be a different person using the first wearable extended reality appliance; e.g., the first user and the second user share the same wearable extended reality appliance.

In some embodiments, the first wearable extended reality appliance differs from the second extended reality appliance. For example, when the first and second users differ, the second user may enter the area associated with the virtual speaker wearing the second wearable extended reality appliance. As another example, the second user may be the same person as the first user who may have switched from using the first wearable extended reality appliance to using the second wearable extended reality appliance.

In some embodiments, the third data corresponding to the third sounds is transmitted to a plurality of additional wearable extended reality appliances while the first wearable extended reality appliance that played the first sounds during the first time period and the second sounds during the second time period has left the area associated with the virtual speaker. For example, multiple users other than the first user may have entered the area associated with the virtual speaker after the first user has left the area (i.e., is absent from the area). Each one of the plurality of additional wearable extended reality appliances may be associated with a different one of the multiple users in the area and may be constructed in a similar manner and operate in a similar way as the first wearable extended reality appliance as described elsewhere in this disclosure. An indication from each of the plurality of additional wearable extended reality appliances may be received, to indicate that each of the plurality of additional wearable extended reality appliances is located in the area associated with the virtual speaker. The indication from each of the plurality of additional wearable extended reality appliances may include a wireless signal from the GPS, Wi-Fi, Bluetooth®, or other wireless communication functionality included in the additional wearable extended reality appliance and may be used to determine the location of the additional wearable extended reality appliance in the physical space.

In some embodiments, the received input indicative of the second settings causes the second sounds and the third sounds to be played at a specific volume level differing from an original volume level associated with the first settings. For example, the first user may adjust the volume level from the original volume level of the first settings to the specific volume level of the second settings. This adjustment may be made separately or in addition to any one or more of the bass, treble, balance, or equalizer settings. The first user may hear the second sounds at the specific volume level, while the second user may hear the third sounds at the same specific volume level, meaning that the volume settings are the same for the first user and the second user. In some embodiments, the first user may hear the second sounds at the specific volume level, while the second user may hear the third sounds at a different specific volume level, meaning that the volume settings are different for the first user and the second user.

In some embodiments, the received input indicative of the second settings causes the second sounds and the third sounds to be played at a specific bass level differing from an original bass level associated with the first settings. For example, the first user may adjust the bass level from the original bass level of the first settings to the specific bass level of the second settings. This adjustment may be made separately or in addition to any one or more of the volume, treble, balance, or equalizer settings.

In some embodiments, the received input indicative of the second settings causes the second sounds and the third sounds to be played at a specific treble level differing from an original treble level associated with the first settings. For example, the first user may adjust the treble level from the original treble level of the first settings to the specific treble level of the second settings. This adjustment may be made separately or in addition to any one or more of the volume, bass, balance, or equalizer settings.

In some embodiments, the received input indicative of the second settings causes the second sounds and the third sounds to be played at specific settings differing from the original values associated with the first settings. For example, the first user may adjust the balance or the equalizer settings from the original balance or equalizer settings of the first settings to the specific balance or equalizer settings of the second settings. These adjustments may be made separately or in addition to any one or more of the volume, bass, or treble settings.

In some embodiments, the received input indicative of the second settings causes the second sounds and the third sounds to play specific audio content differing from original audio content associated with the first settings. For example, the first settings of the virtual speaker may remain unchanged while the specific audio content is being played. In other words, the first settings of the virtual speaker stay the same even if the content changes; i.e., the virtual speaker settings are not tied to the content being played.

In some embodiments, the received input indicative of the second settings causes the second sounds and the third sounds to play a specific music genre differing from an original music genre associated with the first settings. For example, the first settings of the virtual speaker may remain unchanged while the specific music genre is being played. In other words, the first settings of the virtual speaker stay the same even if the music genre changes; i.e., the virtual speaker settings are not tied to the music genre being played.

In some embodiments, the received input indicative of the second settings causes the second sounds and the third sounds to play content from a specific audio channel differing from an original audio channel associated with the first settings. For example, the first settings of the virtual speaker may remain unchanged while the specific audio channel is being played. In other words, the first settings of the virtual speaker stay the same even if the audio channel changes; i.e., the virtual speaker settings are not tied to the audio channel being played. In some examples, the specific audio channel and the original audio channel may correspond to different radio stations. In some examples, the specific audio channel and the original audio channel may correspond to different playlists. In some examples, the specific audio channel and the original audio channel may correspond to different audio sources.

In some embodiments, the virtual speaker settings may correspond to the content received by the wearable extended reality appliance. In some embodiments, the virtual speaker settings may correspond to the physical space or to an extended reality environment associated with the wearable extended reality appliance. For example, if the physical space or the extended reality environment represents a classical music hall, the virtual speaker settings may be adjusted to represent being in a classical music hall with predetermined settings for bass, treble, balance, and equalizer while the user may be permitted to adjust only the volume. As another example, if the physical space or the extended reality environment represents a rock concert at a large stadium, the virtual speaker settings may be adjusted to represent being in a large stadium with predetermined settings for bass, treble, balance, and equalizer while the user may be permitted to adjust only the volume.

In some embodiments, the received input indicative of the second settings causes the virtual speaker to change virtual location within the area, the changed virtual location differs from a virtual location associated with the virtual speaker during the first time period, and wherein the changed virtual location is thereafter associated with the second time period and the third time period. For example, the settings may permit the first user to change the location of the virtual speaker within the physical space. For example, if the virtual speaker is initially in a position next to a door in the physical space, the first user may change the position of the virtual speaker to be next to a window in the physical space.

In some embodiments, the first user may be able to change the location of the virtual speaker by selecting a location in the physical space from a predetermined list of locations in the physical space. For example, predetermined list of locations may be provided to the first user via a user interface element in the extended reality environment.

In some embodiments, the first user may be able to change the location of the virtual speaker by selecting a location in the physical space from a rendering of the physical space presented in the extended reality environment. For example, the virtual speaker may be rendered as a virtual object in the extended reality environment and the rendering in the extended reality environment may correspond to the area associated with the virtual speaker. The first user may be able to move the virtual speaker in the extended reality environment like any other virtual object. In some embodiments, the first user may only be able to place the virtual speaker in predetermined locations. For example, as the first user moves the virtual speaker in the extended reality environment, the first user may be permitted to place the virtual speaker in a predetermined location. If the first user attempts to place the virtual speaker in a location that is not permitted, the first user may not be able to "release" the virtual speaker to place it in that location.

Figure 42:
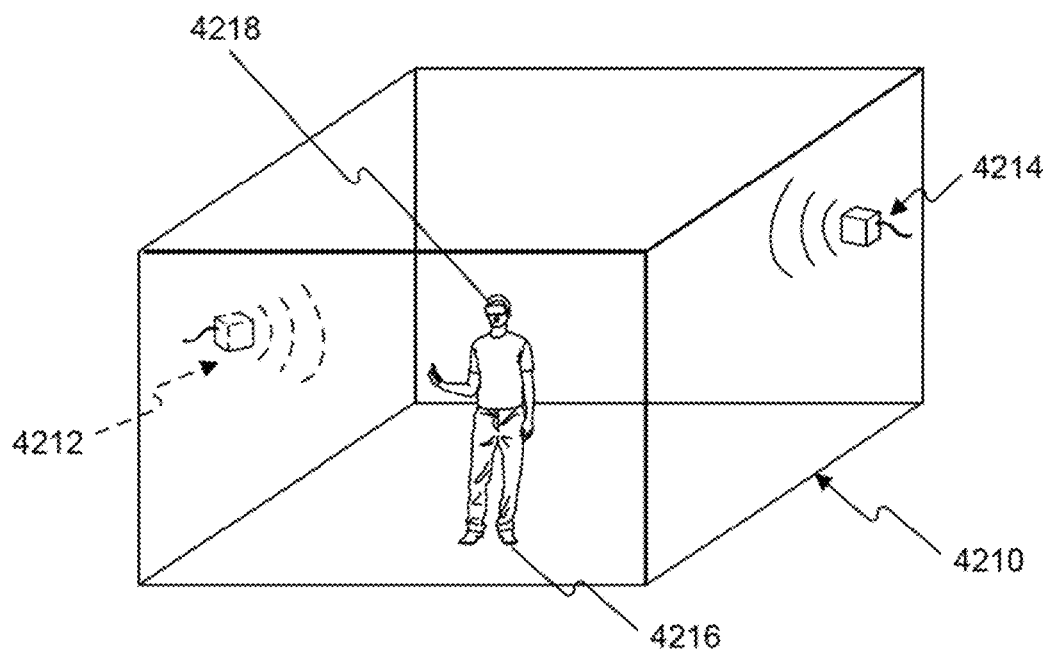
FIG. 42 illustrates the area in the physical space where the first user with the first wearable extended reality appliance is listening to audio at the first settings of the virtual speaker and a location of the virtual speaker in the area in the physical space has changed, consistent with some embodiments of the present disclosure.

FIG. 42 illustrates the area in the physical space where the first user with the first wearable extended reality appliance is listening to audio at the first settings of the virtual speaker and a location of the virtual speaker in the area in the physical space has changed. A physical space 4210 includes a virtual speaker 4212 originally tied to a first location in physical space 4210 (shown in dashed outline). FIG. 42 represents the first time period as described elsewhere in this disclosure, after a first user 4216 has changed the location of the virtual speaker from the first location shown by 4212 to a second location for virtual speaker 4214 (shown in solid outline). As shown in FIG. 42, the virtual speaker is moved from one corner of physical space 4210 to an opposite corner of physical space 4210. The first user 4216 wearing a first wearable extended reality appliance 4218 is located in physical space 4210 and is able to hear second sounds associated with virtual speaker 4214 at first settings of virtual speaker 4214 (represented in FIG. 42 by three curved lines).

In some embodiments, in addition to moving the virtual speaker from the first location (indicated by reference number 4212) to the second location (indicated by reference number 4214), first user 4216 may also adjust other settings of virtual speaker 4214, such as volume, bass, treble, balance, or an equalizer as described elsewhere in this disclosure.

In some embodiments, the virtual speaker is a directional virtual speaker. A directional speaker projects sound in a specific direction (e.g., a narrow sound beam), such that a user in a path of the sound beam can hear the sound, but other people in the physical environment near the user and out of the path of the sound beam cannot hear the sound. Thus, sound signals presented to a user may be tuned to simulate the output of a directional speaker, rendering the virtual speaker directional. In some embodiments, the received input indicative of the second settings causes the virtual speaker to change orientation with respect to a physical space, the changed orientation differs from an original orientation associated with the virtual speaker during the first time period. The settings may permit the first user to change the orientation of the virtual speaker, by either tuning the audio output to simulate a changed location and/or a facing direction of the virtual speaker. For example, the first user may select the facing direction of the virtual speaker, which in turn tunes the audio output to simulate the selected orientation (e.g., rotated left, right, up, down, or any combination thereof). In some embodiments, the changed orientation of the virtual speaker is thereafter associated with the second time period and the third time period. After the first user changes the orientation of the virtual speaker, the changed orientation may carry over into the second time period and the third time period.

Figure 43:
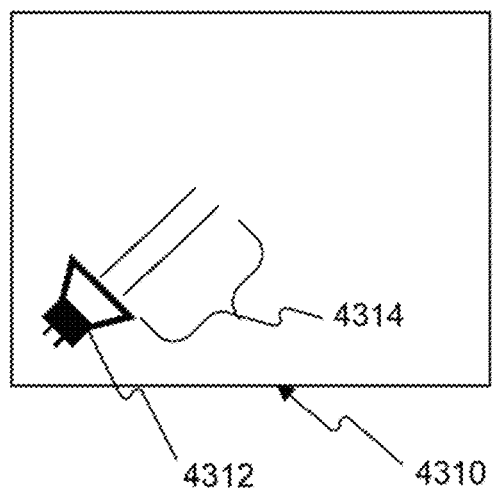
FIG. 43 illustrates an area in a physical space with a directional virtual speaker positioned in a first orientation, consistent with some embodiments of the present disclosure.

FIG. 43 illustrates an area in a physical space with a directional virtual speaker positioned in a first orientation. A physical space 4310 includes a directional virtual speaker 4312 projecting a directional sound beam 4314 in a first orientation. It is noted that the length of the lines used to illustrate directional sound beam 4314 are only indicative of the orientation of directional sound beam 4314 and do not define a "length" of directional sound beam 4314 (i.e., how far a user may be from directional virtual speaker 4312 and still be able to hear sounds from directional virtual speaker 4312). FIG. 43 represents the first time period as described elsewhere in this disclosure, during which a first user listens to the first sounds at the first settings of directional virtual speaker 4312.

Figure 44:
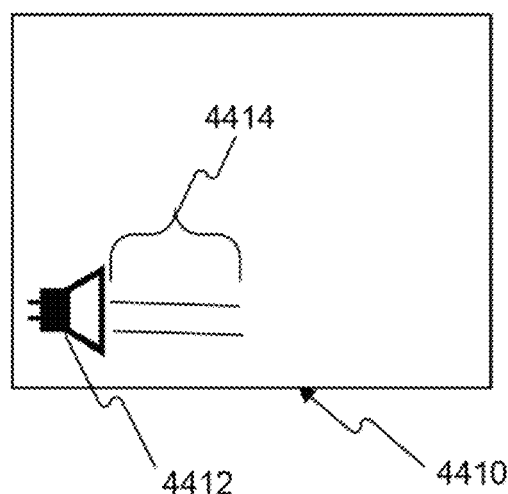
FIG. 44 illustrates the area in the physical space with the directional virtual speaker positioned in a second orientation, consistent with some embodiments of the present disclosure.

FIG. 44 illustrates the area in the physical space with the directional virtual speaker positioned in a second orientation. A physical space 4410 includes a directional virtual speaker 4412 projecting a directional sound beam 4414 in a second orientation. It is noted that the length of the lines used to illustrate directional sound beam 4414 are only indicative of the orientation of directional sound beam 4414 and do not define a "length" of directional sound beam 4414 (i.e., how far a user may be from directional virtual speaker 4412 and still be able to hear sounds from directional virtual speaker 4412). FIG. 44 represents the second time period and the third time period as described elsewhere in this disclosure, after the first user has changed the orientation of the directional virtual speaker and during which a first user or a second user listens to the second sounds or the third sounds at the second settings of directional virtual speaker 4412. In addition to changing the orientation of the directional virtual speaker from the first orientation (shown in FIG. 43) to the second orientation (shown in FIG. 44), the first user may also adjust other settings of directional virtual speaker 4412, such as volume, bass, treble, balance, or an equalizer as described elsewhere in this disclosure.

In some embodiments, the received input indicative of the second settings causes a change in a size of a sound zone associated with the virtual speaker, the changed size of the sound zone differing from an original size of a sound zone associated with the virtual speaker during the first time period. As used herein, the term "sound zone" refers to how far a sound can be heard from the virtual speaker. The larger the sound zone, the farther from the virtual speaker the sound can be heard. Similarly, the size of the sound zone may refer to the contours of the sound zone. Thus, the received input may tune the audio output to specify locations in an area where sounds may or may not be heard. In some embodiments, the sound zone may be based on a distance from the virtual speaker's location in the physical space.

In some embodiments, the sound zone may be of any size (e.g., a width of the sound zone), based on characteristics of the virtual speaker. For example, if the virtual speaker is a directional speaker, the sound zone may be narrow. As another example, if the virtual speaker is an omnidirectional speaker, the sound zone may be a predetermined radius around the virtual speaker measured in any direction, with the virtual speaker being at a center of the sound zone. As another example, the sound zone may have a conical shape with an origin point being the location of the virtual speaker. In yet another example, the sound zone may be based on a physical area, such as a room, an apartment, an office complex, an elevator, or a floor.

Because the speaker is a virtual speaker, the physical limitations of volume from a physical speaker (i.e., the farther the listener is from the speaker, the lower the volume appears to be to the listener) are not relevant, meaning that the volume of the virtual speaker perceived by the first user of the first wearable extended reality appliance may be the same anywhere within the sound zone. For example, the first user may set a range of X meters for the sound zone in which the virtual speaker is active. Once the first user moves outside of the range (e.g., more than X meters), the first user will not be able to hear the sounds. In some embodiments, at least one characteristic of sounds associated with a virtual speaker may be uniform across the sound zone. In some embodiments, at least one characteristic of sounds associated with a virtual speaker may vary across the sound zone. In some embodiments, one or more characteristics of sounds associated with a virtual speaker may be uniform across the sound zone while other one or more characteristics of sounds associated with a virtual speaker may vary across the sound zone. For example, volume may be uniform across the sound zone, while virtual source direction may vary across the sound zone.

In some embodiments, the changed size of the sound zone is thereafter associated with the second time period and the third time period. After the first user changes the size of the sound zone, the changed sound zone size carries over into the second time period and the third time period.

Figure 45:
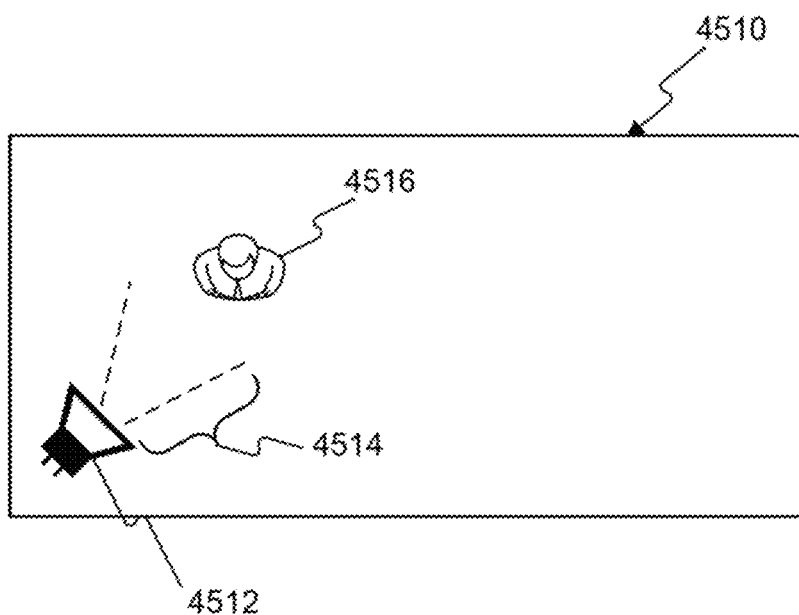
FIG. 45 illustrates an area in a physical space with a virtual speaker having a sound zone of a first size and a user with a wearable extended reality appliance is located in the sound zone, consistent with some embodiments of the present disclosure.

FIG. 45 illustrates an area in a physical space with a virtual speaker having a sound zone of a first size and a user with a wearable extended reality appliance is located in the sound zone. A physical space 4510 includes a virtual speaker 4512 projecting a sound zone 4514 of an original size. Sound zone 4514 is shown having a conical shape with an origin point being the location of virtual speaker 4512. Sound zone 4514 may have other shapes, such as round, circular, spherical, or based on confines of the physical space where the virtual speaker is located. As noted above, the virtual speaker is not subject to the same limitations as a physical speaker, so the sound zone may be defined to have any shape.

It is noted that the length of the dashed lines used to illustrate sound zone 4514 may indicate the original size of the sound zone, i.e., how far a first user 4516 may be from virtual speaker 4512 and still be able to hear sounds from virtual speaker 4512. FIG. 45 represents the first time period as described elsewhere in this disclosure, during which the first user listens to the first sounds at the first settings of virtual speaker 4512 at the original size of the sound zone 4514.

Figure 46:
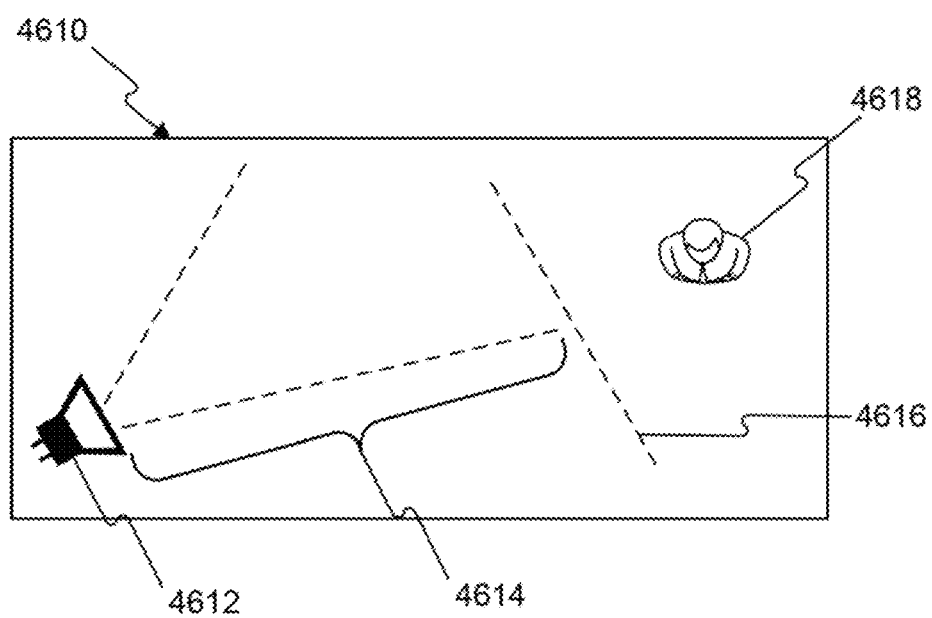
FIG. 46 illustrates an area in a physical space with a virtual speaker having a sound zone of a second size and the user with the wearable extended reality appliance is located outside the sound zone, consistent with some embodiments of the present disclosure.

FIG. 46 illustrates an area in a physical space with a virtual speaker having a sound zone of a second size and the user with the wearable extended reality appliance is located outside the sound zone. A physical space 4610 includes a virtual speaker 4612 projecting a sound zone 4614 of a changed size. Sound zone 4614 is shown having a conical shape with an origin point being the location of virtual speaker 4612. Sound zone 4614 may have other shapes, such as round, circular, spherical, or based on confines of the physical space where the virtual speaker is located. As noted above, the virtual speaker is not subject to the same limitations as a physical speaker, so the sound zone may be defined to have any shape.

It is noted that the length of the dashed lines used to illustrate sound zone 4614 may indicate the changed size of the sound zone, i.e., how far a first user 4618 may be from virtual speaker 4612 and still be able to hear sounds from virtual speaker 4612. As shown in FIG. 46, first user 4618 is outside of changed size sound zone 4614, as indicated by dashed line 4616 and is thus unable to hear sounds from virtual speaker 4612. If first user 4618 moves closer to virtual speaker 4612 so that first user 4618 is inside the changed size sound zone 4614 (i.e., on the side of dashed line 4616 closer to virtual speaker 4612), then first user 4618 would be able to hear the sounds from virtual speaker 4612.

FIG. 46 represents the second time period and the third time period as described elsewhere in this disclosure, after the first user has changed the size of the sound zone of the virtual speaker and during which a first user or a second user listens to the second sounds or the third sounds at the second settings of virtual speaker 4612. In some embodiments, in addition to changing the size of the sound zone of virtual speaker from the original size (shown in FIG. 45) to the changed size (shown in FIG. 46), the first user may also adjust other settings of virtual speaker 4612, such as volume, bass, treble, balance, or an equalizer as described elsewhere in this disclosure.

Some embodiments involve receiving an additional indication during the first time period that an additional wearable extended reality appliance is located in the area associated with the virtual speaker. The additional indication may be received in a similar manner as the first indication and may include similar information as the first indication as described elsewhere in this disclosure. Additionally or alternatively, the additional indication may include a wireless signal from the GPS, Wi-Fi, Bluetooth®, or other wireless communication functionality included in the additional wearable extended reality appliance to determine the location of the additional wearable extended reality appliance in the physical space. In some embodiments, the additional wearable extended reality appliance may be constructed in a similar manner and operate in a similar way as the first wearable extended reality appliance as described elsewhere in this disclosure.

Some embodiments involve transmitting to the additional wearable extended reality appliance fourth data associated with the virtual speaker to thereby enable the additional wearable extended reality appliance to present sounds corresponding to the first settings during the first time period and the second time period. The fourth data may include data in a format that may be transmitted to and received by the additional wearable extended reality appliance, similar to the first data as described elsewhere in this disclosure. The first settings are the same settings of the virtual speaker as used in connection with the first sounds (e.g., the same settings for volume, bass, treble, balance, and equalizer). The user of the additional wearable extended reality appliance may hear fourth sounds corresponding to the fourth data at the first settings of the virtual speaker, for example, at the original volume level of the first settings. Some other embodiments involve transmitting to the additional wearable extended reality appliance fourth data associated with the virtual speaker to thereby enable the additional wearable extended reality appliance to present sounds corresponding to the first settings during the first time period, and transmitting to the additional wearable extended reality appliance fifth data associated with the virtual speaker to thereby enable the additional wearable extended reality appliance to present sounds corresponding to the second settings during the second time period.

In some embodiments, an additional user (with the additional wearable extended reality appliance) may be in the same physical space as the first user. For example, the first user and the additional user may be listening to the same content at the first settings of the virtual speaker (i.e., the fourth data may be the same as the first data). Alternatively, the first user and the additional user may be listening to different content at the first settings of the virtual speaker (i.e., the fourth data may be different from the first data).

Figure 47:
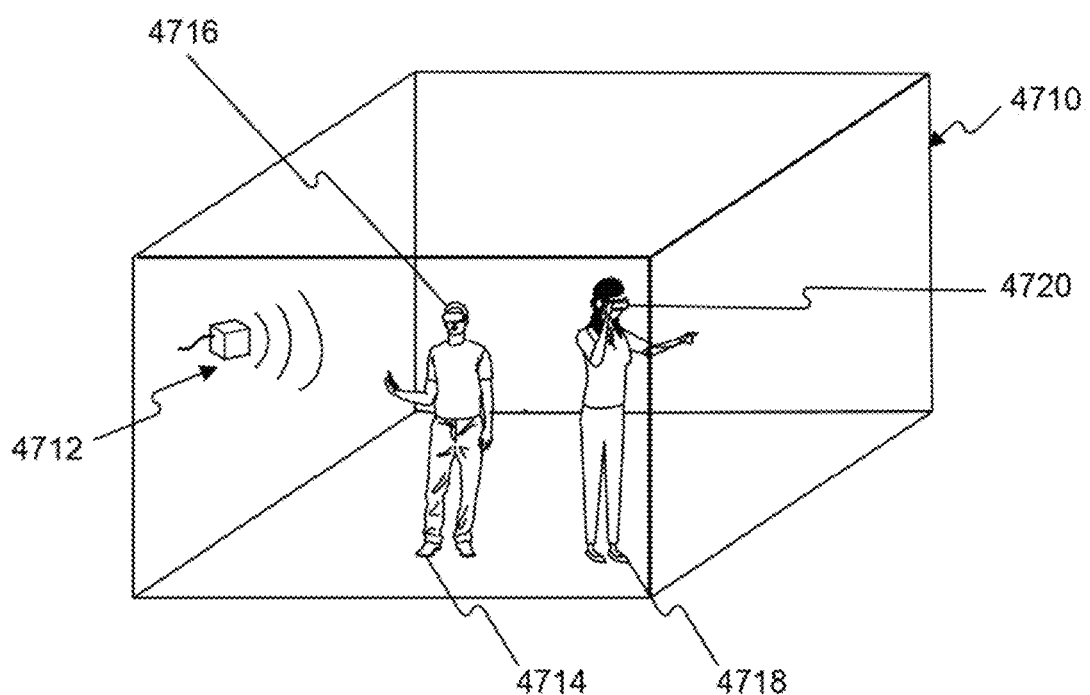
FIG. 47 illustrates an area in a physical space where a first user with a first wearable extended reality appliance and a second user with a second wearable extended reality appliance are listening to audio at first settings of a virtual speaker, consistent with some embodiments of the present disclosure.

FIG. 47 illustrates an area in a physical space where a first user with a first wearable extended reality appliance and a second user with a second wearable extended reality appliance are listening to audio at first settings of a virtual speaker. A physical space 4710 includes a virtual speaker 4712 tied to a location in physical space 4710. A first user 4714 wearing a first wearable extended reality appliance 4716 is located in physical space 4710 and is able to hear first sounds associated with virtual speaker 4712 at first settings of virtual speaker 4712 (represented in FIG. 47 by three curved lines). A second user 4718 wearing an additional wearable extended reality appliance 4720 is located in physical space 4710 and is able to hear fourth sounds associated with virtual speaker 4712 at first settings of virtual speaker 4712 (represented in FIG. 47 by three curved lines). As shown in FIG. 47, both first user 4714 and second user 4718 may hear sounds from virtual speaker 4712 (first sounds and fourth sounds, respectively) at the first settings of virtual speaker 4712.

Some embodiments involve receiving an additional indication during the first time period that an additional wearable extended reality appliance is located in the area associated with the virtual speaker. The additional indication may be received in a similar manner as the first indication and may include similar information as the first indication as described elsewhere in this disclosure. For example, the additional indication may include a signal that may be used by a device (e.g., input device, integrated computational interface device, or computing device) to determine that the additional wearable extended reality appliance is located in the area associated with the virtual speaker. The additional wearable extended reality appliance may be constructed in a similar manner and operate in a similar way as the first wearable extended reality appliance as described elsewhere in this disclosure.

Some embodiments involve transmitting to the additional wearable extended reality appliance fourth data associated with the virtual speaker to thereby enable the additional wearable extended reality appliance to present sounds corresponding to the second settings during the second time period. The fourth data may include data in a format that may be transmitted to and received by the additional wearable extended reality appliance, similar to the first data as described elsewhere in this disclosure. The fourth data may include data such as digital signals representing sounds in a data format that may be transmitted to and received by the additional wearable extended reality appliance.

In some embodiments, an additional user (with the additional wearable extended reality appliance) may be in the same physical space as the first user. For example, the first user and the additional user may be listening to the same content at the second settings of the virtual speaker (i.e., the fourth data may be the same as the first data). Alternatively, the first user and the additional user may be listening to different content at the second settings of the virtual speaker (i.e., the fourth data may be different from the first data).

Some embodiments involve obtaining information associated with the second indication. For example, the information associated with the second indication may include information about the second wearable extended reality appliance, such as a device identifier, or information about the second user of the second wearable extended reality application, such as a user identifier. For example, the device identifier and the user identifier may include an alphanumeric string including an identifier code associated with the second wearable extended reality appliance and/or the second user. In other examples, the information associated with the second indication may include information about the second wearable extended reality appliance, such as a type, a settings, a location, an orientation, an activity indicator, and so forth.

Some embodiments involve accessing a plurality of sound playing rules defining virtual speaker settings, based on the obtained information. The plurality of sound playing rules may be stored on the wearable extended reality appliance or may be stored on a device separate from the wearable extended reality appliance, for example, on an input device or on a cloud-based server in communication with the wearable extended reality appliance. The plurality of sound playing rules may be accessed by the wearable extended reality appliance. In some embodiments, the plurality of sound playing rules may be accessed by a device located in the physical space and in communication with the wearable extended reality appliance.

In some embodiments, one or more of the plurality of sound playing rules may be associated with a device identifier or a user identifier. For example, a parent may create one or more sound playing rules for a child and associate those sound playing rules with a user identifier corresponding to the child such that when the child wears the wearable extended reality appliance, the sound playing rules associated with the child are implemented. For example, the sound playing rule for the child may be that the child is not able to adjust the settings of the virtual speaker or that the child may only raise the volume setting to a predetermined maximum (which may be a lower value than a maximum possible volume setting). As another example, the sound playing rule for the child may be that the child is limited to playing certain types of content (e.g., age-appropriate content as determined by the rule creator). As used herein, the term "implemented" in connection with the sound playing rules means that the sound playing rules are used by the wearable extended reality appliance to control the settings associated with the virtual speaker. In some embodiments, one or more of the plurality of sound playing rules may be associated with an activity associated with the second wearable extended reality appliance. For example, for some activities, the sound playing rules may include a maximum volume. In some embodiments, one or more of the plurality of sound playing rules may be associated with a type of the second wearable extended reality appliance, for example due to hardware limitations of the second wearable extended reality appliance.

Some embodiments involve determining that an existence of the second wearable extended reality appliance in the area associated with the virtual speaker corresponds to a specific sound playing rule. The existence of a second wearable extended reality appliance in the area associated with a virtual speaker may be determined by signals sent by that appliance to either the first appliance or to a central controller. Those signals may be based on a location system such as GPS, Wi-Fi, or Bluetooth related location systems. Additionally or alternatively, the existence may be determined by image data captured by either the second wearable extended reality appliance or another wearable extended reality appliance. Based on the determination of the existence of the second wearable extended reality appliance in a particular area, a correspondence to a specific sound playing rule may be determined. For example, the second indication may indicate that the second wearable extended reality appliance is in the area associated with the virtual speaker. As described elsewhere in this disclosure, the second indication may also include an identifier associated with the second wearable extended reality appliance. In some embodiments, the second indication may include a wireless signal from the GPS, Wi-Fi, Bluetooth®, or other wireless communication functionality included in the second wearable extended reality appliance and may be used to determine the location of the second wearable extended reality appliance in the physical space. In some embodiments, one or more sound playing rules associated with the second wearable extended reality appliance may be determined based on the second indication. For example, if the physical space is a museum and the audio is associated with an exhibit in the physical space, the sound playing rule may be that only the volume setting may be changed by a user and when the second wearable extended reality appliance enters the area associated with the virtual speaker, the volume setting may be adjusted to an initial value (e.g., first settings) which may be the same for all users. Then, once the user is in the physical space, the user may adjust the volume setting.

Some embodiments involve implementing the specific sound playing rule to determine actual settings of the third sounds heard by the second user during the third time period. The specific sound playing rule may include setting information for the virtual speaker, and implementing the specific sound playing rule may change the virtual speaker settings to match the settings indicated by the specific sound playing rule. The specific sound playing rule may be implemented by the second wearable extended reality appliance by controlling the settings (e.g., the second settings) associated with the virtual speaker. An input device associated with the second wearable extended reality appliance may implement the specific sound playing rule.

In some embodiments, the specific sound playing rule is that a specific setting change only affects devices that initiate the specific setting change. In this situation, when a specific sound playing rule is set via a particular device, the rule may only impact the device through which the rule was set. For example, if the specific sound playing rule is associated with a particular wearable extended reality appliance (e.g., by association via an identifier of the wearable extended reality appliance), then the change in the virtual speaker settings may only apply to that particular wearable extended reality appliance.

In some embodiments, the obtained information associated with the second indication includes information about a time of day. The time of day may be a current time in a time zone where the wearable extended reality appliance is located.

Some embodiments involve determining whether the condition of the specific sound playing rule is met based on the information about the time of day. If the specific sound playing rule includes a condition, the condition may be based on a current time of day. For example, a condition might be that before 5 pm, a virtual speaker plays hard rock music, after 5 pm, the music genre switches to light rock, and after 8 pm, mood music kicks-in. By way of another example, if the wearable extended reality appliance includes a physical speaker, the specific sound playing rule may limit the volume of the physical speaker if it is later than 11:00 PM. In some embodiments, the time of day condition is one of two or more conditions of the specific sound playing rule. For example, the sound playing rule may include a time of day condition and a predetermined distance condition (e.g., that the wearable extended reality appliance be located within a predetermined distance of the virtual speaker).

Some embodiments include transmitting to the second wearable extended reality appliance the third data corresponding to the third sounds that correspond to the second settings of the virtual speaker when a condition of the specific content sound playing rule is met. The sound playing rule may include a condition and the sound playing rule may be implemented (i.e., the third sounds are played using the second settings of the virtual speaker) if the condition is met. For example, a condition may include that the user is located within a predetermined distance (measured in any unit of measurement, such as meters, centimeters, feet, or inches) of the location of the virtual speaker in the physical space. If, for example, the physical space is a museum with multiple exhibits and each exhibit has its own virtual speaker associated with it, the sound playing rule may be that the user of the wearable extended reality appliance needs to be within a predetermined distance of the virtual speaker before the audio associated with the exhibit begins playing. In such circumstances, the user would need to be relatively close to the exhibit (within the predetermined distance) before the associated audio started playing, to avoid user confusion by having audio associated with a different exhibit playing.

Some embodiments include transmitting to the second wearable extended reality appliance fourth data corresponding to fourth sounds that correspond to the first settings of the virtual speaker when the condition of the specific sound playing rule is unmet. The sound playing rule may include a condition and the sound playing rule may be not implemented (i.e., the fourth sounds are played using the first settings of the virtual speaker) if the condition is not met. Continuing the example of when the physical space is a museum, if the user walks between different rooms in the museum, the sound playing rule may be that music (i.e., fourth sounds) is played while the user is walking and continues to play until the user is located within a sound zone of a virtual speaker associated with an exhibit in the museum. In this example, the sound playing rule may be associated with the exhibit the user is walking toward and the condition may be that the user be within a predetermined distance of the exhibit (i.e., the condition is met) before the audio associated with the exhibit starts playing, otherwise music is played (i.e., the condition is not met).

In some embodiments, audio data captured using at least one audio sensor included in the second wearable extended reality appliance may be analyzed to detect sounds in the physical environment of the second wearable extended reality appliance (such as ambient noise, a person speaking, music, and so forth). Further, in response to the detection of the sounds in the physical environment of the second wearable extended reality appliance, actual settings of the third sounds heard by the second user during the third time period may be determined, for example, based on characteristics of the sounds in the physical environment of the second wearable extended reality appliance. For example, in response to high ambient noise levels, a volume of the third sounds may be increased. In another example, in response to a detection of a person speaking in the physical environment of the second wearable extended reality appliance, a volume of the third sounds may be decreased. In some examples, the audio data may be analyzed using a voice recognition algorithm to determine whether the person speaking in the physical environment of the second wearable extended reality appliance is the second user. When the person speaking is the second user, the volume of the third sounds may be decreased, while when the person speaking is not the second user, the volume of the third sounds may be increased, may be unmodified, or may be decreased less than when the person speaking is the second user. In some examples, the audio data may be analyzed to determine whether the person speaking in the physical environment of the second wearable extended reality appliance is speaking to the second user. When the person is speaking to the second user, the volume of the third sounds may be decreased, while when the person is not speaking to the second user, the volume of the third sounds may be increased, may be unmodified, or may be decreased less than when the person is speaking to the second user. For example, a machine learning model (such as a classification model) may be trained using training examples to determine from audio whether people are speaking to the second user. An example of such training example may include a sample audio, together with a label indicating whether the sample audio includes speech directed to the second user. The trained machine learning model may be used to analyze the audio data captured using at least one audio sensor included in the second wearable extended reality appliance and determine whether the person speaking in the physical environment of the second wearable extended reality appliance is speaking to the second user.

In some embodiments, additional data associated with other sounds for presentation to the second user during the third time period may be received, the other sounds may not be associated with the virtual speaker. For example, the other sounds may be associated with a different virtual speaker, may be associated with an app, may be associated with a virtual object that is not a virtual speaker, and so forth. Further, the additional data may be analyzed to determine actual settings of the third sounds heard by the second user during the third time period. For example, the determination of the actual settings may be based on a category associated with the other sounds, may be based on a volume associated with the other sounds, may be based on a position of a virtual source associated with the other sounds, and so forth.

Figure 48:
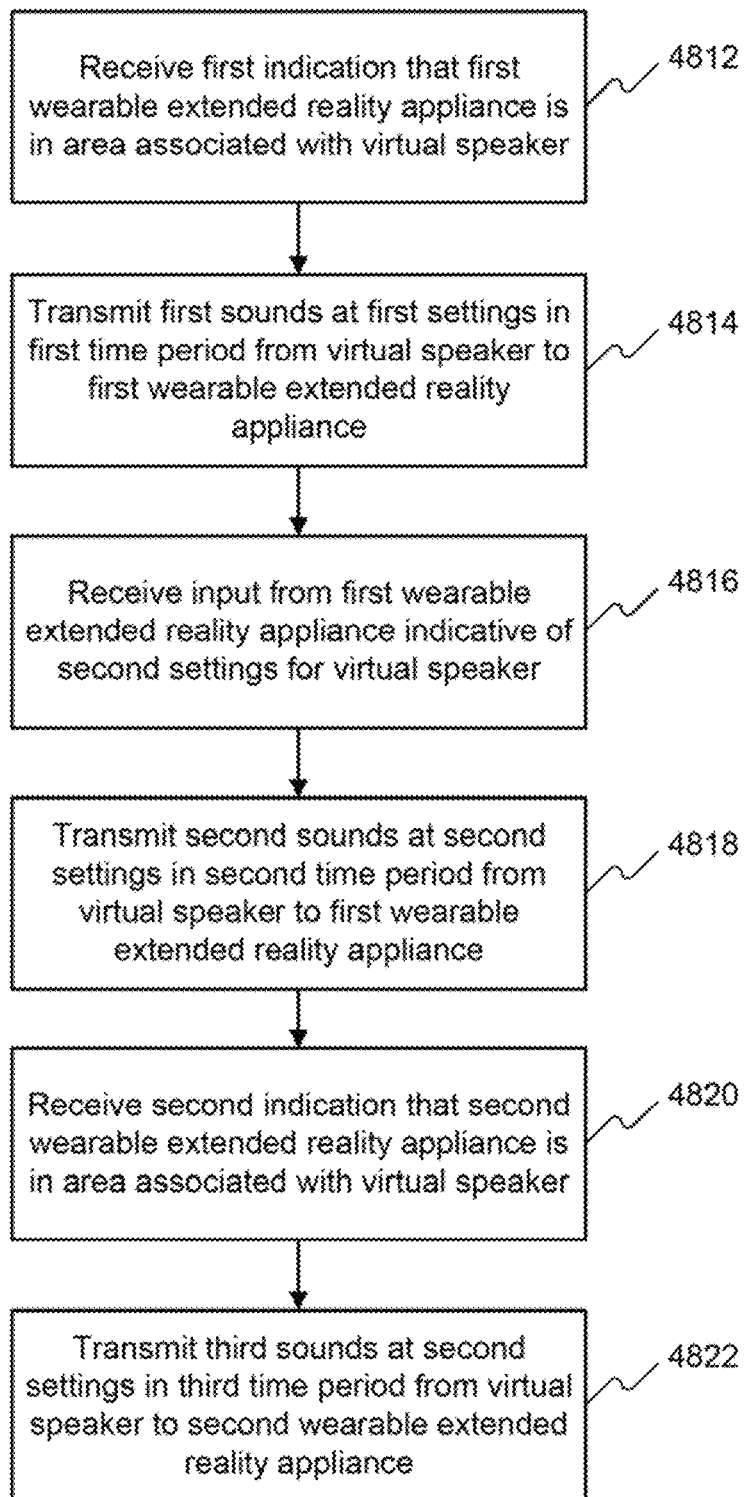
FIG. 48 is a block diagram illustrating an example process for tying a virtual speaker to a physical space, consistent with some embodiments of the present disclosure.

FIG. 48 is a flowchart of an exemplary method 4810 for tying a virtual speaker to a physical space. FIG. 48 is an exemplary representation of just one embodiment, and it is to be understood that some illustrated elements might be omitted and others added within the scope of this disclosure. One or more operations of method 4810 may be performed by a processor associated with a wearable extended reality appliance. For example, a first processor may be located in the wearable extended reality appliance and may perform one or more operations of the method 4810. As another example, a second processor may be located in a computing device selectively connected to the wearable extended reality appliance, and the second processor may perform one or more operations of the method 4810. As another example, the first processor and the second processor may cooperate to perform one or more operations of the method 4810. The cooperation between the first processor and the second processor may include load balancing, work sharing, or other known mechanisms for dividing a workload between multiple processors.

Method 4810 includes a step 4812 of receiving, for example via a wireless network, a first indication that a first wearable extended reality appliance is located in an area associated with a virtual speaker. The terms "first indication," "first wearable extended reality appliance," "virtual speaker," and "area associated with the virtual speaker" have a similar meaning as described elsewhere in this disclosure.

In some embodiments, the physical space may include a device configured to receive wireless signals (e.g., an input device, such as an integrated computational interface device as described elsewhere in this disclosure) from the first wearable extended reality appliance which may be used to determine when the first wearable extended reality appliance enters the physical space. The first indication may include a wireless signal from GPS, Wi-Fi, Bluetooth®, or other wireless communication functionality included in the first wearable extended reality appliance.

Method 4810 includes a step 4814 of transmitting to the first wearable extended reality appliance first data corresponding to first sounds associated with the virtual speaker, to thereby enable a first user of the first wearable extended reality appliance to hear the first sounds during a first time period, wherein the first sounds correspond to first settings of the virtual speaker. In some embodiments, the first wearable extended reality appliance may include headphones and/or speakers as described elsewhere in this disclosure. The terms "first data," "first sounds," and "first time period" have a similar meaning as described elsewhere in this disclosure.

Method 4810 includes a step 4816 of receiving input associated with the first wearable extended reality appliance during the first time period, wherein the received input is indicative of second settings for the virtual speaker. The terms "input" and "second settings" have a similar meaning as described elsewhere in this disclosure. In some embodiments, the input may be received in a manner similar as described elsewhere in this disclosure.

Method 4810 includes a step 4818 of transmitting to the first wearable extended reality appliance second data corresponding to second sounds associated with the virtual speaker, to thereby enable the first user of the first wearable extended reality appliance to hear the second sounds during a second time period, wherein the second sounds correspond to the second settings of the virtual speaker. The terms "second data," "second sounds," and "second time period" have a similar meaning as described elsewhere in this disclosure.

Method 4810 includes a step 4820 of after determining that the first user and the first wearable extended reality appliance left the area associated with the virtual speaker, receiving via the wireless network, a second indication that a second wearable extended reality appliance is located in the area associated with the virtual speaker. The terms "left the area associated with the virtual speaker," "second indication," and "second wearable reality appliance" have a similar meaning as described elsewhere in this disclosure.

Method 4810 includes a step 4822 of transmitting to the second wearable extended reality appliance third data corresponding to third sounds associated with the virtual speaker, to thereby enable a second user of the second wearable extended reality appliance to hear the third sounds during a third time period, wherein the third sounds correspond to the second settings of the virtual speaker. The terms "third data," "third sounds," and "third time period" have a similar meaning as described elsewhere in this disclosure.

Some embodiments provide a system for tying at least one virtual speaker to a physical space. The system includes at least one processor programmed to receive, via a wireless network, a first indication that a first wearable extended reality appliance is located in an area associated with a virtual speaker; transmit to the first wearable extended reality appliance first data corresponding to first sounds associated with the virtual speaker, to thereby enable a first user of the first wearable extended reality appliance to hear the first sounds during a first time period, wherein the first sounds correspond to first settings of the virtual speaker; receive input associated with the first wearable extended reality appliance during the first time period, wherein the received input is indicative of second settings for the virtual speaker; transmit to the first wearable extended reality appliance second data corresponding to second sounds associated with the virtual speaker, to thereby enable the first user of the first wearable extended reality appliance to hear the second sounds during a second time period, wherein the second sounds correspond to the second settings of the virtual speaker; after determining that the first user and the first wearable extended reality appliance left the area associated with the virtual speaker, receive via the wireless network, a second indication that a second wearable extended reality appliance is located in the area associated with the virtual speaker; and transmit to the second wearable extended reality appliance third data corresponding to third sounds associated with the virtual speaker, to thereby enable a second user of the second wearable extended reality appliance to hear the third sounds during a third time period, wherein the third sounds correspond to the second settings of the virtual speaker.

For example, the system may include system 200 shown in FIG. 2. The at least one processor may include processing device 360 shown in FIG. 3 and/or processing device 460 shown in FIG. 4. The steps may be performed entirely by processing device 360, entirely by processing device 460, or jointly by processing device 360 and processing device. The cooperation between processing device 360 and processing device 460 may include load balancing, work sharing, or other known mechanisms for dividing a workload between multiple processing devices.

When using a wearable extended reality appliance to view and/or interact with virtual objects, some virtual objects may be in a field of view while some other virtual objects may be outside the field of view, as explained in more detail below. As the field of view changes (for example, due to head movements of the user or due to changes to display parameters) or the positions of the virtual objects change, virtual objects may enter and/or exit the field of view. Virtual objects may change due to many different triggers, as described in more detail below. When a virtual object changes while the virtual object is outside the field of view, it may take a while before the user looks to the direction of the virtual object and notices the change. Therefore, it is desired to provide a notification indicative of the change noticeable by the user even when the virtual object is outside the field of view. However, when the virtual object is in the field of view, the change is immediately and directly noticeable, and providing a supplementary notification indicative of the change may cause clutter or undesired abundance of notifications. Disclosed embodiments, including methods, systems, apparatuses, and non-transitory computer-readable media, may relate to initiating location-driven sensory prompts reflecting changes to virtual objects. Some embodiments involve a non-transitory computer readable medium containing instructions for performing operations configured to initiate location-driven sensory prompts reflecting changes to virtual objects. The term "non-transitory computer readable medium" may be understood as described earlier. The term "instructions" may refer to program code instructions that may be executed by a computer processor. The instructions may be written in any type of computer programming language, such as an interpretive language (e.g., scripting languages such as HTML and JavaScript), a procedural or functional language (e.g., C or Pascal that may be compiled for converting to executable code), object-oriented programming language (e.g., Java or Python), logical programming language (e.g., Prolog or Answer Set Programming), or any other programming language. In some embodiments, the instructions may implement methods associated with machine learning, deep learning, artificial intelligence, digital image processing, and any other computer processing technique. The term "processor" may be understood as described earlier. For example, the at least one processor may be one or more of server 210 of FIG. 2, mobile communications device 206, processing device 360 of FIG. 3, processing device 460 of FIG. 4, processing device 560 of FIG. 5, and the instructions may be stored at any of memory devices 212, 311, 411, or 511, or a memory of mobile communications device 206.

A virtual object may refer to a visual representation rendered by a computing device (e.g., a wearable extended reality appliance) and configured to represent an object. A virtual object may include, for example, an inanimate virtual object, an animate virtual object, virtual furniture, a virtual decorative object, a virtual widget, a virtual screen, or any other type of virtual representation of any object or feature. In some examples, a virtual object may be associated with a communications application, a news application, a gaming application, a timing application, a word-processing application, a data-processing application, a presentation application, a reading application, a browsing application, a messaging application, or any other type of application. A change to a virtual object may include any type of modification, alteration, variation, adjustment, rearrangement, reordering, adaptation, reconstruction, transformation, or revision to the virtual object. The change to the virtual object may include a change to any aspect of the virtual object, including the appearance of the virtual object, the associated content of the virtual object, the associated functions of the virtual object, the status of the virtual object, the state of the virtual object, the associated data of the virtual object, or any other feature of the virtual object. In some embodiments, the change to the virtual object may include, for example, an incoming message, a received notification, a news update, an occurrence of an event, a request for user action, a received advertisement, a trigger for displaying a user interface, or any other update associated with the virtual object. In some examples, the change to the virtual object may include any action, function, and/or data directed towards the virtual object.

A sensory prompt may refer to any indication that may be configured to be sensed by an individual. A sensory prompt may relate to any sense of an individual, such as sight, smell, touch, taste, hearing, or any other ability of an individual to gather information. In some examples, a sensory prompt may be used to provide a notification to a user. For example, a sensory prompt may include a visual notification, an audible notification, or a tactile notification. A computing device may cause a sensory prompt to be generated (e.g., via one or more output devices, such as a screen, a speaker, or a vibrator), based on one or more triggering events, such as a change to a virtual object rendered by the computing device.

Initiating location-driven sensory prompts reflecting changes to virtual objects may include causing a sensory prompt reflecting a change to a virtual object based on a location associated with the virtual object. For example, a change to a virtual object may trigger different sensory prompts if the virtual object is located in different locations. The different locations of the virtual object that may cause different sensory prompts may be, for example, differentiated based on a field of view of a wearable extended reality appliance that may cause display of the virtual object. Disclosed embodiments may include, for example, detecting when a change happens to a virtual object outside a current field of view of the wearable extended reality appliance. Based on identifying the change, the wearable extended reality appliance may provide a sensory prompt to notify and/or inform the user of the change to the virtual object. The sensory prompt may be different from a sensory prompt that may be triggered by a change to the virtual object if the virtual object is within the field of view of the wearable extended reality appliance.

Some embodiments involve enabling interaction with a virtual object located in an extended reality environment associated with a wearable extended reality appliance. The term "extended reality environment" may be understood as described earlier. The virtual object (also described earlier) may be located in any desired location in the extended reality environment. For example, the virtual object may be displayed (e.g., via the wearable extended reality appliance) as being placed on a physical wall, as being placed on a virtual wall rendered by the wearable extended reality appliance, as being placed on a virtual whiteboard rendered by the wearable extended reality appliance, as being placed (e.g., floating) in a space without being connected to other objects (either physical or virtual) in the space, or in any other desired location.

Interaction with the virtual object may refer to any action from a user to the virtual object or from the virtual object to a user. Interaction with the virtual object may include, for example, any action of a user that may interface the virtual object, such as an instruction input by a user to the virtual object, a command provided by a user to the virtual object, a gesture of a user directed to the virtual object, or any other input that may be provided by a user to the virtual object. The action of a user that may interface with the virtual object may be via an input device of a wearable extended reality appliance that may cause display of the virtual object. Additionally or alternatively, interaction with the virtual object may include any action of the virtual object that may interface with a user, such as an output image of the virtual object for a user, an output sound of the virtual object for a user, output text of the virtual object for a user, or any other output that may be provided by the virtual object to a user. The action of the virtual object that may interface a user may be via an output device of a wearable extended reality appliance that may cause display of the virtual object.

At least one processor associated with a wearable extended reality appliance may, for example, cause display of a virtual object located in an extended reality environment associated with the wearable extended reality appliance and enable interaction with the virtual object located in the extended reality environment associated with the wearable extended reality appliance. For example, the at least one processor may activate input devices of the wearable extended reality appliance and/or output devices of the wearable extended reality appliance, for a user to interact with the virtual object. Additionally or alternatively, the at least one processor may configure parameters, settings, functions, and/or instructions of a system of the wearable extended reality appliance, to allow a user to interact with the virtual object.

Figure 49:
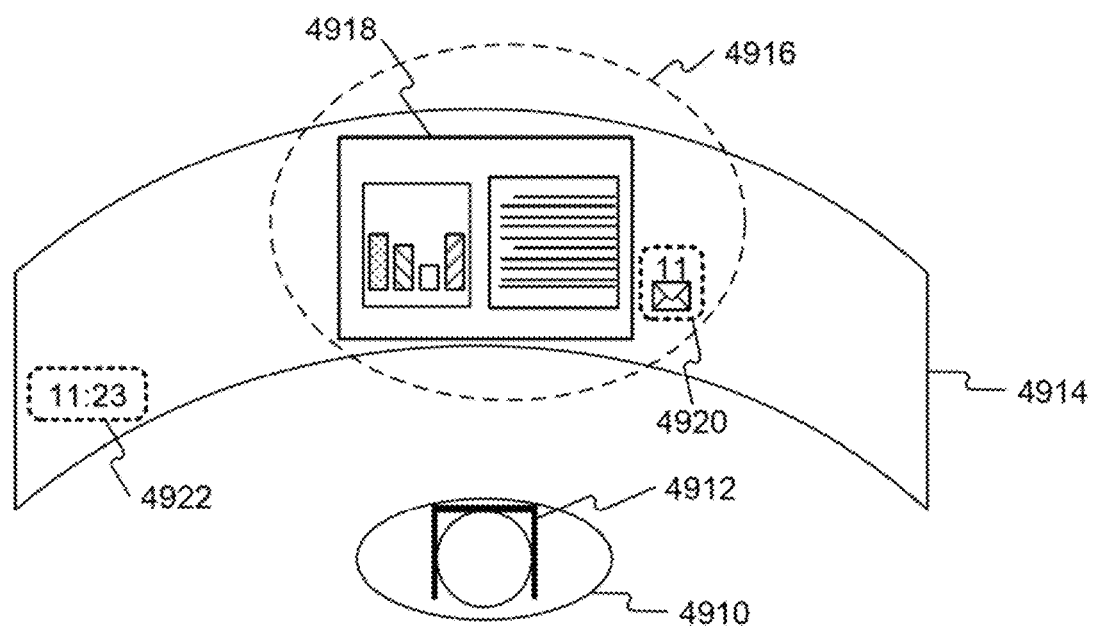
FIGS. 49, 50, 51, and 52 are schematic diagrams illustrating various use snapshots of an example system for initiating sensory prompts for changes based on a field of view consistent with some embodiments of the present disclosure.

FIGS. 49, 50, 51, and 52 are schematic diagrams illustrating various use snapshots of an example system for initiating sensory prompts for changes based on a field of view consistent with some embodiments of the present disclosure. With reference to FIG. 49, a user 4910 may wear a wearable extended reality appliance 4912. The wearable extended reality appliance 4912 may provide an extended reality environment 4914 to the user 4910. The wearable extended reality appliance 4912 may cause display of one or more virtual objects 4918, 4920, 4922 in the extended reality environment 4914. An example of the virtual object 4918 may be a virtual screen. An example of the virtual object 4920 may be an icon or widget for an email application. An example of the virtual object 4922 may be an icon or widget for a clock application. At least one processor associated with the wearable extended reality appliance 4912 may enable the user 4910 to interact with the virtual objects 4918, 4920, 4922 located in the extended reality environment 4914.

Some embodiments involve receiving data reflecting a change associated with the virtual object. A change associated with a virtual object may include any type of modification, alteration, variation, adjustment, rearrangement, reordering, adaptation, reconstruction, transformation, or revision associated with the virtual object. The change associated with the virtual object may include a change to any aspect of the virtual object, including the appearance of the virtual object, the associated content of the virtual object, the associated functions of the virtual object, the status of the virtual object, the state of the virtual object, the associated data of the virtual object, or any other feature of the virtual object. In some embodiments, the change associated with the virtual object may include, for example, an incoming message, a received notification, a news update, an occurrence of an event, a request for user action, a received advertisement, a trigger for displaying a user interface, or any other update associated with the virtual object. In some examples, the change associated with the virtual object may include any action, function, and/or data directed towards the virtual object.

At least one processor associated with the wearable extended reality appliance may, for example, receive data reflecting the change associated with the virtual object. In some examples, the data may be received from another computing device. In some examples, the data may be received from an application, a function, and/or any other entity running on the wearable extended reality appliance. In some examples, the data may be received from an application, a function, and/or any other entity associated with the virtual object. In some examples, the data may be generated by and/or received from the virtual object. Additionally or alternatively, the data may be received from any other desired entity.

In some embodiments, the virtual object is associated with a communications application and the change associated with the virtual object involves at least one of an incoming message or a received notification. A communications application may include, for example, an email application, a social network application, an instant messaging application, a phone application, or any other application that may be configured to communicate with another entity. The virtual object may include an icon, a widget, a symbol, a window, or any other user interface for the communications application. At least one processor associated with the wearable extended reality appliance may implement the communications application, and may receive (e.g., from another computing device or any other desired entity) data indicating an incoming message for the communications application and/or a notification for the communications application. The incoming message and/or the notification may include, for example, an email, a post, a text message, a phone call or voice message, or any other information that may be received by the communications application.

In some embodiments, the virtual object is associated with a news application and the change associated with the virtual object involves a news update. A news application may refer to any application that may be configured to provide information of current events via one or more of various media (e.g., broadcasting or electronic communication). The virtual object may include an icon, a widget, a symbol, a window, or any other user interface for the news application. At least one processor associated with the wearable extended reality appliance may implement the news application, and may receive (e.g., from another computing device or any other desired entity) data indicating a news update for the news application. The news update may include, for example, a real-time news feed, a periodic news update, a triggered news transmission, or any other information associated with news.

In some embodiments, the virtual object is associated with a gaming application and the change associated with the virtual object involves an occurrence of an event in the gaming application. A gaming application may refer to any application that may be configured to provide a video game, a computer game, an electronic game, and/or any other user interaction. A virtual object may include an icon, a widget, a symbol, a window, or any other user interface for the gaming application. At least one processor associated with the wearable extended reality appliance may implement the gaming application, and may receive (e.g., from another computing device, the gaming application, or any other desired entity) data indicating an occurrence of an event in the gaming application. An event in the gaming application may include, for example, a message in a game (e.g., from another player), a mission in a game, a notification in a game, a status change in a game, or any other information associated with a game.

In some embodiments, the change associated with the virtual object is unscheduled and the data reflecting the change associated with the virtual object is received from a remote server. A remote server may include any computing device that may be configured to transmit information. The remote server and the wearable extended reality appliance may be located in different rooms, in different buildings, in different cities, in different states, in different countries, or in two locations having any desired distance therebetween. The change associated with the virtual object may be not appointed, assigned, or designated for a configured time. For example, the remote server may transmit, to the wearable extended reality appliance, the data reflecting the change associated with the virtual object based on the occurrence of an event that may be not subject to a configured schedule (e.g., an individual sending an email, an individual sending a text message, or a real-time news update). In some examples, the change associated with the virtual object may be unscheduled. For example, the data reflecting the change associated with the virtual object may be received from another local software application, from a local sensor, from a remote software application, from a remote sensor, from a remote processing device, and so forth. Additionally or alternatively, the change associated with the virtual object may be scheduled (e.g., expiration of a timer for a clock application associated with the virtual object, an upcoming scheduled event for a calendar application associated with the virtual object, or a scheduled transmission of an email for an email application associated with the virtual object). The data reflecting the change associated with the virtual object may be received from an application associated with (e.g., underlying, supporting, or corresponding to) the virtual object or from any other desired entity.

With reference to FIG. 49, at least one processor associated with the wearable extended reality appliance 4912 may, for example, receive data reflecting a change associated with the virtual object 4920. The data reflecting the change associated with the virtual object 4920 may indicate, for example, that a new email is received by the email application for which the virtual object 4920 may be the icon or widget.

Some embodiments involve determining whether the virtual object is within a field of view of the wearable extended reality appliance or is outside the field of view of the wearable extended reality appliance. A field of view may refer to a spatial extent that may be observed or detected at any given moment. For example, a field of view of an entity as an observer or detector may include a solid angle via which the entity may be sensitive to radiation (e.g., visible light, infrared light, or other optical signals). In some examples, a field of view may include an angle of view. A field of view may be measured horizontally, vertically, diagonally, or in any other desired manner.

A field of view of the wearable extended reality appliance may refer to, for example, a portion, of the extended reality environment, associated with a display system of the wearable extended reality appliance at a given moment. The display system of the wearable extended reality appliance may include, for example, an optical head-mounted display, a monocular head-mounted display, a binocular head-mounted display, a see-through head-mounted display, a helmet-mounted display, or any other type of device configured to show images to a user. The portion of the extended reality environment may include a region or space where virtual content may be displayed by the display system of the wearable extended reality appliance at a given moment. Additionally or alternatively, the field of view of the wearable extended reality appliance may refer to a regional or spatial extent to which virtual content may be displayed by the display system of the wearable extended reality appliance at a given moment. In some examples, from the perspective of a user wearing the wearable extended reality appliance, the field of view of the wearable extended reality appliance may be a solid angle via which the user may view, perceive, observe, detect, and/or be sensitive to virtual content as displayed (e.g., projected or radiated) by the display system of the wearable extended reality appliance (e.g., at a given moment).

At least one processor associated with the wearable extended reality appliance may determine whether the virtual object located in the extended reality environment is within the field of view of the wearable extended reality appliance or is outside the field of view of the wearable extended reality appliance, for example, using a ray casting algorithm, using a rasterization algorithm, using a ray tracking algorithm, and so forth. For example, a user wearing the wearable extended reality appliance may be not able to view the virtual object if the virtual object is outside the field of view of the wearable extended reality appliance, as the virtual object may be not displayed by the display system of the wearable extended reality appliance at the given moment. A user wearing the wearable extended reality appliance may be able to view the virtual object if the virtual object is within the field of view of the wearable extended reality appliance, as the virtual object may be displayed by the display system of the wearable extended reality appliance at the given moment.

The determination of whether the virtual object is within or outside the field of view of the wearable extended reality appliance may be made, for example, at or around the time of the change associated with the virtual object, at or around the time of initiating a sensory prompt for the change (e.g., the first or second sensory prompt as described herein), at or around a time between the change and the initiating of the sensory prompt, at or around a selected time before the change, and/or at or around any other desired time for making the determination. In some examples, the determination of whether the virtual object is within or outside the field of view of the wearable extended reality appliance may be made in response to the receiving of the data reflecting the change associated with the virtual object. In some examples, the determination of whether the virtual object is within or outside the field of view of the wearable extended reality appliance may be made in preparation for the initiating of a sensory prompt for the change associated with the virtual object.

The at least one processor associated with the wearable extended reality appliance may determine that the virtual object is within the field of view of the wearable extended reality appliance, for example, if a certain percentage larger than zero percent (e.g., 0.1 percent, 1 percent, 20 percent, 50 percent, or 100 percent) of the virtual object is within the field of view of the wearable extended reality appliance. The at least one processor may determine that the virtual object is outside the field of view of the wearable extended reality appliance, for example, if the virtual object does not have the certain percentage within the field of view of the wearable extended reality appliance. In some examples, the at least one processor associated with the wearable extended reality appliance may determine whether the virtual object is within or outside the field of view of the wearable extended reality appliance based on determining whether a particular point on the virtual object is within or outside the field of view of the wearable extended reality appliance. Additionally or alternatively, the at least one processor associated with the wearable extended reality appliance may determine whether the virtual object is within or outside the field of view of the wearable extended reality appliance in any other desired manner.

With reference to FIG. 49, a field of view 4916 of the wearable extended reality appliance 4912 may be associated with a display system of the wearable extended reality appliance 4912. The field of view 4916 may move and/or rotate as the display system moves and/or rotates. At a given moment, the display system may cause display, to the user 4910, of virtual content within the field of view 4916 and may not cause display, to the user 4910, of virtual content outside the field of view 4916. The field of view 4916 may be a region or space in the extended reality environment 4914 and/or may be a solid angle from a point of observation by the user 4910 (e.g., the eye(s) of the user 4910 and/or a point in the area of or nearby the eye(s) of the user 4910).

At least one processor associated with the wearable extended reality appliance 4912 may determine whether the virtual object 4920 is within the field of view 4916 or is outside the field of view 4916, for example, based on (e.g., in response to) the receiving of the data reflecting the change associated with the virtual object 4920. In some examples, with reference to FIG. 49, the at least one processor associated with the wearable extended reality appliance 4912 may determine that the virtual object 4920 is within the field of view 4916. In some examples, with reference to FIG. 51 (which may illustrate one or more elements as described in connection with FIG. 49), the at least one processor associated with the wearable extended reality appliance 4912 may determine that the virtual object 4920 is outside the field of view 4916.

Some embodiments involve causing the wearable extended reality appliance to initiate a first sensory prompt indicative of the change associated with the virtual object when the virtual object is determined to be within the field of view. A sensory prompt may refer to any indication that may be configured to be sensed by an individual. A sensory prompt may relate to any sense of an individual, such as sight, smell, touch, taste, hearing, or any other ability of an individual to gather information. In some examples, a sensory prompt may be used to provide a notification to a user. For example, a sensory prompt may include a visual notification, an audible notification, or a tactile notification. A computing device may cause a sensory prompt to be generated (e.g., via one or more output devices, such as a screen, a speaker, or a vibrator), based on one or more triggering events, such as a change associated with a virtual object rendered by the computing device.

At least one processor associated with the wearable extended reality appliance may cause the wearable extended reality appliance to initiate a first sensory prompt indicative of the change associated with the virtual object located in the extended reality environment when the virtual object is determined to be within the field of view of the wearable extended reality appliance. Initiation of the first sensory prompt may be based on receipt of data reflecting the change associated with the virtual object and/or may be based on a determination that the virtual object is within the field of view of the wearable extended reality appliance. The first sensory prompt may include, for example, a notification (e.g., visual, audible, or tactile) that may indicate the change associated with the virtual object. The first sensory prompt may include, for example, a popup notification on a physical or virtual screen, a change of the appearance of the virtual object (e.g., adding or changing a mark, a red dot, a number, or any other indication on the virtual object), a popup virtual object as a notification, or any other desired indication. The first sensory prompt may include, for example, a preview of at least a portion of the content of the change associated with the virtual object, a summary of the content of the change associated with the virtual object, an indication of the existence of the change associated with the virtual object, and/or an indication with any desired level of detail of the change associated with the virtual object.

Figure 50:
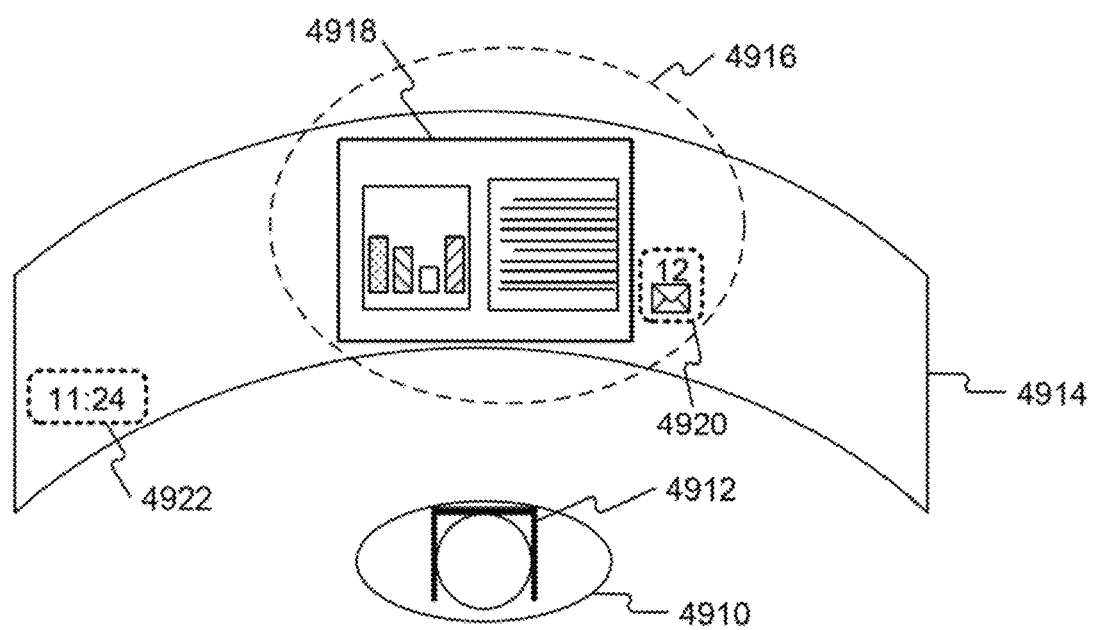

With reference to FIG. 50 (which may illustrate a use snapshot based on the examples as described in connection with FIG. 49), at least one processor associated with the wearable extended reality appliance 4912 may cause the wearable extended reality appliance 4912 to initiate a first sensory prompt indicative of the change associated with the virtual object 4920 when the virtual object 4920 is determined to be within the field of view 4916. The initiating of the first sensory prompt may be based on (e.g., in response to) the receiving of the data reflecting the change associated with the virtual object 4920 and/or the determination that the virtual object 4920 is within the field of view 4916. The first sensory prompt may include a change of the appearance of the virtual object 4920 as displayed by the wearable extended reality appliance 4912. For example, appearing on the virtual object 4920, a number indicating a quantity of emails received by the email application for which the virtual object 4920 may be the icon or widget may change from "11" (as shown in FIG. 49) to "12" (as shown in FIG. 50). The first sensory prompt (e.g., the change of the number from "11" to "12") may indicate that a new email is received by the email application for which the virtual object 4920 may be the icon or widget.

Some embodiments involve causing the wearable extended reality appliance to initiate a second sensory prompt indicative of the change associated with the virtual object when the virtual object is determined to be outside the field of view. In some embodiments, the second sensory prompt differs from the first sensory prompt. At least one processor associated with the wearable extended reality appliance may cause the wearable extended reality appliance to initiate a second sensory prompt indicative of the change associated with the virtual object located in the extended reality environment when the virtual object is determined to be outside the field of view of the wearable extended reality appliance. The initiation of the second sensory prompt may be based on the receipt of data reflecting a change associated with the virtual object and/or may be based on the determination that the virtual object is outside the field of view of the wearable extended reality appliance. The second sensory prompt may include, for example, a notification (e.g., visual, audible, or tactile) that may indicate the change associated with the virtual object. Additionally or alternatively, the second sensory prompt may include, for example, a popup notification on a physical or virtual screen, a change of the appearance of the virtual object (e.g., adding or changing a mark, a red dot, a number, or any other indication on the virtual object), a popup virtual object as a notification, or any other desired indication. The second sensory prompt may further include, for example, a preview of at least a portion of the content of the change associated with the virtual object, a summary of the content of the change associated with the virtual object, an indication of the existence of the change associated with the virtual object, and/or an indication with any desired level of detail of the change associated with the virtual object.

The second sensory prompt may be different from the first sensory prompt (e.g., for the same change associated with the virtual object or for the same received data reflecting the change associated with the virtual object). For example, for the change associated with the virtual object or the received data reflecting the change, the at least one processor associated with the wearable extended reality appliance may initiate the first sensory prompt or the second sensory prompt based on whether the virtual object is within or outside the field of view of the wearable extended reality appliance. The first sensory prompt and the second sensory prompt may be different in terms of a type or category of a sensory prompt, a quantity of sensory prompting items, a degree of sensory prompting effect (e.g., disturbance), content of a sensory prompt, or any other aspect of a sensory prompt. For example, the first sensory prompt may be a visual notification, and the second sensory prompt may be an audible notification. As another example, the first sensory prompt may include one item of visual notification (e.g., a change of the appearance of the virtual object), and the second sensory prompt may include two or more items of visual notification (e.g., a popup notification window and a change of the appearance and/or location of the virtual object). As another example, the first sensory prompt may be an audible notification with a lower degree of loudness, and the second sensory prompt may be an audible notification with a higher degree of loudness. As another example, the first sensory prompt may be a visual notification with first content (e.g., a change of the appearance of the virtual object), and the second sensory prompt may be a visual notification with second content (e.g., a popup notification window with a preview of the content of the change associated with the virtual object). Additionally or alternatively, the first sensory prompt and the second sensory prompt may be different in any other desired manner.

Figure 51:
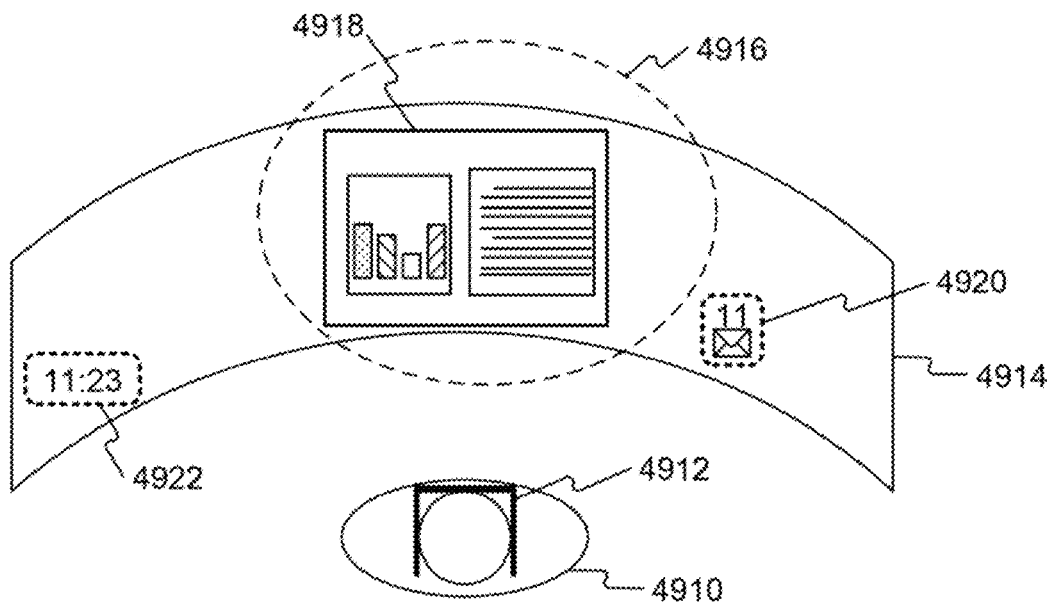
Figure 52:
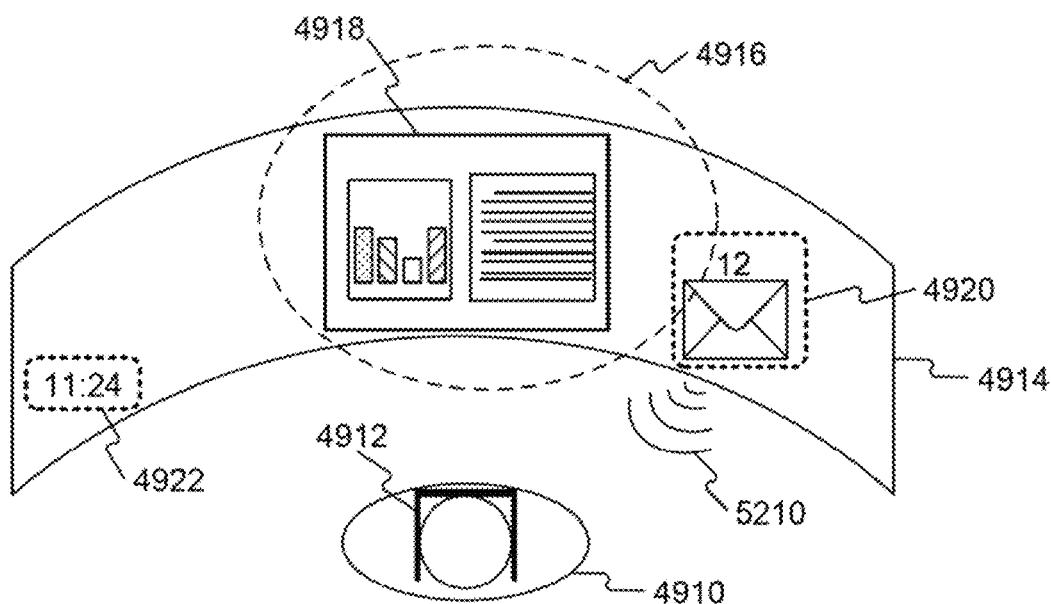

With reference to FIG. 52 (which may illustrate a use snapshot based on the examples as described in connection with FIG. 51), at least one processor associated with the wearable extended reality appliance 4912 may cause the wearable extended reality appliance 4912 to initiate a second sensory prompt indicative of the change associated with the virtual object 4920 when the virtual object 4920 is determined to be outside the field of view 4916 (as shown in FIG. 51). The initiating of the second sensory prompt may be based on (e.g., in response to) the receiving of the data reflecting the change associated with the virtual object 4920 and/or the determination that the virtual object 4920 is outside the field of view 4916 (as shown in FIG. 51).

With reference to FIG. 52, the second sensory prompt may include a change of the size of the virtual object 4920. For example, the size of the virtual object 4920 may be expanded (e.g., by 150 percent, by 200 percent, by 300 percent, or to any other desired degree). In some examples, expanding the size of the virtual object 4920 may make at least a portion of the virtual object 4920 enter the field of view 4916, and thus cause at least the portion to be displayed by the wearable extended reality appliance 4912 to the user 4910. Additionally or alternatively, the second sensory prompt may include a change of the appearance of the virtual object 4920. For example, on the virtual object 4920, a number indicating a quantity of emails received by the email application for which the virtual object 4920 may be the icon or widget may change from "11" (as shown in FIG. 51) to "12" (as shown in FIG. 52). Additionally or alternatively, the second sensory prompt may include an audible notification. For example, at least one processor associated with the wearable extended reality appliance 4912 may cause an audible notification 5210 to be generated (e.g., using one or more speakers associated with the wearable extended reality appliance 4912). The audible notification 5210 may sound as originating from the current location of the virtual object 4920. The audible notification 5210 may include, for example, a beep, a tone, an audio segment, an audio message, an audio associated with the change associated with the virtual object 4920, or any other desired audio.

The second sensory prompt (e.g., including the expanding of the size of the virtual object 4920, the change of the number from "11" to "12," and the audible notification 5210) may indicate that a new email is received by the email application for which the virtual object 4920 may be the icon or widget. The second sensory prompt (e.g., including the expanding of the size of the virtual object 4920, the change of the number from "11" to "12," and the audible notification 5210) may differ from the first sensory prompt (e.g., including the change of the number from "11" to "12").

In some embodiments, the first sensory prompt includes at least one of a visual notification, an audible notification, or a tactile notification, and the second sensory prompt includes at least two of a visual notification, an audible notification, or a tactile notification. A visual notification may include any indication that may be viewed by a user. An audible notification may include any indication that may be heard by a user. A tactile notification may include any indication that may be perceived by a user with the sense of touch. In some examples, the second sensory prompt may include a larger quantity of notifications than the first sensory prompt. In some examples, the second sensory prompt may include a same quantity of notifications as the first sensory prompt. In some examples, the second sensory prompt may include a smaller quantity of notifications than the first sensory prompt.

In some embodiments, the second sensory prompt causes the virtual object to move, and the first sensory prompt causes the virtual object to change its appearance without moving. For example, the change of the appearance of the virtual object without moving (e.g., associated with the first sensory prompt) may include, for example, adding or changing a mark, a red dot, a number, or any other indication on the virtual object, without changing the location of the virtual object in the extended reality environment. Causing the virtual object to move (e.g., associated with the second sensory prompt) may include, for example, changing the location of the virtual object in the extended reality environment. In the second sensory prompt, the virtual object may be caused to move in any desired direction. In some embodiments, causing the virtual object to move includes causing the virtual object to temporarily appear in the field of view of the wearable extended reality appliance. For example, the virtual object may move in a direction towards the field of view of the wearable extended reality appliance, across the boundary of the field of view, and into the field of view. In some examples, the virtual object may move into the field of view along a surface on which the virtual object may be placed (e.g., a physical or virtual wall, a physical or virtual whiteboard, or any other desired surface). Additionally or alternatively, the virtual object may move in a direction, towards the field of view, that may connect the location of the virtual object and a point, on the boundary of the field of view, that may be in proximity to (e.g., closest as measured in the space of the extended reality environment, or closest as measured on a particular surface in the extended reality environment) the location of the virtual object. In some examples, the virtual object may move to a location, in the field of view, that may be in proximity to the boundary of the field of view (e.g., be in proximity to the point on the boundary). In some examples, the virtual object may move to any desired location in the field of view. The virtual object may stay at the location in the field of view for a temporary period of time (e.g., 0.5 seconds, 1 second, 2 seconds, 3 seconds, 5 seconds, 10 seconds, or any other desired time). Additionally or alternatively, the virtual object may stay at the location in the field of view until a user interacts with the virtual object.

In some embodiments, when the field of view of the wearable extended reality appliance includes a virtual screen, the second sensory prompt causes a popup notification to be displayed on the virtual screen, and the first sensory prompt causes the virtual object to change its appearance in an absence of a popup notification on the virtual screen. A virtual screen may include a virtual object that may resemble a physical screen. The virtual screen may be rendered by the wearable extended reality appliance and may be displayed in the field of view of the wearable extended reality appliance. The popup notification (e.g., associated with the second sensory prompt) may include, for example, any indication that may, in response to a triggering event, promptly appear in the foreground of the visual interface rendered by the wearable extended reality appliance. The popup notification may appear in any desired location on the virtual screen. In some examples, the popup notification may indicate information of the change associated with the virtual object, such as a preview of the content of the change associated with the virtual object, a summary of the content of the change associated with the virtual object, the existence of the change associated with the virtual object, or any other desired information. The change of the appearance of the virtual object (e.g., associated with the first sensory prompt) may include, for example, adding or changing a mark, a red dot, a number, or any other indication on the virtual object. In connection with the change of the appearance of the virtual object (e.g., associated with the first sensory prompt), the wearable extended reality appliance may not cause display of a popup notification on the virtual screen.

In some embodiments, the second sensory prompt is indicative of a location of the virtual object outside the field of view of the wearable extended reality appliance. For example, the second sensory prompt may be indicative of a direction between the location of the virtual object and the field of view or a position or area within the field of view (e.g., by associating the second sensory prompt with an edge or location of the field of view closest to the location of the virtual object, by associating the second sensory prompt with a motion directed away from the location of the virtual object, by associating the second sensory prompt with motion directed towards the location of the virtual object, and/or in any other desired manner). In some examples, the second sensory prompt may be indicative of a distance between the location of the virtual object and the field of view or a position or area within the field of view. For example, one or more aspects (e.g., the intensity, the level of loudness, or the level of detail of the content) of the second sensory prompt may be configured based on (e.g., proportional to or inversely proportional to) the distance.

In some embodiments, the second sensory prompt includes an audible output configured to appear as originating from the location of the virtual object outside the field of view of the wearable extended reality appliance. An audible output may include, for example, any indication that may be heard by a user. At least one processor associated with the wearable extended reality appliance may cause the audible output to be generated using a method that may create a directional audible perspective. For example, stereophonic sound may be used to generate the audible output of the second sensory prompt, so that a user of the wearable extended reality appliance may perceive the audible output as originating from the location of the virtual object outside the field of view of the wearable extended reality appliance. In some examples, the first sensory prompt may not include an audible output configured to appear as originating from the location of the virtual object. In some examples, both the first sensory prompt and the second sensory prompt may include audible outputs configured to appear as originating from the location of the virtual object, and the audible output of the first sensory prompt may differ from the audible output of the second sensory prompt in at least one of a tone, a volume, a pitch, a duration, or any other aspect of an audible output. For example, the audible output of the second sensory prompt may be more intense than the audible output of the first sensory prompt.

In some embodiments, the second sensory prompt includes a visual output configured to appear as originating from the location of the virtual object outside the field of view of the wearable extended reality appliance. A visual output may include, for example, any indication that may be viewed by a user. The visual output may include, for example, ripples originating from the location of the virtual object and entering the field of view, a moving arrow or object originating from the location of the virtual object and entering the field of view, or any other visual indication that may be displayed in the field of view as originating from the location of the virtual object. In some examples, the motion of the visual output may be along a surface on which the virtual object may be placed. In some examples, the motion of the visual output may be along a path that may be associated with proximity (e.g., closest) between the location of the virtual object and the field of view. Additionally or alternatively, the motion of the visual output may be determined in any other desired manner. In some examples, the first sensory prompt may not include a visual output configured to appear as originating from the location of the virtual object. In some examples, both the first sensory prompt and the second sensory prompt may include visual outputs configured to appear as originating from the location of the virtual object, and the visual output of the first sensory prompt may visually differ from the visual output of the second sensory prompt. For example, the visual output of the second sensory prompt may be remote from the location of the virtual object while the visual output of the first sensory prompt may be local to the location of the virtual object. In another example, the visual output of the second sensory prompt may move in the extended reality environment while the visual output of the first sensory prompt may be local to a specific area of the extended reality environment (such as the area of the virtual object). In yet another example, the visual output of the second sensory prompt may include one graphical indication, while the visual output of the first sensory prompt may include a different graphical indication. In an additional example, the visual output of the second sensory prompt may include textual information, while the visual output of the first sensory prompt may include different textual information.

Some embodiments involve estimating an importance of the change associated with the virtual object, and determining a degree of disturbance corresponding to the second sensory prompt based on the estimated importance of the change. For example, at least one processor associated with the wearable extended reality appliance may estimate the importance of the change associated with the virtual object based on one or more of various factors, such as a message sender associated with the change, an indicator of importance in a message associated with the change, a date and time of the change, or any other relevant factor. In some examples, to estimate the importance of the change, the at least one processor may analyze the content of the change, for example, by using natural language processing algorithms, voice recognition algorithms, or any other desired method. The at least one processor may determine a degree of disturbance corresponding to the second sensory prompt based on the estimated importance of the change. The degree of disturbance corresponding to the second sensory prompt may include, for example, a degree of loudness of an audible output, a displayed size of a visual output, a vibration amplitude of a tactile output, an amount of the content of an output, or any other measurement of interruption of the second sensory prompt. In some examples, the degree of disturbance may be proportional to the estimated importance of the change.

Some embodiments involve receiving image data; analyzing the image data to determine an activity of a user of the wearable extended reality appliance; estimating a relevancy level of the change associated with the virtual object based on the determined activity of the user; and determining a degree of disturbance corresponding to the second sensory prompt based on the relevancy level of the change. In some examples, image data may be captured using an image sensor included in or separate from the wearable extended reality appliance. The activity of the user may be a physical activity of the user. The analysis of the image data may include usage of a visual activity recognition algorithm or a gesture recognition algorithm. Such algorithms may determine degrees/amounts of bodily movement in image data by identifying a body or parts thereof in pixels and measuring pixel movement. In some examples, the physical activity may include an interaction with a physical object. An object recognition algorithm may be used to identify a type of the physical object, and the relevancy level may be determined based on the type of the physical object (e.g., based on an affinity between the type of the physical object and the virtual object or an affinity between the type of the physical object and the change associated with the virtual object). In some examples, the physical activity of the user may include an interaction with a second virtual object using hand gestures. The relevancy level may be determined based on the second virtual object (e.g., based on an affinity between the second virtual object and the virtual object or an affinity between the second virtual object and the change associated with the virtual object). The degree of disturbance corresponding to the second sensory prompt may include, for example, a degree of loudness of an audible output, a displayed size of a visual output, a vibration amplitude of a tactile output, an amount of the content of an output, or any other measurement of interruption of the second sensory prompt. In some examples, the degree of disturbance may be proportional to the relevancy level of the change.

For example, if the physical object or the second virtual object is of a work type (e.g., a physical book, a physical file, a word processing program, a spreadsheet program, or a presentation program), and the virtual object or the change associated with the virtual object is of a gaming type (e.g., a video game), the relevancy level of the change may be determined to be low. If the physical object or the second virtual object is of a work type (e.g., a physical book, a physical file, a word processing application, a spreadsheet application, or a presentation application), and the virtual object or the change associated with the virtual object is of a work type (e.g., an email application), the relevancy level of the change may be determined to be high.

Some embodiments involve accessing a group of rules associating degrees of disturbance with degrees of virtual object changes, determining that the change associated with the virtual object corresponds to a specific rule of the group of rules, and implementing the specific rule to set a degree of disturbance corresponding to the second sensory prompt. For example, at least one processor associated with the wearable extended reality appliance may store the group of rules in a memory associated with the wearable extended reality appliance. The at least one processor may access the group of rules, for example, in preparation for initiating a sensory prompt (e.g., the second sensory prompt) for the change associated with the virtual object. The degree of disturbance corresponding to the second sensory prompt may include, for example, a degree of loudness of an audible output, a displayed size of a visual output, a vibration amplitude of a tactile output, an amount of the content of an output, or any other measurement of interruption of the second sensory prompt. The group of rules may map various virtual object changes (and/or the degrees of the changes) to corresponding degrees of disturbance of a sensory prompt. For example, each rule in the group of rules may indicate a virtual object change (and/or a degree of the change) and a corresponding degree of disturbance of a sensory prompt for the change. The group of rules may be configured, for example, by a user, an administrator, or any other desired entity. Based on accessing the group of rules, the at least one processor may, for example, search in the group of rules using an identifier of the change associated with the virtual object as a search key. The at least one processor may identify the specific rule based on the searching, and may implement the specific rule to set the degree of disturbance corresponding to the second sensory prompt. The degree of disturbance corresponding to the second sensory prompt may be set to, for example, the degree of disturbance as indicated in the specific rule.

Some embodiments involve halting the second sensory prompt upon detection of a trigger. For example, at least one processor associated with the extended reality appliance may halt (e.g., stop, suspend, or end) the second sensory prompt based on detecting a trigger. The trigger may include, for example, user interaction with and/or user attention to the virtual object, the change associated with the virtual object, and/or the second sensory prompt, a command to halt the second sensory prompt, a command to mute notifications, an expiration of a timer for displaying the second sensory prompt, or any other desired event.

In some embodiments, detection of the trigger includes identifying entry of the virtual object into the field of view of the wearable extended reality appliance. For example, based on the second sensory prompt, a user of the wearable extended reality appliance may direct the user's attention to the virtual object, for example, by moving and/or rotating the wearable extended reality appliance so that the field of view of the wearable extended reality appliance may cover the location of the virtual object and the virtual object may enter into the field of view. At least one processor associated with the wearable extended reality appliance may detect the entry of the virtual object into the field of view and may, based on the detected entry, halt the second sensory prompt.

Some embodiments involve analyzing input received from a sensor associated with the wearable extended reality appliance to detect the trigger for halting the second sensory prompt. The sensor associated with the wearable extended reality appliance may include, for example, an image sensor, an eye-tracking sensor, a sensor for tracking head-motion, a sensor included in or associated with an input device, or any other desired device for receiving information from a user. At least one processor associated with the wearable extended reality appliance may analyze input received from the sensor to detect the trigger for halting the second sensory prompt. The analysis of the input to detect the trigger may include, for example, detecting user interaction with and/or user attention to the virtual object, the change associated with the virtual object, and/or the second sensory prompt, detecting a command to halt the second sensory prompt, detecting a command to mute notifications, or detecting any other desired event as the trigger.

Some embodiments involve, after the wearable extended reality appliance initiated the second sensory prompt, upon entry of the virtual object into the field of view of the wearable extended reality appliance, causing the wearable extended reality appliance to initiate the first sensory prompt indicative of the change associated with the virtual object. For example, based on the second sensory prompt, a user of the wearable extended reality appliance may direct the user's attention to the virtual object, for example, by moving and/or rotating the wearable extended reality appliance so that the field of view of the wearable extended reality appliance may cover the location of the virtual object and the virtual object may enter into the field of view. At least one processor associated with the wearable extended reality appliance may detect the entry of the virtual object into the field of view and may, based on the detected entry, cause the wearable extended reality appliance to initiate the first sensory prompt indicative of the change associated with the virtual object (and may halt the second sensory prompt). For example, the second sensory prompt may include a displayed virtual arrow towards the location of the virtual object, or a displayed illustration (e.g., a preview visual notification) of the change associated with the virtual object (e.g., a received email), and the first sensory prompt may include a change of the appearance of the virtual object (e.g., a change of a number, shown on the virtual object, indicating the quantity of received emails).

Some embodiments involve receiving real-time movement data associated with the wearable extended reality appliance; analyzing the real-time movement data to determine a prospective entrance of the virtual object into the field of view of the wearable extended reality appliance; and in response to the determined prospective entrance of the virtual object into the field of view of the wearable extended reality appliance, withholding causing the wearable extended reality appliance to initiate the second sensory prompt. The real-time movement data may indicate movement of the wearable extended reality appliance and/or a component or element of the wearable extended reality appliance. The real-time movement data may include, for example, data captured using an inertia sensor (such as an accelerometer and/or a gyroscope) included in or separate from the wearable extended reality appliance. Additionally or alternatively, the real-time movement data may be obtained by analyzing images captured using an image sensor included in or separate from the wearable extended reality appliance (e.g., using an ego-motion algorithm). In some examples, the real-time movement data may be captured repeatedly, continuously, or periodically using one or more of various desired sensors and may be processed in real-time.

At least one processor associated with the wearable extended reality appliance may analyze the real-time movement data to determine the prospective entrance of the virtual object into the field of view of the wearable extended reality appliance. The at least one processor may determine that a current movement may cause a prospective entrance of the virtual object into the field of view, for example, if the virtual object may be predicted to enter the field of view within a selected time period (e.g., 0.05 seconds, 0.1 seconds, 0.2 seconds, 0.3 seconds, or any other desired time) from the current time. The at least one processor may make the determination, for example, based on the current position and/or orientation of the wearable extended reality appliance and a current speed and direction of moving and/or rotating of the wearable extended reality appliance. The at least one processor may make the determination (e.g., repeatedly, continuously, or periodically), for example, when the virtual object may be currently outside the field of view. In some examples, the at least one processor may use historical data to predict whether there may be a prospective entrance of the virtual object into the field of view. For example, the at least one processor may store parameter information (e.g., the position of the wearable extended reality appliance, the orientation of the wearable extended reality appliance, the speed of moving and/or rotating of the wearable extended reality appliance, the direction of moving and/or rotating of the wearable extended reality appliance, and/or any other relevant information) during a time period before a detected actual entrance of the virtual object into the field of view, and may compare the stored parameter information with currently gathered parameter information (e.g., for the time period before the current time). Based on the comparison, the at least one processor may determine (e.g., predict) a prospective entrance of the virtual object into the field of view, for example, if a degree of similarity between the stored parameter information and the currently gathered parameter information (e.g., a confidence score) satisfies (e.g., meets or exceeds) a configured or selected threshold level of similarity. Additionally or alternatively, the at least one processor may determine (e.g., predict) a prospective entrance of the virtual object into the field of view in any other desired manner.

In response to the determined prospective entrance of the virtual object into the field of view of the wearable extended reality appliance, the at least one processor associated with the wearable extended reality appliance may withhold causing the wearable extended reality appliance to initiate the second sensory prompt. The withholding may last for any desired time period (e.g., 0.05 seconds, 0.1 seconds, 0.2 seconds, 0.3 seconds, or any other desired time). In some examples, the withholding may last for a time period that may be same as or may approximate the time period within which the virtual object may be predicted (e.g., by the at least one processor) to enter the field of view. If the virtual object does not enter the field of view during the withholding time period, the at least one processor may, based on the expiration of the withholding time period, cause the wearable extended reality appliance to initiate the second sensory prompt. If the virtual object enters the field of view during the withholding time period, the at least one processor may, based on the entrance of the virtual object into the field of view, cause the wearable extended reality appliance to initiate the first sensory prompt.

Some embodiments involve a system for initiating location-driven sensory prompts reflecting changes to virtual objects, the system comprising at least one processor programmed to: enable interaction with a virtual object located in an extended reality environment associated with a wearable extended reality appliance; receive data reflecting a change associated with the virtual object; determine whether the virtual object is within a field of view of the wearable extended reality appliance or is outside the field of view of the wearable extended reality appliance; cause the wearable extended reality appliance to initiate a first sensory prompt indicative of the change associated with the virtual object when the virtual object is determined to be within the field of view; and cause the wearable extended reality appliance to initiate a second sensory prompt indicative of the change associated with the virtual object when the virtual object is determined to be outside the field of view, wherein the second sensory prompt differs from the first sensory prompt.

Some embodiments involve a method for initiating location-driven sensory prompts reflecting changes to virtual objects, the method comprising: enabling interaction with a virtual object located in an extended reality environment associated with a wearable extended reality appliance; receiving data reflecting a change associated with the virtual object; determining whether the virtual object is within a field of view of the wearable extended reality appliance or is outside the field of view of the wearable extended reality appliance; causing the wearable extended reality appliance to initiate a first sensory prompt indicative of the change associated with the virtual object when the virtual object is determined to be within the field of view; and causing the wearable extended reality appliance to initiate a second sensory prompt indicative of the change associated with the virtual object when the virtual object is determined to be outside the field of view, wherein the second sensory prompt differs from the first sensory prompt.

Figure 53:
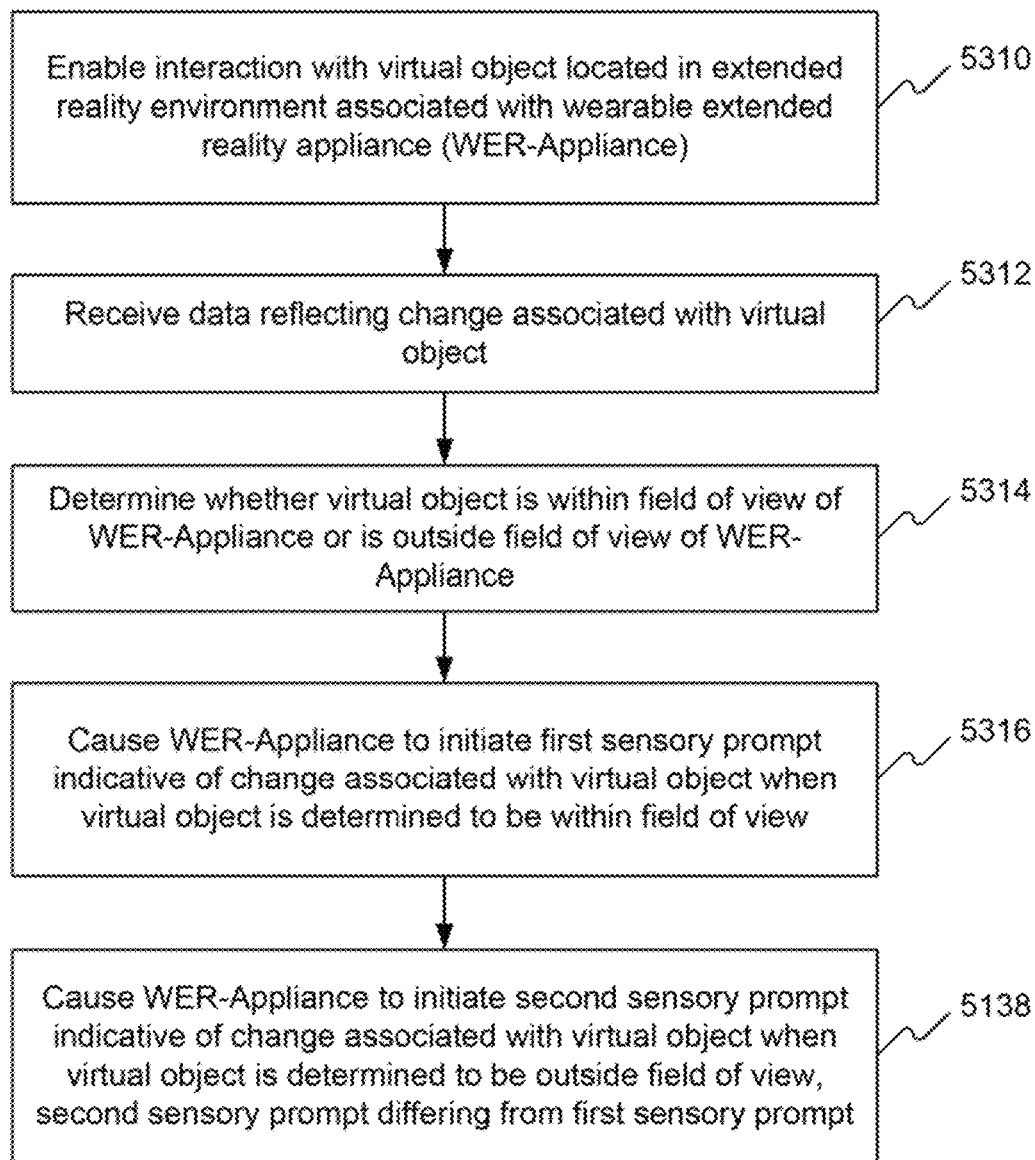
FIG. 53 is a block diagram illustrating an example process for initiating sensory prompts for changes based on a field of view consistent with some embodiments of the present disclosure.

FIG. 53 is a flowchart illustrating an exemplary process 5300 for initiating sensory prompts for changes based on a field of view consistent with some embodiments of the present disclosure. With reference to FIG. 53, in step S310, instructions contained in a non-transitory computer-readable medium when executed by a processor may cause the processor to enable interaction with a virtual object located in an extended reality environment associated with a wearable extended reality appliance. In step S312, instructions contained in a non-transitory computer-readable medium when executed by a processor may cause the processor to receive data reflecting a change associated with the virtual object. In step S314, instructions contained in a non-transitory computer-readable medium when executed by a processor may cause the processor to determine whether the virtual object is within a field of view of the wearable extended reality appliance or is outside the field of view of the wearable extended reality appliance. In step S316, instructions contained in a non-transitory computer-readable medium when executed by a processor may cause the processor to cause the wearable extended reality appliance to initiate a first sensory prompt indicative of the change associated with the virtual object when the virtual object is determined to be within the field of view. In step S318, instructions contained in a non-transitory computer-readable medium when executed by a processor may cause the processor to cause the wearable extended reality appliance to initiate a second sensory prompt indicative of the change associated with the virtual object when the virtual object is determined to be outside the field of view, wherein the second sensory prompt differs from the first sensory prompt.

Various embodiments may be described with reference to a system, method, apparatuses, and/or computer readable medium for performing or implementing operations for selectively controlling a display of digital objects. It is intended that the disclosure of one is a disclosure of all. For example, it is to be understood that the disclosure of one or more processes embodied in a non-transitory computer-readable medium, as described herein, may also constitute a disclosure of methods implemented by the computer readable medium, as well as systems and/or apparatuses for implementing processes embodied in the non-transitory computer-readable medium, for example, via at least one processor. Thus, in some embodiments, a non-transitory computer readable medium contains instructions that when executed by at least one processor cause the at least one processor to perform operations for selectively controlling a display of digital objects. Some aspects of such processes may occur electronically over a network that may be wired, wireless, or both. Other aspects of such processes may occur using non-electronic means. In the broadest sense, the processes disclosed herein are not limited to particular physical and/or electronic instrumentalities; rather, they may be accomplished using any number of differing instrumentalities.

The term "non-transitory computer-readable medium" may be understood as described earlier. The term "instructions" may refer to program code instructions that may be executed by a computer processor, for example, software instructions, computer programs, computer code, executable instructions, source code, machine instructions, machine language programs, or any other type of directions for a computing device. The instructions may be written in any type of computer programming language, such as an interpretive language (e.g., scripting languages such as HTML and JavaScript), a procedural or functional language (e.g., C or Pascal that may be compiled for converting to executable code), object-oriented programming language (e.g., Java or Python), logical programming language (e.g., Prolog or Answer Set Programming), or any other programming language. In some embodiments, the instructions may implement methods associated with machine learning, deep learning, artificial intelligence, digital image processing, and any other computer processing technique.

In some embodiments, the instructions contained in the non-transitory computer-readable medium may include (e.g., embody) various processes for selectively controlling a display of digital objects via a physical display of a computing device such as, for example, a wearable extended reality appliance, including generating a plurality of digital objects for display, determining a usage status of a wearable extended reality appliance, selecting a display mode of a computing device, determining to display and/or not display digital objects, outputting digital objects for presentation, presenting digital objects, causing at least one digital object to appear and/or disappear from display, identifying a change in a usage status of a wearable extended reality appliance, updating a display mode selection, revising a presentation of digital objects, and/or any process related to controlling a display of digital objects based on a usage of a wearable extended reality appliance, as described herein. As used herein, a "computing device" includes any electronic component or group of components for manipulating data. Examples of computing devices include wearable extended reality or virtual reality appliances, personal computers, laptops, servers, tablets, smart phones, smart watches, or any other device that includes at least one processor.

At least one processor may be configured to execute instructions contained in the non-transitory computer-readable medium to cause various processes to be performed for implementing operations for selectively controlling a display of digital objects, as described herein. The term processor may be understood as described earlier. For example, the at least one processor may be one or more of server 210 of FIG. 2, mobile communications device 206, processing device 360 of FIG. 3, processing device 460 of FIG. 4, processing device 560 of FIG. 5, and the instructions may be stored at any of memory devices 212, 311, 411, or 511, or a memory of mobile device 206.

Disclosed embodiments may relate to operations for selectively controlling display of digital objects. As used herein, the term "digital objects" may include, or otherwise denote, any type of data representation or visual presentation generated by and/or presented by at least one computer or processing device. Digital objects may include, for example, any data or media (e.g., alphanumerical text, image data, audio data, video data) formatted for presenting information to a user via, for example, an interface of an electronic device. "Display of digital objects" include the presentation of digital objects to a user via one or more presentation devices. "Operations for selectively controlling display of digital objects" may include one or more acts of regulating, integrating, implementing, presenting, manipulating, and/or changing a presentation of, at least one digital object, or group of digital objects. These digital objects may be capable of being presented to a user via at least one appropriate physical display and/or extended reality appliance at or for a particular time. Moreover, the digital objects may be presented to a user in response to at least one action, option, and/or environment that may be distinguishable from some other action, option, and/or environment. For example, operations for selectively controlling, or otherwise implementing selective control over, a display of digital objects may relate to determining, regulating, managing, changing, and/or otherwise affecting the location, arrangement, appearance, status, accessibility, and/or overall presentation of any number of digital objects via a physical display and/or extended reality appliance, such as a wearable extended reality appliance. In some embodiments, operations for selectively controlling a display of digital objects may be performed within and/or between a real environment, a virtual environment, or real and virtual combined environments for displaying digital objects to a user.

In some embodiments, the manner in which digital objects are displayed to a user may relate to the location, arrangement, appearance, status, accessibility, and/or overall presentation of a digital object or group of digital objects as presented to a user via an extended reality appliance or physical display and/or combination of an extended reality appliance and/or physical display. In some embodiments, the manner in which digital objects are displayed may be selectively controlled to change at or for a particular time in response to at least one action, option, and/or environment.

The display of digital objects may occur in a real environment via at least one physical display for presenting digital content. In other examples, the display of digital objects may occur in an extended reality environment, such as an augmented reality environment or a mixed reality environment, via a physical display of a computing device and/or a wearable extended reality appliance. For example, a wearable extended reality appliance may be configured to enable a user of the wearable extended reality appliance to view the overall display of digital objects across multiple displays including a physical display for presenting digital content and an extended reality appliance for presenting virtual digital content.

Digital objects may be displayed to a user via at least one physical display of a computing device and/or a wearable extended reality appliance. In some embodiments, the wearable extended reality appliance may be in communication with the at least one computing device. In some embodiments, digital objects may include, for example, at least one application, widget, document, cursor, menu, option in a menu, at least one icon which may activate a script for causing an action associated with the particular digital object associated with the icon and/or otherwise linked to related programs or applications, and/or any other data representation or visual presentation displayed, or configured for display, via a physical display and/or via an extended reality appliance. In some embodiments, the digital objects may include real digital objects and/or virtual digital objects. As described herein, a real digital object may relate to any digital object displayed to a user via at least one physical display of a computing device. A virtual digital object may relate to any digital object displayed to a user via a wearable extended reality appliance. For example, at a particular time, one digital object may be presented as a virtual digital object via a wearable extended reality appliance, as a real digital object via a physical display, or as a virtual digital object and a real digital object simultaneously via an extended reality appliance and a physical display.

In some embodiments, a real digital object may include any graphic two-dimensional digital content, graphic three-dimensional digital content, inanimate digital content, animate digital content configured to change over time or in response to triggers, and/or any other digital content configured to be displayed to a user via a physical display. For example, real digital objects displayed via a physical display may include a document, a widget inside a menu bar, and images. In some embodiments, a virtual digital object may include any inanimate virtual content, animate virtual content configured to change over time or in response to triggers, virtual two-dimensional content, virtual three-dimensional content, a virtual constructive or destructive overlay over a portion of a physical and/or digital environment or over a physical and/or real digital object, a virtual addition to a physical and/or digital environment or to a physical and/or real digital object, and/or any other digital content configured to be displayed to a user via a wearable extended reality appliance. For example, virtual digital objects displayed via an extended reality appliance may include a virtual document, virtual widgets inside a virtual menu bar, a virtual workspace, and a realistic three-dimensional rendition of an image.

In some embodiments, a user may be able to interact with the digital objects, including real digital objects and/or virtual digital objects, presented via the physical display and/or the wearable extended reality appliance. In some embodiments, at least one real digital object may be related, linked, associated, or otherwise correspond to at least one virtual digital object, or vice versa. For example, the at least one real digital object and the at least one virtual digital object may share at least one common feature and/or function. In one example, interaction with at least one virtual digital object may affect at least one related, linked, or associated real digital object, and vice versa. In another example, interaction with at least one virtual digital object may not affect a related, linked, or associated real digital object, and vice versa. In some examples, at least one real digital object may be converted to at least one virtual digital object, or vice versa, within an extended reality environment at or for a particular time in response to at least one action, option, and/or environment.

Computations provided by a computing device may include arithmetic and/or logic operations with or without human intervention. For example, a computing device may include one or more input devices, processing devices for processing data instructions, output devices, and/or storage devices for data and storage retention. In some embodiments, a computing device may relate to a standalone unit and/or a combination of related or interconnected units. In some embodiments, the computing device may be directly or indirectly connected to a physical display, and/or may be a part of the physical display. Additionally, or alternatively, the computing device may be directly or indirectly connected to a wearable extended reality appliance and/or may be a part of the wearable extended reality appliance. In some embodiments, the computing device may enable a user to interact with one or more digital objects within an extended reality environment via a wearable extended reality appliance and/or via another device in communication with the computing device and/or with the wearable extended reality appliance. The computing device may be capable of selectively controlling a display of one or more digital objects, consistent with some embodiments of the present disclosure. In one example, the computing device may be configured to generate some or all of the digital objects for display via the physical display and/or the wearable extended reality appliance. For example, a computing device may include a laptop computer, a desktop computer, a smartphone, a wearable computer such as a smartwatch, and a tablet computer.

As used herein, the term "generating a plurality of digital objects for display with use of a computing device" includes constructing and/or rendering of any number of digital objects for presentation a computing device. In some embodiments, the computing device may be configured to generate one or more digital objects for display based on received and/or processed digital signals and/or any other form of data received and/or stored by the computing device. For example, digital signals and/or data processed by the computing device may be used to present digital content, including real digital objects, to a user via a physical display. Additionally, or alternatively, digital signals and/or data processed by the computing device may be used to present virtual digital content, including virtual digital objects, to a user via a wearable extended reality appliance. In one example, digital signals and/or data may indicate an appropriate position and/or angle of a viewpoint of a digital object such that digital content may be generated for display to the user at a particular position and/or angle within a particular environment (e.g., a real environment or extended reality environment). In another example, digital signals and/or data may indicate an appropriate presentation and/or appearance of a digital object such that the digital object has a particular presentation and/or appearance.

Figure 54:
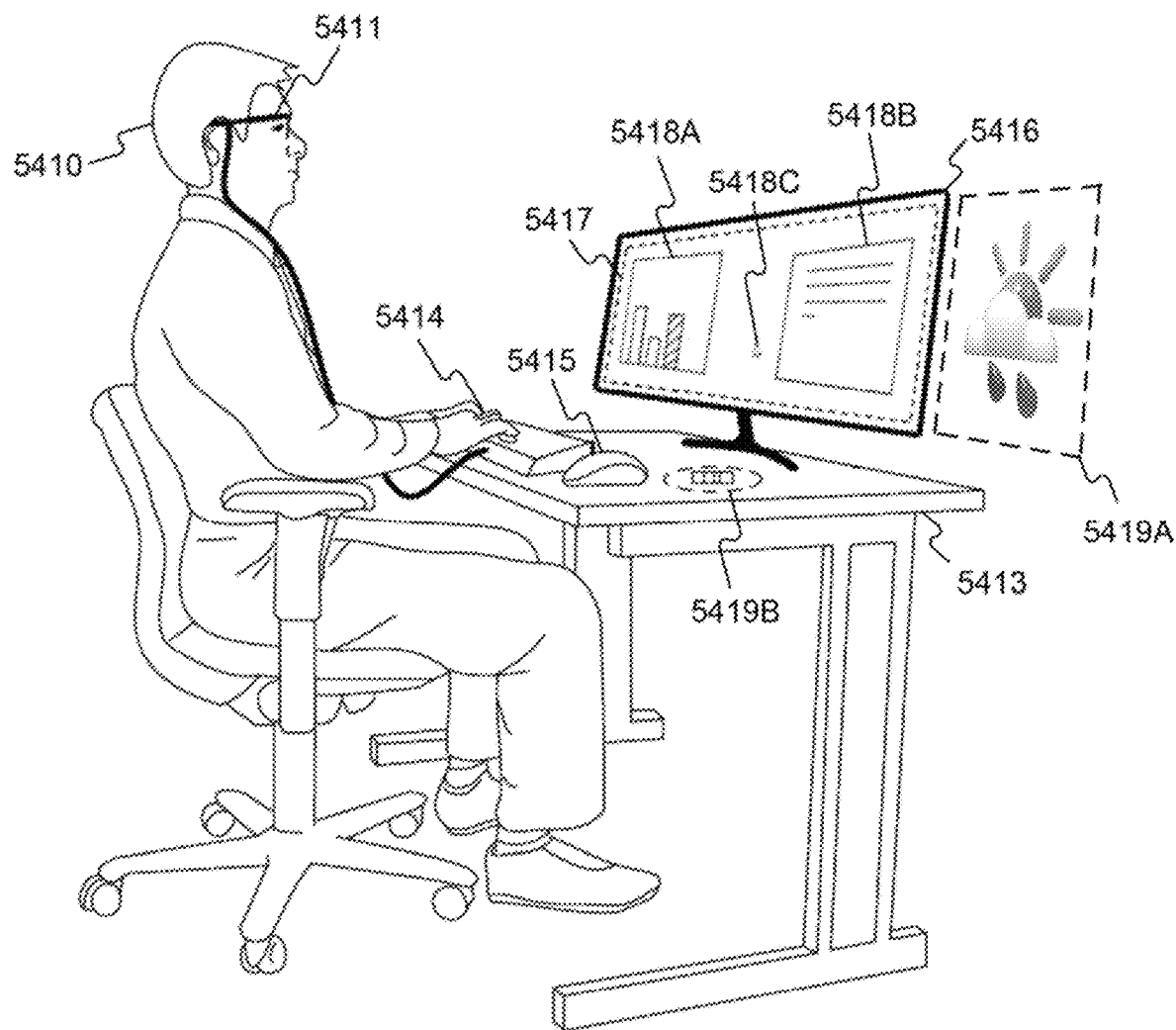
FIG. 54 is a schematic illustration of a plurality of digital objects presented to a user within an extended reality environment via a physical display and a wearable extended reality appliance, consistent with some embodiments of the present disclosure.

By way of example, FIG. 54 illustrates one non-limiting example of a plurality of digital objects presented to a user within an extended reality environment, consistent with some embodiments of the present disclosure. FIG. 54 is a representation of just one embodiment, and it is to be understood that some illustrated elements and/or features might be omitted, and others added within the scope of this disclosure. As shown, a user 5410 is wearing a wearable extended reality appliance 5411 and sitting behind table 5413 supporting a keyboard 5414, mouse 5415, and computing device 5416 having physical display 5417.

The physical display 5417 of the computing device 5416 may be a desktop computer configured to display digital content to user 5410, for example, real digital objects 5418A, 5418B, and 5418C. Real digital objects 5418A and 5418B are programs open on the physical display 5417 and real digital object 5418C may be a cursor for interacting with digital objects displayed via the physical display 5417 and controllable using mouse 5415. While physical display 5417 of computing device 5416 is depicted as a desktop computer, it is to be understood that, in some embodiments, the physical display may relate to any display or combination of physical displays configured to display real digital objects to user 5410. Some non-limiting examples of such physical displays may include a physical display of a laptop computer, a physical display of a tablet, a physical display of a smartphone, a physical display of a television, and so forth. In some examples, a physical display may be or include a device converting digital signals and/or analog signals to perceptible light patterns. Additionally, while keyboard 5414 and mouse 5415 are depicted here as a wireless keyboard and a wireless mouse connected to computing device 5416 of physical display 5417, it is to be understood that the computing device may be indirectly or directly connected to, or in communication with, any number of peripheral devices.

As shown, wearable extended reality appliance 5411 may be a pair of smart glasses. The wearable extended reality appliance 5411 may be connected via a wire to keyboard 5414 which may be in communication with the computing device 5416. Wearable extended reality appliance 5411 may be configured to display virtual digital content to user 5410 within an extended reality environment viewable through wearable extended reality appliance 5411. For example, virtual digital object 5419A and virtual digital object 5419B are displayed to user 5410 via wearable extended reality appliance 5411. From the perspective of user 5410, virtual digital object 5419A is displayed next to physical display 5417 of computing device 5416 and virtual digital object 5419B is displayed on table 5413.

Some embodiments involve generating a plurality of digital objects for display in connection with use of a computing device. In one example, generating a digital object for display may include selecting and/or generating one or more visuals associated with the digital object. In another example, generating a digital object for display may include selecting and/or generating textual data for display in association with the digital object. In another example, generating a digital object for display may include selecting at least one of color, texture, size, position, orientation, illumination, intensity or opacity for the display of at least part of the virtual object. In some examples, generating a digital object for display may include rendering the virtual object, for example using a ray casting algorithm, using a ray tracking algorithm, using rasterization algorithm, and so forth. For example, the digital object may be rendered for display using a single display, using a stereo display, and so forth. For example, the digital object may be rendered from geometrical information associated with the virtual object, from a three-dimensional model associated with the virtual object, from a two-dimensional model associated with the virtual object, from visuals associated with the virtual object, from textual information associated with the virtual object, and so forth.

In some embodiments, the computing device is operable in a first display mode and in a second display mode. The term "display mode" may include a configuration or manner of operation. For example, particular display parameters may apply to a particular mode. The particular mode may be applied to a real and/or extended reality environment at a particular time or for a particular duration. For example, a display parameter may include any characteristic capable of defining or classifying the manner in which any number of digital objects are displayed (e.g., location, arrangement, appearance, status, accessibility, and/or overall presentation) to a user via a physical display and/or extended reality appliance. In some embodiments, the display mode in which the computing device operates may be based on a particular type of one or more of the digital objects (e.g., real digital objects and/or virtual digital objects). In one example, the computing device may be configured to operate in a display mode capable of presenting real digital objects for display via at least one physical display. In another example, the computing device may be configured to operate in a display mode capable of presenting virtual digital objects for display via a wearable extended reality appliance. In yet another example, the computing device may be configured to operate in another display mode capable of simultaneously presenting digital content for display via at least one physical display and virtual digital content for display via a wearable extended reality appliance.

As used herein, the term "operable" refers to an ability to work or perform. For example, a computing device may perform in multiple ways and may be switchable between modes of operation. Switching, for example, may alter the way, manner, type or content of presented. In one display mode, content may be displayed to the user via a physical display and in another mode, the content may be presented via a wearable extended reality appliance. Or, by way of another example, the computing device may be configured to switch between a first display mode for presenting digital objects via the physical display and a second display mode for presenting digital objects via the physical display and/or the wearable extended reality appliance. Additionally, or alternatively, in some embodiments, the computing device may be configured to operate in, and switch between, display modes that are different from the first display mode and the second display mode. In some embodiments, the computing device may be configured to switch between display modes in real time or near real time in response to at least one action, option, and/or environment.

According to some embodiments, when the computing device is in the first display mode, the plurality of digital objects are displayed via a physical display connected to the computing device. In a general sense, the term "displayed via a physical display" may relate to the presentation of digital content, including real digital objects, to a user via a physical display which the user may perceive and/or interact with in a real environment and/or an extended reality environment. In some examples, a "physical display" may relate to any type of device or system that is directly or indirectly connected to a computing device and configured to present inanimate and/or animate graphic two-dimensional and/or three-dimensional digital content to a user. In some examples, a "physical display" may relate to any type of device or system that is configured to present, based on received digital and/or analog signals, graphical information perceptible without using extended reality equipment, such as a wearable extended reality appliance. In some examples, digital objects presented via the physical display (e.g., real digital objects) are perceived as objects positioned at the physical location of the physical display, while digital objects presented via the wearable extended reality appliance (e.g., virtual digital objects) are perceived (e.g., due to optical illusion) as objects positioned away of the wearable extended reality appliance. In some examples, a physical display may relate to a non-transparent display, while the wearable extended reality appliance may include one or more transparent displays and may use the one or more transparent displays to present virtual digital objects in an optical illusion causing the virtual digital objects to appear at a select position in the environment away from the wearable extended reality appliance. In some examples, a physical display may relate to a non-transparent display, while the wearable extended reality appliance may include one or more projectors and may use the one or more projectors to present virtual digital objects in an optical illusion causing the virtual digital objects to appear at a select position in the environment away from the wearable extended reality appliance.

In one embodiment, a physical display may include a computer screen, laptop screen, tablet screen, smartphone screen, projector screen, and/or any physical device capable of presenting digital content, such as a plurality of real digital objects, to a user. The physical display may include one physical display or a combination of physical displays in which at least one physical display is in direct or indirect communication with at least another physical display. Additionally, or alternatively, the physical display may include a combination of discrete physical displays that are not in communication with one another.

As used herein, the "first display mode" may relate to the mode of operation of the computing device in which the computing device may be configured to generate and/or output digital content, such as a plurality of real digital objects, for display to a user via at least one physical display in communication with the computing device. In some examples, the visual presentation of at least one real digital object generated by the computing device in the first display mode may be produced in at least one confined region of the physical display. For example, when the computing device is operating in the first display mode, real digital objects may be generated and/or presented to a user via the physical display within any number of discrete and/or connected subsets of space within the entire space of the physical display. In some embodiments, when the computing device is operating in the first display mode, the plurality of digital objects are not displayed to the user via the wearable extended reality environment.

Figure 55A:
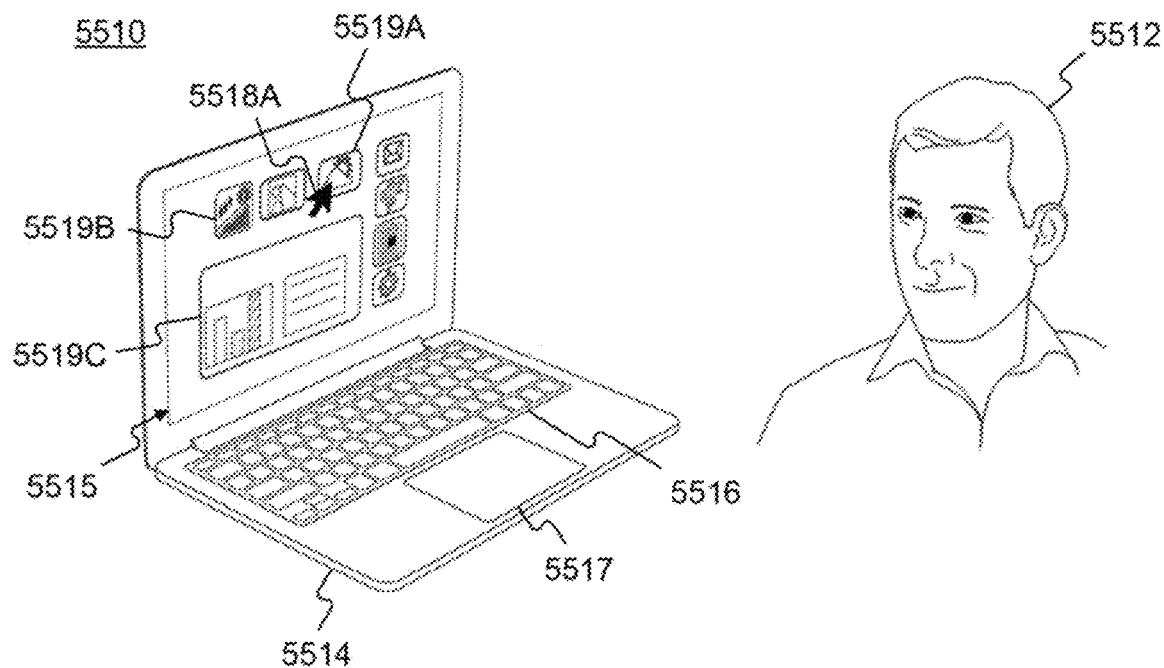
FIG. 55A is a schematic illustration of one example of a plurality of digital objects presented to a user in a first display mode, consistent with some embodiments of the present disclosure.

By way of a non-limiting example, FIG. 55A illustrates a user 5512 of a computing device 5514 operating in a first display mode 5510. User 5512 is shown sitting in front of a computing device 5514 operating in a first display mode 5510. The computing device 5514 includes physical display 5515, keyboard 5516, and mouse 5517. The physical display 5515 of computing device 5514 is configured to display digital content, such as a plurality of real digital objects 5519A to 5519C, to user 5512. In this non-limiting embodiment, computing device 5514 is depicted as a laptop, but as described above, computing device 5514 may be any type of device or combination of devices capable of operating in a first display mode and a second display mode. Moreover, while physical display 5515 of computing device 5514 is depicted here as a laptop screen, it is to be understood that a computing device 5514 may be indirectly or directly connected to, or in communication with, any physical display or combination of physical displays configured to display digital content, such as a plurality of real digital objects, to the user 5512. Additionally, while keyboard 5516 and mouse 5517 are depicted here as a keypad and trackpad built into computing device 5514, it is to be understood that the computing device may be indirectly or directly connected to, or in communication with, any number of peripheral devices including a wireless keyboard, a wireless mouse, and a wearable extended reality appliance.

The digital content displayed to user 5512 by physical display 5515 of computing device 5514 operating in the first display mode 5510 includes, for example, a cursor 5518A and a plurality of real digital objects 5519A to 5519C. Additionally, it is to be understood that cursor 5518A may constitute a digital object, such as a real digital object, as described herein. In the first display mode, cursor 5518A may move anywhere within physical display 5515 and may interact with any digital content displayed therein, such as real digital object 5519A, real digital object 5519B, real digital object 5519C, and/or any group or sub-group of real digital objects. For example, user 5512 may interact with applications or widgets, such as real digital objects 5519A, real digital object 5519B, and real digital object 5519C, displayed in physical display 5515 using keyboard 5516 and/or mouse 5517.

According to some embodiments, when the computing device is in the second display mode, some of the plurality of digital objects are displayed via the physical display, and at least one other of the plurality of digital objects is displayed via a wearable extended reality appliance. In a general sense, the term "displayed via a wearable extended reality appliance" may relate to the presentation of virtual digital content, including virtual digital objects described above, to a user which the user may perceive, and/or interact with, in an extended reality environment via the wearable extended reality appliance. In one example, textual content entered using a keyboard (for example, using a physical keyboard, using a virtual keyboard, etc.) may be presented via the wearable extended reality appliance in real time as the textual content is typed. In another example, a virtual cursor may be presented via the wearable extended reality appliance, and the virtual cursor may be controlled by a pointing device (such as a physical pointing device, a virtual pointing device, a computer mouse, a joystick, a touchpad, a physical touch controller, and so forth). In yet another example, virtual displays, including one or more windows of a graphical user interface operating system, may be presented via the wearable extended reality appliance.

In some embodiments, virtual digital objects generated by the computing device may be displayed via a wearable extended reality appliance in at least one virtual region of the extended reality environment. For example, virtual digital objects may be generated and/or presented to a user via the wearable extended reality appliance within any number of discrete and/or connected subsets of space within the entire space of the extended reality environment. A subset of space may relate to a two-dimensional or three-dimensional space within the extended reality environment that may be fixed relative to a particular physical object and/or digital object, fixed relative to a part of the extended reality appliance, or not fixed relative to any particular physical object, digital object, or part of the extended reality appliance. In some embodiments, virtual digital objects generated by the computing device may be displayed via the wearable extended reality appliance such that the dimensional orientation of at least one virtual digital object within the extended reality environment is different from another virtual digital object, as viewed from the perspective of the user. For example, the perceived dimensional orientation of any one subset of space including at least one virtual digital object may be different from, or similar to, the perceived dimensional orientation of any other subset of space including at least another virtual digital object within the entire space of an extended reality environment. In one example, at least two virtual digital objects may appear to exist within the same plane of the extended reality environment. In another example, at least one virtual digital object may appear to exist in a first plane of the extended reality environment, and at least another virtual digital object may appear to exist in a second plane of the extended reality environment that may intersect, or be parallel to, the first plane of the extended reality environment.

As used herein, the term "wearable extended reality appliance" may be understood as described earlier. In some embodiments, the wearable extended reality appliance may be directly or indirectly in communication with the computing device and may include one wearable extended reality appliance or a combination of wearable extended reality appliances.

As used herein, the "second display mode" may relate to the mode of operation of the computing device in which the computing device may generate and/or output digital content, such as a plurality of digital objects, for display to the user via at least one physical display in communication with the computing device and/or at least one wearable extended reality appliance. In some embodiments, in the second display mode, the wearable extended reality appliance may present digital content that may also be capable of being presented via the physical display. Additionally, or alternatively, the wearable extended reality appliance may present digital content that may not be capable of being presented via the physical display. In some embodiments, in the second display mode, the wearable extended reality appliance may display at least one virtual digital object mimicking and/or extending the functionality of at least one real digital object displayed, or previously displayed, via the physical display. Additionally, or alternatively, the wearable extended reality appliance may display at least one virtual digital object that is not related to the functionality of at least one real digital object displayed, or previously displayed, via the physical display.

Figure 55B:
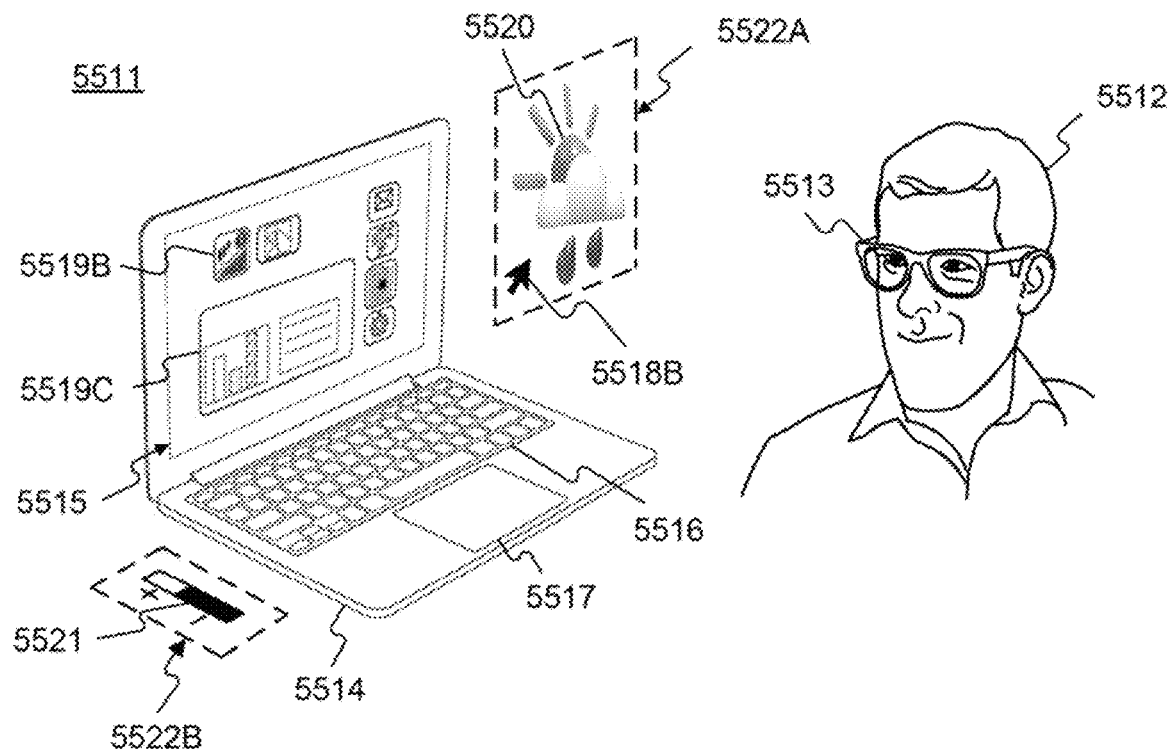
FIG. 55B is a schematic illustration of one example of a plurality of digital objects presented to a user in a second display mode, consistent with some embodiments of the present disclosure.

By way of a non-limiting example, FIG. 55B illustrates a user 5512 of a wearable extended reality appliance 5513 and a computing device 5514 operating in a second display mode 5511. The computing device 5514 illustrated herein is consistent with the computing device 5514 operating in the first display mode 5510 illustrated in FIG. 55A. As shown, the wearable extended reality appliance 5513 is in wireless communication with the computing device 5514 and is configured to display virtual digital content to the user 5512 when the computing device is in the second display mode 5511. Additionally, the wearable extended reality appliance 5513 is configured to enable the user 5512 to view digital content presented via the physical display 5515 of the computing device 5514 through the wearable extended reality appliance 5513. For illustration purposes, the wearable extended reality appliance 5513 is depicted here as a pair of smart glasses, but as described above, wearable extended reality appliance 5513 may be any type of head-mounted device used for presenting an extended reality to user 5512 when computing device 5514 is in the second display mode 5511.

As shown, the digital objects displayed to user 5512 when computing device 5514 is in the second display mode 5511 include real digital objects presented by physical display 5515 of computing device 5514 and virtual digital objects presented by wearable extended reality appliance 5513 in communication with computing device 5514. The real digital objects presented by physical display 5515 of computing device 5514 in the second display mode 5511 include real digital object 5519B and real digital object 5519C. Real digital object 5519B and real digital object 5519C correspond in function and appearance to some of the plurality of digital objects presented to the user 5512 in the first display mode 5510, as illustrated in FIG. 55A. The virtual digital objects presented by wearable extended reality appliance 5513 include virtual digital object 5520 and virtual digital object 5521.

The virtual objects in the extended reality environment, as viewed from the perspective of user 5512, are depicted as two discrete virtual regions including virtual region 5522A and virtual region 5522B. The virtual regions 5522A and 5522B of the extended reality environment have been artificially imposed in this illustration to represent virtual content presented via wearable extended reality appliance 5513 from the perspective of user 5512. Virtual digital object 5520 is presented to user 5512 within virtual region 5522A away from and next to physical display 5515 such that virtual digital object 5520 appears to float at a fixed location to the right of physical display 5515 from the perspective of user 5512. Virtual digital object 5521 is presented to user 5512 within virtual region 5522B in a region away from physical display 5515 corresponding to a surface to the left of computing device 5514 such that virtual digital object 5521 appears to be positioned at a fixed location on a surface to the left of physical display 5515 of computing device 5514 from the perspective of user 5512.

The virtual digital content presented by wearable extended reality appliance 5513 may also include virtual cursor 5518B controllable via the mouse 5517 and/or wearable extended reality appliance 5513. It is to be understood that, in some embodiments, virtual cursor 5518B may constitute a virtual digital object, as described herein, when the computing device is in the second display mode 5511. However, a cursor may also be presented as a real digital object via the physical display 5515 in some embodiments when the computing device is in the second display mode 5511. For example, the cursor may move anywhere within physical display 5515 as cursor 5518A and/or anywhere within the extended reality environment via wearable extended reality appliance 5513 as virtual cursor 5518B. Additionally, the cursor may interact with any digital objects contained within the extended reality environment including any real digital objects as cursor 5518A and/or as virtual cursor 5518B and/or any virtual digital objects as virtual cursor 5518B.

In the second display mode 5511, user 5512 may interact with any digital objects presented via wearable extended reality appliance 5513 and/or the physical display 5515. In one example, virtual cursor 5518B may move over a real digital object presented within physical display 5515 and drag the real digital object out of physical display 5515 into the extended reality environment, for example to virtual region 5522A. In another example, virtual cursor 5518B may move anywhere within the extended reality environment, including virtual regions 5522A and 5522B, and may interact with, virtual digital object 5520 or virtual digital object 5521. In yet another example, virtual cursor 5518B may move on all available surfaces (e.g., virtual region 5522B or any other identifiable physical surface) or on selected surfaces in the extended reality environment. Additionally, or alternatively, in the second display mode 5511, user 5512 may interact with any one of real digital objects 5519B or 5519C or virtual digital objects 5520 or 5521 using hand gestures and/or eye gestures recognized by the wearable extended reality appliance 5513 and/or any sensor (e.g., a camera) in communication with computing device 5514.

In the second display mode, some of the plurality of digital objects presented to the user in the first display mode may be presented to the user via a physical display in communication with the computing device. The digital objects being presented via a physical display may be similar to the real digital objects generated by the same computing device in the first display mode. Additionally, in the second display mode, at least one other of the plurality of digital objects presented to the user in the first display mode may be presented to the user via the wearable extended reality appliance. The at least one other of the plurality of digital objects generated by the computing device in the second display mode and presented via the wearable extended reality appliance may include a virtual digital object or virtual digital objects consistent with the virtual digital objects described above. In some examples, the at least one other of the plurality of digital objects may be presented via the wearable extended reality appliance over the physical display and/or away of the physical display. In some examples, the at least one other of the plurality of digital objects may be presented via the wearable extended reality appliance as a virtual digital object in a fixed location relative to at least one particular physical object, such as a desk, wall, digital device, or any physical object having at least one recognizable surface or boundary. The location of the particular physical object itself may be fixed or not fixed relative to the entire space of the extended reality environment.

In one example, none of the at least one other of the plurality of digital objects is displayed via the physical screen. For example, the computing device operating in the second display mode may be configured to present a plurality of digital objects such that none of at least one virtual digital object presented via the wearable extended reality appliance may correspond to, and/or be displayed as, the real digital objects presented via the physical display in the second display mode. In another example, the at least one other of the plurality of digital objects is displayed via the physical screen while being displayed via the wearable extended reality appliance. For example, the computing device operating in the second display mode may be configured to present a plurality of digital objects such that at least one virtual digital object presented via the wearable extended reality appliance may correspond to, and/or be displayed as, at least one real digital object presented via the physical display in the second display mode. In yet another example, a first digital object of the at least one other of the plurality of digital objects is displayed via the physical screen while being displayed via the wearable extended reality appliance, and a second digital object of the at least one other of the plurality of digital objects is not displayed via the physical screen. For example, the computing device operating in the second display mode may be configured to present a plurality of digital objects such that a first digital object may be presented as a real digital object via the physical display while also being presented as a virtual digital object via the wearable extended reality appliance, and a second digital object may be presented as a virtual digital object via the wearable extended reality appliance but not presented as a real digital object via the physical display.

By way of a non-limiting example, one of the digital objects (real digital object 5519A) illustrated in FIG. 55A is displayed via physical display 5515 as a weather widget in the first display mode 5510. When computing device 5514 is operating in the second display mode 5511 illustrated in FIG. 55B, real digital object 5519A is no longer presented to user 5512 via physical display 5515. Rather, when computing device 5514 is operating in the second display mode 5511 illustrated in FIG. 55B, the digital object is presented as virtual digital object 5520 to user 5512 (in virtual region 5522A) via wearable extended reality appliance 5513. In another example, when computing device 5514 is operating in the second display mode 5511, a digital object (e.g., a weather widget) may be displayed via physical display 5515 while also being presented to user 5512 (in virtual region 5522B) via wearable extended reality appliance 5513 such that a real digital object and virtual digital object are simultaneously displayed to user 5512 within the extended reality environment. In yet another example, when computing device 5514 is operating in the second display mode 5511, a digital object (e.g., a weather widget) may be simultaneously displayed via physical display 5515 and in the extended reality environment via wearable extended reality appliance 5513 while another digital object (e.g., cursor 5518A), previously displayed in the first display mode 5510, is displayed via wearable extended reality appliance 5513 (in virtual region 5522B) as virtual digital object 5518B, but not via physical display 5515.

In some embodiments, in the second display mode, the wearable extended reality appliance may display at least one additional digital object being excluded from display via the physical display in the first display mode. In a general sense, the "term excluded from display via the physical display" may relate to any digital object that is virtually presented via the wearable extended reality appliance but not presented, or not configured to be presented, via the physical display in communication with the computing device. As used herein, the term "one additional digital object" may relate to at least one digital object that is presented as a virtual digital object in the second display mode via the wearable extended reality appliance that is not displayed, or was not previously displayed, as at least one real digital object in the first display mode via the physical display.

In one example, the wearable extended reality appliance may display at least one virtual cursor located outside the physical boundaries of the physical display. In another example, the wearable extended reality appliance may display at least one visual element that resides outside the physical boundaries of the physical display. For example, the wearable extended reality appliance may be configured to display one or more of a virtual digital object for controlling at least one function of the computing device, a virtual digital object which may activate a script for causing an action associated with a particular digital object, and/or any other data representation or visual presentation displayed, or configured for display, via a wearable extended reality appliance. In one non-limiting example, a visual element that resides outside the physical boundaries of the physical display may include a two-dimensional (e.g., simplified) object, such as a clock on the wall or a virtual controller in communication with the computing device, or displayed as a three-dimensional life-like object, such as a plant on a desk.

By way of a non-limiting example, FIG. 55B illustrates virtual digital object 5521 (a volume controller) that is displayed via wearable extended reality appliance 5513 (in virtual region 5522B) when computing device 5514 is operating in the second display mode 5511. Virtual digital object 5521 is not functionally related to any real digital object displayed via physical display 5515 in the second display mode 5511 illustrated in FIG. 55B. Additionally, a digital object corresponding to virtual digital object 5521 is excluded from display via physical display 5515 in the first display mode 5510. For example, there is no digital object illustrated in FIG. 55A that is displayed via physical display 5515 that corresponds to virtual digital object 5521, as shown in FIG. 55B. In the example shown, virtual digital object 5521 is configured to be interacted with only as a virtual digital object and not configured to be displayed via physical display 5515 in the first display mode 5510.

In some embodiments, the at least one other of the plurality of digital objects has a first visual appearance when presented by the physical display in the first display mode and has a second visual appearance when presented by the wearable extended reality appliance in the second display mode. As used herein, the term "visual appearance" may relate to the arrangement, layout, and/or overall presentation of a digital object as displayed. For example, such an appearance may differ based on whether presented on the physical display or the wearable extended reality appliance. In one example, a particular digital object displayed via the physical display may have a first visual appearance when presented via a physical display in the first display mode and a second visual appearance that is different from the first visual appearance when presented virtually in the second display mode via a wearable extended reality appliance. For example, a graphical user interface of a program for viewing and editing a document presented via a wearable extended reality appliance in the second display mode may be different from the same program presented via a physical display in the first display mode. In another example, the visual appearance of a widget for checking emails may appear in a simplified version when presented via the physical display in the first display mode and may appear as an expanded version with more functionality when presented via the wearable extended reality appliance when the computing device is operating in the second display mode. In another example, a real digital object displayed via a physical display in the first display mode may have a visual appearance that is similar in at least one respect, or in all respects, to a virtual digital object displayed via the wearable extended reality appliance in the second display mode.

By way of a non-limiting example, FIG. 55B illustrates virtual digital object 5520 (relating to an application for checking the weather) in the second display mode 5511, which functionally corresponds to real digital object 5519A displayed in the first display mode 5510 of FIG. 55A. The digital object is displayed as an icon (e.g., real digital object 5519A) when presented via physical display 5515 in the first display mode 5510 and is presented as an open application (e.g., virtual digital object 5520) when displayed via wearable extended reality appliance 5513 (in virtual region 5522A) when the computing device is operating in the second display mode 5511. As shown, virtual digital object 5520 has a first visual appearance when presented via the physical display 5515 in the first display mode 5510 that is different from a second visual appearance when presented via the wearable extended reality appliance 5513 in the second display mode 5511.

In some embodiments, the location of a particular digital object may depend upon the location of some particular physical object. In other embodiments, the location of a particular digital object may not depend upon the location of some particular physical object. In some embodiments, when the computing device is operating in the first display mode, a location of a particular digital object of the at least one other of the plurality of digital objects is independent of a location of a particular physical object. The term "independent of a location of a particular physical object" may refer to a particular digital object's absence of spatial dependence on or relationship to a location of a particular physical object at a particular time and/or in a particular display mode. For example, a location of a particular digital object, such as a real digital object, presented to the user via the physical display may not depend on, or otherwise rely upon, the location of some physical object outside of the physical display. In one non-limiting example, the location of a real digital object (e.g., a widget) displayed via a physical display of the computing device in the first display mode may remain within the same discrete subset of space of the physical display, or may otherwise remain unaffected, if a distance between a particular physical object (e.g., a chair, table, or plant) changes relative to some point of reference, such as the physical display.

In some embodiments, when the computing device is operating in the second display mode, the location of the particular digital object depends on the location of the particular physical object. The term "depends on the location of the particular physical object" may refer to a particular digital object's spatial dependence on or relationship to a location of a particular physical object at a particular time and/or in a particular display mode. In some embodiments, a location of a particular digital object, such as a virtual digital object, presented to the user via the wearable extended reality appliance in the second display mode may depend on, or otherwise rely upon, the location of some physical object outside of the physical display. In some examples, the particular virtual digital object may be docked to or near the particular physical object. For example, when a virtual digital object is docked to a physical object, the virtual digital object may stay in the same location as the physical object and may move with the physical object. Additionally, or alternatively, when a virtual digital object is docked near a physical object, the virtual digital object may stay at a location that is within a fixed distance or range relative to the physical object and may move with the physical object such that the digital object remains within a fixed distance or range relative to the physical object. When a virtual digital object is docked to a physical object, at least one point of the virtual digital object may stay fixed relative to at least one point on the physical object such that a particular position and/or angle of the virtual digital object may change with a position and/or angle of the physical object.

In another example, the particular virtual digital object may be configured to move to and/or from the particular physical object. For example, a virtual digital object may be configured to move within the extended reality environment from a location that is a first distance (e.g., longer distance) from the particular physical object to a location that is a second distance (e.g., shorter distance) from the particular physical object, and vice versa. Additionally, or alternatively, a real digital object may be configured to move out of display via the physical display and onto display via the wearable extended reality appliance within the extended reality environment (e.g., as a virtual digital object) toward the particular physical object, and vice versa.

In another example, the particular virtual digital object may be located so that it does not hide, or otherwise obstruct, the particular physical object. In yet another example, the particular virtual digital object may be located so that it is not hidden, or otherwise obstructed, by the particular physical object. For example, the location of a particular virtual digital object (e.g., a widget for a computer application) may be configured to move relative to a particular physical object (e.g., any physical object within the extended reality environment such as a desk, chair, or peripheral device to the computing device) such that the virtual digital object does not obstruct the user's view of the physical object and/or the user's view of the virtual digital object. If the particular digital object is at a location that would obstruct the user's view of the particular virtual digital object, the virtual digital object may be configured to move to a new location relative to the physical object as to remain visible to the user. Additionally, or alternatively, if the particular virtual digital object is at a location that would obstruct the user's view of the particular physical digital object, the virtual digital object may be configured to move to a new location relative to the physical object as to not block the user's view of the physical object.

Figure 56:
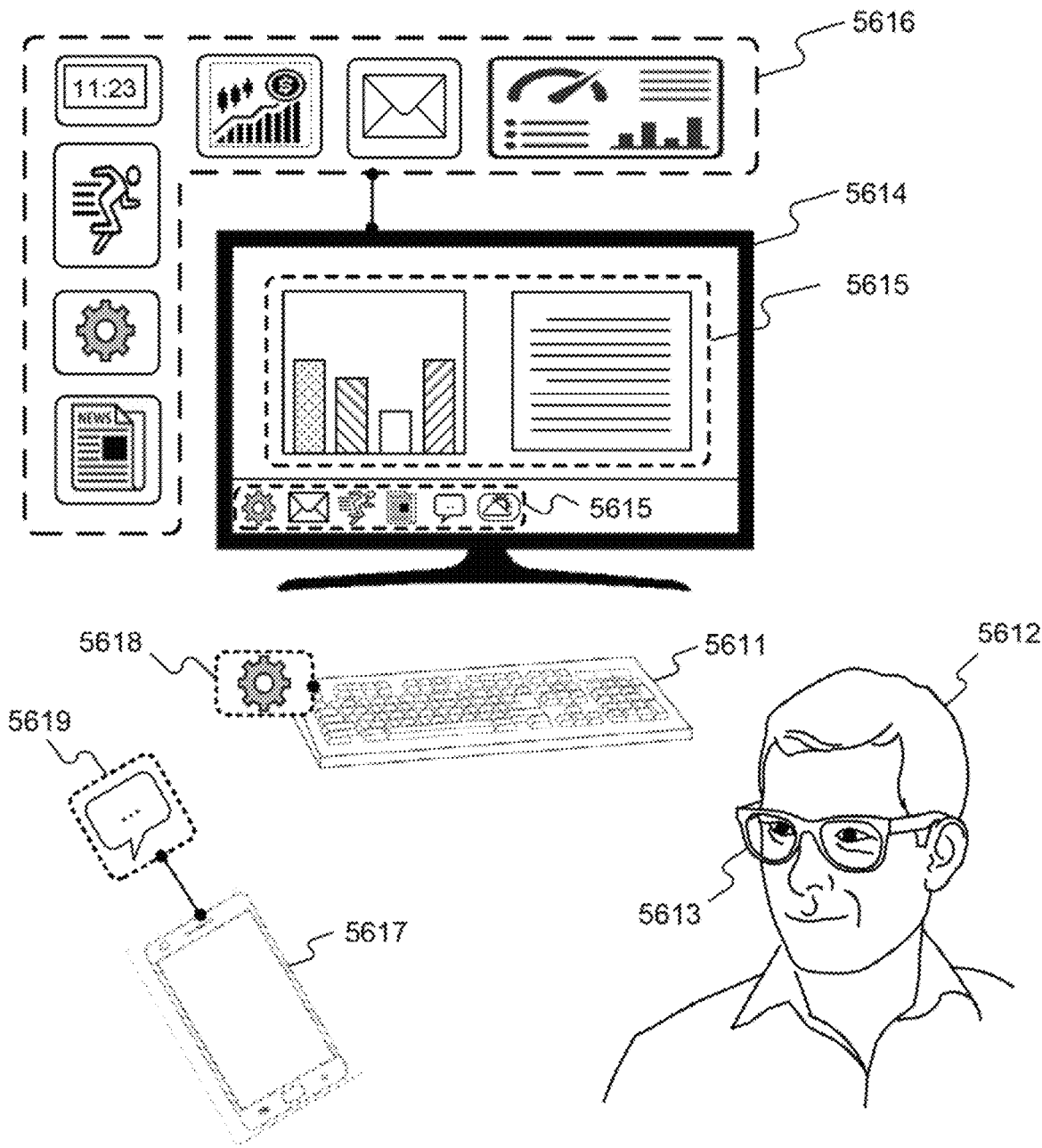
FIG. 56 is a schematic illustration of another example of a plurality of digital objects presented to a user in the second display mode, consistent with some embodiments of the present disclosure.

By way of a non-limiting example, FIG. 56 is a schematic illustration of an example of a plurality of digital objects presented to a user in a second display mode, consistent with some embodiments of the present disclosure. FIG. 56 illustrates a computing device operating in a second display mode, the computing device including physical display 5614 and keyboard 5611. The physical display 5614 of the computing device is configured to display digital content, such as a plurality of real digital objects 5615, to user 5612. For illustration purposes, physical display 5614 of the computing device is depicted here as a computer monitor configured to display digital content to the user 5612. Wearable extended reality appliance 5613 is in wireless communication with the computing device and is configured to display virtual digital content, such as virtual digital objects, to user 5612 when the computing device is in the second display mode. The virtual digital content displayed to user 5612 includes virtual digital objects 5616, virtual digital object 5618, and virtual digital object 5619. When the computing device is operating in the second display mode, the location of virtual digital objects 5616, virtual digital object 5618, and virtual digital object 5619 depend on the location of particular physical objects.

As shown, the location of virtual digital objects 5616 depend on the location of physical display 5614. Virtual digital objects 5616 are contained in a virtual region that is locked to physical display 5614 at a distance away from physical display 5614. Virtual digital objects 5616 are also at a fixed position within the virtual region that is locked to physical display 5614. In this example, the physical display 5614 acts as a physical object. In another example, virtual digital objects 5616 may be locked at a distance from at least one of the real digital objects 5615 displayed via the physical display 5614. As another example, the location of virtual digital object 5618 is docked on top of keyboard 5611 and depends on the location of keyboard 5611. The location of virtual digital object 5618 depends on the location of keyboard 5611 at least because one point of virtual digital object 5618 is fixed relative to at least one point on keyboard 5611 such that a location of virtual digital object 5618 will stay in the same location as keyboard 5611 and may move with keyboard 5611.

As another example, when the computing device is operating in the second display mode, the location of virtual digital object 5619 depends on the location of physical object 5617. For example, virtual digital object 5619 is located at a set distance from physical object 5617 so that it does not hide the physical object 5617 from user 5612. In this example, physical object 5617 is a mobile communication device; however, as discussed above, it is to be understood that a physical object may include any other physical object having at least one recognizable surface or boundary. In one example, virtual digital object 5619 may be configured to move with, move to, and/or move from physical object 5617. In another example, the position of virtual digital object 5619 relative to physical object 5617 may change in response to an action of physical object 5617 (e.g., receiving a text message).

Some embodiments involve determining a usage status of the wearable extended reality appliance. The term "usage status" may relate to a state of use, condition for use, and/or suitability for use of the wearable extended reality appliance described above at any point in time. In some embodiments, a usage status of the wearable extended reality appliance may include a power status of the wearable extended reality appliance (e.g., on or off), an engagement status of the user of the wearable extended reality appliance (e.g., whether the user is interacting with the digital content or has interacted with the digital content recently), a connection status of the wearable extended reality appliance (e.g., connected or disconnected to a computing device), a battery status of the wearable extended reality appliance (e.g., full battery, partial battery, low battery, or no battery), a hardware and/or software status of the wearable extended reality appliance (e.g., operating normally or abnormally), and/or any identifiable measure, or combination of measures, of the wearable extended reality appliance's state, condition, and/or suitability for use.

As used herein, the determination of the usage status of the wearable extended reality appliance may be based on information related to past and/or present usage, operation, and/or general utilization of a particular computing device, the wearable extended reality appliance, and/or another device used in connection with the particular computing device and/or the wearable extended reality appliance. The determination of the usage status of the wearable extended reality appliance may occur at any given point of time (e.g., at startup of the computing device and/or the wearable extended reality appliance) or over any period of time. Any form of data and/or input received by, processed by, and/or stored by at least one computing device that is related to the wearable extended reality appliance's state, condition, and/or suitability for use may be utilized to determine a usage status of the wearable extended reality appliance. In one example, the usage status of the wearable extended reality appliance may be determined based on at least one form of data stored in the computing device and/or the wearable extended reality appliance relating to past usage of the wearable extended reality appliance (e.g., predicted behavior and/or preferences of the wearer of the wearable extended reality appliance). For example, if the user has a tendency to wear the wearable extended reality appliance when they are finished using the wearable extended reality appliance, a usage status of the wearable extended reality appliance may indicate that the user is no longer interacting with the digital content after some amount of time based on data related to prior use and/or user preferences.

In another example, the usage status of the wearable extended reality appliance may be determined based on at least one input received by the computing device and/or the wearable extended reality appliance, indicating the wearable extended reality appliance is ready for use. For example, a webcam may capture image data indicating the user is wearing the wearable extended reality appliance. Additionally, or alternatively, a sensor on the computing device or the wearable extended reality appliance may indicate that the user is wearing the wearable extended reality appliance or that the wearable extended reality appliance has sufficient battery for use within the extended reality environment.

In one embodiment, the usage status of the wearable extended reality appliance is determined based on data indicating when the wearable extended reality appliance is active. As used herein, the term "active" may refer to an activity status of the wearable extended reality appliance indicating that the wearable extended reality appliance and/or the user of the wearable extended reality appliance is engaged or ready to engage or interact with the extended reality environment. In some embodiments, data indicating when the wearable extended reality appliance is active may relate to any information used by the computing device and/or wearable extended reality appliance to determine or analyze the activity of the wearable extended reality appliance and/or the user to determine if the wearable extended reality appliance is ready for use, and/or the user is ready to use the wearable extended reality appliance, in the extended reality environment.

In one example, the wearable extended reality appliance may be active when the power status of the wearable extended reality appliance is "on." The wearable extended reality appliance may be turned on by pressing a power button on the wearable extended reality appliance such that power is delivered to individual components of the wearable extended reality appliance. In another example, the wearable extended reality appliance may be active when the user of the wearable extended reality appliance is engaged with the extended reality environment or when digital content is ready for display within the extended reality environment via a wearable extended reality appliance. The user of the wearable extended reality appliance may be engaged with the wearable extended reality appliance when it is turned on, when the user is ready to use the wearable extended reality appliance (e.g., computing device is on and the user is near the physical display), and/or when the user is currently using the wearable extended reality appliance. In yet another example, the wearable extended reality appliance may be active when the wearable extended reality appliance is connected to, or otherwise in communication with, a computing device. Alternatively, the wearable extended reality appliance may be inactive when the wearable extended reality appliance is disconnected from the computing device.

In another embodiment, the usage status of the wearable extended reality appliance is determined based on data indicating when the wearable extended reality appliance is physically connected through a wire to a port of the computing device. As used herein, the term "physically connected" may be used to refer to a connection status of the wearable extended reality appliance in which the wearable extended reality appliance is attached via a wire to a computing device and/or to at least one peripheral device of the computing device including a keyboard, a mouse, or a monitor. When the wearable extended reality appliance is physically connected to the computing device through a wire to a port (e.g., a port capable of facilitating the transmission of data related to the usage status of the wearable extended reality appliance) of the computing device, the wearable extended reality appliance may be configured to transmit information directly or indirectly to the computing device. In one example, the wearable extended reality appliance may be configured to charge and transmit information to the computing device simultaneously. In another example, the wearable extended reality appliance may be physically connected to a wired keyboard connectable to a computing device via at least one input of the computing device. In another example, the wearable extended reality appliance may be physically connected to a wireless keyboard in communication with the computing device. In yet another example, the wearable extended reality appliance may be physically connected to a physical display in communication with the computing device.

In another embodiment, the usage status of the wearable extended reality appliance is determined based on input from a sensor indicating when the wearable extended reality appliance is worn. As used herein, the term "sensor" may relate to any device in communication with the wearable extended reality appliance and/or the computing device configured to detect and/or measure a property associated with the user, the user's action, user's environment, and/or a property associated with the wearable extended reality appliance. In one example, sensor data may be based on information captured using one or more sensors of an input device in communication with the computing device. In another example, sensor data may be based on information captured using one or more sensors of the extended reality appliance. In yet another example, sensor data may be based on information captured using a combination one or more sensors of an input device in communication with the computing device and using one or more sensors of the extended reality appliance.

In some embodiments, the sensor may include one or more image sensors (e.g., configured to capture images and/or videos of a user of the appliance or of an environment of the user), one or more motion sensors (such as an accelerometer, a gyroscope, a magnetometer, etc.), one or more positioning sensors (such as GPS, outdoor positioning sensor, indoor positioning sensor, etc.), one or more temperature sensors (e.g., configured to measure the temperature of at least part of the appliance and/or of the environment), one or more contact sensors, one or more proximity sensors (e.g., configured to detect whether the appliance is currently worn), one or more electrical impedance sensors (e.g., configured to measure electrical impedance of the user), one or more eye tracking sensors, such as gaze detectors, optical trackers, electric potential trackers (e.g., electrooculogram (EOG) sensors), video-based eye-trackers, infra-red/near infra-red sensors, passive light sensors, or any other technology capable of determining a usage status of the wearable extended reality appliance.

The computing device may use input data (e.g., stimulus, response, command, and/or instruction targeted to a processing device) from at least one sensor to determine the usage status of the wearable extended reality appliance. For example, an input may be received by the at least one processor via an input interface (e.g., input interface 430 of FIG. 4 and/or input interface 330 of FIG. 3), by a sensor associated with the wearable extended reality appliance (e.g., sensor interface 470 or 370), by a different computing device communicatively coupled to the wearable extended reality appliance (e.g., mobile device 206 and/or remote processing unit 208 of FIG. 1), or any other source of input, for example, a camera (e.g., as gesture input or input relating to the usage of the wearable extended reality appliance).

As used herein, "input from a sensor indicating when the wearable extended reality appliance is worn" may relate to any sensor data indicating that the wearable extended reality appliance is currently on, donned by, or a part of a user as a wearable electronic device such that the wearable extended reality appliance is capable of presenting an extended reality to the user. In one example, a proximity sensor, or combination of proximity sensors, connected to a physical display may provide sensor data indicating a presence of the wearable extended reality appliance in proximity to the physical display. For example, data from proximity sensors, or a combination of proximity sensors may be used to determine that the wearable extended reality appliance is in a position relative to the computing device or a peripheral device that is indicative of the wearable extended reality appliance being worn. In another example, an electrical impedance sensor and/or a motion sensor included in the wearable extended reality appliance may provide sensor data indicating the user is ready to engage or interact with the extended reality environment via the wearable extended reality appliance.

In another embodiment, the usage status of the wearable extended reality appliance is determined based on image data captured using an image sensor. The term "image sensor" may include any instrument or group of instruments capable of converting rays of light (e.g., photons) into electrical signals. Examples of image sensors include CCD and CMOS arrays. Other types of image sensors include Lidar and radar sensors. In some examples, the image sensor may be included in the extended reality appliance, in the computing device, in an input device, and/or in an environment of the user. In one example, the image sensor may be in or on a laptop or computer monitor in communication with the computing device such as an integrated, built-in, or standalone webcam. In another example, the image sensor may be a part of the extended reality appliance.

As used herein, the term "image data" may relate to any data captured by one or more image sensors and may be understood as described earlier. At least one processor may be configured to determine the usage status of the wearable extended reality appliance based on image data from any combination of signals emitted and/or reflected off physical objects in the extended reality environment, data stored in memory (e.g., for the location of stationary objects), predicted behavior and/or preferences of the wearer of the wearable extended reality appliance, ambient conditions (e.g., light, sound, dust), and any other criterion for determining a relative position of the wearable extended reality appliance and/or physical objects in the extended reality environment. The signals may include any combination of image data and/or IR signals detected by a camera (e.g., image sensor 472 of FIG. 4), position, location, and orientation data acquired by an IMU and/or GPS unit (e.g., motion sensor 473), ultrasound, radio (e.g., Wi-Fi, Bluetooth, Zigbee, RFID) detected via suitable sensors (e.g., other sensors 475). In one example, the image data may indicate the proximity of the user and whether the user is wearing the wearable extended reality appliance. In another example, the image data may indicate the position of the user relative to the wearable extended reality appliance. In another example, the image data may indicate the position of the user and/or the wearable extended reality appliance relative to the physical display.

In some examples, the image data captured using the image sensor may be analyzed to determine the usage status of the wearable extended reality appliance. For example, a machine learning model (such as a classification model) may be trained using training examples to determine usage statuses of wearable extended reality appliances from images and/or videos. An example of such training example may include a sample image and/or sample video associated with a sample wearable extended reality appliance, together with a label indicating the usage status of the sample wearable extended reality appliance. The trained machine learning model may be used to analyze the image data captured using the image sensor and determine the usage status of the wearable extended reality appliance. In some examples, at least part of the image data may be analyzed to calculate a convolution of the at least part of the image data and thereby obtain a result value of the calculated convolution. Further, in response to the result value of the calculated convolution being a first value, one usage status of the wearable extended reality appliance may be determined, and in response to the result value of the calculated convolution being a second value, another usage status of the wearable extended reality appliance may be determined. In some examples, the image data may be analyzed to determine a type of environment of the wearable extended reality appliance, for example using scene recognition algorithms, and the usage status of the wearable extended reality appliance may be determined based on the type of the environment of the wearable extended reality appliance. In some examples, the image data may be analyzed to detect objects in the environment of the wearable extended reality appliance, for example using object detection algorithms, and the usage status of the wearable extended reality appliance may be determined based on the objects in the environment of the wearable extended reality appliance. In some examples, the image data may be analyzed to detect activities in the environment of the wearable extended reality appliance, for example using event detection algorithms, and the usage status of the wearable extended reality appliance may be determined based on the activities in the environment of the wearable extended reality appliance.

In another embodiment, the usage status of the wearable extended reality appliance is determined based on data indicating when a communication channel is established between the computing device and the wearable extended reality appliance. The term "communication channel" includes any single or group of wired or wireless pathways or other medium over which data or information exchanges may occur. Such channels may permit the transport of data and/or information signals from one or more transmitters to one or more receivers. In one example, a wired transmission medium may relate to a wired communication channel configured to transport data and/or information between the computing device and the wearable extended reality appliance. In another example, a wireless transmission medium may relate to a wireless communication channel configured to transport data and/or information from between the computing device and the wearable extended reality appliance via at least one wireless network. For example, one or more components of the wearable extended reality appliance and/or computing device may communicate directly through a dedicated communication network including BLUETOOTH™ BLUETOOTH LE™ (BLE), Wi-Fi, near field communications (NFC), and/or any other suitable communication methods that provide a medium for exchanging data and/or information between the wearable extended reality appliance and the computing device.

As used herein, a communication channel is "established" between the computing device and the wearable extended reality appliance when the computing device is connected to the wearable extended reality appliance and able to transmit information to and/or receive information from the wearable extended reality appliance via the communication channel. The term "data indicating when a communication channel is established" may relate to any information used by the computing device and/or wearable extended reality appliance to determine the connection status of the wearable extended reality appliance (e.g., connected or disconnected to the computing device). In one example, a connection status of the wearable extended reality appliance may indicate that a communication channel is established (e.g., exchange of data or information is possible) between the computing device and the wearable extended reality appliance. In another example, a connection status of the wearable extended reality appliance may indicate that a communication channel is not established (e.g., exchange of data or information is not possible) between the computing device and the wearable extended reality appliance.

In another embodiment, the usage status of the wearable extended reality appliance is determined based on data indicative of a battery status of the wearable extended reality appliance. As used herein, the "battery status" may refer to the amount of battery life remaining in the wearable extended reality appliance and/or the time it will take to discharge and/or charge the wearable extended reality appliance if connected to a power source. In some examples, data indicative of a battery status of the wearable extended reality appliance may relate to any information used by the computing device and/or wearable extended reality appliance to determine the battery status of the wearable extended reality appliance and/or determine if the wearable extended reality appliance is suitable for use in the extended reality environment. In one example, when the battery status indicates the battery is full battery or partial battery, the wearable extended reality appliance may be suitable for use in the extended reality environment. In another example, when the battery status indicates the battery is low battery or no battery, the wearable extended reality appliance may not be suitable for use in the extended reality environment.

Some embodiments involve selecting a display mode based on the usage status of the wearable extended reality appliance. The term "selecting a display mode" may refer to a picking or choosing a display mode for displaying digital objects from among a plurality of display modes, as display modes are described earlier. For example, the computing device may select a first display mode or a second display mode in view of the determined usage status (e.g., a first usage status or a second usage status). In some embodiments, the usage status of a wearable extended reality appliance may inform the determination of the display mode in which certain digital objects are displayed for presentation to a user via a physical display of a computing device and/or a wearable extended reality appliance. In one example, a first usage status of the wearable extended reality appliance may inform the computing device that the wearable extended reality appliance is unsuitable for use in the extended reality environment at or for a particular time. When the usage status of the wearable extended reality appliance indicates that the wearable extended reality appliance is in a first usage status, the computing device may select a first display mode in which digital objects are displayed via physical display.

By way of a non-limiting example, turning to FIG. 55A, user 5512 is shown not wearing a wearable extended reality appliance. Because user 5512 is not wearing a wearable extended reality appliance, data from at least one sensor of a wearable extended reality appliance and/or at least one image sensor of computing device 5514 indicates the wearable extended appliance is not being worn by user 5512. In view of data indicating the wearable extended appliance is not being worn by user 5512, a processor of computing device 5514 determines the usage status of the wearable extended reality appliance is a first usage status. When the usage status of a wearable extended reality appliance is a first usage status, the at least one processor selects the first display mode 5510 for displaying real digital objects 5519A to 5519C to user 5512 via physical display 5515 of computing device 5514.

In another example, a second usage status of the wearable extended reality appliance may inform the computing device that the wearable extended reality appliance is suitable for use in an extended reality environment at or for a particular time. When the usage status of the wearable extended reality appliance indicates that the wearable extended reality appliance is in a second usage status, the computing device may select a second display mode in which virtual digital objects are displayed via the wearable extended reality appliance. In some embodiments, the computing device may be configured to switch between different selected display modes in real time or near real time in response to a change in usage status of the wearable extended reality appliance.

By way of a non-limiting example, turning to FIG. 55B, user 5512 is shown wearing wearable extended reality appliance 5513. Because user 5512 is wearing wearable extended reality appliance 5513, data from at least one sensor of the wearable extended reality appliance 5513 and/or at least one image sensor of computing device 5514 indicates wearable extended reality appliance 5513 is being worn by user 5512. Additionally, wearable extended reality appliance 5513 is shown to be physically connected to computing device 5514 and a communication channel is established between computing device 5514 and wearable extended reality appliance 5513. Because wearable extended reality appliance 5513 is physically connected and in communication with the computing device 5514, data received by the computing device indicates wearable extended reality appliance 5513 is in condition for use.

In view of data indicating the wearable extended reality appliance 5513 being worn by user 5512, is connected to computing device 5514, and is in communication with computing device 5514, a processor of computing device 5514 determines the usage status of the wearable extended reality appliance is a second usage status. When the usage status of wearable extended reality appliance 5513 is a second usage status, the at least one processor selects the second display mode 5511 for displaying real digital objects 5519B and 5519C to user 5512 via physical display 5515 and virtual digital objects 5520 and 5521 via wearable extended reality appliance 5513.

Some embodiments involve, in response to the display mode selection, outputting for presentation the plurality of digital objects in a manner consistent with the selected display mode. The term "outputting for presentation" relates to a transmission of signals to cause digital content or virtual digital content to be presented for viewing by a user via a physical display or via a wearable extended reality appliance. In some embodiments, the outputting of digital objects for presentation may occur after a display mode has been selected and/or after a display mode has changed. As used herein, "a manner consistent with the selected display mode" may refer to the way in which real digital objects and/or virtual digital objects may be displayed, shown, or caused to appear for view by a user according to the method specified by the selected display mode. For example, when the first display mode is selected, the computing device may output the plurality of digital objects for display via the physical display. In another example, when the second display mode is selected, the computing device may output some of the plurality of digital objects for display via the physical display and at least one other of the plurality of digital objects for display via the wearable extended reality appliance.

By way of a non-limiting example, turning to FIG. 55A, when the first display mode 5510 is selected, at least one processor of the computing device 5514 outputs for presentation the plurality of digital objects in a manner consistent with the first display mode 5510. Here, the plurality of digital objects includes real digital objects 5519A to 5519C to be displayed to user 5512 via physical display 5515 of computing device 5514. Turning to FIG. 55B, when the second display mode 5511 is selected, at least one processor of the computing device 5514 outputs for presentation the plurality of digital objects in a manner consistent with the second display mode 5511. Here, the plurality of digital objects includes real digital objects 5519B and 5519C to be displayed to user 5512 via physical display 5515 and virtual digital objects 5520 and 5521 to be displayed to user 5512 via wearable extended reality appliance 5513.

In some embodiments, when the selected display mode is the second display mode, outputting for presentation the plurality of digital objects includes causing the at least one other of the plurality of digital objects to be displayed via the wearable extended reality appliance while the some of the plurality of digital objects are concurrently displayed via the physical display. "At least one other" of the plurality of digital objects are generated by the computing device in the second display mode and presented via the wearable extended reality appliance. The at least one other of the plurality of digital objects includes a virtual digital object or virtual digital objects consistent with the virtual digital objects described above. As used herein, the term "concurrently displayed" refers to the simultaneous display of real digital objects to the user via the physical display and virtual digital objects to the user via the wearable extended reality appliance. For example, in the second display mode, the at least one other of the plurality of digital objects (i.e., at least one virtual digital object) may be displayed to the user via the wearable extended reality appliance while some of the plurality of digital objects (i.e., some of the real digital objects) are displayed to the user via the physical display at the same time.

By way of a non-limiting example, turning to FIG. 55B, when the second display mode 5511 is selected, at least one processor of computing device 5514 outputs for presentation the plurality of digital objects in a manner consistent with the second display mode 5511. Here, the plurality of digital objects includes real digital objects 5519B and 5519C to be displayed to user 5512 via physical display 5515 and virtual digital objects 5520 and 5521 to be displayed to user 5512 via wearable extended reality appliance 5513. At least one other of the plurality of digital objects (e.g., virtual digital object 5520) is displayed via wearable extended reality appliance 5513 while the some of the plurality of digital objects (e.g., real digital object 5519B and real digital object 5519C) are concurrently displayed via the physical display 5515.

In another embodiment, when the selected display mode is the second display mode, outputting for presentation the plurality of digital objects includes presenting at least one digital object concurrently via the wearable extended reality appliance and via the physical display. For example, in the second display mode, at least one digital object may be displayed to the user via the wearable extended reality appliance and via the physical display at the same time. The at least one digital object may be presented to the user as a virtual digital object via the wearable extended reality appliance and concurrently presented to the user as a real digital object via the physical display.

By way of a non-limiting example, turning to FIG. 56 when the second display mode is selected, at least one processor of the computing device outputs for presentation the plurality of digital objects including real digital objects 5615 to be displayed to user 5612 via physical display 5614 and virtual digital objects 5616, virtual digital object 5618, and virtual digital object 5619 to be displayed to user 5612 via wearable extended reality appliance 5613. Here, a digital object for controlling computer settings is concurrently displayed via wearable extended reality appliance 5513 (e.g., as virtual digital object 5618) and via the physical display 5614 (e.g., as one of real digital objects 5615).

Some embodiments involve determining to display, in the second display mode, the at least one other of the plurality of digital objects via the wearable extended reality appliance. As used herein, "determining to display in the second display mode" may refer to a decision or causation to present particular digital objects, or groups of digital objects, to the user in the second display mode. In some embodiments, determining whether to display in the second display mode may be based on data and/or information related to past and/or present usage of the wearable extended reality appliance and/or any other peripheral device in communication with the computing device. A peripheral device may include any input and/or output device or devices directly or indirectly connected to, or otherwise in communication with, a computing device and/or the extended reality appliance. In some embodiments, determining to display in the second display mode may be based on data and/or information related to a specific digital object and/or groups of digital objects configured to be presented to a user. For example, information related to the usage, form, and/or function of a specific digital object, or groups of digital objects, may be utilized to determine which digital object, or groups of digital objects, are to be displayed for presentation via a physical display of a computing device and which of the digital objects are to be displayed via the wearable extended reality appliance.

In one embodiment, the determining to display, in the second display mode, the at least one other of the plurality of digital objects via the wearable extended reality appliance is based on user input. The term "user input" may refer to any information and/or data that is sent by the user and received by the computing device for processing. The user may transmit input data and/or information from a variety of input devices, for example, a keyboard, a mouse, a touch pad, a touch screen, one or more buttons, a joystick, a microphone, an image sensor, and any other device configured to detect physical or virtual input. The received input may be in the form of at least one of text, sounds, speech, hand gestures, body gestures, tactile information, and any other type of physically or virtually input generated by the user. In some embodiments, the input received from the user may be used to determine which of the digital objects to display via the physical display and which to display via the wearable extended reality appliance. In some embodiments, the user's input or inputs may be detected and converted into virtual interactions with the extended reality environment thereby enabling the user to select, or otherwise interact with, digital objects within the extended reality environment. For example, a user may drag and drop a digital object from a real environment to an extended reality environment, and vice versa.

In one example, when the computing device is in the second display mode, the user may select, or otherwise interact with, at least one digital object via hand gestures. For example, the user may drag a real digital object displayed via a physical display from the physical display to the wearable extended reality appliance such that the digital object is displayed as a virtual digital object. In another example, when the computing device is in the second display mode, the user may select, or otherwise interact with, at least one digital object via eye gestures. For example, the user may drag a virtual digital object displayed via the wearable extended reality appliance from the extended reality environment to the physical display such that the digital object is displayed as a real digital object. In yet another example, when the computing device is in the second display mode, the user may select, or otherwise interact with, at least one digital object via a cursor by using a computer mouse. For example, the user may drag and drop real digital objects and/or virtual digital objects between the physical display and the wearable extended reality appliance within the extended reality environment.

In one embodiment, the determining to display, in the second display mode, the at least one other of the plurality of digital objects via the wearable extended reality appliance is based on a type of input device connected to the computing device. As used herein, the term "input device" may refer to any device, or combination of devices, configured to provide information and/or data to the computing device for processing. The input device may include any of the above-described input devices configured to detect a physical and/or digital input. As used herein, the term "type of input device" may refer to the category of input device, or input devices, in communication with a computing device. In some embodiments, the category of input device may relate to the use of certain input devices with a particular computing device (e.g., a wireless keyboard vs. a wired keyboard) and/or in a particular environment (e.g., at a user's home office space vs. work office space).

In some embodiments, the category of input device, or input devices, may inform which digital object or digital objects are displayed via the wearable extended reality appliance. In one embodiment, input devices used in conjunction with one particular computing device (e.g., a desktop computer) may relate to one category of input devices (e.g., devices used at a user's work) and input devices used in conjunction with another particular computing device (e.g., a laptop) may relate to another category of input devices (e.g., devices used at a user's home). For example, an input device (e.g., a wired mouse) used in conjunction with the desktop computer may cause at least one particular digital object to be presented to the user via the wearable extended reality appliance, and an input device (e.g., an integrated trackpad) used in conjunction with the laptop computer may cause another particular digital object to be presented to the user via the wearable extended reality appliance. In another embodiment, at least one input device used with a particular computing device's operation in one setting (e.g., the user's home network) may relate to one category of input devices and at least another input device used with the particular computing device's operation in another setting (e.g., the user's office network) may relate to another category of input devices. For example, when a user is using a laptop on their home network, at least one particular digital object may be presented to the user via the wearable extended reality appliance, and when a user is using the laptop on their work network, at least another particular digital object may be presented to the user via the wearable extended reality appliance. In another example, when a user is using a laptop on their home network, at least one particular digital object having a first appearance may be presented to the user via the wearable extended reality appliance, and when a user is using the laptop on their work network, the at least one particular digital object having a second appearance may be presented to the user via the wearable extended reality appliance.

Additionally, or alternatively, the type of input device may refer to the unique characteristics of a particular input device in communication with a computing device. In some embodiments, the unique characteristics of an input device, or input devices, in communication with the computing device may inform which digital object or digital objects are displayed via the wearable extended reality appliance. In one example, in the second display mode, when a first input device (e.g., a wired keyboard) is connected to the computing device, at least one of a first group of digital objects may be presented to the user via the wearable extended reality appliance. In another example, in the second display mode, when a second input device (e.g., a wireless keyboard) is connected to the computing device, at least one of a second group of digital objects may be presented to the user via the wearable extended reality appliance. In yet another example, in the second display mode, when the second input device and a third input device (e.g., a wireless mouse) are connected, at least one of a second group of digital objects and/or a third group of digital objects may be presented to the user via the wearable extended reality appliance.

In one embodiment, determining to display, in the second display mode, the at least one other of the plurality of digital objects via the wearable extended reality appliance is based on past user actions. The term "past user actions" may relate to stored information and/or data corresponding to a user's former interactions with the extended reality environment. In some embodiments, a user's past interactions with the extended reality environment may include a user's prior virtual digital object selection, a user's interactions with digital objects in particular settings and/or at particular times, privacy levels associated with different virtual digital objects, the relationship between virtual digital objects and physical objects, the relationship between virtual digital objects and real digital objects, the user's preferences, the user's past behavior, and any other information and/or data associated with a user's past usage within an extended reality environment.

In one example, a user's past actions may relate to the last time the user docked the at least one digital object to a particular physical object. Because of the past action concerning the docking of the at least one digital object, it may be determined to display the digital object via a wearable extended reality appliance (e.g., docked to the particular physical object) and/or to display the digital object via a physical display. In another example, a user's past actions may relate to the last digital object a user was interacting with in a particular setting. Because of the past action concerning the last digital object a user was interacting with in a particular setting, it may be determined to display the digital object via a wearable extended reality appliance (e.g., virtually displaying a digital object relative to one physical object within a work setting) and/or to display the digital object via a physical display (e.g., not virtually displaying a digital object relative to one physical object within a home setting and only displaying the digital object via a physical display).

In another example, a user's past actions may relate to the last digital object a user was interacting with at a particular time. Because of the past action concerning the last digital object a user was interacting with at a particular time, it may be determined to display the digital object via a wearable extended reality appliance (e.g., if a digital object is routinely opened for display via a wearable extended reality appliance at a first time of the day) and/or to display the digital object via a physical display (e.g., if the same digital object is routinely opened for display via a physical display at a second time of the day). In another example, a user's past actions may relate to display preferences corresponding to certain virtual digital objects. Because of the past action concerning display preferences corresponding to certain virtual digital objects, it may be determined to display the certain digital object via a wearable extended reality appliance and/or a physical display (e.g., when they are commonly opened when other digital objects are open).

In one embodiment, determining to display, in the second display mode the at least one other of the plurality of digital objects via the wearable extended reality appliance is based on at least one predefined rule. The term "predefined rule" includes any predetermined condition that serves as a trigger for object display. In some embodiments, a predefined rule may delineate parameters for what digital objects to display, or not display, as virtual digital objects via the wearable extended reality appliance when the computing device is in the second display mode. In some embodiments, at least one predefined rule may be triggered at or for a particular time in response to information and/or data corresponding to at least one action, option, and/or environment that may be distinguishable from some other action, option, and/or environment. For example, at least one predefined rule may be defined such that a weather widget must be presented virtually. In another example, at least one predefine rule may be defined such that a text editing application must be presented virtually to allow user to edit in a magnified view.

In some embodiments, multiple predefined rules may be triggered simultaneously at the same time or over a period of time. For example, at least one predefined rule may be defined such that when mathematical equations are present on a physical display, a calculator and a notepad are presented virtually in an extended reality environment via the wearable extended reality appliance while other virtual digital objects are caused to disappear from the extended reality environment. In another embodiment, a predefined rule may call for a particular group of digital objects to be displayed, or not displayed, as virtual digital objects, in response to user input. For example, at least one predefined rule may be defined such that when a user opens an application using a mouse as an input, the application is displayed to the user via the physical display, and when a user opens an application using hand gestures as an input, the application is displayed to the user via the wearable extended reality appliance.

In some embodiments, a predefined rule may call for a particular group of digital objects to be displayed, or not displayed, as virtual digital objects, in response to certain operating conditions of the computing device and/or the wearable extended reality appliance. For example, at least one predefined rule may be defined such that when the battery of the wearable extended reality appliance and/or the computing device is low (e.g., below 20%), a first subset of applications may be available for display via the wearable extended reality appliance, and when the battery of the wearable extended reality appliance and/or the computing device is very low (e.g., below 10%), a second subset of applications that is less than the first subset of applications may be available for display via the wearable extended reality appliance. In yet another embodiment, a predefined rule may define the manner in which certain virtual digital objects are presented to the user. For example, at least one predefined rule may be defined such when a particular digital object, such as a clock widget, is displayed virtually, the clock widget is displayed at a particular location on a user's wall.

Some embodiments involve identifying a change in the usage status of the wearable extended reality appliance. In one example, while the plurality of digital objects are presented in a manner consistent with the first display mode, the at least one processor may perform operations for identifying a change in the usage status of the wearable extended reality appliance from a first usage status corresponding to the first display mode to a second usage status corresponding to the second display mode. In another example, while the plurality of digital objects are presented in a manner consistent with the second display mode, the at least one processor may perform operations for identifying a change in the usage status of the wearable extended reality appliance.

As used herein, a "change in the usage status" of the wearable extended reality appliance may relate to any identifiable adjustment, modification, revision, shift, transition, or variation in a state of use, condition for use, and/or suitability for use of the wearable extended reality appliance. For example, an identifiable change in the usage status may include a change from one particular usage status (e.g., a first usage status of a high battery level) of the wearable extended reality appliance to another usage status (e.g., a second usage status of a low battery level) or vice-versa that is inconsistent with a current display mode. In another example, an identifiable change in the usage status may relate to a change in the user's degree of interaction with digital content (e.g., the user has not interacted with digital content in the past 5 minutes). In another example, an identifiable change in the usage status may relate to a change in the connection status of the wearable extended reality appliance (e.g., connecting the wearable extended reality appliance to a computing device).

In one example, a change in the usage status of the wearable extended reality appliance may relate to a change from the first usage status corresponding to the first display mode to a second usage status corresponding to the second display mode. In another example, a change in the usage status of the wearable extended reality appliance may relate to a change from a second usage status corresponding to the second display mode to a first usage status corresponding to the first display mode. In yet another example, a change in the usage status of the wearable extended reality appliance may relate to a change from a second usage status corresponding to the second display mode to a third usage status corresponding to a display mode that is different from the first display mode and the second display mode.

As used herein, "identifying a change in the usage status" may include sensing, detecting, or receiving an indication that a usage status, as previously described, has changed. The identification may be conducted in a manner similar to the processes for determining a usage status of the wearable extended reality appliance described above. In one embodiment, any identifiable measure, or combination of measures, of the wearable extended reality appliance's state, condition, and/or suitability for use may be utilized to identify a change in the usage status of the wearable extended reality appliance. For example, a change in the usage status of the wearable extended reality appliance may be detected in response to battery voltage, temperature of operating components, or ambient light and/or sound conditions, the location of physical objects, and/or any other factor related to the wearable extended reality appliances usage. In one embodiment, the change in the usage status of the wearable extended reality appliance may be identified based on any form of data and/or information received by, processed by, and/or stored by at least one computing device that is related to a change in the usage of the wearable extended reality appliance's state, condition, and/or suitability for use. In another example, the change in the usage status of the wearable extended reality appliance may be identified based on at least one input received by the computing device and/or the wearable extended reality appliance indicating the wearable extended reality appliance is appropriate for use or no longer appropriate for use.

Some embodiments involve updating the display mode selection and/or revising the presentation of the plurality of digital objects in response to an identified change of the usage status of the wearable extended reality appliance. "Updating the display mode selection" may relate to a change to the display mode in response to an identified change to the usage status of the wearable extended reality appliance. In some embodiments, the particular display mode in which the computing device was operating prior to the identified change in usage status of the wearable extended reality appliance may be updated to another display mode that is consistent with the present usage status. In some embodiments, when the plurality of digital objects are presented in a manner consistent with the second display mode and a change in the usage status of the wearable extended reality appliance is identified, in response to the identified change in the usage status, the at least one processor may perform operations for updating the display mode selection from the second display mode to the first display mode. For example, in response to an identified change from the second usage status corresponding to the second display mode to a first usage status, the display mode may be updated from the second display mode to the first display mode. In another example, in response to an identified change from the first usage status corresponding to the first display mode to a second usage status, the display mode may be updated from the first display mode to the second display mode.

By way of a non-limiting example, referring back to FIGS. 55A and 55B, computing device 5514 is configured to analyze input signals indicating when wearable extended reality appliance 5513 is in a first usage status or a second usage status. When the wearable extended reality appliance is in a first usage status (e.g., not being worn by user 5512), as illustrated in FIG. 55A, the plurality of digital objects (e.g., real digital objects 5519A to 5519C and cursor 5518A) are presented to user 5512 via physical display 5515 in a manner consistent with the first display mode 5510. When wearable extended reality appliance 5513 is in a second usage status (e.g., worn by user 5512), as illustrated in FIG. 55B, the plurality of digital objects (e.g., real digital objects 5519B and 5519C, virtual cursor 5518B, virtual digital object 5520, and virtual digital object 5521) are presented to user 5512 in a manner consistent with the second display mode 5511. As shown, real digital objects 5519B and 5519C are presented via the physical display 5515. Virtual cursor 5518B, virtual digital object 5520, and virtual digital object 5521 are presented via wearable extended reality appliance 5513.

When computing device 5514 identifies the usage status of the wearable extended reality appliance 5513 has changed from a first usage status (as shown in FIG. 55A) to a second usage status (as shown in FIG. 55B), the display mode selection is updated. In response to the identified change in the usage status, computing device 5514 updates the display mode selection from a first display mode 5510 (as shown in FIG. 55A) to a second display mode 5511 (as shown in FIG. 55B). Additionally, when computing device 5514 identifies the usage status of the wearable extended reality appliance 5513 has changed from a second usage status (as shown in FIG. 55B) to a first usage status (as shown in FIG. 55A), the display mode selection is updated. In response to the identified change in the usage status, computing device 5514 updates the display mode selection from a second display mode 5511 (as shown in FIG. 55B) to a first display mode 5510 (as shown in FIG. 55A).

Some embodiments involve automatically revising the presentation of the plurality of digital objects in response to an identified change in usage status and/or in response to an updated display mode selection of the wearable extended reality appliance. In one embodiment, when a change from the first usage status to the second usage status is identified, in response to the change in the usage status, the at least one processor may perform operations for automatically revising the presentation of the plurality of digital objects to be consistent with the second display mode. In another embodiment, when the display mode is updated from the second display mode to the first display mode, in response to the updated display mode selection, the at least one processor may perform operations for automatically revising the presentation of the plurality of digital objects to be consistent with the first display mode.

As used herein, "revising the presentation of the plurality of digital objects" may relate to a change in the display of the plurality of digital objects to the user of the physical display and/or the wearable extended reality appliance. In some embodiments, the presentation of the plurality of digital objects may be revised in response to the updated display mode. As used herein, the term "automatically" may refer to a change, in real time or near real time, to the presentation of the plurality of digital objects in response to the identified change in the usage status, and/or a resulting change to the display mode in view of the identified change in the usage status, that is made without human intervention. In some embodiments, when the presentation of the plurality of digital objects is revised to be consistent with the second display mode, automatically revising the presentation of the plurality of digital objects may include causing a first digital object from the plurality of digital objects to disappear from the physical display, causing the first digital object to be presented via the wearable extended reality appliance, and/or causing an additional digital object excluded from the plurality of digital objects to be presented via the wearable extended reality appliance. In some embodiments, when the presentation of the plurality of digital objects is revised to be consistent with the first display mode, automatically revising the presentation of the plurality of digital objects may include causing a first digital object and a second digital object previously presented via the wearable extended reality appliance to reappear on the physical display, and/or causing a third digital object previously presented via the wearable extended reality appliance to disappear.

By way of a non-limiting example, referring to FIGS. 55A and 55B, the computing device 5514 is configured to determine whether the usage status of the wearable extended reality appliance 5513 has changed from a first usage status (as shown in FIG. 55A) to a second usage status (as shown in FIG. 55B). When the computing device 5514 identifies a change from the first usage status to the second usage status (e.g., user 5512 puts on wearable extended reality appliance 5513 and wirelessly connects the wearable extended reality appliance 5513 to the computing device 5514), computing device 5514 automatically revises the presentation of the plurality of digital objects to be consistent with the second display mode 5511 (as shown in FIG. 55B).

When the presentation of the plurality of digital objects is revised to be consistent with the second display mode 5511, the automatically revised presentation of the plurality of digital objects includes a first digital object (real digital object 5519A in FIG. 55A) from the plurality of digital objects to disappear from the physical display 5515 and causing the first digital object (virtual digital object 5520 in FIG. 55B) to be presented via the wearable extended reality appliance 5513. Additionally, the automatically revised presentation of the plurality of digital objects includes an additional digital object (virtual digital object 5521) excluded from the plurality of digital objects shown in FIG. 55A to be presented via the wearable extended reality appliance 5513 in FIG. 55B.

In another example, the computing device 5514 is configured to determine whether the usage status of the wearable extended reality appliance 5513 has changed from a second usage status (as shown in FIG. 55B) to a first usage status (as shown in FIG. 55A). When the computing device 5514 identifies a change from the second usage status to the first usage status (e.g., user 5512 takes off wearable extended reality appliance 5513), computing device 5514 automatically revises the presentation of the plurality of digital objects to be consistent with the first display mode 5510 (as shown in FIG. 55A).

When the presentation of the plurality of digital objects is revised to be consistent with the first display mode 5510, the automatically revised presentation of the plurality of digital objects includes a first digital object (virtual digital object 5520 in FIG. 55B) previously presented via the wearable extended reality appliance 5513 to reappear on the physical display as real digital object 5519A in FIG. 55A. Additionally, the automatically revised presentation of the plurality of digital objects excludes an additional digital object (virtual digital object 5521) previously presented via the wearable extended reality appliance 5513 from display via physical display 5515, such that virtual digital object 5521 is caused to disappear from display to user 5512.

Some embodiments involve a system for selectively controlling display of digital objects, the system comprising at least one processor programmed to: generate a plurality of digital objects for display in connection with use of a computing device operable in a first display mode and in a second display mode, wherein in the first display mode, the plurality of digital objects are displayed via a physical display connected to the computing device, and in the second display mode, some of the plurality of digital objects are displayed via the physical display and at least one other of the plurality of digital objects is displayed via a wearable extended reality appliance; determine a usage status of the wearable extended reality appliance; select a display mode based on the usage status of the wearable extended reality appliance; and in response to the display mode selection, output for presentation the plurality of digital objects in a manner consistent with the selected display mode.

Figure 57:
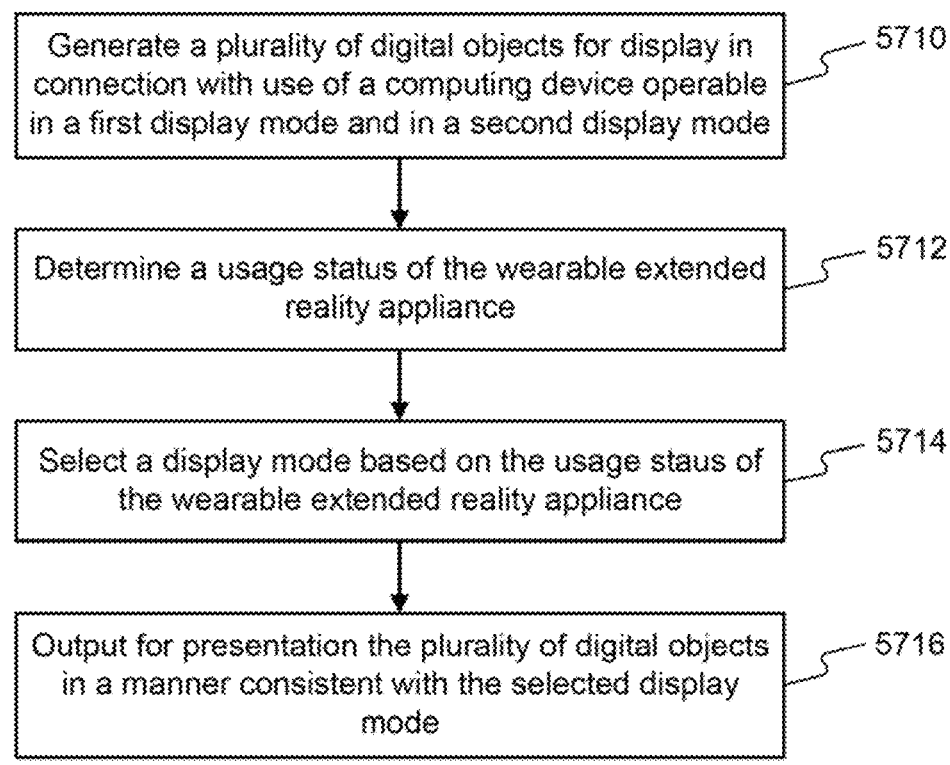
FIG. 57 is a block diagram illustrating an example process for selectively controlling a display of digital objects, consistent with some embodiments of the present disclosure.

FIG. 57 illustrates a flowchart of an example process 5700 for selectively controlling a display of digital objects, consistent with some embodiments of the present disclosure. In some embodiments, process 5700 may be performed by at least one processor (e.g., one or more of server 210 of FIG. 2, mobile communications device 206, processing device 360 of FIG. 3, processing device 460 of FIG. 4, processing device 560 of FIG. 5) to perform operations or functions described herein. In some embodiments, some aspects of process 5700 may be implemented as software (e.g., program codes or instructions) that are stored in a memory (e.g., any of memory devices 212, 311, 411, or 511, or a memory of mobile device 206) or a non-transitory computer readable medium. In some embodiments, some aspects of process 5700 may be implemented as hardware (e.g., a specific-purpose circuit). In some embodiments, process 5700 may be implemented as a combination of software and hardware.

Referring to FIG. 57, process 5700 may include a step S710 of generating a plurality of digital objects for display in connection with use of a computing device operable in a first display mode and in a second display mode, wherein in the first display mode, the plurality of digital objects are displayed via a physical display connected to the computing device, and in the second display mode, some of the plurality of digital objects are displayed via the physical display, and at least one other of the plurality of digital objects is displayed via a wearable extended reality appliance.

Figure 58:
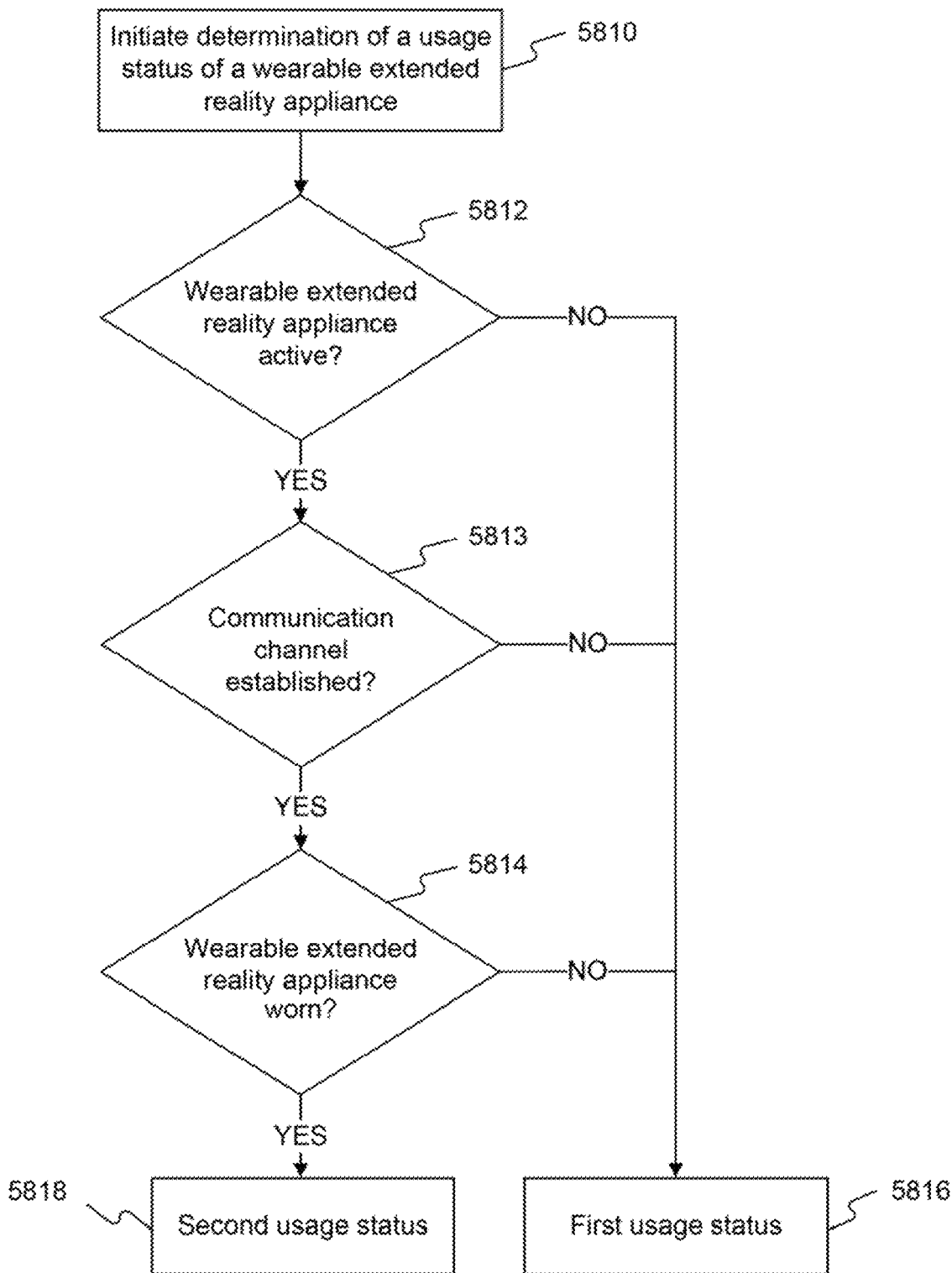
FIG. 58 is a block diagram illustrating an example process for determining a usage status of a wearable extended reality appliance, consistent with some embodiments of the present disclosure.

Process 5700 may include a step S712 of determining a usage status of the wearable extended reality appliance. In some embodiments, the usage status of the wearable extended reality appliance may be determined after the plurality of digital objects are generated for display in connection with use of a computing device by step S710. By way of example, FIG. 58 illustrates one non-limiting example of a process 5800 for determining a usage status of a wearable extended reality appliance. FIG. 58 is an exemplary representation of just one embodiment, and it is to be understood that some illustrated features might be omitted, and others added within the scope of this disclosure.

Process 5800 may include a step S810 of initiating determination of a usage status (e.g., a first usage status or a second usage status) of the wearable extended reality appliance. A processor (e.g., one or more of server 210 of FIG. 2, mobile communications device 206, processing device 360 of FIG. 3, processing device 460 of FIG. 4, processing device 560 of FIG. 5) may determine the usage status, for example, using data indicating when the wearable extended reality appliance is active, when a communication channel is established, or when the wearable extended reality appliance is worn by the user, consistent with some embodiments of the present disclosure.

Process 5800 may include a step S812 of determining whether the wearable extended reality appliance is active, as described above. In one example, when the at least one processor determines that the wearable extended reality appliance is not active (e.g., the wearable extended reality appliance is off), the at least one processor may determine at step S816 that the usage status of the wearable extended reality appliance is a first usage status. Alternatively, when the at least one processor determines that the wearable extended reality appliance is active (e.g., the wearable extended reality appliance is on), the at least one processor may proceed to step S813. In another embodiment, when the at least one processor determines that the wearable extended reality appliance is active, the at least one processor may determine the usage status of the wearable extended reality appliance is a second usage status.

Process 5800 may include a step S813 of determining whether a communication channel is established between the computing device and the wearable extended reality appliance, as described above. In one example, when the at least one processor determines that a communication channel is not established between the computing device and the wearable extended reality appliance (e.g., the wearable extended reality appliance is disconnected from the computing device), the at least one processor may determine at step S816 the usage status of the wearable extended reality appliance is the first usage status. Alternatively, when the at least one processor determines that a communication channel is established between the computing device and the wearable extended reality appliance (e.g., the wearable extended reality appliance is connected to the computing device), the at least one processor may proceed to step S814. In another embodiment, when the at least one processor determines that a communication channel is established between the computing device and the wearable extended reality appliance, the at least one processor may determine the usage status of the wearable extended reality appliance is the second usage status.

Process 5800 may include a step S814 of determining whether the wearable extended reality appliance is worn by the user, as described above. In one example, when the at least one processor determines that the wearable extended reality appliance is not worn by the user (e.g., a proximity sensor detects the wearable extended reality appliance is not in proximity to the computing device and/or an image sensor detects the wearable extended reality appliance is not properly worn), the at least one processor may determine at step S816 the usage status of the wearable extended reality appliance is the first usage status. Alternatively, when the at least one processor determines that the wearable extended reality appliance is worn by the user (e.g., a proximity sensor detects the wearable extended reality appliance is in proximity to the computing device and/or an image sensor detects the wearable extended reality appliance is properly worn), the at least one processor may determine at step S818 the usage status of the wearable extended reality appliance is a second usage status.

Figure 59:
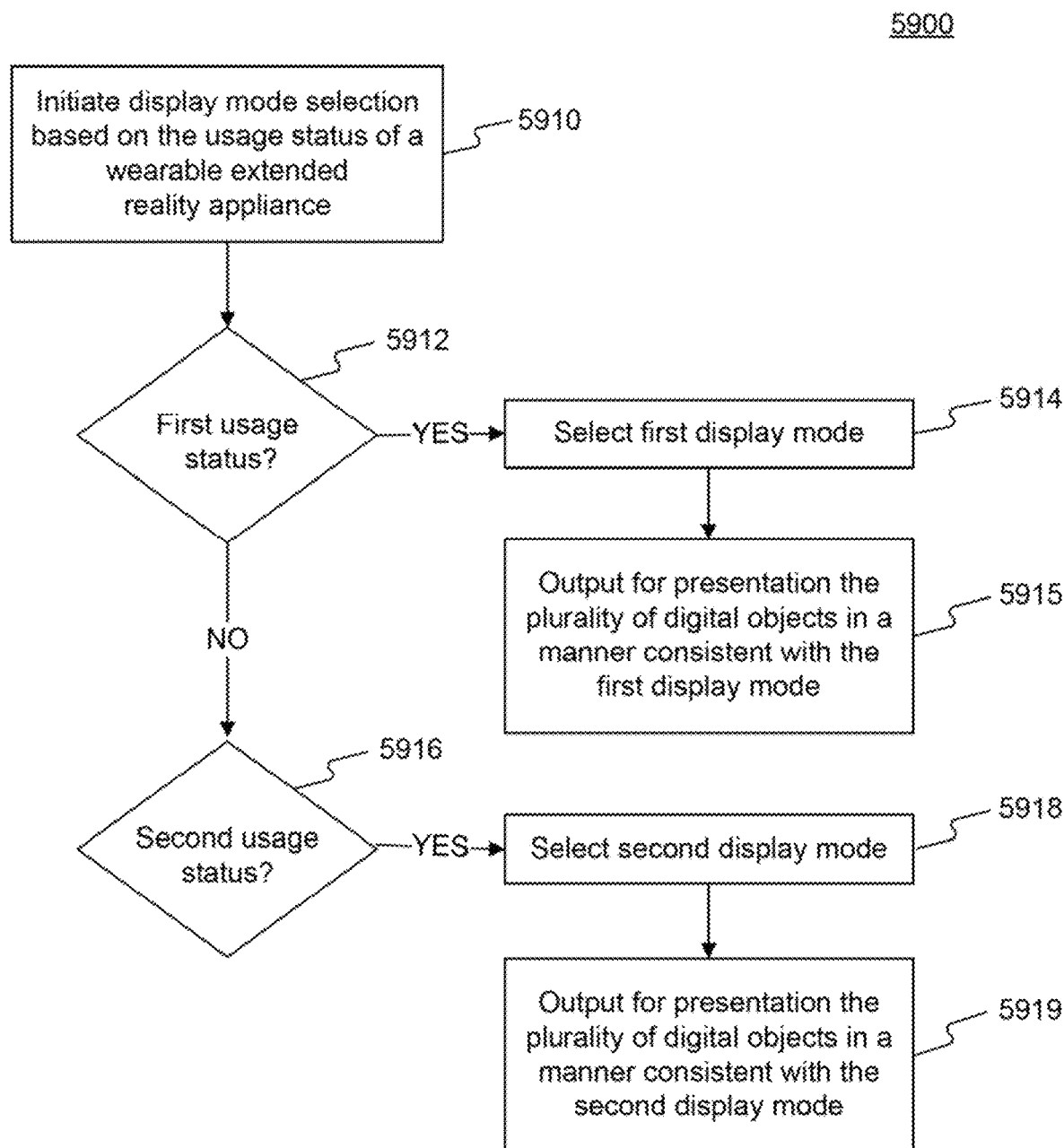
FIG. 59 is a block diagram illustrating an example process for selecting a display mode of a wearable extended reality appliance based on the usage status of the wearable extended reality appliance, consistent with some embodiments of the present disclosure.

Referring back to FIG. 57, process 5700 may include a step S714 of selecting a display mode based on the usage status of the wearable extended reality appliance. In some embodiments, the display mode may be selected after a usage status of the wearable extended reality appliance is determined by step S712. By way of example, FIG. 59 illustrates one non-limiting example of a process 5900 for selecting a display mode of a wearable extended reality appliance based on a usage status of the wearable extended reality appliance. FIG. 59 is an exemplary representation of just one embodiment, and it is to be understood that some illustrated features might be omitted, and others added within the scope of this disclosure.

Process 5900 may include a step S910 of initiating determination of a display mode selection based on a determined usage status of the wearable extended reality appliance, consistent with some embodiments of the present disclosure. A processor (e.g., one or more of server 210 of FIG. 2, mobile communications device 206, processing device 360 of FIG. 3, processing device 460 of FIG. 4, processing device 560 of FIG. 5) may determine the display mode (e.g., a first display mode or second display mode) based on a determination of whether the usage status of the wearable extended reality appliance is a first usage status or a second usage status.

Process 5900 may include a step S912 of determining whether the usage status of the wearable extended reality appliance is a first usage status, consistent with some embodiments of the present disclosure. In one example, when the at least one processor determines that the wearable extended reality appliance is in the first usage status, the at least one processor may select at step S914 the first display mode of the computing device. When the at least one processor determines that the wearable extended reality appliance is not in the first usage status, the at least one processor may proceed to step S916.

Process 5900 may include a step S916 of determining whether the usage status of the wearable extended reality appliance is a second usage status, consistent with some embodiments of the present disclosure. In one example, when the at least one processor determines that the wearable extended reality appliance is in the second usage status, the at least one processor may select at step S918 the second display mode of the computing device. In one embodiment, when the at least one processor determines that the wearable extended reality appliance is not in the second usage status at step S916, the at least one processor may retry step S910. In another embodiment, the at least one processor may determine whether the usage status of the wearable extended reality appliance is a second usage status prior to determining whether the usage status of the wearable extended reality appliance is a first usage status.

Referring back to FIG. 57, process 5700 may include a step S716 of, in response to the display mode selection, outputting for presentation the plurality of digital objects in a manner consistent with the selected display mode. In one embodiment, the plurality of digital objects may be output for presentation after a display mode of the wearable extended reality appliance is selected by step S714. By way of example, FIG. 59 illustrates one non-limiting example of a process 5900 for selecting a display mode of a wearable extended reality appliance and outputting for presentation the plurality of digital objects in a manner consistent with the selected display mode, consistent with some embodiments of the present disclosure.

Process 5900 may include a step S914 of selecting the first display mode of the computing device based on the first usage status of the wearable extended reality appliance, as described above. When the at least one processor selects the first display mode at step S914, the at least one processor outputs for presentation the plurality of digital objects in a manner consistent with the first display mode at step S915. Process 5900 may include a step S918, of selecting the second display mode of the computing device based on the second usage status of the wearable extended reality appliance, as described above. When the at least one processor selects the second display mode at step S918, the at least one processor outputs for presentation the plurality of digital objects in a manner consistent with the second display mode at step S919.

Figure 60:
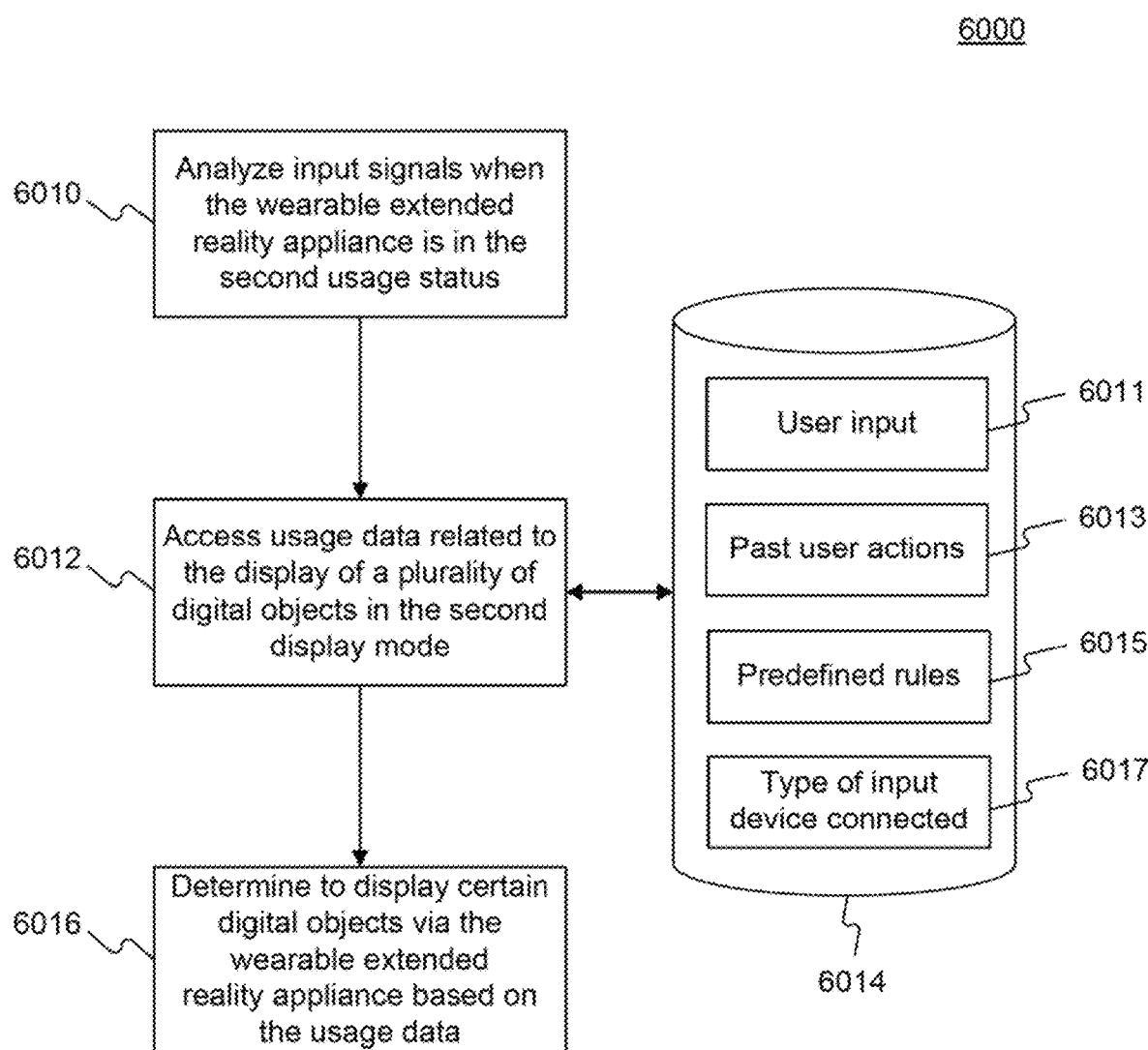
FIG. 60 is a block diagram illustrating an example process for displaying certain digital objects in the second display mode when the wearable extended reality appliance is in a second usage status, consistent with some embodiments of the present disclosure.

FIG. 60 is a flowchart illustrating an exemplary process 6000 for determining to display certain digital objects in the second display mode via a wearable extended reality appliance when the wearable extended reality appliance is in a second usage status, consistent with some embodiments of the present disclosure. FIG. 60 is an exemplary representation of just one embodiment, and it is to be understood that some illustrated features might be omitted, and others added within the scope of this disclosure.

With reference to step 6010 of FIG. 60, instructions contained in a non-transitory computer-readable medium when executed by at least one processor may cause the at least one processor to analyze input signals and stored data and/or information when the wearable extended reality appliance is in the second usage status to determine which digital objects are to be displayed in the second display mode, consistent with some embodiments of the present disclosure. For example, the at least one processor may analyze user input signals captured by at least one sensor in communication with a computing device and/or wearable extended reality appliance. In step 6012, the at least one processor may be caused to access database 6014 related to the display of a plurality of digital objects for presentation in the second display mode. While only one database 6014 is depicted herein for illustrative purposes, it is to be understood that the referenced data and/or information shown therein may be contained in and/or across any number of databases.

In one example, the at least one processor may access data and/or information stored in database 6014 related to at least one user input 6011, described above. Based on data and/or information related to the at least one user input 6011, the at least one processor may determine which of the plurality of digital objects to display via the wearable extended reality appliance in the second display mode at step 6016. In another example, the at least one processor may access data and/or information stored in database 6014 related to at least one past user action 6013, described above. Based on data and/or information related to the at least one past user action 6013, the at least one processor may determine which of the plurality of digital objects to display via the wearable extended reality appliance in the second display mode at step 6016.

In another example, the at least one processor may access data and/or information related to at least one predefined rule 6015, described above. Based on data and/or information related to the at least one predefined rule 6015, the at least one processor may determine which of the plurality of digital objects to display via the wearable extended reality appliance in the second display mode at step 6016. In another example, the at least one processor may access data and/or information stored in database 6014 related to at least one type of input device connected 6017, described above. Based on data and/or information related to the at least one type of input device connected 6017, the at least one processor may determine which of the plurality of digital objects to display via the wearable extended reality appliance in the second display mode at step 6016. In yet another example, the at least one processor may access data and/or information stored in database 6014 related to any combination of user input 6011, past user actions 6013, predefined rules 6015, and/or type of input device connected 6017 to determine which of the plurality of digital objects are to be displayed via the wearable extended reality appliance in the second display mode at step 6016.

Figure 61:
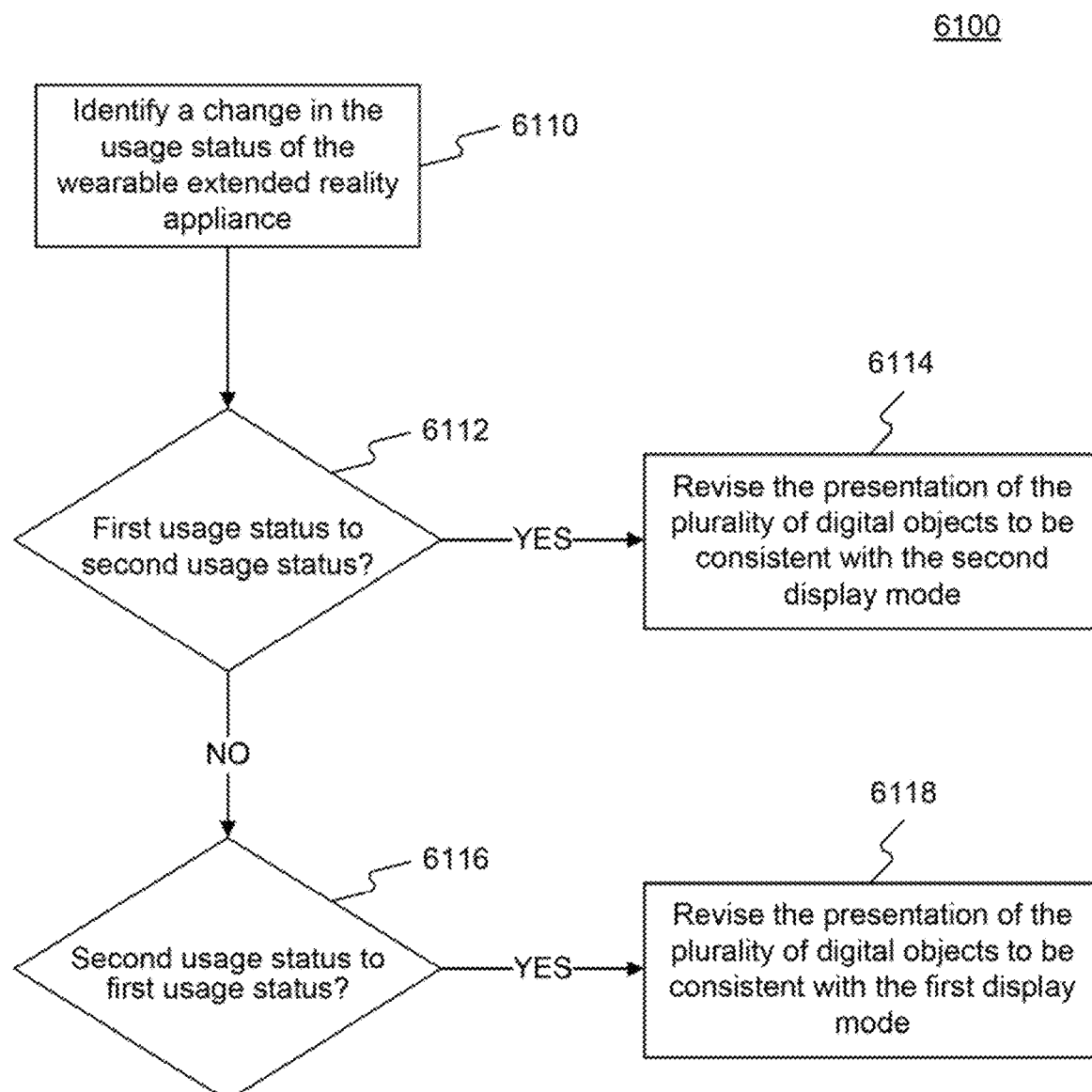
FIG. 61 is a block diagram illustrating an example process for identifying a change in a usage status of a wearable extended reality appliance and revising the presentation of a plurality of digital objects, consistent with some embodiments of the present disclosure.

FIG. 61 is a flowchart illustrating a process 6100 for identifying a change in a usage status of a wearable extended reality appliance and revising the presentation of a plurality of digital objects, consistent with some embodiments of the present disclosure in response to the identified change in the usage status of the wearable extended reality appliance. FIG. 61 is an exemplary representation of just one embodiment, and it is to be understood that some illustrated features might be omitted, and others added within the scope of this disclosure.

With reference to step 6110 of FIG. 61, instructions contained in a non-transitory computer-readable medium when executed by at least one processor may cause the at least one processor to identify a change in the usage status of the wearable extended reality appliance. In step 6112, the at least one processor may be caused to determine whether the usage status of the wearable extended reality appliance has changed from a first usage status to a second usage status, as described above. When the at least one processor identifies a change from the first usage status to the second usage status at step 6112, the at least one processor may be caused to revise the presentation of the plurality of digital objects to be consistent with the second display mode at step 6114.

When the at least one processor determines that the usage status has not changed from the first usage status to the second usage status, the at least one processor may proceed to step 6116. In step 6116, the at least one processor may be caused to determine whether the usage status of the wearable extended reality appliance has changed from a second usage status to a first usage status, as described above. When the at least one processor identifies a change from the second usage status to the first usage status at step 6116, the at least one processor may be caused to revise the presentation of the plurality of digital objects to be consistent with the first display mode at step 6118. In another embodiment, the at least one processor may be caused to make the determination at step 6116 at the same time as and/or before the determination at step 6112.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet. The computing system can include clients and servers. A client and server are generally remote from each other and typically interact through a communication network. The relationship of client and server arises by virtue of computer programs running on the respective computers and having a client-server relationship to each other.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof. And other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The invention claimed is:

1. A non-transitory computer readable medium containing instructions that when executed by at least one processor cause the at least one processor to perform operations for extracting content from a virtual display, the operations comprising:
generating the virtual display via a wearable extended reality appliance, wherein the virtual display presents a group of virtual objects and is located at a first virtual distance from the wearable extended reality appliance;
generating an extended reality environment via the wearable extended reality appliance, wherein
the extended reality environment includes at least one additional virtual object presented at a second virtual distance from the wearable extended reality appliance;
receiving input for causing a specific virtual object from the group of virtual objects to move from the virtual display to the extended reality environment,
wherein the specific virtual object is a window including a group of control buttons in a particular area of the window, the group of control buttons include at least a control button for minimizing the window, a control button for maximizing the window, a control button for closing the window, and a control button for moving the window outside the virtual display; and wherein the input includes an activation of the control button for moving the window outside the virtual display; and
in response to receiving the input, generating a presentation of a version of the specific virtual object in the extended reality environment at a third virtual distance from the wearable extended reality appliance, wherein the third virtual distance differs from the first virtual distance and the second virtual distance.

2. The non-transitory computer readable medium of claim 1, wherein the operations further include causing, in response to receiving the input, a presentation of the specific virtual object to be removed from the virtual display.

3. The non-transitory computer readable medium of claim 1, wherein the operations further include causing, in response to receiving the input, simultaneous presentations of the specific virtual object on the virtual display and the version of the specific virtual object at another location in the extended reality environment.

4. The non-transitory computer readable medium of claim 1, wherein the operations further include determining the third virtual distance for presenting the version of the specific virtual object.

5. The non-transitory computer readable medium of claim 4, wherein the determination of the third virtual distance is based on at least one of the first virtual distance or the second virtual distance.

6. The non-transitory computer readable medium of claim 4, wherein the determination of the third virtual distance is based on a type of the specific virtual object.

7. The non-transitory computer readable medium of claim 4, wherein the determination of the third virtual distance is based on a physical object in the extended reality environment.

8. The non-transitory computer readable medium of claim 1, wherein the operations further include determining a position for presenting the version of the specific virtual object in the extended reality environment.

9. The non-transitory computer readable medium of claim 8, wherein the determination of the position is based on a physical object in the extended reality environment.

10. The non-transitory computer readable medium of claim 1, wherein generating the presentation of the version of the specific virtual object in the extended reality environment includes implementing a modification to the specific virtual object.

11. The non-transitory computer readable medium of claim 10, wherein the modification to the specific virtual object is based on a type of the specific virtual object.

12. The non-transitory computer readable medium of claim 10, wherein the modification to the specific virtual object includes changing a visual appearance of the specific virtual object.

13. The non-transitory computer readable medium of claim 10, wherein the modification to the specific virtual object includes changing a behavior of the specific virtual object.

14. The non-transitory computer readable medium of claim 1, wherein the operations further include receiving an additional input for causing another virtual object from the group of virtual objects to move from the virtual display to the extended reality environment; and in response to receiving the additional input, generating a presentation of a version of the another virtual object in the extended reality environment at a fourth virtual distance from the wearable extended reality appliance, wherein the fourth virtual distance differs from the first virtual distance, the second virtual distance, and the third virtual distance.

15. The non-transitory computer readable medium of claim 1, wherein the operations further include identifying a trigger for halting the presentation of the version of the specific virtual object in the extended reality environment and for presenting the specific virtual object on the virtual display.

16. The non-transitory computer readable medium of claim 1, wherein the operations further include, after generating the presentation of the version of the specific virtual object in the extended reality environment:
while a focus of an operating system controlling the group of virtual objects is a particular virtual object presented in the virtual display, receiving a first input for task switching from a keyboard;
in response to receiving the first input for task switching, causing the focus of the operating system to switch from the particular virtual object presented in the virtual display to the version of the specific virtual object presented in the extended reality environment; and
while the focus of the operating system is the version of the specific virtual object presented in the extended reality environment, receiving a second input for task switching from the keyboard; and in response to receiving the second input for task switching from the keyboard, causing the focus of the operating system to switch from the version of the specific virtual object presented in the extended reality environment to another virtual object presented in the virtual display.

17. The non-transitory computer readable medium of claim 1, wherein the operations further include, after generating the presentation of the version of the specific virtual object in the extended reality environment, receiving an input from a keyboard for a thumbnail view presentation of virtual objects associated with the virtual display, and including a thumbnail version of the specific virtual object presented in the extended reality environment in the thumbnail view presentation of the virtual objects associated with the virtual display.

18. A system for extracting content from a virtual display, the system comprising:
   at least one processor and memory for storing a program for execution by the at least one processor to:
      generate the virtual display via a wearable extended reality appliance, wherein the virtual display presents a group of virtual objects and is located at a first virtual distance from the wearable extended reality appliance;
      generate an extended reality environment via the wearable extended reality appliance, wherein the extended reality environment includes at least one additional virtual object presented at a second virtual distance from the wearable extended reality appliance;
      receive input for causing a specific virtual object from the group of virtual objects to move from the virtual display to the extended reality environment, wherein the specific virtual object is a window including a group of control buttons in a particular area of the window, the group of control buttons include at least a control button for minimizing the window, a control button for maximizing the window, a control button for closing the window, and a control button for moving the window outside the virtual display; and wherein the input includes an activation of the control button for moving the window outside the virtual display; and
      in response to receiving the input, generate a presentation of a version of the specific virtual object in the extended reality environment at a third virtual distance from the wearable extended reality appliance, wherein the third virtual distance differs from the first virtual distance and the second virtual distance.

19. A method for extracting content from a virtual display, the method comprising:
   generating the virtual display via a wearable extended reality appliance, wherein the virtual display presents a group of virtual objects and is located at a first virtual distance from the wearable extended reality appliance;
   generating an extended reality environment via the wearable extended reality appliance, wherein the extended reality environment includes at least one additional virtual object presented at a second virtual distance from the wearable extended reality appliance;
   receiving input for causing a specific virtual object from the group of virtual objects to move from the virtual display to the extended reality environment, wherein the specific virtual object is a window including a group of control buttons in a particular area of the window, the group of control buttons include at least a control button for minimizing the window, a control button for maximizing the window, a control button for closing the window, and a control button for moving the window outside the virtual display; and wherein the input includes an activation of the control button for moving the window outside the virtual display; and
   in response to receiving the input, generating a presentation of a version of the specific virtual object in the extended reality environment at a third virtual distance from the wearable extended reality appliance, wherein the third virtual distance differs from the first virtual distance and the second virtual distance.

\* \* \* \* \*